US012534534B2

(12) United States Patent
Pechouckova et al.

(10) Patent No.: US 12,534,534 B2
(45) Date of Patent: *Jan. 27, 2026

(54) ANTI-CD137 ANTIBODIES

(71) Applicant: INVOX PHARMA LIMITED, London (GB)

(72) Inventors: Sarka Pechouckova, Cambridge (GB); Francisca Wollerton, Cambridge (GB); Miguel Gaspar, Cambridge (GB)

(73) Assignee: INVOX PHARMA LIMITED, London (GB)

( * ) Notice: Subject to any disclaimer, the term of this patent is extended or adjusted under 35 U.S.C. 154(b) by 500 days.

This patent is subject to a terminal disclaimer.

(21) Appl. No.: 17/259,680

(22) PCT Filed: Jul. 12, 2019

(86) PCT No.: PCT/EP2019/068798
§ 371 (c)(1),
(2) Date: Jan. 12, 2021

(87) PCT Pub. No.: WO2020/011968
PCT Pub. Date: Jan. 16, 2020

(65) Prior Publication Data
US 2021/0238299 A1  Aug. 5, 2021

(30) Foreign Application Priority Data
Jul. 12, 2018  (GB) ..................... 1811404

(51) Int. Cl.
*C07K 16/28* (2006.01)
(52) U.S. Cl.
CPC ...... *C07K 16/2878* (2013.01); *C07K 2317/24* (2013.01); *C07K 2317/33* (2013.01); *C07K 2317/40* (2013.01); *C07K 2317/64* (2013.01); *C07K 2317/75* (2013.01); *C07K 2317/76* (2013.01); *C07K 2317/92* (2013.01)
(58) Field of Classification Search
None
See application file for complete search history.

(56) References Cited

U.S. PATENT DOCUMENTS

| | | |
|---|---|---|
| 3,909,459 A | 9/1975 | Friese et al. |
| 3,967,230 A | 6/1976 | Kamigaito et al. |
| 4,004,183 A | 1/1977 | Oki et al. |
| 5,595,756 A | 1/1997 | Bally et al. |
| 6,180,370 B1 * | 1/2001 | Queen ............. A61P 19/02 435/69.6 |
| 6,380,664 B1 | 4/2002 | Pollner |
| 7,288,638 B2 | 10/2007 | Jure-Kunkel et al. |
| 7,592,426 B2 | 9/2009 | Ebel et al. |
| 8,217,149 B2 | 7/2012 | Irving et al. |
| 8,383,796 B2 | 2/2013 | Korman et al. |
| 8,911,732 B2 | 12/2014 | Dennis et al. |
| 9,567,399 B1 | 2/2017 | Campbell et al. |
| 9,617,338 B1 | 4/2017 | Campbell et al. |
| 10,090,646 B2 | 10/2018 | Takaoka et al. |
| 10,205,305 B2 | 2/2019 | Uegaki et al. |
| 10,233,258 B2 | 3/2019 | Akamatsu et al. |
| 10,604,576 B2 | 3/2020 | Campbell et al. |
| 11,214,618 B2 | 1/2022 | Tuna et al. |
| 11,214,620 B2 | 1/2022 | Campbell et al. |
| 11,548,948 B2 | 1/2023 | Tuna et al. |
| 11,629,193 B2 | 4/2023 | Tuna et al. |
| 12,103,976 B2 | 10/2024 | Lakins et al. |
| 12,187,798 B2 | 1/2025 | Tuna et al. |
| 12,247,074 B2 | 3/2025 | Wollerton et al. |
| 12,252,537 B2 | 3/2025 | Tuna et al. |
| 12,297,283 B2 | 5/2025 | Tuna et al. |
| 2003/0030355 A1 | 2/2003 | Honda |
| 2007/0071675 A1 | 3/2007 | Wu et al. |
| 2009/0055944 A1 | 2/2009 | Korman et al. |
| 2012/0237498 A1 | 9/2012 | Ahrens et al. |
| 2012/0276104 A1 | 11/2012 | Woisetschlager |
| 2013/0034559 A1 | 2/2013 | Queva et al. |
| 2014/0004121 A1 | 1/2014 | Fanslow, III et al. |
| 2014/0341917 A1 | 11/2014 | Nastri et al. |
| 2015/0214697 A1 | 7/2015 | Yoshida et al. |
| 2015/0259420 A1 | 9/2015 | Triebel et al. |
| 2015/0307620 A1 | 10/2015 | Vella et al. |
| 2016/0043531 A1 | 2/2016 | Firstenberg et al. |
| 2016/0137740 A1 | 5/2016 | Hammond et al. |
| 2016/0244528 A1 * | 8/2016 | Gray ................ A61P 13/12 |

(Continued)

FOREIGN PATENT DOCUMENTS

| | | |
|---|---|---|
| CN | 101802006 A | 8/2010 |
| CN | 104955845 A | 9/2015 |

(Continued)

OTHER PUBLICATIONS

Yuan, Wei, et al. "Contributions of costimulatory molecule CD137 in endothelial cells." Journal of the American Heart Association 10.11 (2021): e020721 (Year: 2021).*
Ye, Lingyun et al. "CD137, an attractive candidate for the immunotherapy of lung cancer." Cancer science vol. 111,5 (2020): 1461-1467. doi:10.1111/cas.14354 (Year: 2020).*
Hong, Jun P et al. "An Agonistic Anti-CD137 Antibody Disrupts Lymphoid Follicle Structure and T-Cell-Dependent Antibody Responses." Cell reports. Medicine vol. 1,3 (2020): 100035. doi:10.1016/j.xcrm.2020.100035 (Year: 2020).*
Wozniak-Knopp, G., et al. "Introducing antigen-binding sites in structural loops of immunoglobulin constant domains: Fc fragments with engineered HER2/neu-binding sites and antibody properties." Protein Engineering, Design & Selection 23.4 (2010): 289-297 (Year: 2010).*

(Continued)

*Primary Examiner* — Michael Szperka
*Assistant Examiner* — Lia E Taylor
(74) *Attorney, Agent, or Firm* — Wolf, Greenfield & Sacks, P.C.

(57) ABSTRACT

The present application relates to antibody molecules that bind CD137. The antibody molecules find application in the treatment and diagnosis of diseases and disorders, such as cancer and infectious diseases.

21 Claims, 4 Drawing Sheets

Specification includes a Sequence Listing.

(56) References Cited

U.S. PATENT DOCUMENTS

| | | |
|---|---|---|
| 2017/0198050 A1 | 7/2017 | Eckelman et al. |
| 2017/0355756 A1 | 12/2017 | Julien et al. |
| 2017/0362321 A1 | 12/2017 | Campbell et al. |
| 2018/0118841 A1 | 5/2018 | Ellmark et al. |
| 2018/0175592 A1 | 6/2018 | Uegaki et al. |
| 2018/0194862 A1 | 7/2018 | Akamatsu et al. |
| 2018/0339031 A1 | 11/2018 | Masternak et al. |
| 2019/0106494 A1 | 4/2019 | Wang et al. |
| 2019/0202920 A1 | 7/2019 | Tuna et al. |
| 2019/0256602 A1 | 8/2019 | Campbell et al. |
| 2019/0330344 A1 | 10/2019 | Tuna et al. |
| 2019/0330351 A1 | 10/2019 | Campbell et al. |
| 2019/0338032 A1 | 11/2019 | Campbell et al. |
| 2019/0338049 A1 | 11/2019 | Tuna et al. |
| 2020/0407446 A1 | 12/2020 | McCourt et al. |
| 2021/0139590 A1 | 5/2021 | Tuna et al. |
| 2021/0237498 A1 | 8/2021 | Yoda et al. |
| 2021/0277134 A1 | 9/2021 | Lakins et al. |
| 2021/0301022 A1 | 9/2021 | Wollerton et al. |
| 2021/0309753 A1 | 10/2021 | Tuna et al. |
| 2021/0355228 A1 | 11/2021 | Lakins et al. |
| 2022/0048996 A1 | 2/2022 | Tuna et al. |
| 2022/0049007 A1 | 2/2022 | Lakins et al. |
| 2022/0185890 A1 | 6/2022 | Tuna et al. |
| 2022/0185894 A1 | 6/2022 | Campbell et al. |
| 2022/0267421 A1 | 8/2022 | Munoz-Olaya et al. |
| 2022/0275092 A1 | 9/2022 | Morrow et al. |
| 2022/0403025 A1 | 12/2022 | Mount et al. |
| 2023/0028110 A1 | 1/2023 | Tuna et al. |
| 2023/0357413 A1 | 11/2023 | Tuna et al. |
| 2023/0406935 A1 | 12/2023 | Tuna et al. |
| 2024/0132599 A1 | 4/2024 | Tuna et al. |
| 2024/0226319 A1 | 7/2024 | Jaeger et al. |
| 2024/0376215 A1 | 11/2024 | Tuna et al. |
| 2025/0084176 A1 | 3/2025 | Lakins et al. |

FOREIGN PATENT DOCUMENTS

| | | |
|---|---|---|
| CN | 104968364 A | 10/2015 |
| CN | 107523546 A | 12/2017 |
| CN | 109563171 A | 4/2019 |
| EP | 1025230 B1 | 2/2006 |
| EP | 1180123 B1 | 7/2008 |
| EP | 2407487 A1 | 1/2012 |
| EP | 2546268 A1 | 1/2013 |
| EP | 2242771 B1 | 7/2013 |
| EP | 2905030 A1 | 8/2015 |
| EP | 2215121 B1 | 2/2016 |
| EP | 3354661 A1 | 8/2018 |
| EP | 3470426 A1 | 4/2019 |
| JP | S51-046628 A | 4/1976 |
| JP | 2003-0228556 A | 1/2003 |
| JP | 2011-521905 A | 7/2011 |
| JP | 2012-500006 A | 1/2012 |
| JP | 2016-513467 A | 5/2016 |
| JP | 2016-533395 A | 10/2016 |
| JP | 2017-010741 A | 1/2017 |
| JP | 2018-508475 A | 3/2018 |
| RU | 2017112379 A | 10/2018 |
| TW | 201642897 A | 12/2016 |
| WO | WO 2001/077342 A1 | 10/2001 |
| WO | WO 2005/035584 A1 | 4/2005 |
| WO | WO 2006/072620 A1 | 7/2006 |
| WO | WO 2006/088447 A1 | 8/2006 |
| WO | WO 2006/099141 A1 | 9/2006 |
| WO | WO 2008/003103 A2 | 1/2008 |
| WO | WO 2008/068048 A2 | 6/2008 |
| WO | WO 2009/000006 A1 | 12/2008 |
| WO | WO 2009/068204 A1 | 6/2009 |
| WO | WO 2009/126944 A1 | 10/2009 |
| WO | WO 2009/132876 A1 | 11/2009 |
| WO | WO 2010/019570 A2 | 2/2010 |
| WO | WO 2010/057047 A1 | 5/2010 |
| WO | WO 2010/111282 A1 | 9/2010 |
| WO | WO 2010/124797 A1 | 11/2010 |
| WO | WO 2012/130831 A1 | 10/2012 |
| WO | WO 2013/181634 A2 | 12/2013 |
| WO | WO 2014/004549 A2 | 1/2014 |
| WO | WO 2014/008218 A1 | 1/2014 |
| WO | WO 2014/052064 A1 | 4/2014 |
| WO | WO 2014/089113 A1 | 6/2014 |
| WO | WO 2014/140180 A1 | 9/2014 |
| WO | WO 2014/151910 A1 | 9/2014 |
| WO | WO 2015/048312 A1 | 4/2015 |
| WO | WO 2015/049537 A1 | 4/2015 |
| WO | WO 2015/119923 A1 | 8/2015 |
| WO | WO 2015/138920 A1 | 9/2015 |
| WO | WO 2015/198312 A1 | 12/2015 |
| WO | WO 2015/200119 A1 | 12/2015 |
| WO | WO 2016/028672 A1 | 2/2016 |
| WO | WO 2016/040880 A1 | 3/2016 |
| WO | WO 2016/110584 A1 | 7/2016 |
| WO | WO 2016/111645 A1 | 7/2016 |
| WO | WO 2016/162505 A1 | 10/2016 |
| WO | WO 2016/177802 A1 | 11/2016 |
| WO | WO 2016/185016 A1 | 11/2016 |
| WO | WO 2016/200782 A1 | 12/2016 |
| WO | WO 2017/009456 A1 | 1/2017 |
| WO | WO 2017/015560 A2 | 1/2017 |
| WO | WO 2017/019846 A8 | 2/2017 |
| WO | WO 2017/025498 A1 | 2/2017 |
| WO | WO 2017/049452 A1 | 3/2017 |
| WO | WO 2017/052241 A1 | 3/2017 |
| WO | WO 2017/055398 A2 | 4/2017 |
| WO | WO 2017/062888 A1 | 4/2017 |
| WO | WO 2017/077085 A2 | 5/2017 |
| WO | WO 2017/087589 A2 | 5/2017 |
| WO | WO 2017/087901 A2 | 5/2017 |
| WO | WO 2017/123650 A2 | 7/2017 |
| WO | WO 2017/182672 A1 | 10/2017 |
| WO | WO 2017/193032 A2 | 11/2017 |
| WO | WO 2017/205738 A1 | 11/2017 |
| WO | WO 2017/220555 A1 | 12/2017 |
| WO | WO 2017/220569 A1 | 12/2017 |
| WO | WO 2017/220990 A9 | 12/2017 |
| WO | WO 2018/017673 A1 | 1/2018 |
| WO | WO 2018/056821 A1 | 3/2018 |
| WO | WO 2018/060480 A1 | 4/2018 |
| WO | WO 2018/091740 A2 | 5/2018 |
| WO | WO 2018/115859 A1 | 6/2018 |
| WO | WO 2018/127610 A1 | 7/2018 |
| WO | WO 2018/222711 A2 | 12/2018 |
| WO | WO 2019/025545 A1 | 2/2019 |

OTHER PUBLICATIONS

Stryer, Biochemistry 4th, WH Freeman, New York. 1995 (Year: 1995).*
Colman, Peter M. Research in Immunology 145.1 (1994): 33-36 (Year: 1994).*
Creative Biolabs, "Overview of Fcab", Creative Biolabs, 2025 (Year: 2025).*
Kipriyanov, Sergey M., and Fabrice Le Gall. "Generation and production of engineered antibodies." Molecular biotechnology 26.1 (2004): 39-60. (Year: 2004).*
Janeway, Charles A. "Immunobiology: The Immune System in Health and Disease." 2001 (Year: 2001).*
[No Author Listed], Abstract for CHI Immuno-Oncology Summit Europe. Mar. 18-22, 2019. 1 page. PDR303.
[No Author Listed], First-in-Class bispecific antibodies for cancer immunotherapy. Presentation at Takeda. Dec. 13, 2016. 24 pages. PDR160.
[No Author Listed] F-Star Modular Bispecific Antibodies. Summary for ATLAS deck. Presented at JP Morgan. Jan. 2017. 1 page. PDR159.
[No Author Listed], FS118 First in Human Study in Patients With Advanced Malignancies. Sponsored by F-star Therapeutics Limited. Clinical Trial. Retreived from https://clinicaltrials.gov/ct2/show/NCT03440437. Feb. 22, 2018. 7 pages.
[No Author Listed], Molecular biological basis of immunotherapy. New and Orphan Drugs for Leukemia Therapeutics. Sep. 30, 2016. 387-390. Retrieved on Dec. 18, 2023. 7 pages.

(56) References Cited

OTHER PUBLICATIONS

[No Author Listed], Pipeline Overview: F-star is developing a pipeline of bispecific antibodies focused on oncology and immuno-oncology. F-Start website update. Sep. 2016. 2 pages. PDR126.

Ascierto et al., Initial efficacy of anti-lymphocyte activation gene-3 (anti-LAG-3:BMS-986016) in combination with nivolumab (nivo) in pts with melanoma (MEL) previously treated with anti-PD-1/PD-L1 therapy. J Clin Oncology. May 20, 2017;35(15):9520-9520. Abstract only. doi: 10.1200/JCO.2017.35.15_suppl.9520. EPub May 30, 2017.

Asgarov et al., A new anti-mesothelin antibody targets selectively the membrane-associated form. MAbs. Apr. 2017;9(3):Supplementary Data. doi: 10.1080/19420862.2017.1288770. 6 pages.

Awuah et al., Reduced Shedding of Surface Mesothelin Improves Efficacy of Mesothelin-Targeting Recombinant Immunotoxins. Mol Cancer Ther. Jul. 2016;15(7):1648-55. doi: 10.1158/1535-7163.MCT-15-0863. Epub May 18, 2016.

Berg et al., Biochemistry. 5th ed. New York. 2002. Accessible at https://www.ncbi.nlm.nih.gov/books/NBK22358/section5.5. Accessed Jun. 9, 2021. 4 pages.

Bernett et al., Abstract P122: Multiple bispecific checkpoint combinations enhance T cell activity. J Immunother Cancer. 2016;4(Suppl 1):P122. 2 pages.

Bernett et al., Multiple bispecific checkpoint combinations enhance T cell activity. Xencor Poster Presentation. 2016. 1 page.

Bodhankar et al., PD-L1 Monoclonal Antibody Treats Ischemic Stroke by Controlling Central Nervous System Inflammation. Stroke. Oct. 2015;46(10):2926-34. doi: 10.1161/STROKEAHA.115.010592. Epub Aug. 25, 2015.

Borlak et al., Immune-mediated liver injury of the cancer therapeutic antibody catumaxomab targeting EpCAM, CD3 and Fcγ receptors. Oncotarget. May 10, 2016;7(19):28059-74. doi: 10.18632/oncotarget.8574.

Brewis, Development of an anti-PD-L1 Fcab. Presentation. Human Antibodies and Hybrodomas Conference. Oct. 22, 2018. PDR 312.

Brewis, Identification of a PD-L1 binding Fcab: a potent inhibitor of immunosuppressive signals. Abstract. Human Antibodies and Hybridomas 2018. Jun. 11, 2018. 1 page. PDR282.

Brewis, The use of bispecific antibodies to modulate anti-tumour immune responses. Oral Presentation at ELRIG—Research and Innovation. Mar. 29, 2017. 33 pages. PDR177.

Brewis, The use of bispecific antibodies to modulate anti-tumour immune responses. Oral Presentation at PEPtalk. Jan. 12, 2017. 26 pages. PDR163.

Burova et al., Abstract 1484: Combined treatment with anti-LAG-3 and anti-PD-1 fully human monoclonal antibodies inhibits tumor growth in immunocompetent double-humanized LAG-3/PD-1 mice. Proceedings: AACR 107th Annual Meeting 2016. Apr. 16-20, 2016. New Orleans, LA. doi: 10.1158/1538-7445.AM2016-1484. Published Jul. 2016. 8 pages.

Burova et al., Abstract P195: A novel anti-human LAG-3 antibody in combination with anti-human PD-1 (REGN2810) shows enhanced anti-tumor activity in PD-1 × LAG-3 dual-humanized mice and favorable pharmacokinetic and safety profiles in cynomolgus monkey. J Immunother Cancer. 2016;4(Suppl 1):P195. 2 pages.

Callahan et al., Targeting T Cell Co-receptors for Cancer Therapy. Immunity. May 17, 2016;44(5):1069-78. doi: 10.1016/j.immuni.2016.04.023.

Camisaschi et al., LAG-3 expression defines a subset of CD4(+)CD25(high)Foxp3(+) regulatory T cells that are expanded at tumor sites. J Immunol. Jun. 1, 2010;184(11):6545-51. doi: 10.4049/jimmunol.0903879. Epub Apr. 26, 2010.

Cemerski et al., T cell activation and anti-tumor efficacy of anti-LAG-3 antibodies is independent of LAG-3-MHCII blocking capacity. Poster Presentation. 30th Annual Meeting and Associated Programs of the Society for Immunotherapy of Cancer (SITC 2015). National Harbor, MD. Nov. 4-8, 2015. 1 page.

Chatterjee et al., Noninvasive Imaging of Immune Checkpoint Ligand PD-L1 in Tumors and Metastases for Guiding Immunotherapy. Mol Imaging. Jan.-Dec. 2017;16:1536012117718459. doi: 10.1177/1536012117718459. 5 pages.

Chen et al., Molecular mechanisms of T cell co-stimulation and co-inhibition. Nat Rev Immunol. Apr. 2013;13(4):227-42. doi: 10.1038/nri3405. Epub Mar. 8, 2013. Erratum in: Nat Rev Immunol. Jul. 2013;13(7):542.

Chiu et al., Antibody Structure and Function: The Basis for Engineering Therapeutics. Antibodies (Basel). Dec. 3, 2019;8(4):55. doi: 10.3390/antib8040055.

Chu et al., An Update on Anti-CD137 Antibodies in Immunotherapies for Cancer. Int J Mol Sci. Apr. 12, 2019;20(8):1822. doi: 10.3390/ijms20081822. 17 pages.

Curran et al., PD-1 and CTLA-4 combination blockade expands infiltrating T cells and reduces regulatory T and myeloid cells within B16 melanoma tumors. Proc Natl Acad Sci U S A. Mar. 2, 2010;107(9):4275-80. doi: 10.1073/pnas.0915174107. Epub Feb. 16, 2010.

Dahlén et al., Bispecific antibodies in cancer immunotherapy. Ther Adv Vaccines Immunother. Feb. 2018;6(1):3-17. doi: 10.1177/2515135518763280. Epub Mar. 28, 2018.

Davies, Analytical challenges for next generation biologics. Oral Presentation at Waters Biopharma Mini-Seminar. May 24, 2017. 20 pages. PDR191.

Davies, Bispecific Antibodies: New Opportunities for Novel Therapies. Oral Presentation at Bioprocess UK 2016. Nov. 26, 2016. 14 pages. PDR 135.

Davies, Overcoming the Manufacturing Challenges for Bisepcific mAbs. Oral Presentation at 5th Annual Cell Culture and Bioprocessing Congress. Nov. 6, 2016. 16 pages. PDR142.

Davies, Overcoming the Manufacturing Challenges for Bisepcific mAbs. Oral Presentation at Biopronet 3rd Annual Scientific Symposium. Oct. 20, 2016. 16 pages. PDR136.

Daxini et al., Vasculitis associated with immune checkpoint inhibitors—a systematic review. Clin Rheumatol. Sep. 2018;37(9):2579-2584. doi: 10.1007/s10067-018-4177-0. Epub Jun. 19, 2018.

Del Bano et al., A Bispecific Antibody-Based Approach for Targeting Mesothelin in Triple Negative Breast Cancer. Front Immunol. Jul. 10, 2019;10:1593. doi: 10.3389/fimmu.2019.01593.

Demeure et al., T Lymphocytes infiltrating various tumour types express the MHC class II ligand lymphocyte activation gene-3 (LAG-3): role of LAG-3/MHC class II interactions in cell-cell contacts. Eur J Cancer. Sep. 2001;37(13):1709-18. doi: 10.1016/s0959-8049(01)00184-8.

Deng et al., LAG-3 confers poor prognosis and its blockade reshapes antitumor response in head and neck squamous cell carcinoma. Oncoimmunology. Oct. 7, 2016;5(11):e1239005. doi: 10.1080/2162402X.2016.1239005.

Doody et al., Abstract B091: a LAG-3/PD-L1 bispecific antibody inhibits tumor growth in two syngeneic colon carcinoma models. Second CRI-CIMT-EATI-AACR International Cancer Immunotherapy Conference: Translating Science into Survival. Sep. 25-28, 2016. New York, NY. doi: 10.1158/23/26-6066.IMM2016-B091. Published Nov. 2016. 8 pages.

Doody, An anti-murine LAG-3/PD-L1 bispecific antibody which modulates T cell activity and inhibits tumour growth. Oral Presentation at 2nd Annual Advances in Immuno-Oncology Congress. May 16, 2017. 17 pages. PDR188.

Doody, In vivo Efficacy of bispecific antibodies targeting two immmune-modulatory receptors. Oral Presentation at PEGS Europe. Nov. 4, 2016. 16 pages. PDR144.

El-Khoueiry et al., The relationship of pharmacodynamics (PD) and pharmacokinetics (PK) to clinical outcomes in a phase I study of OX40 agonistic monoclonal antibody (mAb) PF-04518600 (PF-8600). J Clin Oncol. May 20, 2017. 35(15_suppl):3027-3027. Meeting Abstract. 2017 ASCO Annual Meeting I. doi: 10.1200/JCO.2017.35.15_suppl.3027. 4 pages.

Everett et al., A LAG-3/PD-L1 bispecific antibody inhibits tumour growth in two syngeneic colon carcinoma models. Poster Presentation. AACR Tumor Immunology and Immunotherapy. Oct. 21, 2016. 1 page. PDR137.

(56) References Cited

OTHER PUBLICATIONS

Everett et al., Abstract PR06: a LAG-3/PD-L1 bispecific antibody inhibits tumour growth in two syngeneic colon carcinoma models. AACR Special Conference on Tumor Immunology and Immunotherapy. Oct. 20-23, 2016. Boston, MA. Doi: 10.1158/2326-6074.TUMIMM16-PR06. Published Mar. 2017. 8 pages.
Everett, A LAG-3/PD-L1 Bispecific Antibody Inhibits Tumour Growth in Two Syngeneic Colon Carcinoma Models. Oral Presentation at AACR Tumor Immunology and Immunotherapy. Boston, MA. Oct. 20-23, 2016. 5 pages. PDR141.
Faroudi et al., Abstract 2399: LAG-3/PD-L1 mAb2 can overcome PD-L1-mediated compensatory upregulation of LAG-3 induced by single-agent checkpoint blockade. Proceedings: AACR Annual Meeting 2019; Mar. 29-Apr. 3, 2019. Atlanta, GA. Doi: 10.1158/1538-7445.AM2019-2399. Published Jul. 2019. 4 pages.
Faroudi et al., Abstract B009: FS118, a LAG-3/PD-L1 bispecific antibody, capable of driving potent anti-tumour immune responses and overcome PD-(L)1-mediated compensatory. Sep. 25-28, 2019. Fifth CRI-CIMT-EATI-AACR International Cancer Immunotherapy Conference (2019): Translating Science into Survival. Paris. 1 page.
Faroudi et al., FS118, a LAG-3/PD-L1 bispecific antibody, capable of driving potent anti-tumour immune responses and overcome PD-(L)1-mediated compensatory. Sep. 25-28, 2019. Poster. Fifth CRI-CIMT-EATI-AACR International Cancer Immunotherapy Conference (2019): Translating Science into Survival. Paris. 1 page.
Fiehler, Development of an anti-PD-L1 Fcab. Presentation. European Antibody Congress. Oct. 29, 2018. 26 pages. PDR312.
Foy et al., Poxvirus-Based Active Immunotherapy with PD-1 and LAG-3 Dual Immune Checkpoint Inhibition Overcomes Compensatory Immune Regulation, Yielding Complete Tumor Regression in Mice. PLoS One. Feb. 24, 2016;11(2):e0150084. doi: 10.1371/journal.pone.0150084.
Frenzel et al., Phage display-derived human antibodies in clinical development and therapy. MAbs. Oct. 2016;8(7):1177-1194. doi: 10.1080/19420862.2016.1212149. Epub Jul. 14, 2016.
F-STAR, First-in-Class Bispecific Antibodies for Cance Immunotherapy. Jul. 2016. Presentation. 14 pages. PDR119.
F-STAR, Next-Generation Bispecifics for Cancer Immunotherapy. Feb. 2020. Presented on Mar. 11, 2020 at Immuno-Oncology Summit Europe 2020. London. 46 pages.
F-STAR, Redirecting T Cells. Overcoming Cancer. Improving Lives. Oct. 2019 Presentation in Investor Meeting. 36 pages.
F-STAR, Redirecting T Cells. Overcoming Cancer. Improving Lives. Apr. 2020 Presentation in Investor Meeting. 43 pages.
F-STAR, Redirecting T Cells. Overcoming Cancer. Improving Lives. Jan. 2020 Presentation in Investor Meeting. 41 pages.
Gandhi et al., Expression of LAG-3 by tumor-infiltrating lymphocytes is coincident with the suppression of latent membrane antigen-specific CD8+ T-cell function in Hodgkin lymphoma patients. Blood. Oct. 1, 2006;108(7):2280-9. doi: 10.1182/blood-2006-04-015164. Epub Jun. 6, 2006.
Gaspar et al., FS120 mAb2, a dual agonist bispecific antibody targeting OX40 and CD137, activates T cells in vitro and induces FcyR-independent anti-tumour activity. SITC 2018. Nov. 7, 2018. Poster. 10 pages.
Gaspar, FS120 mAb2, a dual agonist bispecific antibody targeting OX40 and CD137. SITC 2018. Nov. 11, 2018. Presentation. 12 pages.
Geuijen et al., Abstract 541: An unbiased screen identifies a CD137xPD-L1 bispecific IgG1 antibody with unique T cell activation and binding properties. Cancer Res. 2019;79(13_Supplement):541. Poster Presentation AACR Conference 2019. Jul. 1, 2019. doi: 10.1158/1538-7445.AM2019-541. 4 pages.
Gliddon, Pushing all the buttons: innovating in immuno-oncology with mAb. Oral Presentation at Phacilitate Immunotherapy World 2017. Jan. 18, 2017. 11 pages. PDR165.
Glisson et al., Phase 1 study of MEDI0562, a humanized OX40 agonist monoclonal antibody (mAb), in adult patients (pts) with advanced solid tumors. Annals Onocol. Oct. 1, 2016;27(6):vi361. doi: 10.1093/annonc/mdw378.07.
Golfier et al., Anetumab ravtansine: a novel mesothelin-targeting antibody-drug conjugate cures tumors with heterogeneous target expression favored by bystander effect. Mol Cancer Ther. Jun. 2014;13(6):1537-48. doi: 10.1158/1535-7163.MCT-13-0926. Epub Apr. 8, 2014.
Grosso et al., Programmed death-ligand 1 (PD-L1) expression in various tumor types. J Immunother Cancer. 2013;1(Suppl 1):P53. http://www.immunotherapyofcancer.org/content/1/S1/P53. 1 page.
Gunde et al., Abstract 1532: A novel, monovalent tri-specific antibody-based molecule that simultaneously modulates PD-L1 and 4-1BB exhibits potent anti-tumoral activity in vivo. Cancer Res. 2019;79(13_Supplement):1532. AACR Conference 2019. Jul. 1, 2019. doi: 10.1158/1538-7445.AM2019-1532. 4 pages.
Haines et al., Abstract 4714: Blockade of LAG-3 amplifies immune activation signatures and augments curative antitumor responses to anti-PD-1 therapy in immune competent mouse models of cancer. Proceedings: AACR Annual Meeting 2017. Apr. 1-5, 2017. Washington, DC. doi: 10.1158/1538-7445.AM2017-4714. Published Jul. 2017. 8 pages.
Han et al., Bispecific anti-CD3 × anti-HER2 antibody mediates T cell cytolytic activity to HER2-positive colorectal cancer in vitro and in vivo. Int J Oncol. Dec. 2014;45(6):2446-54. doi: 10.3892/ijo.2014.2663. Epub Sep. 18, 2014.
Hassan et al., Mesothelin Immunotherapy for Cancer: Ready for Prime Time? J Clin Oncol. Dec. 2016;34(34):4171-4179. doi: 10.1200/JCO.2016.68.3672. Epub Oct. 31, 2016.
Hassan et al., Phase II clinical trial of amatuximab, a chimeric antimesothelin antibody with pemetrexed and cisplatin in advanced unresectable pleural mesothelioma. Clin Cancer Res. Dec. 1, 2014;20(23):5927-36. doi: 10.1158/1078-0432.CCR-14-0804. Epub Sep. 17, 2014.
Hebb et al., Administration of low-dose combination anti-CTLA4, anti-CD137, and anti-OX40 into murine tumor or proximal to the tumor draining lymph node induces systemic tumor regression. Cancer Immunol Immunother. Jan. 2018;67(1):47-60. doi: 10.1007/s00262-017-2059-y. Epub Sep. 13, 2017. Author Manuscript. 20 pages.
Herbst et al., Predictive correlates of response to the anti-PD-L1 antibody MPDL3280A in cancer patients. Nature. Nov. 27, 2014;515(7528):563-7. doi: 10.1038/nature14011. Author Manuscript.
Hid Cadena et al., Checks and Balances in Autoimmune Vasculitis. Front Immunol. Feb. 22, 2018;9:315. doi: 10.3389/fimmu.2018.00315.
Ho et al., A novel high-affinity human monoclonal antibody to mesothelin. Int J Cancer. May 1, 2011;128(9):2020-30. doi: 10.1002/ijc.25557.
Horn et al., CD3xPDL1 bi-specific T cell engager (BiTE) simultaneously activates T cells and NKT cells, kills PDL1+ tumor cells, and extends the survival of tumor-bearing humanized mice. Oncotarget. Aug. 3, 2017;8(35):57964-57980. doi: 10.18632/oncotarget.19865.
Huang et al., Abstract PR03: Combinatorial blockade of PD-1, CTLA-4, and LAG-3 pathways inhibits murine ovarian tumor growth. Abstracts: AACR Special Conference: Advances in Ovarian Cancer Research: Exploiting Vulnerabilities. Oct. 17-20, 2015. Orlando, FL. doi: 10.1158/1557-3265.OVCA15-PR03. Published Jan. 2016. 8 pages.
Iwai et al., Involvement of PD-L1 on tumor cells in the escape from host immune system and tumor immunotherapy by PD-L1 blockade. Proc Natl Acad Sci U S A. Sep. 17, 2002;99(19):12293-7. doi: 10.1073/pnas.192461099. Epub Sep. 6, 2002.
Jochems et al., Analyses of functions of an anti-PD-L1/TGFβR2 bispecific fusion protein (M7824). Oncotarget. Sep. 8, 2017;8(43):75217-75231. doi: 10.18632/oncotarget.20680.
Kehry et al., Abstract 271: Targeting PD-1, TIM-3 and LAG-3 in combination for improved immunotherapy combinations. AACR 106th Annual Meeting. Apr. 18-22, 2015. Philadelphia, PA. doi: 10.1158/1538-7445.AM2015-271. 8 pages.
Klooster et al., Abstract B088: Generation of immuno-modulatory receptor binding bispecific antibodies to modulate tumor immunity. Second CRI-CIMT-EATI-AACR International Cancer Immunotherapy Conference: Translating Science into Survival. Sep. 25-28, 2016. New York, NY. doi: 10.1158/2326-6066.IMM2016-B088. 4 pages.

(56) References Cited

OTHER PUBLICATIONS

Koopmans et al., A novel bispecific antibody for EGFR-directed blockade of the PD-1/PD-L1 immune checkpoint. Oncoimmunology. May 31, 2018;7(8):e1466016. doi: 10.1080/2162402X.2018.1466016.
Kraman et al., A LAG-3/PD-L1 bispecific antibody inhibits tmour growth in two syngeneic colon carcinoma models. Poster Presentation. BSI/NVVI Congress. Dec. 6, 2016. 1 page. PDR153.
Kraman et al., A LAG-3/PD-L1 bispecific antibody inhibits tumour growth in two syngeneic colon carcinoma models. Abstract B091. Poster Presentation. CRI-CIMT-EATI-AACR Cancer Immunotherapy Conference. Sep. 26, 2016. 1 page. PDR129.
Kraman et al., A LAG-3/PD-L1 bispecific antibody inhibits tumour growth in two syngeneic colon carcinoma models. Poster 003. Poster Presentation. 2nd Annual Advances in Immuno-Oncology Congress. May 15, 2017. 1 page. PDR185.
Kraman et al., A LAG-3/PD-L1 bispecific antibody inhibits tumour growth in two syngeneic colon carcinoma models. Poster 1103. Poster Presentation. Keystone Symposium—Cancer Immunology and Immunotherapy. Mar. 19, 2017. 1 page. PDR174.
Kraman et al., A LAG-3/PD-L1 bispecific antibody inhibits tumour growth in two syngeneic colon carcinoma models. Poster 128. Poster Presentation at SITC. Nov. 9, 2016. 1 page. PDR143.
Kraman et al., A LAG-3/PD-L1 bispecific antibody inhibits tumour growth in two syngeneic colon carcinoma models. Poster 5651. Poster Presentation. AACR Annual Meeting. Apr. 1, 2017. 1 page. PDR176.
Kraman et al., A Lag-3/PD-L1 bispecific antibody inhibits tumour growth in two syngeneic colon carcinoma models. Poster Presentation. International Conference on Human & Translational Immunology. Sep. 16, 2016. 1 page. PDR123.
Kraman et al., A LAG-3/PD-L1 bispecific antibody inhibits tumour growth in two syngeneic coon carcinoma models. Poster 3005. Poster Presentation. Keystome Symposium—Biobetters and Next-Generation Biologics. Jan. 22-26, 2017. 1 page. PDR164.
Kraman et al., Abstract 5651:A LAG-3/PD/L1 bispecific antibody inhibits tumor growth in two syngeneic colon carcinoma models. AACR Annual Meeting 2017. Apr. 1-5, 2017. Washington, DC. Doi: 10.1158/1538-7445.AM2017-5651. 8 pages.
Kraman et al., Dual blockade of PD-L1 and LAG-3 with FS118, a unique bispecific antibody, induces CD8+ T-cell activation and modulates the tumour microenvironment to promote anti-tumour immune responses. Apr. 14-18, 2018. Poster 2719. Proceedings of the American Association for Cancer Research Annual Meeting 2018. Chicago, IL. 2 pages.
Kraman et al., Dual blockade of PD-L1 and LAG-3 with FS118, a unique bispecific antibody, induces T-cell activation with the potential to drive potent anti-tumour immune responses. Nov. 7, 2017;5 Suppl 2 (87):Abstract P348. 32nd Annual Meeting and Pre-Conference Programs of the Society for Immunotherapy of Cancer (SITC). Part II. Nov. 8-12, 2017. National Harbor, MD. 2 pages.
Kraman et al., Dual blockade of PD-L1 and LAG-3 with FS118, a unique bispecific antibody, induces T-cell activation with the potential to drive potent anti-tumour immune responses. Apr. 14-18, 2018;78(13 Suppl);Abstract 2719. Proceedings of the American Association for Cancer Research Annual Meeting 2018. Chicago, IL. 5 pages.
Kraman et al., Dual blockade of PD-L1 and LAG-3 with FS118, a unique bispecific antibody, induces T-cell activation with the potential to drive potent anti-tumour immune responses. Poster P348. 32nd Annual Meeting and Pre-Conference Programs of the Society for Immunotherapy of Cancer (SITC). Part II. Nov. 8-12, 2017. National Harbor, MD. 1 page.
Kraman et al., FS118, a Bispecific Antibody Targeting LAG-3 and PD-L1, Enhances T-Cell Activation Resulting in Potent Antitumor Activity. Clin Cancer Res. Jul. 1, 2020;26(13):3333-3344. doi: 10.1158/1078-0432.CCR-19-3548. Epub Apr. 16, 2020.
Kunik et al., Structural consensus among antibodies defines the antigen binding site. PLoS Comput Biol. 2012;8(2):e1002388. doi: 10.1371/journal.pcbi.1002388. Epub Feb. 23, 2012. 12 pages.
Kvarnhammar et al., The CTLA-4 x OX40 bispecific antibody ATOR-1015 induces anti-tumor effects through tumor-directed immune activation. J Immunother Cancer. Apr. 11, 2019;7(1):103. doi: 10.1186/s40425-019-0570-8.
La Motte-Mohs et al., Abstract 3217: MGD013, a bispecific PD-1 x LAG-3 Dual-Affinity Re-Targeting (DART®) protein with T-cell immunomodulatory activity for cancer treatment. AACR 107th Annual Meeting. Apr. 16-20, 2016. New Orleans, LA. Doi: 10.1158/1538-7445.AM2016-3217. 8 pages.
La Motte-Mohs et al., MGD013, a bispecific PD-1 x LAG-3 Dual-Affinity Re-Targeting (DART®) protein with T-cell immunomodulatory activity for cancer treatment. Poster Presentation. 2016. http://ir.macrogenics.com/events.cfm. 1 page.
Lakins et al., FS222 mAb2, a bispecific conditional agonist antibody targeting CD137 and PD-L1, induces potent lymphocyte activation and has a favourable safety profile. F-star, Cambridge, UK. Poster Presentation. AACR Annual Meeting Mar. 29-Apr. 3, 2019. Atlanta, GA. Poster No. 1540. 1 page.
Lakins et al., Optimising TNFRSF agonism and checkpoint blockade with a novel CD137/PD-L1 bispecific antibody. Abstracts Therapeutic Development. Dec. 1, 2018;29(Supplement 10):X30. doi: 10.1093/annonc/mdy487.014. 1 page.
Lamberts et al., ImmunoPET with Anti-Mesothelin Antibody in Patients with Pancreatic and Ovarian Cancer before Anti-Mesothelin Antibody-Drug Conjugate Treatment. Clin Cancer Res. Apr. 1, 2016;22(7):1642-52. doi: 10.1158/1078-0432.CCR-15-1272. Epub Nov. 20, 2015.
Larkin et al., Combined Nivolumab and Ipilimumab or Monotherapy in Untreated Melanoma. N Engl J Med. Jul. 2, 2015;373(1):23-34. doi: 10.1056/NEJMoa1504030. Epub May 31, 2015. Erratum in: N Engl J Med. Nov. 29, 2018;379(22):2185.
Levitan, Amgen Halts Rilotumumab Development Due to Increased Death Signal. Cancer Network. Nov. 26, 2014. Retrieved from www.cancernetwork.com/view/amgen-halts-rilotumumab-development-due-increased-death-signal. 3 pages.
Li et al., Discovery and preclinical characterization of the antagonist anti-PD-L1 monoclonal antibody LY3300054. J Immunother Cancer. Apr. 30, 2018;6(1):31. doi: 10.1186/s40425-018-0329-7. Erratum in: J Immunother Cancer. Jun. 4, 2018;6(1):45.
Lin et al., Fc-dependent expression of CD137 on human NK cells: insights into "agonistic" effects of anti-CD137 monoclonal antibodies. Blood. Aug. 1, 2008;112(3):699-707. doi: 10.1182/blood-2007-11-122465. Epub Jun. 2, 2008.
Link et al., Abstract 3752: Preclinical pharmacology of MP0310: a 4-1BB/FAP bispecific DARPin drug candidate promoting tumor-restricted T-cell costimulation. Cancer Res. Jul. 1, 2018;78(13_Supplement):3752.
Liu et al., Abstract 3642: Tumor-antigen expression-dependent activation of the CD137 costimulatory pathway by bispecific DART® proteins. Cancer Res. Jul. 1, 2017;77(13_Supplement):3642.
Liu et al., Dual Targeting of Innate and Adaptive Checkpoints on Tumor Cells Limits Immune Evasion. Cell Rep. Aug. 21, 2018;24(8):2101-2111. doi: 10.1016/j.celrep.2018.07.062.
Ma et al., Recognition of mesothelin by the therapeutic antibody MORAb-009: structural and mechanistic insights. J Biol Chem. Sep. 28, 2012;287(40):33123-31. doi: 10.1074/jbc.M112.381756. Epub Jul. 11, 2012.
Mayes et al., Abstract 539: A bispecific Fc-silenced IgG1 antibody (MCLA-145) requires PD-L1 binding to activate CD137. Cancer Res. 2019;79(13_Supplement):539. AACR Presentation 2019. Jul. 1, 2019. doi: 10.1158/1538-7445.AM2019-539. 4 pages.
Mccourt et al., KY1055; a novel ICOS/PD-L1 bispecific antibody, enhance T cell activation and delivers potent monotherapy anti-tumour response in vivo. Abstract. CIMT 2018. Feb. 28, 2018. 1 page. PDR245.
Mccourt et al., KY1055; a novel ICOS/PD-L1 bispecific antibody, enhance T cell activation and delivers potent monotherapy anti-tumour response in vivo. Poster Presentation. CIMT Conference. May 9, 2018. 1 page. PDR 264.
Mccourt et al., KY1055; a novel ICOS/PD-L1 bispecific antibody, enhance T cell activation and delivers potent monotherapy anti-tumour response in vivo. Presentation. CIMT Conference. May 9, 2018. 13 pages. PDR265.

(56) References Cited

OTHER PUBLICATIONS

Mccourt, Development of an ICOS/PD-L1 Bispecific, Mar. 18-22, 2019. Abstract. Cambridge Healthtech Institute's 4th Annual Immuno-Oncology Summit Europe 2019 (London).
Melero et al., Clinical development of immunostimulatory monoclonal antibodies and opportunities for combination. Clin Cancer Res. Mar. 1, 2013;19(5):997-1008. doi: 10.1158/1078-0432.CCR-12-2214.
Michaelson et al., Anti-tumor activity of stability-engineered IgG-like bispecific antibodies targeting TRAIL-R2 and LTbetaR. MAbs. Mar.-Apr. 2009;1(2):128-41. doi: 10.4161/mabs.1.2.7631. Epub Mar. 11, 2009.
Munoz-Olaya, Development of an anti-PD-L1Fcab. Presentation. PEGS Lisbon. Nov. 16, 2018. 24 pages. PDR321.
Nalivaiko et al., A Recombinant Bispecific CD20×CD95 Antibody With Superior Activity Against Normal and Malignant B-cells. Mol Ther. Feb. 2016;24(2):298-305. doi: 10.1038/mt.2015.209. Epub Nov. 19, 2015.
Pavlidou et al., Simultaneous costimulatory T-cell engagement and checkpoint inhibition by PRS-344/ONC0055, a 4-1BB/PD-L1 bispecific compound for tumor localized activation of the immune system. SITC 2018. Poster Presentation. 2018. 1 page.
Perez-Ruiz et al., Anti-CD137 and PD-1/PD-L1 Antibodies En Route toward Clinical Synergy. Clin Cancer Res. Sep. 15, 2017;23(18):5326-5328. doi: 10.1158/1078-0432.CCR-17-1799. Epub Aug. 8, 2017.
Poon et al., Dual agonist bispecific antibody targeting OX40 and DC137 mediates anti-tumour immunity and synergises with PD-1/PD-L1 blockade to improve survival in a syngeneic mouse model. AACR 2019. Mar. 29, 2019. Poster. 9 pages.
Powles et al., MPDL3280A (anti-PD-L1) treatment leads to clinical activity in metastatic bladder cancer. Nature. Nov. 27, 2014;515(7528):558-62. doi: 10.1038/nature13904.
Reichen et al., Abstract 3029: FAP-mediated tumor accumulation of a T-cell agonistic FAP/4-1BB DARPin drug candidate analyzed by SPECT/CT and quantitative biodistribution. Cancer Res. Jul. 1, 2018;78(13_Supplement):3029.
Ryan et al., A novel biologic platform elicits profound T cell costimulatory activity and antitumor immunity in mice. Cancer Immunol Immunother. Apr. 2018;67(4):605-613. doi: 10.1007/s00262-018-2116-1. Epub Jan. 11, 2018.
Sainson et al., KY1055, a novel ICOS/PD-L1 bispecific antibody, efficiently enhances T cell activation and delivers a potent anti-tumour response in vivo. Abstract. AACR. Jan. 22, 2018. 1 page. PDR236.
Sainson et al., KY1055, a novel ICOS/PD-L1 bispecific antibody, efficiently enhances T cell activation and delivers a potent anti-tumour response in vivo. Poster Presentation. AACR 2018. Apr. 4, 2018. 1 page. PDR254.
Schroeder, Chapter 13: Immunoglobulins and Their Genes. From Arthritis and Allied Conditions: A Textbook of Rheumatology. 15th Ed. vol. 1. Eds Koopman et al. Lippincot Williams & Wilkins. pp. 289-304. Supplied by the British Library Jul. 31, 2023.
Segal et al., Results from an Integrated Safety Analysis of Urelumab, an Agonist Anti-CD137 Monoclonal Antibody. Clin Cancer Res. Apr. 15, 2017;23(8):1929-1936. doi: 10.1158/1078-0432.CCR-16-1272. Epub Oct. 18, 2016.
Strauss et al., Phase I Trial of M7824 (MSB0011359C), a Bifunctional Fusion Protein Targeting PD-L1 and TGFβ, in Advanced Solid Tumors. Clin Cancer Res. Mar. 15, 2018;24(6):1287-1295. doi: 10.1158/1078-0432.CCR-17-2653. Epub Jan. 3, 2018.
Tang et al., A human single-domain antibody elicits potent antitumor activity by targeting an epitope in mesothelin close to the cancer cell surface. Mol Cancer Ther. Apr. 2013;12(4):416-26. doi: 10.1158/1535-7163.MCT-12-0731. Epub Jan. 31, 2013.
Tuna, Delivering the next immuno-oncology breakthrough. PEGS Europe 2018. Nov. 11, 2018. Presentation. 24 pages.
Tuna, Identification of a PD-L1 binding FCAB: a potent inhibitor of immunosuppressive signals. Abstract. European Antibody Congress. May 3, 2018. 1 page. PDR270.
Tuna, The use of bispecific antibodies to modulate anti-tumour immune responses. Oral Presentation at 10th Annual Proteins and Antibodies Congress. Apr. 24, 2017. 26 pages. PDR183.
Vanamee et al., Structural principles of tumor necrosis factor superfamily signaling. Sci Signal. Jan. 2, 2018;11(511):eaao4910. doi: 10.1126/scisignal.aao4910. 12 pages.
Wang et al., Retargeting T cells for HER2-positive tumor killing by a bispecific Fv-Fc antibody. PLoS One. Sep. 23, 2013;8(9):e75589. doi: 10.1371/journal.pone.0075589. eCollection 2013.
Weismann, A LAG-3/PD-L1 Bispecific Antibody Inhibits Tumour Growth In Two Syngeneic Colon Carcinoma Models. International Conference on Human and Translational Immunology. Rhodes, Greece. Sep. 16-21, 2016. Presentation. 6 pages. PDR128.
Wherry, T cell exhaustion. Nat Immunol. Jun. 2011;12(6):492-9. doi: 10.1038/ni.2035.
Wilton, KY1055, a bispecific mAb2 targeting ICOS and PD-L1. Presentation. Feb. 21, 2018. 17 pages. PDR238.
Wolchok et al., Nivolumab plus ipilimumab in advanced melanoma. N Engl J Med. Jul. 11, 2013;369(2):122-33. doi: 10.1056/NEJMoa1302369. Epub Jun. 2, 2013. Erratum in: N Engl J Med. Nov. 29, 2018;379(22):2185. Author Manuscript.
Woo et al., Immune inhibitory molecules LAG-3 and PD-1 synergistically regulate T-cell function to promote tumoral immune escape. Cancer Res. Feb. 15, 2012;72(4):917-27. doi: 10.1158/0008-5472.CAN-11-1620. Epub Dec. 20, 2011.
Workman et al., Negative regulation of T cell homeostasis by lymphocyte activation gene-3 (CD223). J Immunol. Jan. 15, 2005;174(2):688-95. doi: 10.4049/jimmunol.174.2.688.
Workman et al., The CD4-related molecule, LAG-3 (CD223), regulates the expansion of activated T cells. Eur J Immunol. Apr. 2003;33(4):970-9. doi: 10.1002/eji.200323382.
Wydro, Bispecific antibodies: new opportunities for novel therapies. Oral Presentation at 7th Annual Biologics Symposium. Mar. 1, 2017. 24 pages. PDR172.
Wykes et al., Immune checkpoint blockade in infectious diseases. Nat Rev Immunol. Feb. 2018;18(2):91-104. doi: 10.1038/nri.2017.112. Epub Oct. 9, 2017.
Yap et al., A first-in-human phase I study of FS118, an anti-LAG-3/PD-L1 bispecific antibody in patients with solid tumors that have progressed on prior PD-1/PD-L1 therapy. Journal of Clinical Oncology. Jun. 1, 2019. Poster TPS2652. 2019 ASCO Annual Meeting Proceedings. 20 pages.
Yap et al., A first-in-human phase I study of FS118, an anti-LAG-3/PD-L1 bispecific antibody in patients with solid tumors that have progressed on prior PD-1/PD-L1 therapy. Journal of Clinical Oncology. May 26, 2019;37(15_suppl). 3 pages.
Yonezawa et al., Boosting Cancer Immunotherapy with Anti-CD137 Antibody Therapy. Clin Cancer Res. Jul. 15, 2015;21(14):3113-20. doi: 10.1158/1078-0432.CCR-15-0263. Epub Apr. 23, 2015.
Zhang et al., Structural basis of a novel PD-L1 nanobody for immune checkpoint blockade. Cell Discov. Mar. 7, 2017;3:17004. doi: 10.1038/celldisc.2017.4.
Zhao et al., Novel Antibody Therapeutics Targeting Mesothelin In Solid Tumors. Clin Cancer Drugs. Oct. 2016;3(2):76-86. doi: 10.2174/2212697X03666160218215744.
International Search Report and Written Opinion for Application No. PCT/EP2019/068798, mailed Sep. 25, 2019.
International Preliminary Report on Patentability for Application No. PCT/EP2019/068798, mailed Jan. 21, 2021.
[No Author Listed] F-star Alpha: A new asset centric company. Retrieved from http://www.onenucleus.com/media/Events/LSLS/11%20feb%202014/Jane%20Dancer.pdf on Jan. 8, 2015. 15 pages.
Asgarov et al., A new anti-mesothelin antibody targets selectively the membrane-associated form. MAbs. Apr. 2017;9(3):567-577. doi: 10.1080/19420862.2017.1288770.
Bacac et al., Abstract 1494: CEA TCB: A novel head-to-tail 2:1 T cell bispecific antibody for treatment of CEA-positive solid tumors. Oncoimmunology. Aug. 2016; 5(Abstract): e1203498. Epub Jun. 24, 2016. doi: 10.1080/2162402X.2016.1203498.
Chester et al., 4-1BB agonism: adding the accelerator to cancer immunotherapy. Cancer Immunol Immunother. Oct. 2016;65(10):1243-8. doi: 10.1007/s00262-016-1829-2. Epub Mar. 31, 2016.

(56) References Cited

OTHER PUBLICATIONS

Chester et al., Dual antibody therapy to harness the innate antitumor immune response to enhance antibody targeting of tumors. Curr Opin Immunol. Apr. 2015;33:1-8. doi: 10.1016/j.coi.2014.12.010. Epub Jan. 7, 2015.
Goding et al., Combination of adoptive cell transfer, anti-PD-L1 and anti-LAG-3 antibodies for the treatment of recurrent tumors: better with more. OncoImmunology. Oct. 22, 2013;2(8):e25050-1-e25050-3.
Hasenhindl et al., Creating stable stem regions for loop elongation in Fcabs—insights from combining yeast surface display, in silico loop reconstruction and molecular dynamics simulations. Biochim Biophys Acta. 2014;1844(9):1530-1540. doi:10.1016/j.bbapap.2014.04.020.
Hasenhindl et al., Stability assessment on a library scale: a rapid method for the evaluation of the commutability and insertion of residues in C-terminal loops of the CH3 domains of IgG1-Fc. Protein Eng Des Sel. 2013;26(10):675-682.
Jing et al., Combined immune checkpoint protein blockade and low dose whole body irradiation as immunotherapy for myeloma. Journal of Immunotherapy of Cancer. doi: 10.1186/S40425-014-0043-Z. Jan. 20, 2015. 15 pages.
Kraman et al., A LAG-3/PD-L1 bispecific antibody inhibits tumor growth in two syngeneic colon carcinoma models. Journal of ImmunoTherapy of Cancer. 2016;4(Suppl 1):82(abstract P124).
Kraman et al., A LAG-3/PD-L1 bispecific antibody inhibits tumor growth in two syngeneic colon carcinoma models. Retrieved from http://www.f-star.com/media/73722/A-LAG-3-PD-L1-bispecific-antibody-inhibits-tumour-growth-in-two-syngeneic-colon-carcinoma-models.pdf. Nov. 9-13, 2016. 1 page.
Lakins et al., A Novel CD137/PD-L1 Bispecific Antibody Modulates the Tumour Microenvironmentby Activating CD8+ T cells and Results in Tumour Growth Inhibition. F-Star Poster. Nov. 7, 2018. 1 page. Retrieved from https://www.f-star.com/media/87488/201811-SITC-2018-F-star-FS222-Poster-ONLINE.pdf.
Lee et al., 4-1BB and OX40 dual costimulation synergistically stimulate primary specific CD8 T cells for robust effector function. J Immunol. Sep. 1, 2004;173(5):3002-12. doi: 10.4049/jimmunol.173.5.3002.
Leung et al., A HER2-specific Modified Fc Fragment (Fcab) Induces Antitumor Effects Through Degradation of HER2 and Apoptosis. Mol Ther. Nov. 2015;23(11):1722-1733. doi: 10.1038/mt.2015.127. Epub Aug. 3, 2015. Erratum in: Mol Ther. Nov. 2015;23(11):1794.
Lobner et al., Engineered IgG1-Fc—one fragment to bind them all. Immunol Rev. Mar. 2016;270(1):113-31. doi: 10.1111/imr.12385.
Lobner et al., Two-faced Fcab prevents polymerization with VEGF and reveals thermodynamics and the 2.15 Å crystal structure of the complex. MAbs. Oct. 2017;9(7):1088-1104. doi: 10.1080/19420862.2017.1364825. Epub Aug. 17, 2017.
Lundqvist et al., 31st Annual Meeting and Associated Programs of the Society for Immunotherapy of Cancer (SITC 2016): Part One. Journal for Immunotherapy of Cancer. Nov. 16, 2016;4(1):74(abstract P124).
Qui et al., CD134 plus CD137 dual costimulation induces Eomesodermin in CD4 T cells to program cytotoxic Th1 differentiation. J Immunol. Oct. 1, 2011;187(7):3555-64. doi: 10.4049/jimmunol.1101244. Epub Aug. 31, 2011.
Ramelet et al., Beneficial outcome of combination therapy with 4-1BB targeting antibody. Eur J Cancer. Nov. 29, 2016;69(Suppl 1):S96-S97.
Sallin et al., The anti-lymphoma activities of anti-CD137 monoclonal antibodies are enhanced in FcγRIII(-/-) mice. Cancer Immunol Immunother. Sep. 2014;63(9):947-58. doi: 10.1007/s00262-014-1567-2. Epub Jun. 14, 2014.
Schlothauer et al., Novel human IgG1 and IgG4 Fc-engineered antibodies with completely abolished immune effector functions. Protein Eng Des Sel. Oct. 2016;29(10):457-466. doi: 10.1093/protein/gzw040. Epub Aug. 29, 2016.
Shindo et al., Combination immunotherapy with 4-1BB activation and PD-1 blockade enhances antitumor efficacy in a mouse model of subcutaneous tumor. Anticancer Res. Jan. 2015;35(1):129-36.
Vilgelm et al., Combinatorial approach to cancer immunotherapy: strength in numbers. Journal of Leukocyte Biology. 2016;100(2):275-90. Epub Jun. 2, 2016.
Wozniak-Knopp et al., Designing Fcabs: well-expressed and stable high affinity antigen-binding Fc fragments. Protein Eng Des Sel. Sep. 1, 2017;30(9):657-671. doi: 10.1093/protein/gzx042.
Wozniak-Knopp et al., Introducing antigen-binding sites in structural loops of immunoglobulin constant domains: Fc fragments with engineered HER2/neu-binding sites and antibody properties. Protein Eng Des Sel. 2010;23(4):289-297. doi:10.1093/protein/gzq005.
Xu et al., In vitro characterization of five humanized OKT3 effector function variant antibodies. Cell Immunol. Feb. 25, 2000;200(1):16-26.
[No Author Listed], mesothelin isoform 1 preproprotein [*Homo sapiens*]. NCBI Reference Sequence: NP_001170826.1. May 2, 2024. Retrieved from https://www.ncbi.nlm.nih.gov/protein/NP_001170826.1/. 4 pages.
[No Author Listed], mesothelin isoform 1 preproprotein [Mus musculus]. NCBI Reference Sequence: NP_001343215.1. Jun. 18, 2024. Retrieved from https://www.ncbi.nlm.nih.gov/protein/NP_001343215.1. 3 pages.
[No Author Listed], Predicted: mesothelin isoform X4 [Macaca fascicularis]. NCBI Reference Sequence: XP_005590874.2. Jan. 25, 2016. Retrieved from https://www.ncbi.nlm.nih.gov/protein/XP_005590874.2. 2 pages.
[No Author Listed], tumor necrosis factor receptor superfamily member 9 precursor [*Homo sapiens*]. NCBI Reference Sequence: NP_001552.2. Jun. 9, 2024. Retrieved from https://www.ncbi.nlm.nih.gov/protein/NP_001552.2. 4 pages.
Badri et al., Optimization of radiation dosing schedules for proneural glioblastoma. J Math Biol. Apr. 2016;72(5):1301-36. doi: 10.1007/s00285-015-0908-x.
Baylot et al., TCTP Has a Crucial Role in the Different Stages of Prostate Cancer Malignant Progression. Results Probl Cell Differ. 2017;64:255-261. doi: 10.1007/978-3-319-67591-6_13.
Brinkmann et al., The making of bispecific antibodies. MAbs. Feb./Mar. 2017;9(2):182-212. doi: 10.1080/19420862.2016.1268307.
Chen et al., Enhancement and destruction of antibody function by somatic mutation: unequal occurrence is controlled by V gene combinatorial associations. EMBO J. Jun. 15, 1995;14(12):2784-94. doi: 10.1002/j.1460-2075.1995.tb07278.x.
Cooper, The Development and Causes of Cancer. From The Cell: Molecular Approach. 2nd Ed. Sunderland, MA. Sinauer Associates. 2000. 9 pages.
Durham et al., Lymphocyte Activation Gene 3 (LAG-3) modulates the ability of CD4 T-cells to be suppressed in vivo. PLoS One. Nov. 5, 2014;9(11):e109080. doi: 10.1371/journal.pone.0109080. 13 pages.
Edwards et al., The remarkable flexibility of the human antibody repertoire; isolation of over one thousand different antibodies to a single protein, BLyS. J Mol Biol. Nov. 14, 2003;334(1):103-18. doi: 10.1016/j.jmb.2003.09.054.
Gide et al., Distinct Immune Cell Populations Define Response to Anti-PD-1 Monotherapy and Anti-PD-1/Anti-CTLA-4 Combined Therapy. Cancer Cell. Feb. 11, 2019;35(2):238-255.e6. doi: 10.1016/j.ccell.2019.01.003.
Gough et al., OX40 agonist therapy enhances CD8 infiltration and decreases immune suppression in the tumor. Cancer Res. Jul. 1, 2008;68(13):5206-15. doi: 10.1158/0008-5472.CAN-07-6484.
Heppner et al., Tumor heterogeneity: biological implications and therapeutic consequences. Cancer Metastasis Rev. 1983;2(1):5-23. doi: 10.1007/BF00046903.
Kaas et al., IG, TR and IgSF, MHC and MhcSF: what do we learn from the IMGT Colliers de Perles? Brief Funct Genomic Proteomic. Dec. 2007;6(4):253-64. doi: 10.1093/bfgp/elm032. Epub Jan. 21, 2008.
Koenig et al., Mutational landscape of antibody variable domains reveals a switch modulating the interdomain conformational dynam-

(56) References Cited

OTHER PUBLICATIONS ics and antigen binding. Proc Natl Acad Sci U S A. Jan. 24, 2017;114(4):E486-E495. doi: 10.1073/pnas.1613231114. Epub Jan. 5, 2017.

Koyama et al., Adaptive resistance to therapeutic PD-1 blockade is associated with upregulation of alternative immune checkpoints. Nat Commun. Feb. 17, 2016;7:10501. doi: 10.1038/ncomms10501. 9 pages.

Kussie et al., A single engineered amino acid substitution changes antibody fine specificity. J Immunol. Jan. 1, 1994;152(1):146-52.

Lo et al., Effector-attenuating Substitutions That Maintain Antibody Stability and Reduce Toxicity in Mice. J Biol Chem. Mar. 3, 2017;292(9):3900-3908. doi: 10.1074/jbc.M116.767749. Epub Jan. 11, 2017.

Matsuzaki et al., Tumor-infiltrating NY-ESO-1-specific CD8+ T cells are negatively regulated by LAG-3 and PD-1 in human ovarian cancer. Proc Natl Acad Sci U S A. Apr. 27, 2010;107(17):7875-80. doi: 10.1073/pnas.1003345107. Epub Apr. 12, 2010.

Muller et al., Spliceosomal peptide P140 for immunotherapy of systemic lupus erythematosus: results of an early phase II clinical trial. Arthritis Rheum. Dec. 2008;58(12):3873-83. doi: 10.1002/art.24027.

Otano et al., CD137 (4-1BB) costimulation of CD8+ T cells is more potent when provided in cis than in trans with respect to CD3-TCR stimulation. Nat Commun. Dec. 15, 2021;12(1):7296. doi: 10.1038/s41467-021-27613-w.

Seckinger et al., Development and characterization of NILK-2301, a novel CEACAM5×CD3 KA bispecific antibody for immunotherapy of CEACAM5-expressing cancers. J Hematol Oncol. Dec. 12, 2023;16(1):117. doi: 10.1186/s13045-023-01516-3.

Shen, et al. Single variable domain-IgG fusion. A novel recombinant approach to Fc domain-containing bispecific antibodies. J Biol Chem. Apr. 21, 2006;281(16):10706-14. doi: 10.1074/jbc.M513415200. Epub Feb. 15, 2006.

Shepherd et al., T Cell Immunity to Bacterial Pathogens: Mechanisms of Immune Control and Bacterial Evasion. Int J Mol Sci. Aug. 26, 2020;21(17):6144. doi: 10.3390/ijms21176144.

Torres et al., The immunoglobulin constant region contributes to affinity and specificity. Trends Immunol. Feb. 2008;29(2):91-7. doi: 10.1016/j.it.2007.11.004. Epub Jan. 10, 2008.

Turaj et al., Augmentation of CD134 (OX40)-dependent NK anti-tumour activity is dependent on antibody cross-linking. Sci Rep. Feb. 2, 2018;8(1):2278. doi: 10.1038/s41598-018-20656-y.

Yap et al., Abstract TPS2652: A first-in-human phase I study of FS118, an anti-LAG-3/PD-L1 bispecific antibody in patients with solid tumors that have progressed on prior PD-1/PD-L1 therapy. Journal of Clinical Oncology. May 15, 2019;37(15_suppl). 2019 ASCO Annual Meeting Proceedings. 4 pages.

Jäger et al., EGFR binding Fc domain-drug conjugates: stable and highly potent cytotoxic molecules mediate selective cell killing. Biol Chem. Sep. 20, 2021;403(5-6):525-534. doi: 10.1515/hsz-2021-0321.

\* cited by examiner

A

B

A

B

ANTI-CD137 ANTIBODIES

RELATED APPLICATION

This application is a national stage filing under 35 U.S.C. 371 of International Patent Application Serial No. PCT/EP2019/068798, filed Jul. 12, 2019, the entire contents of which is incorporated herein by reference in its entirety.

REFERENCE TO AN ELECTRONIC SEQUENCE LISTING

The contents of the electronic sequence listing (F083170006US00-SUBSEQ-ACZ.txt; Size: 236,279 bytes; and Date of Creation: Aug. 21, 2025) is herein incorporated by reference in its entirety.

FIELD OF THE INVENTION

The present invention relates to antibody molecules that bind CD137. The antibody molecules find application in the treatment and diagnosis of diseases and disorders, such as cancer and infectious diseases.

BACKGROUND TO THE INVENTION

Cell signalling is an essential part of the life of all organisms and normally involves cell surface receptors that interact with soluble or surface expressed ligands. This interaction results in changes to the receptor, the ligand or both. For example, ligand binding can induce conformational changes in the receptors causing them to cluster together into dimers or oligomers. This clustering effect then results in activation of intracellular signalling pathways. There are numerous receptors that are activated in this way, including members of the tumour necrosis factor receptor superfamily (TNFRSF), such as CD137.

CD137 (4-1BB; TNFRSF9) is a co-stimulatory molecule of the tumour necrosis factor receptor superfamily (TNFRSF). CD137 is widely known to be upregulated on CD8$^+$ T cells following activation, and can also be expressed on activated CD4$^+$ helper T cells, B cells, regulatory T cells, natural killer (NK) cells, natural killer T (NKT) cells and dendritic cells (DCs) (Bartkowiak & Curran, 2015). The primary functional role of CD137 in enhancing T cell cytotoxicity was first described in 1997 (Shuford et al., 1997), and soon thereafter anti-CD137 mAbs were proposed as anti-cancer therapeutics.

CD137 is a transmembrane protein with four extracellular cysteine-rich domains, referred to as CRD1-4, and a cytoplasmic region responsible for CD137 signalling. The ligand for CD137 is CD137L. It has been predicted that CD137 forms a trimer/trimer complex with CD137L (Won et al., 2010), and determination of the X-ray crystal structure of the CD137/CD137L complex has confirmed that three monomeric CD137 receptors bind to a CD137L trimer (Li et al., 2018). Engagement of CD137L results in receptor trimer formation and subsequent clustering of multiple receptor trimers, and leads to the activation of the CD137 signalling cascade. This signalling cascade provides a survival signal to T cells against activation-induced cell death (Hurtado et al., 1997) thereby playing a critical role in sustaining effective T cell immune responses and generating immunological memory (Bartkowiak & Curran, 2015).

The role of CD137 in leukocyte biology is generally well understood with a clear biological rationale behind its role in tumour immunology. CD137 is expressed by activated T cells and has been used as a marker to identify antigen-specific CD4$^+$ and CD8$^+$ T cells. Typically, expression of CD137 is higher on CD8$^+$ T cells than CD4$^+$ T cells (Wen et al., 2002). In the case of CD8$^+$ T cells, proliferation, survival and cytotoxic effector function via the production of interferon gamma and interleukin 2 have been attributed to CD137 clustering. CD137 clustering also contributes to the differentiation and maintenance of memory CD8$^+$ T cells. In some subsets of CD4$^+$ T cells, CD137 clustering similarly leads to proliferation and activation and results in the release of cytokines such as interleukin 2 (Makkouk et al., 2016).

Natural killer (NK)-mediated antibody-dependent cellular cytotoxicity (ADCC) via tumour-targeting mAbs has been demonstrated to be enhanced as a consequence of CD137 stimulation via agonistic anti-CD137 monoclonal antibodies in vitro and in vivo (Bartkowiak & Curran, 2015). NK cells bind antibodies via their Fc receptor and, depending on the antibody isotype, this can lead to NK cell activation, eliciting cytotoxic granule release and the lysis of target cells (Kohrt et al., 2012). Kohrt and colleagues demonstrated that an anti-CD137 agonistic antibody enhanced the antitumor activity of therapeutic antibodies rituximab, trastuzumab, and cetuximab by enhancing ADCC when dosed in combination therewith (Kohrt et al., 2014; Kohrt et al., 2011). In addition, human NK cells upregulate expression of CD137 after encountering cell-bound antibodies via their FcγR. Subsequent stimulation of these NK cells with an anti-CD137 antibody has been shown to enhance their ADCC against tumour cells (Chester et al., 2015; Chester et al., 2016).

B lymphocytes also express CD137 upon activation. Binding of CD137 ligand to CD137 enhances B cell proliferation, survival and cytokine production. CD137 expression is also induced on normal and malignant human B cells following binding of CD40 to its ligand CD154 (CD40 ligand), resulting in enhanced B cell survival if CD137 is subsequently activated (Vinay and Kwon, 2011).

CD137 has also been demonstrated to be expressed on tumour-reactive subsets of tumour-infiltrating lymphocytes (TILs). CD137 monotherapy has been shown to be efficacious in several preclinical immunogenic tumour models such as MC38, CT26 and B cell lymphomas. Combination of CD137 engagement with other anti-cancer agents such as chemotherapy, cytokines and other checkpoint regulators has been demonstrated to result in enhanced growth reduction of established tumours. Specifically, combination of anti-CD137 antibodies with anti-CD20, anti-EGFR, and anti-HER-2 antibodies has been shown to result in a synergistic effect on tumour growth reduction in various preclinical xenograft models (Kohrt et al., 2014; Kohrt et al., 2012; Kohrt et al., 2011).

Coupling a tumour-targeted monoclonal antibody therapy with treatment with an anti-CD137 agonist antibody has shown promising results in preclinical models for lymphoma (Kohrt et al., 2011), head and neck cancer, colorectal cancer (Kohrt et al., 2014) and breast cancer (Kohrt et al., 2012). A number of tumour-targeting monoclonal antibodies have also been tested in combination with CD137 agonist antibodies in the clinic, including the anti-CD20 mAb rituximab (NCT01307267, NCT02951156), anti-EGFR mAb cetuximab (NCT02110082) and anti-CS1 mAb elotuzumab (NCT02252263). However, clinical development has been slowed due to dose-limiting high-grade liver inflammation associated with CD137 agonist antibody treatment. Urelumab (BMS-663513), a non-ligand blocking human IgG4 isotype antibody (Chester et al, 2018), was the first anti-CD137 antibody to enter clinical trials but these were halted after significant, on target, dose-dependent liver toxicity was observed (Chester et al., 2018). More recently, clinical trials of urelumab in the treatment of solid cancers was recommenced in which urelumab treatment was combined with radiotherapy (NCT03431948) or with other therapeutic antibodies, such as rituximab (NCT01775631), cetuximab (NCT02110082), anti-PD-1 antibody nivolumab (NCT02253992, NCT02534506, NCT02845323), and a combination of nivolumab and the anti-LAG-3 antibody BMS986016 (NCT02658981). However, to reduce liver toxicity associated with urelumab treatment, dosing of urelumab in these trials had to be limited and efficacy results were disappointing (Chester et al., 2018).

No dose-limiting toxicity has been observed with Pfizer's anti-CD137 antibody utomilumab (PF-05082566), a human IgG2 isotype antibody, in the dose range 0.03 mg/kg up to 10 mg/kg in Phase I clinical trials of advanced cancer (Chester et al. 2016; Segal et al., 2018). However, the overall objective response rate with this antibody was only 3.8% in patients with solid tumours, potentially indicating that utomilumab has a weaker potency and clinical efficacy than urelumab, whilst having a more favourable safety profile (Chester et al., 2018; Segal et al., 2018). Utomilumab has been tested in combination with radiotherapy (NCT03217747) or chemotherapy, as well as in combination with other antibody therapies, including anti-PD-L1 antibody avelumab (NCT02554812), and anti-PD-1 antibody pembrolizumab (NCT02179918), to assess the safety, tolerability, dose-limiting toxicities (DLTs), maximum tolerated dose (MTD) and efficacy of the different treatment combinations. These trials are ongoing with early results showing no DLTs for doses up to 5 mg/kg and a 26% patient response rate for the combination of utomilumab and pembrolizumab. Triple combinations of utomilumab with avelumab and other immunooncology therapies are also being tested (NCT02554812, NCT03217747).

A number of bispecific molecules targeting CD137 are also in early stage development, many of which are based on non-antibody-based scaffold or fusion protein technology. Development of a bispecific molecule targeting CD137 and FAPalpha using DARPin scaffold protein based technology has been reported (Link et al., 2018; Reichen et al., 2018). T cell activation via tumour targeting of CD137 agonism using HER2- and EphA2-targeted DART molecules has also been shown (Liu et al., 2017). CD137L fusion proteins which target tumours via FAPalpha or CD19 in solid tumours and lymphomas are also being developed. The most clinically advanced CD137 bispecific (and the only one containing a full-length antibody) is PRS-343, a CD137/HER2 bispecific molecule. In this molecule, CD137 is bound via an artificial binding protein (anticalin) attached to the Fc portion of the HER2-targeting antibody trastuzumab in IgG4 format. PRS-343 has been reported to provide tumour target-dependent activation of CD137 on lymphocytes at sites where HER2 is overexpressed in a humanised mouse model, but no improvement in tumour growth inhibition over trastuzumab treatment alone was observed (Hinner et al., 2016 and WO 2016/177802 A1). PRS-343 has recently entered Phase I clinical trials for treatment of a range of solid tumours to assess its safety, tolerability and efficacy (NCT03330561).

STATEMENTS OF INVENTION

As explained in the background section above, clinical development of CD137 agonist molecules has been held back due to treatment being either associated with dose-limiting high-grade liver inflammation (urelumab) or low clinical efficacy (utomilumab).

The present inventors recognised that there is a need in the art for CD137 agonist molecules which exhibit improved clinical efficacy but are not associated with dose-limiting liver inflammation. Such molecules could be administered to individuals at doses which optimize the potency and therefore efficacy of the molecule, and could be employed in the treatment of cancer as immunotherapeutic agents, for example, or in the treatment of infectious diseases.

Without wishing to be bound by theory, it is thought that T cells present in the liver may have the potential to be activated by anti-CD137 agonist molecules, leading to liver inflammation. CD8+ T cells have been shown to promote liver inflammation and apoptosis after sepsis/viral infection (Wesche-Soldato et al., 2007). Anti-CD137 agonist antibody therapy in mice has been shown to result in CD137-dependent T cell infiltration into the liver (Dubrot J et al., 2010). The results from these studies, when taken together, indicate that anti-CD137 agonist antibodies with high activity, such as urelumab, may cause infiltration of activated CD8+ T cells into the liver, thereby leading to liver inflammation. The activity of utomilumab may have been too low for this effect to be observed. Alternatively, the dose-limiting liver toxicity observed with urelumab treatment may be due to the particular epitope bound by this antibody.

The present inventors conducted an extensive selection program to isolate antibody molecules that bind dimeric human CD137 with high affinity. In view of the selection protocol used, the antibody molecules are expected to bind to monomeric CD137 with a lower affinity than the affinity observed for dimeric CD137, i.e. are expected to bind CD137 with high avidity.

'Affinity' as referred to herein may refer to the strength of the binding interaction between an antibody molecule and its cognate antigen as measured by KD. As would be readily apparent to the skilled person, where the antibody molecule is capable of forming multiple binding interactions with an antigen (e.g. where the antibody molecule is capable of binding the antigen bivalently and, optionally, the antigen is dimeric) the affinity, as measured by KD, may also be influenced by avidity, whereby avidity refers to the overall strength of an antibody-antigen complex.

Expression of CD137 by immune cells, such as T cells, is upregulated on activation. Without wishing to be bound by theory, it is thought that due to the high expression of CD137 on activated immune cells, CD137 will be in the form of dimers, trimers and higher-order multimers on the surface of such cells. In contrast, naïve immune cells, such as naïve T cells, express low or negligible levels of CD137 on their cell surface and any CD137 present is therefore likely to be in monomeric form. It is therefore expected that antibody molecules which bind to CD137 with high avidity, will preferentially bind to activated immune cells, such as activated T cells, as opposed to naïve immune cells.

As described in the background section above, initial ligation of a CD137 ligand to its receptor, CD137, initiates a chain of events that leads to CD137 trimerisation, followed by receptor clustering, activation of the NFkB intracellular signalling pathway and subsequent immune cell activation. For a therapeutic agent to efficiently activate CD137, several CD137 monomers need to be bridged together in a way that mimics a trimeric ligand.

Utomilumab is an IgG2 molecule and is dependent on crosslinking by Fcγ receptors for its agonist activity. Urelumab is an IgG4 molecule with constitutive activity and so does not require crosslinking by Fcγ receptors for activity, although its agonist activity is enhanced on crosslinking by some Fcγ receptors. Fcγ receptors are found throughout the human body. The immune cell activation activity of utomilumab and urelumab is therefore not limited to particular sites in the body and thus may occur in the liver or elsewhere in the body.

The present inventors have shown that the antibody molecules of the invention require crosslinking in order to cluster and activate CD137. As mentioned above, Fcγ receptor-mediated crosslinking has the disadvantage that Fcγ receptors are found throughout the human body and thus CD137 activation is not limited to a particular site. The present inventors therefore introduced mutations into the CH2 domain of the antibody molecules to reduce or abrogate Fcγ receptor binding. Thus, in the absence of crosslinking through an agent other than Fcγ receptors, the antibody molecules of the invention do not exhibit CD137 agonist activity and thus are not expected to induce liver inflammation.

The antibody molecules of the invention have further been shown to be capable of binding with high affinity to dimeric cynomolgus CD137. This cross-reactivity for both human and cynomolgus CD137 is advantageous, as it allows dosing and safety testing of the antibody molecules to be performed in cynomolgus monkeys during preclinical development. This is of particular advantage in the context of antibody molecules binding to CD137, as such molecules have been shown to be associated with hepatotoxicity in the clinic.

The antibody molecules of the invention have also been shown to have a range of activities on ligand binding, and include antibody molecules which block, do not block, or partially block binding of CD137L to CD137. Anti-CD137 antibodies utomilumab and urelumab have been reported to block and to not block binding of CD137L to CD137 (US Patent Application Publication No. 2012/0237498 and U.S. Pat. No. 7,288,638), respectively. For utomilumab this function has also been confirmed by the present inventors but conversely to previous reports, urelumab was found to also block ligand binding. Without wishing to be bound by theory, it is thought that antibody molecules which do not block, or only partially block, binding of CD137L to CD137 may be advantageous because the natural activation pathway of CD137 expressing immune cells through binding to CD137L is not inhibited, or only partially inhibited, in the presence of the antibody molecule. This may thus allow natural activation of immune cells expressing CD137 in addition to immune cell activation through CD137 clustering and activation driven by the antibody molecule.

In light of the ability of the antibody molecules of the invention to block binding of CD137L to CD137 and to bind dimeric cynomolgus CD137, it is expected that these antibody molecules bind to different epitopes on CD137 than utomilumab and urelumab. As mentioned above, it is possible that the high-grade liver inflammation caused by urelumab treatment is the result of the particular epitope bound by this antibody. This is supported by the fact, that it is thought that utomilumab binds to a different epitope on CD137 than urelumab in view of the molecules appearing to have different potencies and the fact that treatment with utomilumab was not associated with any dose-limiting toxicities.

The present inventors have recognised that the anti-CD137 antibodies of the invention can be used to prepare multispecific, e.g. bispecific, molecules which bind a second antigen in addition to CD137, such as a tumour antigen. Preferably the multispecific molecule binds the second antigen bivalently, although it is expected that where the second antigen is a cell-bound tumour antigen, monovalent binding of the antigen will be sufficient to crosslink the antibody molecule and induce CD137 clustering and activation. Specifically, the present inventors have prepared antibody molecules comprising an additional antigen-binding site in each of the CH3 domains of the antibody molecule and thus are able to bind a second antigen bivalently. Such bispecific antibody molecules are expected to be capable of activating CD137 conditionally in the presence of said second antigen without the need for e.g. Fcγ receptor-mediated crosslinking as require by conventional antibody molecules. It is thought that binding of the antibody molecules to the second antigen will cause crosslinking of the antibody molecules at the site of said antigen, which in turn will lead to clustering and activation of CD137 on the Immune cell surface. The agonistic activity of the antibody molecules is therefore expected to be dependent on both the second antigen and CD137 being present. In other words, the agonistic activity is expected to be conditional. In addition, crosslinking of the antibodies in the presence of the second antigen is thought to assist with clustering of CD137 bound via a constant domain antigen-binding site of the antibody molecule. Where the second antigen is a disease antigen, such as a tumour antigen, the antibody molecules are therefore expected to be capable of activating immune cells in a disease-dependent manner, for example in a tumour microenvironment. This targeted activation of immune cells is expected to be beneficial in avoiding the liver inflammation seen with urelumab treatment, for example.

Antibody molecules comprising an anti-CD137 Fab and CH3 domain binding sites specific for a second antigen preferably bind both CD137 and the second antigen bivalently. This is advantageous, as the bivalent binding of both targets is expected to make the bridging between the immune cell expressing CD137 and the second antigen more stable and thereby extend the time during which the immune cell is localised at a particular site, such as a tumour microenvironment, and can act on the disease, e.g. the tumour. This is different to the vast majority of conventional bispecific antibody formats which are heterodimeric and bind each target antigen monovalently via one Fab arm. Such a monovalent interaction is expected to be not only less stable but in many cases is insufficient to induce clustering of TNFRSF receptors such as CD137 in the first place.

A further feature of the antibody molecules of the invention comprising CH3 domain binding sites specific for a second antigen is that the two antigen binding sites for CD137 and the second antigen are both contained within the antibody structure itself. In particular, the antibody molecules do not require other proteins to be fused to the antibody molecule via linkers or other means to result in molecule that binds bivalently to both of its targets. This has a number of advantages. Specifically, the antibody molecules can be produced using methods similar to those employed for the production of standard antibodies, as they do not comprise any additional fused portions. The structure is also expected to result in improved antibody stability, as linkers may degrade over time, resulting in a heterogeneous population of antibody molecules. Those antibodies in the population having only one protein fused will not be able to induce conditional agonism of TNFRSF receptors such as CD137 as efficiently as antibodies having two proteins fused. Cleavage/degradation of the linker could take place prior to administration or after administration of the therapeutic to the patient (e.g. through enzymatic cleavage or the in vivo pH of the patient), thereby resulting in a reduction of its effectiveness whilst circulating in the patient. As there are no linkers in the antibody molecules of the invention, the antibody molecules are expected to retain the same number of binding sites both before and after administration. Furthermore, the structure of the antibody molecules of the invention is also preferred from the perspective of immunogenicity of the molecules, as the introduction of fused proteins or linkers or both may induce immunogenicity when antibody molecules are administered to a patient, resulting in reduced effectiveness of the therapeutic.

Thus, the present invention provides:

[1] An antibody molecule that binds to CD137, wherein the antigen-binding site of the antibody molecule comprises complementarity determining regions (CDRs) 1-6 of:
  (i) antibody FS30-10-16 set forth in SEQ ID NOs 30, 32, 38, 17, 19 and 22, respectively;
  (ii) antibody FS30-10-3 set forth in SEQ ID NOs 30, 32, 34, 17, 19 and 22, respectively;
  (iii) antibody FS30-10-12 set forth in SEQ ID NOs 30, 32, 36, 17, 19 and 22, respectively;
  (iv) antibody FS30-35-14 set forth in SEQ ID NOs 62, 64, 66, 17, 19 and 23, respectively; or
  (v) antibody FS30-5-37 set forth in SEQ ID NOs 7, 9, 11, 17, 19 and 21, respectively;
    wherein the CDR sequences are defined according to the ImMunoGeneTics (IMGT) numbering scheme.

[2] An antibody molecule that binds to CD137, wherein the antigen-binding site of the antibody molecule comprises CDRs 1-6 of:
  (i) antibody FS30-10-16 set forth in SEQ ID NOs 31, 33, 39, 18, 20 and 22, respectively;
  (ii) antibody FS30-10-3 set forth in SEQ ID NOs 31, 33, 35, 18, 20 and 22, respectively;
  (iii) antibody FS30-10-12 set forth in SEQ ID NOs 31, 33, 37, 18, 20 and 22, respectively;
  (iv) antibody FS30-35-14 set forth in SEQ ID NOs 63, 65, 67, 18, 20 and 23, respectively; or
  (v) antibody FS30-5-37 set forth in SEQ ID NOs 8, 10, 12, 18, 20 and 21, respectively;
    wherein the CDR sequences are defined according to the Kabat numbering scheme.

[3] The antibody molecule according to [1] or [2], wherein the antibody molecule comprises a heavy chain variable (VH) domain and/or light chain variable (VL) domain.

[4] The antibody molecule according to any of [1] to [3], wherein the antibody molecule comprises an immunoglobulin heavy chain and/or an immunoglobulin light chain.

[5] The antibody molecule according to any one of [3] to [4], wherein the antibody molecule comprises the VH domain and/or VL domain of:
  (i) antibody FS30-10-16 set forth in SEQ ID NOs 54 and 48, respectively;
  (ii) antibody FS30-10-3 set forth in SEQ ID NOs 28 and 48, respectively;
  (iii) antibody FS30-10-12 set forth in SEQ ID NOs 44 and 48, respectively;
  (iv) antibody FS30-35-14 set forth in SEQ ID NOs 60 and 70, respectively; or
  (v) antibody FS30-5-37 set forth in SEQ ID NOs 5 and 15, respectively.

[6] The antibody molecule according to any one of [1] to [5], wherein the antibody molecule comprises:
  (i) the heavy chain of antibody FS30-10-16 set forth in SEQ ID NO: 52 or 50, and/or the light chain of antibody FS30-10-16 set forth in SEQ ID NO: 46;
  (ii) the heavy chain of antibody FS30-10-3 set forth in SEQ ID NO: 26 or 24, and/or the light chain of antibody FS30-10-3 set forth in SEQ ID NO: 46;
  (iii) the heavy chain of antibody FS30-10-12 set forth in SEQ ID NO: 42 or 40, and/or the light chain of antibody FS30-10-12 set forth in SEQ ID NO: 46;
  (iv) the heavy chain of antibody FS30-35-14 set forth in SEQ ID NO: 58 or 56, and/or the light chain of antibody FS30-35-14 set forth in SEQ ID NO: 68; or
  (v) the heavy chain of antibody FS30-5-37 set forth in SEQ ID NO: 3 or 1, and/or the light chain of antibody FS30-5-37 set forth in SEQ ID NO: 13.

[7] The antibody molecule according to any one of [1] to [6], wherein the antibody molecule comprises the heavy chain and light chain of:
  (i) antibody FS30-10-16 set forth in SEQ ID NO: 52 and 46, respectively;
  (ii) antibody FS30-10-3 set forth in SEQ ID NO: 26 and 46, respectively;
  (iii) antibody FS30-10-12 set forth in SEQ ID NO: 42 and 46, respectively;
  (iv) antibody FS30-35-14 set forth in SEQ ID NO: 58 and 68, respectively; or
  (v) antibody FS30-5-37 set forth in SEQ ID NO: 3 and 13, respectively.

[8] The antibody molecule according to any one of [1] to [7], wherein the antibody molecule comprises CDRs 1-6, the VH domain, VL domain, light chain and/or heavy chain of antibody FS30-10-16, FS30-10-3, FS30-10-12, or FS30-35-14.

[9] The antibody molecule according to any one of [1] to [8], wherein the antibody molecule comprises CDRs 1-6, the VH domain, VL domain, light chain and/or heavy chain of antibody FS30-10-16, FS30-10-3, or FS30-10-12.

[10] The antibody molecule according to any one of [1] to [9], wherein the antibody molecule comprises CDRs 1-6, the VH domain, VL domain, light chain and/or heavy chain of antibody FS30-10-16.

[11] The antibody molecule according to any one of [8] to [10], wherein the antibody does not block or partially blocks the binding of CD137 ligand (CD137L) to CD137.

[12] The antibody molecule according to any one of [9] to [11], wherein the antibody partially blocks the binding of CD137L to CD137.

[13] The antibody molecule according to [11] or [12], wherein the CD137L blocking activity of the antibody molecule is lower than the CD137L blocking activity of an antibody molecule comprising or consisting of the heavy chain sequence and light chain sequence of antibody G1/MOR7480.1 set forth in SEQ ID NOs 99 and 101, respectively.

[14] The antibody molecule according to any one of [11] to [13], wherein the CD137L blocking activity of the antibody molecule is less than or equal to 80%, less than or equal to 70%, or less than or equal to 60% of the CD137L blocking activity of an antibody molecule comprising or consisting of the heavy chain sequence and light chain sequence of antibody G1/MOR7480.1 set forth in SEQ ID NOs 99 and 101, respectively.

[15] The antibody molecule according to any one of [11] to [14], wherein the CD137L blocking activity of the antibody molecule is at least 20%, at least 30%, or at least 40% of the CD137L blocking activity of an antibody molecule comprising or consisting of the heavy chain sequence and light chain sequence of antibody G1/MOR7480.1 set forth in SEQ ID NOs 99 and 101, respectively.

[16] The antibody molecule according to any one of [11] to [15], wherein the CD137L blocking activity of the antibody molecule is between 20% and 80%, between 30% and 70%, or between 40% and 60% of the CD137L blocking activity of an antibody molecule comprising or consisting of the heavy chain sequence and light chain sequence of antibody G1/MOR7480.1 set forth in SEQ ID NOs 99 and 101, respectively.

[17] The antibody molecule according to any one of [11] to [16], wherein the CD137L blocking activity of the antibody molecule is lower than the CD137L blocking activity of an antibody molecule comprising or consisting of the heavy chain sequence and light chain sequence of antibody G1/20H4.9 set forth in SEQ ID NOs 104 and 106, respectively.

[18] The antibody molecule according to any one of [11] to [17], wherein the CD137L blocking activity of the antibody molecule is less or equal to 80%, less or equal to 70%, or less or equal to 60% of the CD137L blocking activity of an antibody molecule comprising or consisting of the heavy chain sequence and light chain sequence of antibody G1/20H4.9 set forth in SEQ ID NOs 104 and 106, respectively.

[19] The antibody molecule according to any one of [11] to [18], wherein the CD137L blocking activity of the antibody molecule is at least 20%, at least 30%, or at least 40% of the CD137L blocking activity of an antibody molecule comprising or consisting of the heavy chain sequence and light chain sequence of antibody G1/20H4.9 set forth in SEQ ID NOS 104 and 106, respectively.

[20] The antibody molecule according to any one of [11] to [19], wherein the CD137L blocking activity of the antibody molecule is between 20% and 80%, between 30% and 70%, or between 40% and 60% of the CD137L blocking activity of an antibody molecule comprising or consisting of the heavy chain sequence and light chain sequence of antibody G1/20H4.9 set forth in SEQ ID NOs 104 and 106, respectively.

[21] The antibody molecule according to [10], wherein the CD137L blocking activity of the antibody molecule is between 70% and 130%, 80% and 120%, or 90% and 110% of the CD137L blocking activity of an antibody molecule comprising or consisting of the heavy chain sequence and light chain sequence of antibody FS20-22-49AA/FS30-10-16 set forth in SEQ ID NOs 79 and 46, respectively.

[22] The antibody molecule according to any one of [1] to [7], wherein the antibody molecule comprises CDRs 1-6, the VH domain, VL domain, light chain and/or heavy chain of antibody FS30-5-37.

[23] The antibody molecule according to [22], wherein the antibody blocks the binding of CD137L to CD137.

[24] The antibody molecule according to any one of [11] to [23], wherein the ligand blocking activity of the antibody molecule is measurable using an enzyme-linked immunosorbent assay (ELISA).

[25] The antibody molecule according to any one of [1] to [24], wherein the CD137 is human CD137.

[26] The antibody molecule according to [25], wherein the CD137 is the extracellular domain of human CD137.

[27] The antibody molecule according to [26], wherein the CD137 consists of or comprises the sequence set forth in SEQ ID NO: 112.

[28] The antibody molecule according to any one of [1] to [24], wherein the CD137 is cynomolgus CD137.

[29] The antibody molecule according to [28], wherein the CD137 is the extracellular domain of cynomolgus CD137.

[30] The antibody molecule according to [29], wherein the CD137 consists of or comprises the sequence set forth in SEQ ID NO: 113.

[31] The antibody molecule according to any one of [11] to [27], wherein the CD137L is human CD137L.

[32] The antibody molecule according to any one of [11] to [27], wherein the CD137L is human CD137L.

[33] The antibody molecule according to any one of [1] to [32], wherein the antibody molecule is a multispecific antibody molecule.

[34] The antibody molecule according to [33], wherein antibody molecule is a bispecific, trispecific, or tetraspecific antibody molecule.

[35] The antibody molecule according to [34], wherein the antibody molecule is a bispecific molecule.

[36] The antibody molecule according to any one of [33] to [35], wherein the antibody molecule comprises a second antigen-binding site located in a constant domain of the antibody molecule.

[37] The antibody molecule according to [36], wherein the second antigen-binding site binds an immune cell antigen, a tumour antigen, or an infectious disease antigen.

[38] The antibody molecule according to [37], wherein the immune cell antigen is a member of the tumour necrosis factor receptor superfamily (TNFRSF).

[39] The antibody molecule according to [38], wherein the member of the TNFRSF is OX40.

[40] The antibody molecule according to [37], wherein the tumour antigen is a tumour-associated antigen.

[41] The antibody molecule according to [37], wherein the infectious disease antigen is a bacterial or viral antigen.

[42] The antibody molecule according to any one of [36] to [41], wherein the second antigen-binding site comprises a first sequence, a second sequence, and/or a third sequence, wherein the first sequence, second sequence and third sequence are located in the AB structural loop, the CD structural loop and the EF structural loop of the constant domain, respectively.

[43] The antibody molecule according to any one of [36] to [42], wherein the constant domain is a CH3 domain.

[44] The antibody molecule according to any one of [36] to [43], wherein the antibody molecule is capable of activating CD137 on an immune cell in the presence of the second antigen.

[45] The antibody molecule according to any one of to wherein binding of the antibody molecule to CD137 and the second antigen causes clustering of CD137 on the immune cell.

[46] The antibody molecule according to [44] or [45], wherein the immune cell is a T cell.

[47] The antibody molecule according to any one of [1] to [46] wherein the antibody molecule does not bind to Fcγ receptors.

[48] The antibody molecule according to any one of [1] to [47], wherein the antibody molecule has been modified to reduce or abrogate binding of the CH2 domain of the antibody molecule or antibody molecule to one or more Fcγ receptors.

[49] The antibody molecule according to [47] to [48], wherein the Fcγ receptor is selected from the group consisting of: FcγRI, FcγRIIa, FcγRIIb and FcγRIII.

[50] A conjugate comprising the antibody molecule according to any one of [1] to [49] and a bioactive molecule.

[51] A conjugate comprising the antibody molecule according to any one of [1] to [49] and a detectable label.

[52] A nucleic acid molecule or molecules encoding the antibody molecule according to any one of [1] to [49].

[53] The nucleic acid molecule(s) according to [52], wherein the nucleic acid molecule(s) comprise(s):
  (i) the VH domain cDNA sequence of antibody FS30-10-16 set forth in SEQ ID NO: 55 or, and/or the VL domain cDNA sequence of antibody FS30-10-16 set forth in SEQ ID NO: 49; or
  (ii) the VH domain cDNA sequence of antibody FS30-10-3 set forth in SEQ ID NO: 29, and/or the VL domain cDNA sequence of antibody FS30-10-3 set forth in SEQ ID NO: 49;
  (iii) the VH domain cDNA sequence of antibody FS30-10-12 set forth in SEQ ID NO: 45, and/or the VL domain cDNA sequence of antibody FS30-10-12 set forth in SEQ ID NO: 49;
  (iv) the VH domain cDNA sequence of antibody FS30-35-14 set forth in SEQ ID NO: 61, and/or the VL domain cDNA sequence of antibody FS30-35-14 set forth in SEQ ID NO: 69; or
  (v) the VH domain cDNA sequence of antibody FS30-5-37 set forth in SEQ ID NO: 6, and/or the VL domain cDNA sequence of antibody FS30-5-37 set forth in SEQ ID NO: 14.

[54] The nucleic acid molecule(s) according to [52] or [53], wherein the nucleic acid molecule(s) comprise(s):
  (i) the heavy chain cDNA sequence of antibody FS30-10-16 set forth in SEQ ID NO: 53 or 51, and/or the light chain cDNA sequence of antibody FS30-10-16 set forth in SEQ ID NO: 47;
  (ii) the heavy chain cDNA sequence of antibody FS30-10-3 set forth in SEQ ID NO: 27 or 25, and/or the light chain cDNA sequence of antibody FS30-10-3 set forth in SEQ ID NO: 47;
  (iii) the heavy chain cDNA sequence of antibody FS30-10-12 set forth in SEQ ID NO: 43 or 41, and/or the light chain cDNA sequence of antibody FS30-10-12 set forth in SEQ ID NO: 47;
  (iv) the heavy chain cDNA sequence of antibody FS30-35-14 set forth in SEQ ID NO: 59 or 57, and/or the light chain cDNA sequence of antibody FS30-35-14 set forth in SEQ ID NO: 69; or
  (v) the heavy chain cDNA sequence of antibody FS30-5-37 set forth in SEQ ID NO: 4 or 2, and/or the light chain cDNA sequence of antibody FS30-5-37 set forth in SEQ ID NO: 14.

[55] A vector or vectors comprising the nucleic acid molecule or molecules according to any one of [52] to [54].

[56] A recombinant host cell comprising the nucleic acid molecule(s) according to any one of to [54], or the vector(s) according to [55].

[57] A method of producing the antibody molecule according to any one of [1] to [49] comprising culturing the recombinant host cell of [56] under conditions for production of the antibody molecule.

[58] The method according to [57] further comprising isolating and/or purifying the antibody molecule.

[59] A pharmaceutical composition comprising the antibody molecule or conjugate according to any one of [1] to [51] and a pharmaceutically acceptable excipient.

[60] The antibody molecule or conjugate according to any one of [1] to [51] for use in a method for treatment of the human body by therapy.

[61] The antibody molecule or conjugate according to any one of [1] to [51] for use in a method of treating cancer or an infectious disease in an individual.

[62] A method of treating a disease in an individual comprising administering to the individual a therapeutically effective amount of the antibody molecule or conjugate according to any one of [1] to [51].

[63] A method according to [62], wherein the disease is cancer or an infectious disease.

[64] The use of the antibody molecule or conjugate according to any one of [1] to [51] in the preparation of a medicament.

[65] The use according to [64], wherein the medicament is for the treatment of cancer or an infectious disease.

[66] The antibody molecule or conjugate for use according to [60] or [61], wherein the method for treatment comprises administering the antibody molecule or conjugate to the individual in combination with a second therapeutic.

[67] The method according to [62] or [63], wherein the method further comprises administering a therapeutically effective amount of a second therapeutic to the individual.

[68] The antibody molecule or conjugate according to any one of [1] to [49] or [51] for use in a diagnostic method practised on the human or animal body.

[69] A method of detecting a disease in an individual, the method comprising the use of the antibody molecule or conjugate according to any one of [1] to [49] or [51].

[70] The use of the antibody molecule or conjugate according to any one of [1] to [49] or [51] in the manufacture of a diagnostic product.

BRIEF DESCRIPTION OF THE FIGURES

FIG. 1A shows that there is concentration dependent increase in the activation of T cells, as evidenced by an increase in IL-2 release, in the presence of the crosslinked positive control mAbs (G1AA/MOR7480.1 and G1AA/20H4.9) and the anti-CD137 FS30 mAbs (G1AA/FS30-5, G1AA/FS30-6, G1AA/FS30-10, G1AA/FS30-15 and G1AA/FS30-16), but not in the presence of the negative control mAb (G1AA/HeID1.3). The T cell activation activity of G1AA/FS30-5, G1AA/FS30-10, G1AA/FS30-15 and G1AA/FS30-16 was higher than that of G1AA/FS30-6. FIG. 1B shows that in the absence of crosslinking, the FS30 mAbs (G1AA/FS30-5, G1AA/FS30-6, G1AA/FS30-10, G1AA/FS30-15 and G1AA/FS30-16) showed no T cell activation as evidenced by the low basal levels of IL-2 measured. In contrast, the positive control mAb (G1AA/20H4.9) showed potent T cell activation in the absence of crosslinking as evidenced by an increase in IL-2 release. The effect of the anti-human CD137 mAbs and control antibodies on IL-2 release was tested at two concentrations (25 nM and 100 nM).

14), compared with anti-CD137 mAbs (G1/MOR7480.1 and G1/20H4.9 in FIG. 2A and G1/MOR7480.1 only in FIG. 2B) as positive controls for CD137 binding and ligand blocking activity, mAb² FS20-22-49AA/4420 as a negative-control mAb² for OX40 binding, and anti-OX40 mAb G1/11D4 as an isotype/negative control. The mAbs and mAb² were tested at one concentration (100 nM in FIG. 2A and 200 nM in FIG. 2B). Normalised values are shown. These results show that both anti-CD137 control antibodies and the FS20-22-49AA/FS30-5-37 mAb² completely blocked the interaction between human CD137L and human CD137 receptor. The mAb² comprising anti-CD137 Fabs derived from the FS30-10 lineage, i.e. FS20-22-49AA/FS30-10-3, FS20-22-49AA/FS30-10-12 and FS20-22-49AA/FS30-10-16, partially blocked the interaction between human CD137L and human CD137 receptor, while the FS20-22-49AA/FS30-35-14 mAb² (FIG. 2A only) and the G1/11D4 mAb and FS20-22-49AA/4420 mAb² controls lacked the ability to significantly inhibit the receptor-ligand interaction and were therefore considered not to show any ligand blocking activity.

Figure 3:
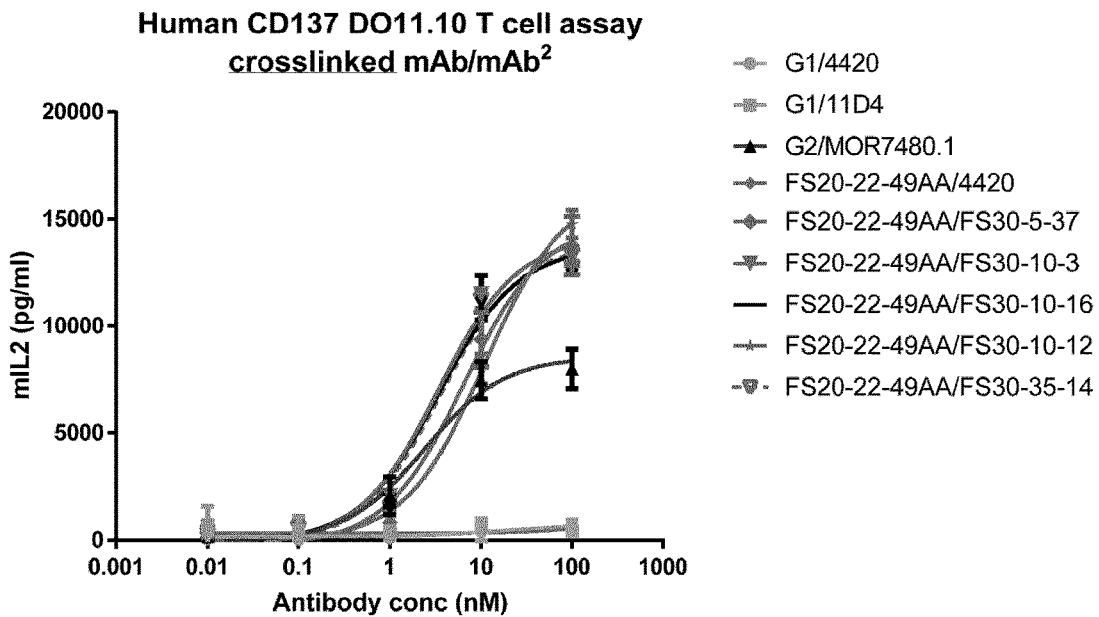
Figure 3:
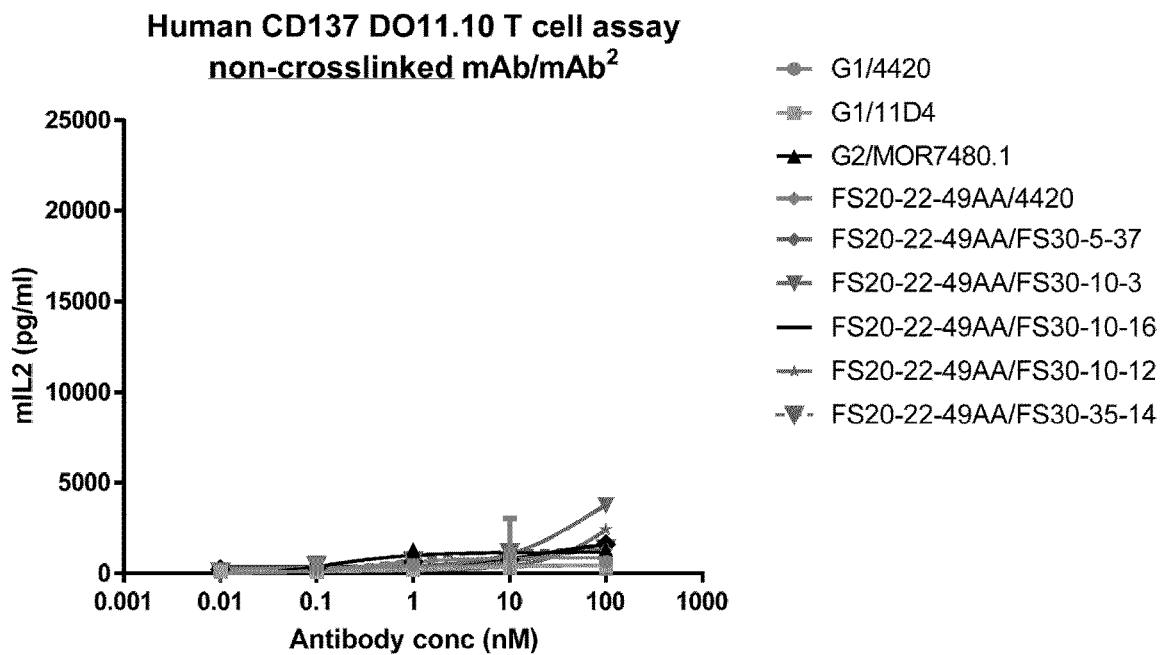

FIG. 3 shows representative graphs of mouse IL-2 release in DO11.10-hCD137 T cell activation assays in the presence of increasing concentrations of anti-human CD137 FS30 mAb in mAb² format comprising an anti-human OX40 Fcab (FS20-22-49AA/FS30-5-37, FS20-22-49AA/FS30-10-3, FS20-22-49AA/FS30-10-12, FS20-22-49AA/FS30-10-16 and FS20-22-49AA/FS30-35-14). Anti-CD137 antibody G2/MOR7480.1 was used as a positive control; anti-OX40 mAb G1/11D4 and mAb² clone FS20-22-49AA/4420 were used as negative controls; and anti-FITC mAb G1/4420 was used as an isotype negative control. All mAbs and mAb² were tested in the absence and presence of a crosslinking agent. FIG. 3A shows that there was a concentration dependent increase in the activation of DO11.10-hCD137 cells, as evidenced by an increase in mouse IL-2 release, in the presence of the crosslinked positive control mAb (G2/MOR7480.1) and the anti-CD137 FS30 mAb² (FS20-22-49AA/FS30-5-37, FS20-22-49AA/FS30-10-3, FS20-22-49AA/FS30-10-12, FS20-22-49AA/FS30-10-16 and FS20-22-49AA/FS30-35-14), but not in the presence of the negative control mAbs and mAb² (G1/4420, FS20-22-49AA/4420 and G1/11D4). FIG. 3B shows that in the absence of crosslinking, the positive control G2/MOR7480.1, the mAb² FS20-22-49AA/FS30-5-37, FS20-22-49AA/FS30-10-3, FS20-22-49AA/FS30-10-12, FS20-22-49AA/FS30-10-16 and FS20-22-49AA/FS30-35-14, and the negative controls G1/4420, FS20-22-49AA/4420 and G1/11D4 showed no to weak T cell activation, as evidenced by the low basal levels of IL-2 measured.

DETAILED DESCRIPTION

The present invention relates to antibody molecules that bind CD137. CD137 is also known as tumor necrosis factor receptor superfamily member 9 (TNFRSF9) or 4-1BB. The antibody molecule preferably binds human CD137, more preferably human and cynomolgus CD137, yet more preferably dimeric human and cynomolgus CD137. The portion of CD137 bound by the antibody molecule is preferably the CD137 extracellular domain. The extracellular domain of human and cynomolgus CD137 may comprise or consist of the sequence set forth in SEQ ID Nos 112 and 113, respectively. The antibody molecule of the present invention is preferably capable of binding to CD137 expressed on the surface of a cell. The cell is preferably an immune cell, such as a CD8⁺ or CD4⁺ T cell or regulatory T (Treg) cell, preferably a CD8⁺ T cell, or a B cell, natural killer (NK) cell, natural killer T (NKT) cell, dendritic cell (DC), or a tumour-infiltrating lymphocyte (TIL).

The antibody molecule preferably binds CD137 specifically. The term "specific" may refer to the situation in which the antibody molecule will not show any significant binding to molecules other than its specific binding partner(s), here CD137. The term "specific" is also applicable where the antibody molecule is specific for particular epitopes, such as epitopes on CD137, that are carried by a number of antigens, in which case the antibody molecule will be able to bind to the various antigens carrying the epitope. The antibody molecule preferably does not bind, or does not show any significant binding, to TNFRSF1A, TNFRSF1B, GITR, NGFR, CD40 and/or DR6.

As explained in the background section above, treatment of patients with the anti-CD137 antibody urelumab was associated with dose-limiting high-grade liver inflammation. Without wishing to be bound by theory, it is thought that the liver inflammation seen with urelumab treatment may have been due to activation of T cells present in the liver, or infiltration and accumulation of activated T cells in the liver of the patients. In order to select for molecules with reduced or no liver inflammation, the present inventors selected for antibody molecules which are expected to have high avidity for CD137. Specifically, the present inventors selected antibody molecules which bound to dimeric CD137 with high affinity. Expression of CD137 by T cells is upregulated on priming and activation. It is thought that due to the higher expression of CD137 on activated T cells, CD137 will be in the form of dimers, trimers and higher-order multimers on the surface of such cells. In contrast, CD137 expression by inactive T cells is low or even undetectable. It is therefore thought that CD137, in so far as this is expressed at all on the surface of such T cells, is likely to be in monomeric form. Antibody molecules which bind to CD137 with high avidity are therefore thought to preferentially bind to activated T cells, as opposed to inactive T cells, such as inactive T cells present in the liver, and therefore to exhibit reduced or no liver inflammation.

The antibody molecule preferably binds to dimeric human CD137 with an affinity ($K_D$) of 10 nM, 9 nM, 8 nM, 7 nM, 6 nM, 5 nM, 4 nM, 3 nM, 2 nM, 1 nM, 0.5 nM, 0.4 nM, 0.3 nM, or 0.2 nM or with a higher affinity. The antibody molecule may bind dimeric CD137 with a higher affinity than monomeric CD137.

The antibody molecules of the invention have also been shown to bind dimeric cynomolgus CD137. Binding to cynomolgus CD137 as well as human CD137 is thought to be beneficial for carrying out efficacy and toxicity studies with the antibody molecule in cynomolgus monkeys, which may be predictive of the efficacy and toxicity of the antibody molecule in humans.

In a preferred embodiment, the antibody molecule may bind to dimeric cynomolgus CD137 with an affinity ($K_D$) of 10 nM, 9 nM, 8 nM, 7 nM, 6 nM, 5 nM, 4 nM, 3 nM, 2 nM, 1 nM, 0.5 nM, 0.4 nM, 0.3 nM, or 0.2 nM or with a higher affinity.

The antibody molecule may bind to dimeric human CD137 and dimeric cynomolgus CD137 with similar affinity. This is thought to be beneficial for ensuring that efficacy and toxicity studies carried out with the antibody molecule in cynomolgus monkeys are predictive of the efficacy and toxicity of the antibody molecule in humans.

Thus, in a preferred embodiment, the antibody molecule binds to dimeric cynomolgus CD137 with an affinity which is no more than 10-fold, preferably no more than 5-fold, more preferably no more than 2-fold lower or higher than the affinity with which the antibody molecule binds dimeric human CD137.

The binding affinity of an antibody molecule to a cognate antigen, such as human or cynomolgus CD137 can be determined by surface plasmon resonance (SPR), such as Biacore, for example.

The antibody molecule may be chimeric, humanised or human. Preferably, the antibody molecule is a human antibody molecule.

The antibody molecule is preferably monoclonal.

The antibody molecule may be isolated, in the sense of being free from contaminants, such as antibodies able to bind other polypeptides and/or serum components.

The antibody molecule may be natural or partly or wholly synthetically produced. For example, the antibody molecule may be a recombinant antibody molecule.

The antibody molecule comprises one or more CDR-based antigen-binding sites for CD137.

The antibody molecule may be an immunoglobulin or an antigen-binding fragment thereof. For example, the antibody molecule may be an IgG, IgA, IgE or IgM molecule, preferably an IgG molecule, such as an IgG1, IgG2, IgG3 or IgG4 molecule, more preferably an IgG1 or IgG2 molecule, most preferably an IgG1 molecule, or a fragment thereof. In a preferred embodiment, the antibody molecule is a complete immunoglobulin molecule.

In other embodiments, the antibody molecule may be an antigen-binding fragment comprising a CDR-based antigen-binding site for CD137. CDR-based antigen-binding fragments applicable to the antibody molecules of the invention will be known to those of skill in the art. Exemplary CDR-based antigen-binding fragments are described, for example, in Brinkmann and Kontermann, 2017 and Powers et al., 2012. For example, the antigen-binding fragment may be an IgGΔCH2, fragment antigen-binding (Fab), F(ab')$_2$, single-chain Fab (scFab), a disulphide stabilized variable fragment (dsFv), a single-chain variable fragment (scFv), (scFv)$_2$, an scFv-CH3 (minibody), scFv-Fc, scFv-zipper, a diabody, a triabody, a tetrabody, or a single-domain antibody (sdAb), such as a V$_H$H domain or nanobody. Preferred antigen-binding fragments comprise more than one CDR-based antigen-binding site for CD137, i.e. they may be multivalent. Thus, the antigen-binding fragment may preferably be an IgGΔCH2, F(ab')$_2$, a diabody, a triabody, or a tetrabody.

Antibodies and methods for their construction and use are well-known in the art and are described in, for example, Holliger and Hudson, 2005. It is possible to take monoclonal and other antibodies and use techniques of recombinant DNA technology to produce other antibodies or chimeric molecules which retain the specificity of the original antibody. Such techniques may involve introducing CDRs or variable regions of one antibody molecule into a different antibody molecule (EP-A-184187, GB 2188638A and EP-A-239400).

A CDR-based antigen-binding site is an antigen-binding site in an antibody variable region. A CDR-based antigen-binding site, may be formed by three CDRs, such as the three light chain variable domain (VL) CDRs or three heavy chain variable domain (VH) CDRs. Preferably the CDR-based antigen-binding site is formed by six CDRs, three VL CDRs and three VH CDRs. The contributions of the different CDRs to the binding of the antigen may vary in different antigen binding sites.

The three VH domain CDRs of the antigen-binding site may be located within an immunoglobulin VH domain and the three VL domain CDRs may be located within an immunoglobulin VL domain. For example, the CDR-based antigen-binding site may be located in an antibody variable region.

The antibody molecule has one or preferably more than one, for example two, CDR-based antigen binding sites for CD137. The antibody molecule thus may comprise one VH and one VL domain but preferably comprises two VH and two VL domains, i.e. two VH/VL domain pairs, as is the case in naturally-occurring IgG molecules, for example.

The CDR-based antigen-binding site may comprise the three VH CDRs or three VL CDRs, preferably the three VH CDRs and the three VL CDRs, of antibody FS30-10-16, FS30-10-3, FS30-10-12, or FS30-35-14, or FS30-5-37, preferably antibody FS30-10-16, FS30-10-3, FS30-10-12, or FS30-35-14, more preferably antibody FS30-10-16, FS30-10-3, or FS30-10-12, most preferably antibody FS30-10-16.

The sequences of the CDRs may be readily determined from the VH and VL domain sequences of an antibody molecule using routine techniques. The VH and VL domain sequences of antibodies FS30-10-16, FS30-10-3, FS30-10-12, or FS30-35-14, or FS30-5-37 are described herein, and the three VH and three VL domain CDRs of said antibodies may thus be determined from said sequences. The CDR sequences may, for example, be determined according to Kabat et al., 1991 or the international ImMunoGeneTics information system (IMGT) (Lefranc et al., 2015).

The VH domain CDR1, CDR2 and CDR3 sequences of the antibody molecule according to IMGT numbering may be the sequences located at positions 27-38, 56-65, and 105-117, of the VH domain of the antibody molecule, respectively.

The VH domain CDR1, CDR2 and CDR3 sequences of the antibody molecule according to Kabat numbering may be the sequences at located positions 31-35, 50-65, and 95-102 of the VH domain, respectively.

The VL domain CDR1, CDR2 and CDR3 sequences of the antibody molecule according to IMGT numbering may be the sequences located at positions 27-38, 56-65, and 105-117, of the VL domain, respectively.

The VL domain CDR1, CDR2 and CDR3 sequences of the antibody molecule according to Kabat numbering may be the sequences at located positions 24-34, 50-56, and 89-97 of the VL domain, respectively.

For example, the sequence of the VH domain CDR1, CDR2 and CDR3 of:
 (i) antibody FS30-10-16 may be as set forth in SEQ ID NOs 30, 32, and 38, respectively;
 (ii) antibody FS30-10-3 may be as set forth in SEQ ID NOs 30, 32, and 34, respectively;
 (iii) antibody FS30-10-12 may be as set forth in SEQ ID NOs 30, 32, and 36, respectively;
 (iv) antibody FS30-35-14 may be as set forth in SEQ ID NOs 62, 64, and 66, respectively; or
 (v) antibody FS30-5-37 may be as set forth in SEQ ID NOs7, 9, and 11, respectively;
 wherein the CDR sequences are defined according to the ImMunoGeneTics (IMGT) numbering scheme.

The sequence of the VL domain CDR1, CDR2 and CDR3 of:
 (i) antibody FS30-10-16 may be as set forth in SEQ ID NOs 17, 19, and 22, respectively;
 (ii) antibody FS30-10-3 may be as set forth in SEQ ID NOs 17, 19, and 22, respectively;
 (iii) antibody FS30-10-12 may be as set forth in SEQ ID NOs 17, 19, and 22, respectively;

(iv) antibody FS30-35-14 may be as set forth in SEQ ID NOs 17, 19, and 23, respectively; or
(v) antibody FS30-5-37 may be as set forth in SEQ ID NOs 17, 19, and 21, respectively;
wherein the CDR sequences are defined according to the IMGT numbering scheme.

The sequence of the VH domain CDR1, CDR2 and CDR3 of:
(i) antibody FS30-10-16 may be as set forth in SEQ ID NOs 31, 33, and 39, respectively;
(ii) antibody FS30-10-3 may be as set forth in SEQ ID NOs 31, 33, and 34, respectively;
(iii) antibody FS30-10-12 may be as set forth in SEQ ID NOs 31, 33, and 37, respectively;
(iv) antibody FS30-35-14 may be as set forth in SEQ ID NOs 63, 65, and 67, respectively; or
(v) antibody FS30-5-37 may be as set forth in SEQ ID NOs 8, 10, and 12, respectively;
wherein the CDR sequences are defined according to the Kabat numbering scheme.

The sequence of the VL domain CDR1, CDR2 and CDR3 of:
(i) antibody FS30-10-16 may be as set forth in SEQ ID NOs 18, 20, and 22, respectively;
(ii) antibody FS30-10-3 may be as set forth in SEQ ID NOs 18, 20, and 22, respectively;
(iii) antibody FS30-10-12 may be as set forth in SEQ ID NOs 18, 20, and 22, respectively;
(iv) antibody FS30-35-14 may be as set forth in SEQ ID NOs 18, 20, and 23, respectively; or
(v) antibody FS30-5-37 may be as set forth in SEQ ID NOs 18, 20, and 21, respectively;
wherein the CDR sequences are defined according to the Kabat numbering scheme.

The heavy and light chain sequences of antibodies FS30-10-16, FS30-10-3, and FS30-10-12 are identical with the exception of the residue at position 109 of the VH domain according to the IMGT numbering scheme (residue 97 of the VH domain according to the Kabat numbering scheme). This amino acid change lies within the VH domain CDR3. Thus, the antibody molecule may comprise the VH domain CDR1, CDR2 and CDR3 sequences and/or VL domain CDR1, CDR2 and CDR3 sequences, VH domain sequence and/or VL domain sequence, heavy chain sequence and/or light chain sequence, of antibody FS30-10-16, wherein the antibody molecule optionally comprises an amino acid substitution at position 109 of the VH domain according to the IMGT numbering scheme (residue 97 of the VH domain according to the Kabat numbering scheme) selected from the group consisting of: asparagine (N), and threonine (T).

The CDR-based antigen-binding site may comprise the VH or VL domains, preferably the VH and VL domains, of antibody FS30-10-16, FS30-10-3, FS30-10-12, FS30-35-14, or FS30-5-37, preferably antibody FS30-10-16, FS30-10-3, FS30-10-12, or FS30-35-14, more preferably antibody FS30-10-16, FS30-10-3, or FS30-10-12, most preferably antibody FS30-10-16.

The VH domain of antibodies FS30-10-16, FS30-10-3, FS30-10-12, FS30-35-14, or FS30-5-37 may have the sequence set forth in SEQ ID NOs 54, 28, 44, 60, or 5, respectively. The VL domain of antibodies FS30-10-16, FS30-10-3, FS30-10-12, FS30-35-14, or FS30-5-37 may have the sequence set forth in SEQ ID NOs 46, 46, 46, 68, or 13, respectively.

The antibody molecule may comprise the heavy or light chain, preferably the heavy and light chain, of antibody FS30-10-16, FS30-10-3, FS30-10-12, FS30-35-14, or FS30-5-37, preferably antibody FS30-10-16, FS30-10-3, FS30-10-12, or FS30-35-14, more preferably antibody FS30-10-16, FS30-10-3, or FS30-10-12, most preferably antibody FS30-10-16.

[sequences with LALA] The heavy chain of antibodies FS30-10-16, FS30-10-3, FS30-10-12, FS30-35-14, and FS30-5-37 may have the sequence set forth in SEQ ID NOs 52, 26, 42, 58, and 3, respectively.

The light chain of antibodies FS30-10-16, FS30-10-3, FS30-10-12, FS30-35-14, and FS30-5-37 may have the sequence set forth in SEQ ID NOs 46, 46, 46, 68, and 13, respectively.

The antibody molecule may also comprise a variant of a CDR, VH domain, VL domain, heavy chain or light chain sequence as described herein. Suitable variants can be obtained by means of methods of sequence alteration, or mutation, and screening. In a preferred embodiment, an antibody molecule comprising one or more such variant sequences retains one or more of the functional characteristics of the parent antibody molecule, such as binding specificity and/or binding affinity for CD137, preferably human and/or cynomolgus CD137. For example, an antibody molecule comprising one or more variant sequences preferably binds to CD137 with the same affinity as, or a higher affinity than, the (parent) antibody molecule. The parent antibody molecule is antibody molecule which does not comprise the amino acid substitution(s), deletion(s), and/or insertion(s) which has (have) been incorporated into the variant antibody molecule.

The antibody molecule may comprise a VH domain, VL domain, heavy chain, or light chain, which has at least 70%, at least 75%, at least 80%, at least 85%, at least 90%, at least 95%, at least 96%, at least 97%, at least 98%, at least 99%, at least 99.1%, at least 99.2%, at least 99.3%, at least 99.4%, at least 99.5%, at least 99.6%, at least 99.7%, at least 99.8%, or at least 99.9% sequence identity to the VH domain, VL domain, heavy chain, or light chain of antibody FS30-10-16, FS30-10-3, FS30-10-12, FS30-35-14, or FS30-5-37, preferably antibody FS30-10-16, FS30-10-3, FS30-10-12, or FS30-35-14, more preferably antibody FS30-10-16, FS30-10-3, or FS30-10-12, most preferably antibody FS30-10-16.

Sequence identity is commonly defined with reference to the algorithm GAP (Wisconsin GCG package, Accelerys Inc, San Diego USA). GAP uses the Needleman and Wunsch algorithm to align two complete sequences, maximising the number of matches and minimising the number of gaps. Generally, default parameters are used, with a gap creation penalty equaling 12 and a gap extension penalty equaling 4. Use of GAP may be preferred but other algorithms may be used, e.g. BLAST (which uses the method of Altschul et al., 1990, FASTA (which uses the method of Pearson and Lipman, 1988), or the Smith-Waterman algorithm (Smith and Waterman, 1981), or the TBLASTN program, of Altschul et al., 1990 supra, generally employing default parameters. In particular, the psi-Blast algorithm (Altschul et al., 1997) may be used.

The antibody molecule may comprise a VH CDR1, VH CDR2, VH CDR3, VL CDR1, VL CDR2, and/or VL CDR3 which has one or more amino acid sequence alterations (addition, deletion, substitution and/or insertion of an amino acid residue), preferably 3 alterations or fewer, 2 alterations or fewer, or 1 alteration compared with the VH CDR1, VH CDR2, VH CDR3, VL CDR1, VL CDR2, and/or VL CDR3 of antibody FS30-10-16, FS30-10-3, FS30-10-12, FS30-35-14, or FS30-5-37, preferably antibody FS30-10-16, FS30-

10-3, FS30-10-12, or FS30-35-14, more preferably antibody FS30-10-16, FS30-10-3, or FS30-10-12, most preferably antibody FS30-10-16.

The antibody molecule may comprise a VH domain, VL domain, heavy chain, or light chain, which has one or more amino acid sequence alterations (addition, deletion, substitution and/or insertion of an amino acid residue), preferably 20 alterations or fewer, 15 alterations or fewer, 10 alterations or fewer, 5 alterations or fewer, 4 alterations or fewer, 3 alterations or fewer, 2 alterations or fewer, or 1 alteration compared with the VH domain, VL domain, heavy chain, or light chain of antibody FS30-10-16, FS30-10-3, FS30-10-12, FS30-35-14, or FS30-5-37, preferably antibody FS30-10-16, FS30-10-3, FS30-10-12, or FS30-35-14, more preferably antibody FS30-10-16, FS30-10-3, or FS30-10-12, most preferably antibody FS30-10-16. In particular, amino acid sequence alterations may be located in one or more framework regions of the antibody molecules, such as one or more framework regions of the heavy and/or light chains of the antibody molecule.

The heavy chain of the antibody molecule may optionally comprise an additional lysine residue (K) at the immediate C-terminus of the heavy chain CH3 domain sequence.

In preferred embodiments in which one or more amino acids are substituted with another amino acid, the substitutions may conservative substitutions, for example according to the following Table. In some embodiments, amino acids in the same category in the middle column are substituted for one another, i.e. a non-polar amino acid is substituted with another non-polar amino acid, for example. In some embodiments, amino acids in the same line in the rightmost column are substituted for one another.

| ALIPHATIC | Non-polar | G A P |
| | | I L V |
| | Polar - uncharged | C S T M |
| | | N Q |
| | Polar - charged | D E |
| | | K R |
| AROMATIC | | H F W Y |

In some embodiments, substitution(s) may be functionally conservative. That is, in some embodiments the substitution may not affect (or may not substantially affect) one or more functional properties (e.g. binding affinity) of the antibody molecule comprising the substitution as compared to the equivalent unsubstituted antibody molecule.

The CH2 domain of the antibody molecule may comprise one or more mutations that reduce or abrogate binding of the CH2 domain to one or more Fcγ receptors, such as FcγRI, FcγRIIa, FcγRIIb, FcγRIII, and/or to complement. The inventors postulate that reducing or abrogating binding to Fcγ receptors will decrease or eliminate ADCC mediated by the antibody molecule. Similarly, reducing or abrogating binding to complement is expected to reduce or eliminate CDC mediated by the antibody molecule. Mutations to decrease or abrogate binding of the CH2 domain to one or more Fcγ receptors and/or complement are known in the art (Wang et al., 2018). These mutations include the "LALA mutation" described in Bruhns et al., 2009 and Hezareh et al., 2001, which involves substitution of the leucine residues at IMGT positions 1.3 and 1.2 of the CH2 domain with alanine (L1.3A and L1.2A). Alternatively, the generation of a-glycosyl antibodies through mutation of the conserved N-linked glycosylation site by mutating the asparagine (N) at IMGT position 84.4 of the CH2 domain to alanine, glycine or glutamine (N84.4A, N84.4G or N84.4Q) is also known to decrease IgG1 effector function (Wang et al., 2018). As a further alternative, complement activation (C1q binding) and ADCC are known to be reduced through mutation of the proline at IMGT position 114 of the CH2 domain to alanine or glycine (P114A or P114G) (Idusogie et al., 2000; Klein et al., 2016). These mutations may also be combined in order to generate antibody molecules with further reduced or no ADCC or CDC activity.

Thus, the antibody molecule may comprise a CH2 domain, wherein the CH2 domain preferably comprises:
  (i) alanine residues at positions 1.3 and 1.2; and/or
  (ii) an alanine or glycine at position 114; and/or
  (iii) an alanine, glutamine or glycine at position 84.4;
  wherein the amino acid residue numbering is according to the IMGT numbering scheme.

In a preferred embodiment, the antibody molecule comprises a CH2 domain, wherein the CH2 domain preferably comprises:
  (i) alanine residues at positions 1.3 and 1.2; and/or
  (ii) an alanine or glycine at position 114;
wherein the amino acid residue numbering is according to the IMGT numbering scheme.

In a preferred embodiment, the antibody molecule comprises a CH2 domain, wherein the CH2 domain comprises:
  (i) an alanine residue at position 1.3; and
  (ii) an alanine residue at position 1.2;
  wherein the amino acid residue numbering is according to the IMGT numbering scheme.

For example, the CH2 domain may have the sequence set forth in SEQ ID NO: 107.

In an alternative preferred embodiment, the antibody molecule comprises a CH2 domain, wherein the CH2 domain comprises:
  (i) an alanine residue at position 1.3;
  (ii) an alanine residue at position 1.2; and
  (iii) an alanine at position 114;
  wherein the amino acid residue numbering is according to the IMGT numbering scheme.

For example, the CH2 domain may have the sequence set forth in SEQ ID NO: 108.

Also contemplated is antibody molecule which comprises a CDR-based antigen binding site for CD137 and which competes with an antibody molecule as described herein, or that binds to the same epitope on CD137 as an antibody molecule as described herein. Methods for determining competition for an antigen by two antibodies are known in the art. For example, competition of binding to an antigen by two antibodies can be determined by surface plasmon resonance, e.g. using a Biacore instrument. Methods for mapping the epitope bound by an antibody are similarly known.

The antibody molecules have been shown to have range of activities on ligand binding. For example, the antibody molecule may be capable of blocking, may not be capable of blocking, or may be capable of partially blocking binding of CD137L to CD137.

Preferably, the antibody molecule may be capable of blocking, may not be capable of blocking, or may be capable of partially blocking binding of CD137L to CD137. More preferably, the antibody molecule is capable of partially blocking binding of CD137L to CD137.

The ability of an antibody molecule to block the binding of CD137L to CD137 may be determined by reference to an antibody molecule comprising or consisting of the heavy chain and light chain of antibody G1/MOR7480.1 set forth in SEQ ID NOs 99 and 101, respectively, or comprising or consisting of the heavy chain and light chain of antibody G1/20H4.9 set forth in SEQ ID NOs 104 and 106, respectively.

Alternatively, the ability of an antibody molecule to block the binding of CD137L to CD137, also referred to as the CD137L blocking activity herein, may be determined by reference to an antibody molecule comprising or consisting of the heavy chain and light chain of antibody FS20-22-49AA/FS30-10-16 set forth in SEQ ID NOs 79 and 46, respectively.

For example, the antibody molecule may have a lower level of CD137L blocking activity than an antibody molecule comprising or consisting of the heavy chain and light chain of antibody G1/MOR7480.1 set forth in SEQ ID NOs 99 and 101, respectively, or the heavy chain and light chain of antibody G1/20H4.9 set forth in SEQ ID NOs 104 and 106, respectively.

For example, the antibody molecule may have a CD137L blocking activity that is less or equal to 80%, less or equal to 70%, or less or equal to 60% of the CD137L blocking activity of an antibody molecule comprising or consisting of the heavy chain and light chain sequence of antibody G1/MOR7480.1 set forth in SEQ ID NOs 99 and 101, respectively, or the heavy chain and light chain of antibody G1/20H4.9 set forth in SEQ ID NOs 104 and 106, respectively.

The antibody molecule may have a CD137L blocking activity that is at least 20%, at least 30%, or at least 40% of the CD137L blocking activity of an antibody molecule comprising or consisting of the heavy chain and light chain sequence of antibody G1/MOR7480.1 set forth in SEQ ID NOs 99 and 101, respectively, or the heavy chain and light chain of antibody G1/20H4.9 set forth in SEQ ID NOs 104 and 106, respectively.

The antibody molecule may have a CD137L blocking activity that is between 20% and 80%, between 30% and 70%, or between 40% and 60% of the CD137L blocking activity of an antibody molecule comprising or consisting of the heavy chain and light chain sequence of antibody G1/MOR7480.1 set forth in SEQ ID NOs 99 and 101, respectively, or the heavy chain and light chain of antibody G1/20H4.9 set forth in SEQ ID NOs 104 and 106, respectively.

The antibody molecule may have a CD137L blocking activity that is between 70% and 130%, 80% and 120%, or 90% and 110% of the CD137L blocking activity of an antibody molecule comprising or consisting of the heavy chain sequence and light chain sequence of antibody FS20-22-49AA/FS30-10-16 set forth in SEQ ID NOs 79 and 46, respectively.

In one aspect, the present invention relates to an antibody molecule which has a partial CD137L blocking activity as described above and which binds to both human and cynomolgus CD137.

Methods which are suitable for determining the ability of an antibody molecule to block the binding of CD137L to CD137 are known in the art and include ELISAs and cell-based assays, such as assays which use cells overexpressing CD137 or CD137 ligand for testing of binding of labelled, e.g. biotinylated, CD137L or CD137, respectively.

For example, the method for determining the ability of an antibody molecule to block the binding of CD137L to CD137 may comprise:
(a)
  (i) immobilizing CD137 on a solid support;
  (ii) incubating said solid support with the antibody molecule;
  (iii) incubating the solid support prepared in step (a) (ii) with CD137L; and
  (iv) measuring binding of CD137L to CD137 to obtain a measurement value; and
(b)
  (i) immobilizing CD137 on a solid support;
  (ii) incubating said solid support with a control antibody molecule;
  (iii) incubating said solid support prepared in step (b) (ii) with CD137L; and
  (iv) measuring binding of CD137L to CD137 to obtain a measurement value; and comparing the measurement value obtained in (a) with the measurement value obtained in (b).

As another example, the method for determining the ability of an antibody molecule to block the binding of CD137L to CD137 may comprise:
(a)
  (i) immobilizing CD137L on a solid support;
  (ii) incubating CD137 with the antibody molecule;
  (iii) incubating the solid support prepared in step (a) (i) with the mixture of CD137 and the antibody molecule prepared in step a (ii); and
  (iv) measuring binding of CD137L to CD137 to obtain a measurement value; and
(b)
  (i) immobilizing CD137L on a solid support;
  (ii) incubating CD137 with a control antibody molecule;
  (iii) incubating the solid support prepared in step (b) (i) with the mixture of CD137 and the control antibody molecule prepared in step b (ii); and
  (iv) measuring binding of CD137L to CD137 to obtain a measurement value; and comparing the measurement value obtained in (a) with the measurement value obtained in (b).

As a further example, the method for determining the ability of an antibody molecule to block the binding of CD137L to CD137 may comprise:
(a)
  (i) incubating CD137 with the antibody molecule;
  (ii) incubating the mixture of the antibody molecule and CD137 with cells expressing CD137L; and
  (iii) measuring binding of CD137L to CD137 to obtain a measurement value; and
(b)
  (i) incubating CD137 with a control antibody molecule;
  (ii) incubating the mixture of the control antibody molecule and CD137 with cells expressing CD137L; and
  (iii) measuring binding of CD137L to CD137 to obtain a measurement value; and comparing the measurement value obtained in (a) with the measurement value obtained in (b).

As yet a further example, the method for determining the ability of an antibody molecule to block the binding of CD137L to CD137 may comprise:
(a)
  (i) incubating the antibody molecule with cells expressing CD137;
  (ii) incubating the mixture of the antibody molecule and CD137-expressing cells with CD137L; and
  (iii) measuring binding of CD137L to CD137 to obtain a measurement value; and (b)
(i) incubating a control antibody molecule with cells expressing CD137;
(ii) incubating the mixture of the control antibody molecule and CD137-expressing cells with CD137L; and
(iii) measuring binding of CD137L to CD137 to obtain a measurement value; and comparing the measurement value obtained in (a) with the measurement value obtained in (b).

The control antibody preferably blocks binding of CD137L to CD137. For example, the control antibody may comprise or consist of the heavy chain and light chain of antibody G1/MOR7480.1 set forth in SEQ ID NOs 99 and 101, respectively, the heavy chain and light chain of antibody G1/20H4.9 set forth in SEQ ID NOs 104 and 106, respectively, or the heavy chain sequence and light chain sequence of antibody FS20-22-49AA/FS30-10-16 set forth in SEQ ID NOs 79 and 46, respectively. Thus, an antibody molecule whose measurement value as determined in step (a) is the same or higher than the measurement of the control antibody as determined in step (b) blocks binding of CD137L to CD137 to the same or a greater extent than the control antibody.

In a preferred embodiment, the antibody molecule of the invention may comprise one or more further antigen-binding sites that bind one or more further antigens, in addition to the CDR-based antigen-binding site for CD137. The one or more further antigen-binding sites preferably bind their cognate antigens specifically.

The one or more further antigen-binding sites preferably do not bind CD137. The antibody molecule may thus be a multispecific, for example a bispecific, trispecific, or tetraspecific molecule, preferably a bispecific molecule. In a preferred embodiment, the antibody molecule is capable of simultaneously binding to CD137 and the one or more further antigens.

Antibody molecules have a modular architecture comprising discrete domains, which can be combined in a multitude of different ways to create multispecific, e.g. bispecific, trispecific, or tetraspecific antibody formats. Exemplary multispecific antibody formats are described in Spiess et al. (2015) and Kontermann (2012), for example. The antibody molecules of the present invention may be employed in such multispecific formats.

For example, the antibody molecule of the invention may be a heterodimeric antibody molecule, such as a heterodimeric complete immunoglobulin molecule, or a fragment thereof. In this case, one part of the antibody molecule will have a sequence or sequences as described herein. For example, where the antibody molecule of the invention is a bispecific heterodimeric antibody molecule, the antibody molecule may comprise a heavy chain and light chain as described herein paired with a heavy chain and light chain comprising a VH domain and a VL domain, respectively, which bind an antigen other than MSLN. Techniques for preparing heterodimeric antibodies are known in the art and include knobs-into-holes (KIHs) technology, which involves engineering the CH3 domains of an antibody molecule to create either a "knob" or a "hole" to promote chain heterodimerization. Alternatively, heterodimeric antibodies can be prepared through the introduction of charge pairs into the antibody molecule to avoid homodimerization of CH3 domains by electrostatic repulsion and to direct heterodimerization by electrostatic attraction. Examples of heterodimeric antibody formats include CrossMab, mAb-Fv, SEEDbody, and kih IgG.

Figure 1:
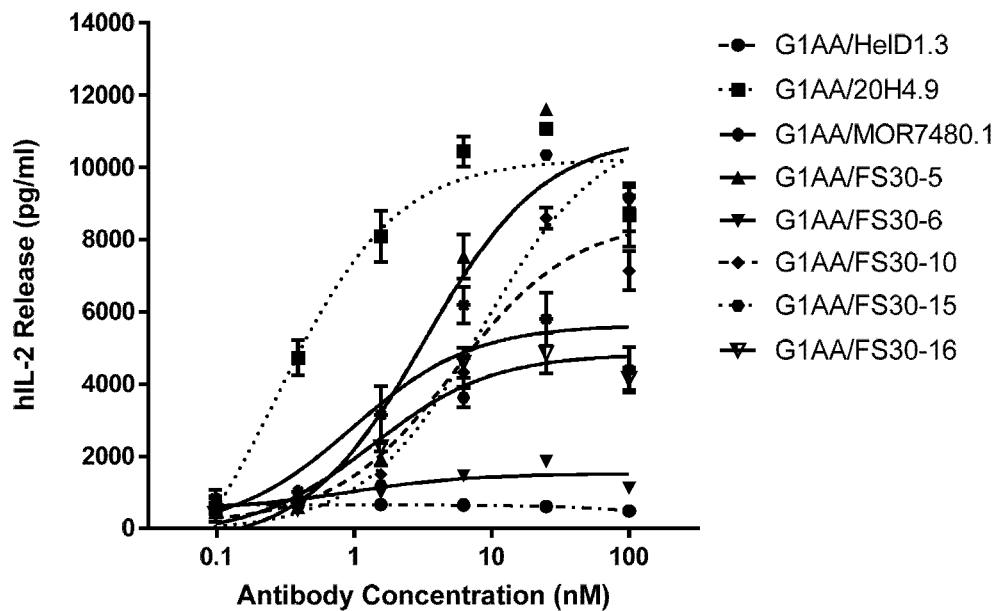
FIG. 1 shows IL-2 release in a primary T cell activation assay in the presence of increasing concentrations of anti-human CD137 FS30 mAbs. The FS30 mAbs were tested in IgG1 format including the LALA mutation (G1AA/FS30-5, G1AA/FS30-6, G1AA/FS30-10, G1AA/FS30-15 and G1AA/FS30-16). The anti-CD137 mAbs, MOR7480.1 and 20H4.9, each in IgG1 format and harbouring the LALA mutation, were included as positive controls (G1AA/MOR7480.1 and G1AA/20H4.9), whereas an anti-hen egg-white lysozyme antibody in IgG1 LALA format was included as negative control (G1AA/HeID1.3). All mAbs were tested in the absence and presence of a crosslinking agent, except for G1AA/MOR7480.1 and G1AA/HeID1.3 which were only tested when crosslinked.
Figure 1:
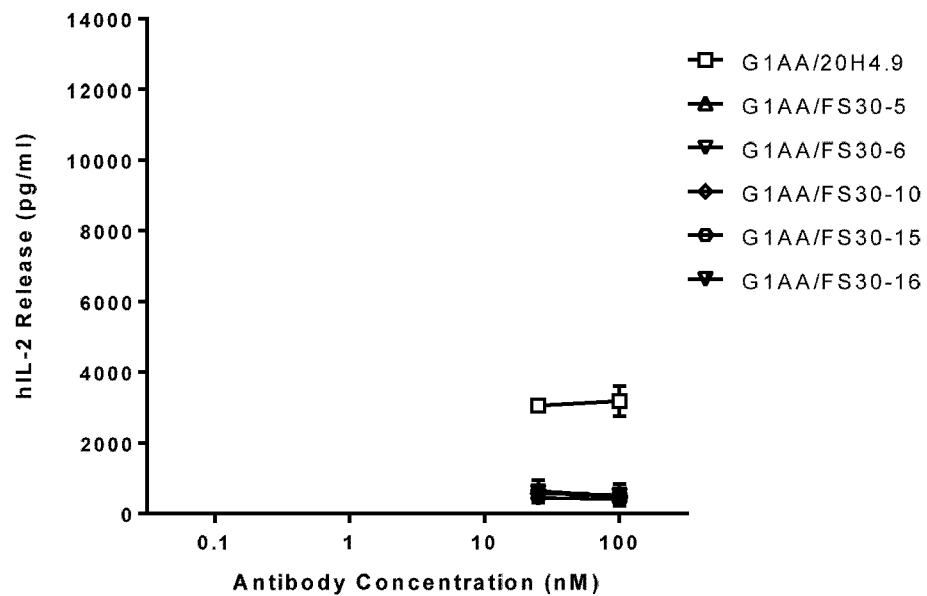

Alternatively, a multispecific antibody molecule may comprise a complete immunoglobulin molecule or a fragment thereof and an additional antigen-binding moiety or moieties. The antigen-binding moiety may for example be an Fv, scFv or single domain antibody, and may be fused to the complete immunoglobulin molecule or a fragment thereof. Examples of multispecific antibody molecules comprising additional antigen-binding moieties fused to a complete immunoglobulin molecule include DVD-IgG, DVI-IgG, scFv4-IgG, IgG-scFv, and scFv-IgG molecules (Spiess et al., 2015; FIG. 1). Examples of multispecific antibody molecules comprising additional antigen-binding moieties fused to an immunoglobulin fragment include BiTE molecules, diabodies, and DART molecules, for example (Spiess et al., 2015; FIG. 1).

Other suitable formats would be readily apparent to the skilled person.

In a preferred embodiment, the antibody molecule comprises a second antigen-binding site that binds a second antigen, wherein the second antigen-binding site is preferably located in a constant domain of the antibody molecule. For example, the antibody molecule may be a mAb$^2$ (TM) bispecific antibody. A mAb$^2$ bispecific antibody, as referred to herein, is an IgG immunoglobulin which includes a CDR-based antigen binding site in each of its variable regions and at least one antigen binding site in a constant domain of the antibody molecule.

In a preferred embodiment, the antibody is an antibody molecule that binds CD137 and a second antigen, the antibody molecule comprising:
(i) two CDR-based antigen-binding sites for CD137, each formed by an immunoglobulin VH domain and an immunoglobulin VL domain; and
(ii) two antigen-binding sites that bind a second antigen located in the two CH3 domains of the antibody molecule.

In a more preferred embodiment, the antibody is a complete immunoglobulin molecule, e.g. a complete IgG1 molecule, that binds CD137 and a second antigen, the antibody molecule comprising:
(i) two CDR-based antigen-binding sites for CD137, each formed by an immunoglobulin VH domain and an immunoglobulin VL domain; and
(ii) two antigen-binding sites that bind a second antigen located in the two CH3 domains of the antibody molecule; and
wherein the immunoglobulin molecule further comprises CH1, CH2 and CL domains.

The antigen-binding site for the second antigen may be located in any constant domain of the antibody molecule. For example, the antigen-binding site for the second antigen may be located in one or more of the CH4, CH3, CH2, CH1 or CL domains, preferably the CH3 or CH2 domain, most preferably the CH3 domain.

The antigen binding site may be composed of one or more, for example one, two, three or more, structural loops of the constant domain of the antibody molecule.

The structural loops of an antibody constant domain include the AB, BC, CD, DE, EF, and FG structural loops. The antigen binding site may comprise two or more of the AB, BC, CD, DE, EF, and FG structural loops of the constant domain, preferably the AB and EF structural loops, or the AB, CD and EF structural loops.

The positions of the structural loops in antibody constant domains are well-known in the art. For example, the structural loops of the CH3 domain are located between positions 10 and 19 (AB loop), 28 and 39 (BC loop), 42 and 79 (CD loop), 82 and 85 (DE loop), 91 and 102 (EF loop) and 106 and 117 (FG loop) of the CH3 domain, wherein the residues are numbered according to IMGT numbering scheme. The locations of the structural loop positions in other constant domains may be easily determined.

The structural loops of the constant domain may comprise one or more amino acid modifications in order to form the antigen-binding site for the second antigen. One or more amino acid modifications may include amino acid substitutions, additions, or deletions. The introduction of amino acid modifications into the structural loop regions of antibody constant domains to create antigen-binding sites for target antigens is well-known in the art and is described, for example, in Wozniak-Knopp G et al., 2010, and patent publication nos. WO2006/072620 and WO2009/132876. Examples of constant domain binding sites are provided below.

In a preferred embodiment, the antibody molecule comprises one or more amino acid modifications (substitutions, additions, and/or deletions) in the AB, CD and/or EF structural loops, preferably the AB and EF structural loops or the AB, CD and EF structural loops. For example, the antibody molecule may comprise one or more amino acid modifications (substitutions, additions, and/or deletions) between positions 10 and 19, 42 and 79, and/or 91 and 102 of the CH3 domain, preferably between positions 10 and 19, and 91 and 102, or between positions 10 and 19, 42 and 79, and 91 and 102 of the CH3 domain to provide an antigen-binding site for a second antigen as set out herein. More preferably, the antibody molecule comprises one or more amino acid modifications (substitutions, additions, and/or deletions) between positions 11 and 19, 45 and 78, 91 and 95, and/or 96 and 102 of the CH3 domain, more preferably between positions 11 and 19, 91 and 95, and 96 and 102, or between positions 11 and 19, 45 and 78, 91 and 95, and 96 and 102 of the CH3 domain to provide an antigen-binding site for a second antigen as set out herein. The unmodified CH3 domain preferably comprises or consists of the sequence set forth in SEQ ID NO: 109. The residue numbering is according to IMGT numbering scheme.

Activation of CD137 requires clustering of CD137 on the immune cell surface, e.g. the T cell surface, which in turn stimulates intracellular signalling pathways and immune cell activation. Binding of antibody molecules to CD137 on the immune cell surface in the absence of crosslinking of the antibody molecules may not cause CD137 to form clusters, and consequently may not result in immune cell activation.

The present inventors have shown that the antibody molecules of the invention do not cause T cell activation in the absence of crosslinking of the antibody molecule (see Example 7).

As explained above, crosslinking of antibody molecules through binding to Fcγ receptors is both inefficient and cannot be targeted to a particular location e.g. the site of a disease, as Fcγ receptor expressing cells are present throughout the human body. The second antigen bound by the second antigen-binding site is therefore preferably not an Fcγ receptor.

In a preferred embodiment, the antibody molecules of the invention therefore comprise a second antigen binding site that binds a second antigen, wherein the second antigen is capable of binding to and crosslinking multiple antibody molecules.

For example, the present inventors have shown using other bispecific molecules comprising binding sites for both CD137 and a second antigen, specifically mAb$^2$ molecules comprising two constant domain binding sites for CD137 and two CDR-based antigen binding site for a second antigen (CD137/second antigen mAb$^2$), that where the second antigen is a multimeric molecule, binding of the antibody molecule to the second antigen results in, or enhances, T cell activation. The second antigen is therefore preferably a multimeric antigen, such as a dimer, trimer or higher-order multimer, and thus able to crosslink several antibody molecules.

The present inventors have also shown using CD137/second antigen mAb$^2$ molecules that where the second antigen is a surface antigen, such as a cell-surface antigen, which can be monomeric or multimeric and is present in high concentrations and/or clustered at a surface, e.g. a cell surface, binding of the antibody molecule to the second antigen results in, or enhances, T cell activation. Without wishing to be bound by theory, it is thought that binding of the antibody molecule to an abundant cell-surface antigen, for example, results in a high concentration of antibody molecules bound to the cell surface which places the antibody molecules in sufficiently close proximity to be able to drive clustering of CD137 and immune cell activation. In a preferred embodiment, the second antigen is therefore a surface antigen which is expressed at a high concentration on a surface, e.g. a cell surface.

An antibody molecule comprising a second antigen-binding site that binds a second antigen, as described herein, and which activates immune cells, such as T cells, only on binding to the second antigen, or whose immune cell activation activity is enhanced on binding to the second antigen, is also referred to as a conditional agonist. This immune cell activation activity on binding to the second antigen is independent of binding of the antibody molecule to Fcγ receptors and/or external crosslinking agents, such as protein A or G or secondary antibodies, and therefore allows the conditional agonist activity of the antibody molecule to be targeted to sites where the second antigen is present. For example, where the second antigen is a disease antigen, the antibody molecule may activate the immune cell selectively at the site of disease and not elsewhere in an individual.

In addition, an antibody molecule which activates immune cells, such as T cells, only on binding to a second antigen, may have increased immune cell activation activity compared with antibody molecules that rely on crosslinking by other mechanisms, such as external crosslinking agents, or crosslinking via Fcγ receptor interaction. Because the activation of CD137 is more efficient, immune cell activation may be achieved at lower concentrations of antibody molecules described herein relative to other antibody molecules.

Thus, the antibody molecule of the invention preferably induces increased activation of immune cells, such as T cells, when the antibody molecule is crosslinked, e.g. through binding to a second antigen, than when the antibody molecule is not crosslinked.

The ability of an antibody molecule to activate T cells may be measured using a T cell activation assay. T cells release IL-2 on activation. A T cell activation assay may therefore measure IL-2 release to determine the level of T cell activation induced by the antibody molecule.

For example, the ability of the antibody molecule to activate T cells may be determined by measuring the concentration of the antibody molecule required to achieve half-maximal release of IL-2 by the T cells in a T cells activation assay when the antibody molecule is crosslinked. This is referred to as the $EC_{50}$ of the antibody molecule below. A lower $EC_{50}$ indicates that a lower concentration of the antibody molecule is needed to achieve half-maximal release of IL-2 by the T cells in the T cells activation assay, and thus that the antibody molecule has a higher T cell activation activity. The antibody molecule may be cross-linked using an anti-CH2 antibody, for example.

In a preferred embodiment, the antibody molecule has an $EC_{50}$ in a T cell activation assay which is within 50-fold, 40-fold, 30-fold, 20-fold, 10-fold, 5-fold, 4-fold, 3-fold, or 2-fold of the $EC_{50}$ of FS20-22-49AA/FS30-10-16 (comprising the LALA mutation) in the same assay, wherein FS20-22-49AA/FS30-10-16 (LALA) consists of or comprises the heavy chain set forth in SEQ ID NO: 79 and the light chain set forth in SEQ ID NO: 46.

For example, the antibody molecule may have an $EC_{50}$ in a T cell activation assay of 20 nM or less, 15 nM or less, 10 nM or less, 5 nM or less, 4 nM or less, 3 nM or less, 2 nM or less, 1 nM or less, or 0.5 nM or less.

In addition, or alternatively, the ability of an antibody molecule to activate T cells may be determined by measuring the maximum concentration of IL-2 released by the T cells in a T cell activation assay in the presence of the antibody molecule, wherein the antibody molecule is cross-linked.

In a preferred embodiment, the maximum concentration of IL-2 released by the T cells in a T cell activation assay in the presence of the antibody molecule in the presence of crosslinking is within 10-fold, 5-fold, 4-fold, 3-fold, 2-fold, or 1.5-fold of the maximum concentration of IL-2 released by the T cells in the presence of FS20-22-49AA/FS30-10-16 (comprising the LALA mutation). The maximum concentration of IL-2 released by the T cells in a T cell activation assay in the presence of the antibody molecule in the presence of crosslinking is preferably higher, for example at least 1.1-fold or at least 1.2-fold higher than the maximum concentration of IL-2 released by the T cells in a T cell activation assay in the presence of the crosslinked G1/MOR7480.1 in the same assay.

The T cell activation assay may be a T cell assay as described herein, such as a CD8+ T cell assay, as described in the present Examples, see e.g. Example 2.

For example, a T cell activation assay may be an IL-2 release assay based on CD8+ T cells isolated from human Peripheral Blood Mononuclear Cells (PBMCs). For example, the T cell activation assay may comprise isolating human PBMCs from leucocyte depletion cones. Methods for isolating PBMCs are known in the art and described in the present examples. The CD8+ T cells may then be isolated from the PBMCs. Methods for isolating CD8+ T cells from PBMCs are known in the art and described in the present examples.

The CD8+ T cells may then be added to multiwall plates coated with an anti-human CD3 antibody. A suitable dilution of each test antibody molecule may be prepared and added to the wells. The T cells may then be incubated at 37° C., 5% $CO_2$ for 24 hours with the test antibody. Supernatants may be collected and assayed to determine the concentration of IL-2 in the supernatant. Methods for determining the concentration of IL-2 in a solution are known in the art and described in the present examples. The concentration of human IL-2 may be plotted versus the log concentration of the antibody molecule. The resulting curves may be fitted using the log (agonist) versus response equation.

The second antigen bound by the second antigen-binding site of the antibody molecule may be an immune cell antigen, or a disease antigen. Disease antigens include pathogenic antigens and tumour antigens.

The immune cell antigen bound by the antibody molecule may be present on the same immune cell or on a different immune cell to CD137.

The immune cell antigen may be a member of the tumour necrosis factor receptor superfamily (TNFRSF) other than CD137. TNFRSF receptors are membrane-bound cytokine receptors that comprise an extracellular cysteine rich domain that binds one or more ligands of the tumour necrosis factor superfamily (TNFSF).

The TNFRSF receptor may be located on the surface of an immune cell. Upon binding of a TNFRSF ligand, TNFRSF receptors form clusters on the immune cell surface which activates the immune cell. For example, ligand bound TNFRSF receptors may form multimers, such as trimers, or clusters of multimers. The presence of clusters of ligand-bound TNFRSF receptors stimulates intracellular signalling pathways which activate the immune cell.

Without wishing to be bound by theory it is thought that by engaging both CD137 and a second TNFRSF receptor on an immune cell surface, the antibody molecules will cause both CD137 and the second TNFRSF receptor to cluster and activate the immune cell(s). In other words, the antibody molecule will act as a TNFRSF receptor agonist when both targets are bound.

TNFRSF receptors include CD27, CD40, EDA2R, EDAR, FAS, LTBR, RELT, TNFRSF1A, TNFRSF1B, TNFRSF4, TNFRSF6B, TNFRSF8, TNFRSF10A-10D, TNFRSF11A, TNFRSF11B, TNFRSF12A, TNFRSF13B, TNFRSF13C, TNFRSF14, TNFRSF17, TNFRSF18, TNFRSF19, TNFRSF21 and TNFRSF25.

In a preferred embodiment, the TNFRSF receptor is TNFRSF4 (OX40).

CD27 (TNFRSF7: Gene ID 939) has the reference amino acid sequence of NP_001233.1 and may be encoded by the reference nucleotide sequence of NM_001242.4. CD40 (TNFRSF5: Gene ID 958) has the reference amino acid sequence of NP_001241.1 and may be encoded by the reference nucleotide sequence of NM_001250.5. EDA2R (TNFRSF27: Gene ID 60401) has the reference amino acid sequence of NP_001186616.1 and may be encoded by the reference nucleotide sequence of NM_001199687.2. EDAR (Gene ID 10913) has the reference amino acid sequence of NP_071731.1 and may be encoded by the reference nucleotide sequence of NM_022336, 3. FAS (TNFRSF6: Gene ID 355) has the reference amino acid sequence of NP_000034.1 and may be encoded by the reference nucleotide sequence of NM_000043.5. LTBR (TNFRSF3: Gene ID 4055) has the reference amino acid sequence of NP_001257916.1 and may be encoded by the reference nucleotide sequence of NM_001270987.1. RELT (TNFRSF19L: Gene ID 84957) has the reference amino acid sequence of NP_116260.2 and may be encoded by the reference nucleotide sequence of NM_032871.3. TNFRSF1A (Gene ID 7132) has the reference amino acid sequence of NP_001056.1 and may be encoded by the reference nucleotide sequence of NM_001065.3. TNFRSF1B (Gene ID 7133) has the reference amino acid sequence of NP_001057.1 and may be encoded by the reference nucleotide sequence of NM_001066.2. TNFRSF4 (Gene ID 7293) has the reference amino acid sequence of NP_003318 and may be encoded by the reference nucleotide sequence of NM_003327). TNFRSF6B (Gene ID 8771) has the reference amino acid sequence of NP_003814.1 and may be encoded by the reference nucleotide sequence of NM_003823.3. TNFRSF8 (Gene ID 943) has the reference amino acid sequence of NP_001234.3 and may be encoded by the reference nucleotide sequence of NM_001243.4. TNFRSF10A (Gene ID 8797) has the reference amino acid sequence of NP_003835.3 and may be encoded by the reference nucleotide sequence of NM_003844.3. TNFRSF10B (Gene ID 8795) has the reference amino acid sequence of NP_003833.4 and may be encoded by the reference nucleotide sequence of NM_003842.4. TNFRSF10C (Gene ID 8794) has the reference amino acid sequence of NP_003832.2 and may be encoded by the reference nucleotide sequence of NM_003841.4. TNFRSF10D (Gene ID 8793) has the reference amino acid sequence of NP_003831.2 and may be encoded by the reference nucleotide sequence of NM_003840.4. TNFRSF11A (Gene ID 8792) has the reference amino acid sequence of XP_011524547.1 and may be encoded by the reference nucleotide sequence of XM_11526245.2. TNFRSF11B (Gene ID 4982) has the reference amino acid sequence of NP_002537.3 and may be encoded by the reference nucleotide sequence of NM_002546.3. TNFRSF12A (Gene ID 51330) has the reference amino acid sequence of NP_057723.1 and may be encoded by the reference nucleotide sequence of NM_016639.2. TNFRSF13B (Gene ID 23495) has the reference amino acid sequence of NP_0036584.1 and may be encoded by the reference nucleotide sequence of NM_012452.2. TNFRSF13C (Gene ID 115650) has the reference amino acid sequence of NP_443177.1 and may be encoded by the reference nucleotide sequence of NM_052945.3. TNFRSF14 (Gene ID 8764) has the reference amino acid sequence of NP_001284534.1 and may be encoded by the reference nucleotide sequence of NM_001297605.1. TNFRSF17 (Gene ID 608) has the reference amino acid sequence of NP_001183.2 and may be encoded by the reference nucleotide sequence of NM_001192.2. TNFRSF18 (Gene ID 8784) has the reference amino acid sequence of NP_004195.2 and may be encoded by the reference nucleotide sequence of NM_004186.1. TNFRSF19 (Gene ID 55504) has the reference amino acid sequence of NP_001191387.1 and may be encoded by the reference nucleotide sequence of NM_001204458.1. NFRSF21 (Gene ID 27242) has the reference amino acid sequence of NP_055267.1 and may be encoded by the reference nucleotide sequence of NM_014452.4. TNFRSF25 (DR3: Gene ID 8718) binds to ligand TNFSF15 (TL1A) has the reference amino acid sequence of NP_001034753.1 and may be encoded by the reference nucleotide sequence of NM_001039664.1.

Alternatively, immune cell antigen bound by the second antigen-binding site may be a molecule which regulates the immune system other than a TNFRSF molecule, e.g. an immune costimulatory molecule or an inhibitory checkpoint molecule. Examples of such other immune regulatory molecules include ICOS (CD278), LAG3, PD1, PD-L1, PD-L2, B7H3, B7H4, CTLA4, TIGIT, BTLA, HVEM, T cell immunoglobulin and mucin-domain containing-3 (TIM-3), CD47, CD73, A2aR, CD200, CD200R and Colony stimulating factor 1 receptor (CSF-1R), VISTA, CD28, CD80, LLT1, galectin-9, NKG2A, NKG2D and KIR.

The immune cell on which the immune cell antigen is present may belong to any immune cell subset and can be a T cell, a tumour-infiltrating leukocyte (TIL), a myeloid lineage cell such as an antigen presenting cell (APC), an NK cell and/or a B cell. When the immune cell antigen is a TNFRSF receptor, the immune cell on which the TNFRSF receptor is present is preferably a T cell.

Alternatively, the second antigen-binding site may bind to a disease antigen as mentioned above. Without wishing to be bound by theory, it is thought that binding of the antibody molecule to CD137 and a disease antigen will result in the activation of T cells in the vicinity of the disease. The activated T cells may then then initiate, promote or take part in an immune response, for example an immune response against a pathogen or a cancer cell. An overview of the role the immune system plays in recognizing and eradicating cancer cells is provided by Chen and Mellman (2013).

In a preferred embodiment, the disease antigen is a tumour antigen. A tumour antigen is an antigen that is predominantly present in the environment of a tumour, and is not ubiquitously present elsewhere in an individual. For example, the tumour antigen may be present on the surface of tumour cells or may be present on other stromal cells of the tumour microenvironment or in biological fluids in the vicinity of a tumour. The tumour antigen is therefore a marker of the location of tumour cells in an individual.

In some embodiments, the tumour antigen may be an antigen that is located on the surface of a cancer cell. Preferably, the tumour antigen is upregulated or overexpressed on tumour cells, whereas it is not abundantly expressed by the corresponding normal somatic cells from the same tissue in the absence of a tumour.

In some embodiments, the tumour antigen is upregulated or overexpressed on stromal cells of the tumour microenvironment, compared with stromal cells of the corresponding normal tissue in the absence of a tumour.

Preferred tumour antigens exist on the cell surface and are not rapidly internalised.

Tumour antigens that are suitable for targeting by the antibody molecules may be identified using methods that are known in the art. For example, an antibody molecule targeting CD137 receptor and a tumour antigen can be used in an assay where a CD137 expressing cell is co-cultured with a tumour antigen expressing cell and activation of the CD137 expressing cell is measured, for example by a T cell activation assay, a proliferation assay or cytotoxicity assay.

A cell surface tumour antigen may be a Tumour-Associated Antigen (TAA) or a Tumour-specific antigen (TSA).

Tumour antigens expressed by cancer cells may include, for example, cancer-testis (CT) antigens encoded by cancer-germ line genes, such as MAGE-A1, MAGE-A2, MAGE-A3, MAGE-A4, MAGE-A5, MAGE-A6, MAGE-A7, MAGE-A8, MAGE-A9, MAGE-A10, MAGE-A11, MAGE-A12, GAGE-I, GAGE-2, GAGE-3, GAGE-4, GAGE-5, GAGE-6, GAGE-7, GAGE-8, BAGE-I, RAGE-1, LB33/MUM-1, PRAME, NAG, MAGE-Xp2 (MAGE-B2), MAGE-Xp3 (MAGE-B3), MAGE-Xp4 (MAGE-B4), MAGE-C1/CT7, MAGE-C2, NY-ESO-I, LAGE-I, SSX-I, SSX-2 (HOM-MEL-40), SSX-3, SSX-4, SSX-5, SCP-I and XAGE and immunogenic fragments or variants thereof (Simpson et al., 2005; Gure et al., 2005; Velazquez et al., 2007; Andrade et al., 2008; Tinguely et al., 2008; Napoletano et al., 2008).

Other cell surface tumour antigens include, for example, AFP, $\alpha_v\beta_3$ (vitronectin receptor), $\alpha_v\beta_6$, B-cell maturation agent (BCMA), CA125 (MUC16), CD4, CD20, CD22, CD33, CD52, CD56, CD66e, CD80, CD140b, CD227 (MUC1), EGFR (HER1), EpCAM, GD3 ganglioside, HER2, prostate-specific membrane antigen (PSMA), prostate specific antigen (PSA), CD5, CD19, CD21, CD25, CD37, CD30, CD33, CD45, HLA-DR, anti-idiotype, carcinoembryonic antigen (CEA), e.g. carcinoembryonic antigen-related cell adhesion molecule 5 (CEACAM5), TAG-72, Folate-binding protein, A33, G250, ferritin, glycolipids such as gangliosides, carbohydrates such as CA-125, IL-2 receptor, fibroblast activation protein (FAP), IGF1R, B7H3, B7H4, PD-L1, CD200, EphA2, and mesothelin or variants thereof. These and other cell surface tumour antigens are described in Carter et al., 2004; Scott and Renner, 2001; and Cheever et al., 2009; Tai and Anderson, 2015; and Podojil and Miller, 2017.

Other tumour antigens include out-of-frame peptide-MHC complexes generated by the non-AUG translation initiation mechanisms employed by "stressed" cancer cells (Malarkannan et al., 1999).

Other tumour antigens include peptide-MHC complexes on the surface of tumour cells or of cells of the tumour microenvironment, where the peptide-MHC complexes comprise a tumour-specific neoantigen peptide fragment of a mutated intracellular tumour antigen, and where the peptide neoantigen harbours one or more tumour-specific mutations (Gubin et al., 2015). Other tumour antigens are well-known in the art (see for example WO00/20581; Cancer Vaccines and Immunotherapy (2000) Eds Stern, Beverley and Carroll, Cambridge University Press, Cambridge). The sequences of these tumour antigens are readily available from public databases but are also found in WO1992/020356 A1, WO1994/005304 A1, WO1994/023031 A1, WO1995/020974 A1, WO1995/023874 A1 and WO1996/026214 A1.

Preferred tumour antigens include HER2, FAP, EpCAM, CEACAM5, CD20, CD73, PSMA, mesothelin, EphA2, IGF1R, CD200, $\alpha_v\beta_6$, BCMA, PD-L1, B7H3, B7H4 and EGFR.

HER2 (ERBB2; Gene ID 2064) may have the reference amino acid sequence of NP_001005862.1 and may be encoded by the reference nucleotide sequence of NM_001005862.2. FAP (Gene ID 2191) may have the reference amino acid sequence of NP_001278736.1 and may be encoded by the reference nucleotide sequence of NM_001291807.1. EpCAM (Gene ID 4072) may have the reference amino acid sequence of NP_002345.2 and may be encoded by the reference nucleotide sequence of NM_002354.2. CEACAM5 (Gene ID 1048) may have the reference amino acid sequence of NP_001278413.1 and may be encoded by the reference nucleotide sequence of NM_001291484.2. CD20 (MS4A1; Gene ID 931) may have the reference amino acid sequence of NP_068769.2 and may be encoded by the reference nucleotide sequence of NM_021950.3. CD73 (NT5E; Gene ID 4907) may have the reference amino acid sequence of NP_001191742.1 and may be encoded by the reference nucleotide sequence of NM_001204813.1. PSMA (FOLH1; Gene ID 2346) may have the reference amino acid sequence of NP_001014986.1 and may be encoded by the reference nucleotide sequence of NM_001014986.1. Mesothelin (MSLN; Gene ID 10232) may have the reference amino acid sequence of NP_001170826.1 and may be encoded by the reference nucleotide sequence of NM_001177355.2. EphA2 (Gene ID 1969) may have the reference amino acid sequence of NP_001316019.1 and may be encoded by the reference nucleotide sequence of NM_001329090.1. IGF1R (Gene ID 3480) may have the reference amino acid sequence of NP_000866.1 and may be encoded by the reference nucleotide sequence of NM_000875.4. CD200 (Gene ID 4345) may have the reference amino acid sequence of NP_001004196.2 and may be encoded by the reference nucleotide sequence of NM_001004196.3. $\alpha_v\beta_6$ is a heterodimer composed of the integrin subunit alpha V and integrin subunit beta 6. Integrin subunit alpha V (ITGAV; Gene ID 3685) may have the reference amino acid sequence of NP_001138471.1 and may be encoded by the reference nucleotide sequence of NM_001144999.2. Integrin subunit beta 6 (ITGB6; Gene ID 3694) may have the reference amino acid sequence of NP_000879.2 and may be encoded by the reference nucleotide sequence of NM_000888.4. BCMA (TNFRSF17; Gene ID 608) may have the reference amino acid sequence of NP_001183.2 and may be encoded by the reference nucleotide sequence of NM_001192.2. PD-L1 (CD274; Gene ID 29126) may have the reference amino acid sequence of NP_001254635.1 and may be encoded by the reference nucleotide sequence of NM_001267706.1. B7H3 (CD276; Gene ID 80381) may have the reference amino acid sequence of NP_001019907.1 and may be encoded by the reference nucleotide sequence of NM_001024736.1. B7H4 (VTCN1; Gene ID 79679) may have the reference amino acid sequence of NP_001240778.1 and may be encoded by the reference nucleotide sequence of NM_001253849.1. EGFR (Gene ID 1956) may have the reference amino acid sequence of NP_001333826.1 and may be encoded by the reference nucleotide sequence of NM_001346897.1.

In other embodiments, the tumour antigen may be a soluble tumour antigen, for example a growth factor that is produced by or in response to cancer cells. A soluble factor may be upregulated or overexpressed in biological fluids in the vicinity of a tumour. A soluble tumour antigen may be multimeric, for example a dimer or a trimer. A soluble tumour antigen may be present in higher concentrations at the tumour site or in the tumour microenvironment than elsewhere in the body of an individual. The tumour microenvironment and associated soluble tumour antigens are described in more detail in Bhome et al. (2015).

Suitable soluble tumour antigens include VEGF, HGF, SDF1 and TGF-beta, e.g. TGF-beta-1, TGF-beta-2, TGF-beta-3 and TGF-beta-4.

VEGF (VEGFA; gene ID 7422) has the reference amino acid sequence of NP_001020537.2 and may be encoded by the reference nucleotide sequence of NM_001025366.2. HGF (gene ID 3082) has the reference amino acid sequence of NP_000592.3 and may be encoded by the reference nucleotide sequence of NM_000601.5. SDF1 (CXCL12; gene ID 6387) has the reference amino acid sequence of NP_000600.1 and may be encoded by the reference nucleotide sequence of NM_000609.6. TGF-beta-1 (TGFB1; gene ID 7040) may have the reference amino acid sequence of NP_000651.3 and may be encoded by the reference nucleotide sequence of NM_000660.6. TGF-beta-2 (TGFB2; gene ID 7042) may have the reference amino acid sequence of NP_001129071.1 and may be encoded by the reference nucleotide sequence of NM_001135599.3. TGF-beta-3 (TGFB3; gene ID 7043) may have the reference amino acid sequence of NP_001316867.1 and may be encoded by the reference nucleotide sequence of NM_001329938.1. TGF-beta-4 (LEFTY2; gene ID 7044) may have the reference amino acid sequence of NP_001165896.1 and may be encoded by the reference nucleotide sequence of NM_001172425.2.

In an alternative preferred embodiment, the disease antigen is a pathogenic antigen.

Activation of immune cells, such as T cells, NK cells and/or macrophages by the antibody molecule in the vicinity of a site of an infectious disease is expected to be useful in the treatment of the infectious disease. The infectious disease may be an acute or persistent infectious diseases but preferably is a persistent infectious diseases.

The pathogenic antigen is preferably an antigen expressed by a human pathogen, such as a viral, bacterial, fungal or parasitic antigen (e.g. a protozoal antigen), preferably a viral or bacterial antigen. A pathogenic antigen is an antigen that is predominantly present on a pathogen, or in the vicinity of a site of an infectious disease, and is not ubiquitously present elsewhere in an individual.

For example, the pathogenic antigen may be an antigen present on the surface of a virus, bacterium, fungus or parasite, or a soluble antigen expressed by a virus, bacterium, fungus or parasite. The virus, bacterium, fungus, or parasite may be a virus, bacterium, fungus, or parasite as referred to elsewhere herein.

Where the pathogenic antigen is a soluble antigen, the antigen may be upregulated or overexpressed in biological fluids in the vicinity of the site of the infectious disease. For example, a soluble pathogenic antigen may be present in higher concentrations at, or in the vicinity of, the site of the infectious disease than elsewhere in the body of an individual. The soluble pathogenic antigen may be multimeric, for example a dimer or a trimer.

Pathogenic antigens that are suitable for targeting by the antibody molecule may be identified using methods that are known in the art. For example, an antibody molecule targeting CD137 and a pathogenic antigen can be used in an assay where a CD137 expressing cell is co-cultured with a pathogen or pathogenic antigen and activation of the CD137 expressing cell is measured, for example by a T cell activation assay, a proliferation assay or cytotoxicity assay.

Many pathogenic antigens suitable for targeting by the antibody molecule are further more known in the art and can be selected by the skilled person according to the infectious disease to be treated. Examples of viral antigens include proteins p24, gp120, and gp41 expressed by human immunodeficiency virus (HIV), hepatitis B surface antigen (HBsAg) expressed by hepatitis B virus (HBV), and haemagglutinin and neuraminidase expressed by influenza virus. Examples of bacterial antigens include Rv1733, Rv2389 and Rv2435n expressed by *Mycobacterium tuberculosis*.

In some embodiments, the antibody molecule may not comprise an antigen-binding site in a constant domain, e.g. a CH3 domain of the antibody molecule. For example, the antibody molecule may not comprise an antigen-binding site that binds to OX40 in a constant domain of the antibody molecule. In particular, the antibody molecule may not comprise an antigen-binding site in a constant domain, such as a CH3 domain, of the antibody molecule, wherein the antigen-binding site comprises modifications in one or more structural loops of the constant domain, such as one or more modifications in the AB, CD and/or EF structural loop of the constant domain.

In one example, the antibody molecule may not comprise an OX40 antigen-binding site comprising a first sequence, a second sequence, and a third sequence located in the AB, CD and EF structural loops of the CH3 domain, respectively, wherein the first, second and third sequence are the first, second and third sequence of Fcab FS20-22-49 set forth below.

In addition, or alternatively, the antibody molecule may not comprise the CH3 domain of Fcab FS20-22-49 set forth below.

Fcab FS20-22-49 CH3 Domain Structural Loop Sequences
  FS20-22-49 first sequence—YWDQE (SEQ ID NO: 121)
  FS20-22-49 second sequence—DEQFA (SEQ ID NO: 122)
  FS20-22-49 third sequence—QYRWNPADY (SEQ ID NO: 123)
Fcab FS20-22-49 CH3 Domain Sequence
  GQPREPQVYTLPPSRDEYWDQEVSLT-CLVKGFYPSDIAVEWESNGDEQFAYKTTPPVLDS DGSFFLYSKLTVDQYRWNPADYFSCSVMHEALHN-HYTQKSLSLSPG (SEQ ID NO: 124)

The antibody molecule may be conjugated to a bioactive molecule or a detectable label. In this case, the antibody molecule may be referred to as a conjugate. Such conjugates find application in the treatment and/or diagnosis of diseases as described herein.

For example, the bioactive molecule may be an immune system modulator, such as a cytokine, preferably a human cytokine. For example, the cytokine may be a cytokine which stimulates T cell activation and/or proliferation. Examples of cytokines for conjugation to the antibody molecule include IL-2, IL-10, IL-12, IL-15, IL-21, GM-CSF and IFN-gamma.

Alternatively, the bioactive molecule may be a ligand trap, such as a ligand trap of a cytokine, e.g. of TGF-beta or IL-6.

Suitable detectable labels which may be conjugated to antibody molecules are known in the art and include radioisotopes such as iodine-125, iodine-131, yttrium-90, indium-111 and technetium-99; fluorochromes, such as fluorescein, rhodamine, phycoerythrin, Texas Red and cyanine dye derivatives for example, Cy7 and Alexa750; chromogenic dyes, such as diaminobenzidine; latex beads; enzyme labels such as horseradish peroxidase; phosphor or laser dyes with spectrally isolated absorption or emission characteristics; and chemical moieties, such as biotin, which may be detected via binding to a specific cognate detectable moiety, e.g. labelled avidin.

The antibody molecule may be conjugated to the bioactive molecule or detectable label by means of any suitable covalent or non-covalent linkage, such as a disulphide or peptide bond. Where the bioactive molecule is a cytokine, the cytokine may be joined to the antibody molecule by means of a peptide linker. Suitable peptide linkers are known in the art and may be 5 to 25, 5 to 20, 5 to 15, 10 to 25, 10 to 20, or 10 to 15 amino acids in length.

In some embodiments, the bioactive molecule may be conjugated to the antibody molecule by a cleavable linker. The linker may allow release of the bioactive molecule from the antibody molecule at a site of therapy. Linkers may include amide bonds (e.g. peptidic linkers), disulphide bonds or hydrazones. Peptide linkers for example may be cleaved by site specific proteases, disulphide bonds may be cleaved by the reducing environment of the cytosol and hydrazones may be cleaved by acid-mediated hydrolysis.

The conjugate may be a fusion protein comprising the antibody molecule and the bioactive molecule. In this case the bioactive molecule may be conjugated to the antibody molecule by means of a peptide linker or peptide bond. Where the antibody molecule is a multichain molecule, such as where the antibody molecule is or comprises an Fcab or is a mAb$^2$, the bioactive molecule may be conjugated to one or more chains of the antibody molecule. For example, the bioactive molecule may be conjugated to one or both of the heavy chains of the mAb$^2$ molecule. Fusion proteins have the advantage of being easier to produce and purify, facilitating the production of clinical-grade material.

The invention also provides an isolated nucleic acid molecule or molecules encoding an antibody molecule of the invention. The skilled person would have no difficulty in preparing such nucleic acid molecules using methods well-known in the art.

The nucleic acid molecule or molecules may encode the VH domain and/or VL domain, preferably the VH domain and VL domain of: antibody FS30-10-16, FS30-10-3, FS30-10-12, FS30-35-14, or FS30-5-37, preferably antibody FS30-10-16, FS30-10-3, FS30-10-12, or FS30-35-14, more preferably antibody FS30-10-16, FS30-10-3, or FS30-10-12, most preferably antibody FS30-10-16. The VH and VL domain sequences of these antibodies are described herein.

For example, a nucleic acid molecule which encodes the VH domain of antibody FS30-10-16, FS30-10-3, FS30-10-12, FS30-35-14, or FS30-5-37 is set forth in SEQ ID NOs: 53, 27, 43, 59 and 4, respectively.

A nucleic acid molecule which encodes the VL domain of antibody FS30-10-16, FS30-10-3, FS30-10-12, FS30-35-14, or FS30-5-37 is set forth in SEQ ID NOs: 49, 49, 49, 70 and 13, respectively.

In a preferred embodiment, the nucleic acid molecule(s) encode the heavy chain and/or light chain, preferably the heavy chain and light chain of: antibody FS30-10-16, FS30-10-3, FS30-10-12, FS30-35-14, or FS30-5-37, preferably antibody FS30-10-16, FS30-10-3, FS30-10-12, or FS30-35-14, more preferably antibody FS30-10-16, FS30-10-3, or FS30-10-12, most preferably antibody FS30-10-16. The heavy and light chain sequences of these antibodies are described herein.

For example, a nucleic acid molecule which encodes the heavy chain of antibody FS30-10-16, FS30-10-3, FS30-10-12, FS30-35-14, or FS30-5-37 is set forth in SEQ ID NOs: 53, 27, 43, 59 and 4, respectively.

A nucleic acid molecule which encodes the light chain of antibody FS30-10-16, FS30-10-3, FS30-10-12, FS30-35-14, or FS30-5-37 is set forth in SEQ ID NOs: 49, 49, 49, 71 and 16, respectively.

Where the nucleic acid encodes the VH and VL domain, or heavy and light chain, of an antibody molecule of the invention, the two domains or chains may be encoded on two separate nucleic acid molecules.

An isolated nucleic acid molecule may be used to express an antibody molecule of the invention. The nucleic acid will generally be provided in the form of a recombinant vector for expression. Another aspect of the invention thus provides a vector comprising a nucleic acid as described above. Suitable vectors can be chosen or constructed, containing appropriate regulatory sequences, including promoter sequences, terminator fragments, polyadenylation sequences, enhancer sequences, marker genes and other sequences as appropriate.

Preferably, the vector contains appropriate regulatory sequences to drive the expression of the nucleic acid in a host cell. Vectors may be plasmids, viral e.g. phage, or phagemid, as appropriate.

A nucleic acid molecule or vector as described herein may be introduced into a host cell. Techniques for the introduction of nucleic acid or vectors into host cells are well established in the art and any suitable technique may be employed. A range of host cells suitable for the production of recombinant antibody molecules are known in the art, and include bacterial, yeast, insect or mammalian host cells. A preferred host cell is a mammalian cell, such as a CHO, NS0, or HEK cell, for example a HEK293 cell.

Another aspect of the invention provides a method of producing an antibody molecule of the invention comprising expressing a nucleic acid encoding the antibody molecule in a host cell and optionally isolating and/or purifying the antibody molecule thus produced. Methods for culturing host cells are well-known in the art. The method may further comprise isolating and/or purifying the antibody molecule. Techniques for the purification of recombinant antibody molecules are well-known in the art and include, for example HPLC, FPLC or affinity chromatography, e.g. using Protein A or Protein L. In some embodiments, purification may be performed using an affinity tag on antibody molecule. The method may also comprise formulating the antibody molecule into a pharmaceutical composition, optionally with a pharmaceutically acceptable excipient or other substance as described below.

As explained above, CD137 is expressed on cells of the immune system, including $CD8^+$ T cells, $CD4^+$ T cells, Treg cells, B cells, NK cells, NKT cells, dendritic cells, and tumour-infiltrating lymphocytes (TILs). In particular, CD137 activation has been shown to play a role in enhancing proliferation, survival and the cytotoxic effector function of $CD8^+$ T cells, as well as $CD8^+$ T cell differentiation and maintenance of memory $CD8^+$ T cells. CD137 is expressed at a lower level on $CD4^+$ T cells than $CD8^+$ T cells but has also been shown to be involved in inducing proliferation and activation of some subsets of $CD4^+$ T cells. Activation of CD137 has also been demonstrated to enhance NK cell-mediated ADCC, as well as B cell proliferation, survival and cytokine production.

In light of the immune response enhancing activity of CD137, CD137 agonist molecules have been investigated in the context of cancer treatment, as well as the treatment of chronic infections.

The antibody molecules as described herein may thus be useful for therapeutic applications, in particular in the treatment of cancer. In addition, the antibody molecules are expected to be useful in the treatment of infectious diseases, such as persistent infectious diseases.

An antibody molecule as described herein may be used in a method of treatment of the human or animal body. Related aspects of the invention provide;
  (i) an antibody molecule described herein for use as a medicament,
  (ii) an antibody molecule described herein for use in a method of treatment of a disease or disorder,
  (iii) the use of an antibody molecule described herein in the manufacture of a medicament for use in the treatment of a disease or disorder; and,
  (iv) a method of treating a disease or disorder in an individual, wherein the method comprises administering to the individual a therapeutically effective amount of an antibody molecule as described herein.

The individual may be a patient, preferably a human patient.

Treatment may be any treatment or therapy in which some desired therapeutic effect is achieved, for example, the inhibition or delay of the progress of the condition, and includes a reduction in the rate of progress, a halt in the rate of progress, amelioration of the condition, cure or remission (whether partial or total) of the condition, preventing, ameliorating, delaying, abating or arresting one or more symptoms and/or signs of the condition or prolonging survival of an individual or patient beyond that expected in the absence of treatment.

Treatment as a prophylactic measure (i.e. prophylaxis) is also included. For example, an individual susceptible to or at risk of the occurrence or re-occurrence of a disease such as cancer may be treated as described herein. Such treatment may prevent or delay the occurrence or re-occurrence of the disease in the individual.

A method of treatment as described may be comprise administering at least one further treatment to the individual in addition to the antibody molecule. The antibody molecule described herein may thus be administered to an individual alone or in combination with one or more other treatments. Where the antibody molecule is administered to the individual in combination with another treatment, the additional treatment may be administered to the individual concurrently with, sequentially to, or separately from the administration of the antibody molecule. Where the additional treatment is administered concurrently with the antibody molecule, the antibody molecule and additional treatment may be administered to the individual as a combined preparation. For example, the additional therapy may be a known therapy or therapeutic agent for the disease to be treated.

Whilst an antibody molecule may be administered alone, antibody molecules will usually be administered in the form of a pharmaceutical composition, which may comprise at least one component in addition to the antibody molecule. Another aspect of the invention therefore provides a pharmaceutical composition comprising an antibody molecule as described herein. A method comprising formulating an antibody molecule into a pharmaceutical composition is also provided.

Pharmaceutical compositions may comprise, in addition to the antibody molecule, a pharmaceutically acceptable excipient, carrier, buffer, stabilizer or other materials well known to those skilled in the art. The term "pharmaceutically acceptable" as used herein pertains to compounds, materials, compositions, and/or dosage forms which are, within the scope of sound medical judgement, suitable for use in contact with the tissues of a subject (e.g., human) without excessive toxicity, irritation, allergic response, or other problem or complication, commensurate with a reasonable benefit/risk ratio. Each carrier, excipient, etc. must also be "acceptable" in the sense of being compatible with the other ingredients of the formulation. The precise nature of the carrier or other material will depend on the route of administration, which may be by infusion, injection or any other suitable route, as discussed below.

For parenteral, for example subcutaneous or intravenous administration, e.g. by injection, the pharmaceutical composition comprising the antibody molecule may be in the form of a parenterally acceptable aqueous solution which is pyrogen-free and has suitable pH, isotonicity and stability. Those of relevant skill in the art are well able to prepare suitable solutions using, for example, isotonic vehicles, such as Sodium Chloride Injection, Ringer's Injection, Lactated Ringer's Injection. Preservatives, stabilizers, buffers, antioxidants and/or other additives may be employed as required including buffers such as phosphate, citrate and other organic acids; antioxidants, such as ascorbic acid and methionine; preservatives (such as octadecyldimethylbenzyl ammonium chloride; hexamethonium chloride; benzalkonium chloride; benzethonium chloride; phenol, butyl or benzyl alcohol; alkyl parabens, such as methyl or propyl paraben; catechol; resorcinol; cyclohexanol; 3'-pentanol; and m-cresol); low molecular weight polypeptides; proteins, such as serum albumin, gelatin or immunoglobulins; hydrophilic polymers, such as polyvinylpyrrolidone; amino acids, such as glycine, glutamine, asparagines, histidine, arginine, or lysine; monosaccharides, disaccharides and other carbohydrates including glucose, mannose or dextrins; chelating agents, such as EDTA; sugars, such as sucrose, mannitol, trehalose or sorbitol; salt-forming counter-ions, such as sodium; metal complexes (e.g. Zn-protein complexes); and/or non-ionic surfactants, such as TWEEN™, PLURONICS™ or polyethylene glycol (PEG).

In some embodiments, antibody molecules may be provided in a lyophilised form for reconstitution prior to administration. For example, lyophilised antibody molecules may be re-constituted in sterile water and mixed with saline prior to administration to an individual.

Administration may be in a "therapeutically effective amount", this being sufficient to show benefit to an individual. The actual amount administered, and rate and time-course of administration, will depend on the nature and severity of what is being treated, the particular individual being treated, the clinical condition of the individual, the cause of the disorder, the site of delivery of the composition, the type of antibody molecule, the method of administration, the scheduling of administration and other factors known to medical practitioners. Prescription of treatment, e.g. decisions on dosage etc., is within the responsibility of general practitioners and other medical doctors, and may depend on the severity of the symptoms and/or progression of a disease being treated. Appropriate doses of antibody molecules are well known in the art (Ledermann et al., 1991; Bagshawe et al., 1991). Specific dosages indicated herein, or in the Physician's Desk Reference (2003) as appropriate for an antibody molecule being administered, may be used. A therapeutically effective amount or suitable dose of an antibody molecule can be determined by comparing in vitro activity and in vivo activity in an animal model. Methods for extrapolation of effective dosages in mice and other test animals to humans are known. The precise dose will depend upon a number of factors, including whether the size and location of the area to be treated, and the precise nature of the antibody molecule.

A typical antibody dose is in the range 100 µg to 1 g for systemic applications, and 1 µg to 1 mg for topical applications. An initial higher loading dose, followed by one or more lower doses, may be administered. This is a dose for a single treatment of an adult individual, which may be proportionally adjusted for children and infants, and also adjusted for other antibody formats in proportion to molecular weight.

Treatments may be repeated at daily, twice-weekly, weekly or monthly intervals, at the discretion of the physician. The treatment schedule for an individual may be dependent on the pharmocokinetic and pharmacodynamic properties of the antibody composition, the route of administration and the nature of the condition being treated.

Treatment may be periodic, and the period between administrations may be about two weeks or more, e.g. about three weeks or more, about four weeks or more, about once a month or more, about five weeks or more, or about six weeks or more. For example, treatment may be every two to four weeks or every four to eight weeks. Suitable formulations and routes of administration are described above.

In a preferred embodiment, an antibody molecule as described herein may be for use in a method of treating cancer.

Cancer may be characterised by the abnormal proliferation of malignant cancer cells. Where a particular type of cancer, such as breast cancer, is referred to, this refers to an abnormal proliferation of malignant cells of the relevant tissue, such as breast tissue. A secondary cancer which is located in the breast but is the result of abnormal proliferation of malignant cells of another tissue, such as ovarian tissue, is not a breast cancer as referred to herein but an ovarian cancer.

The cancer may be a primary or a secondary cancer. Thus, an antibody molecule as described herein may be for use in a method of treating cancer in an individual, wherein the cancer is a primary tumour and/or a tumour metastasis.

A tumour of a cancer to be treated using an antibody molecule as described herein may comprise TILs that express CD137, e.g. on their cell surface. In one embodiment, the tumour may have been determined to comprise TILs that express CD137. Methods for determining the expression of an antigen on a cell surface are known in the art and include, for example, flow cytometry.

For example, the cancer to be treated using an antibody molecule as described herein may be selected from the group consisting of leukaemias, such as acute myeloid leukaemia (AML), chronic myeloid leukaemia (CML), acute lymphoblastic leukaemia (ALL) and chronic lymphocytic leukaemia (CLL); lymphomas, such as Hodgkin lymphoma, non-Hodgkin lymphoma and multiple myeloma; and solid cancers, such as sarcomas (e.g. soft tissue sarcomas), skin cancer (e.g. Merkel cell carcinoma), melanoma, bladder cancer (e.g. urothelial carcinoma), brain cancer (e.g. glioblastoma multiforme), breast cancer, uterine/endometrial cancer, ovarian cancer (e.g. ovarian serous cystadenoma), prostate cancer, lung cancer (e.g. non-small cell lung carcinoma (NSCLC) and small cell lung cancer (SCLC)), colorectal cancer (e.g. colorectal adenocarcinoma), cervical cancer (e.g. cervical squamous cell cancer and cervical adenocarcinoma), liver cancer (e.g. hepatocellular carcinoma), head and neck cancer (e.g. head and neck squamous-cell carcinoma), oesophageal cancer, pancreatic cancer, renal cancer (e.g. renal cell cancer), adrenal cancer, stomach cancer (e.g. stomach adenocarcinoma), testicular cancer, cancer of the gall bladder and biliary tracts (e.g. cholangiocarcinoma), thyroid cancer, thymus cancer, bone cancer, and cerebral cancer.

In a preferred embodiment, the cancer to be treated using an antibody molecule as described herein is a solid cancer. More preferably, the cancer to be treated using an antibody molecule as described herein is a solid cancer selected from the group consisting of: sarcoma, melanoma, bladder cancer, brain cancer, breast cancer, ovarian cancer, uterine/endometrial cancer, prostate cancer, lung cancer, colorectal cancer, cervical cancer, liver cancer, head and neck cancer, pancreatic cancer, renal cancer and stomach cancer.

In the context of cancer, treatment may include inhibiting cancer growth, including complete cancer remission, and/or inhibiting cancer metastasis, as well as inhibiting cancer recurrence. Cancer growth generally refers to any one of a number of indices that indicate change within the cancer to a more developed form. Thus, indices for measuring an inhibition of cancer growth include a decrease in cancer cell survival, a decrease in tumour volume or morphology (for example, as determined using computed tomographic (CT), sonography, or other imaging method), a delayed tumour growth, a destruction of tumour vasculature, improved performance in delayed hypersensitivity skin test, an increase in the activity of anti-cancer immune cells or other anti-cancer immune responses, and a decrease in levels of tumour-specific antigens. Activating or enhancing immune responses to cancerous tumours in an individual may improve the capacity of the individual to resist cancer growth, in particular growth of a cancer already present in the subject and/or decrease the propensity for cancer growth in the individual.

In the context of cancer treatment, an antibody molecule as described herein may be administered to an individual in combination with another anti-cancer therapy or therapeutic agent, such as an anti-cancer therapy or therapeutic agent which has been shown to be suitable, or is expected to be suitable, for the treatment of the cancer in question. For example, the antibody molecule may be administered to the individual in combination with a chemotherapeutic agent, radiotherapy, an immunotherapeutic agent, an anti-tumour vaccine, an oncolytic virus, an adoptive cell transfer (ACT) therapy (such as adoptive NK cell therapy or therapy with chimeric antigen receptor (CAR) T-cells, autologous tumour infiltrating lymphocytes (TILs), or gamma/delta T cells, or an agent for hormone therapy.

Without wishing to be bound by theory, it is thought that the antibody molecule described herein may act as an adjuvant in anti-cancer therapy. Specifically, it is thought that administration of the antibody molecule to an in individual in combination with chemotherapy and/or radiotherapy, or in combination with an anti-tumour vaccine, for example, will trigger a greater immune response against the cancer than is achieved with chemotherapy and/or radiotherapy, or with an anti-tumour vaccine, alone.

One or more chemotherapeutic agents for administration in combination with an antibody molecule as described herein may be selected from the group consisting of: taxanes, cytotoxic antibiotics, tyrosine kinase inhibitors, PARP inhibitors, B-Raf enzyme inhibitors, MEK inhibitors, c-MET inhibitors, VEGFR inhibitors, PDGFR inhibitors, alkylating agents, platinum analogues, nucleoside analogues, antifolates, thalidomide derivatives, antineoplastic chemotherapeutic agents and others. Taxanes include docetaxel, paclitaxel and nab-paclitaxel; cytotoxic antibiotics include actinomycin, bleomycin, and anthracyclines such as doxorubicin, mitoxantrone and valrubicin; tyrosine kinase inhibitors include erlotinib, gefitinib, axitinib, PLX3397, imatinib, cobemitinib and trametinib; PARP inhibitors include piraparib; B-Raf enzyme inhibitors include vemurafenib and dabrafenib; alkylating agents include dacarbazine, cyclophosphamide and temozolomide; platinum analogues include carboplatin, cisplatin and oxaliplatin; nucleoside analogues include azacitidine, capecitabine, fludarabine, fluorouracil and gemcitabine; antifolates include methotrexate and pemetrexed. Other chemotherapeutic agents suitable for use in the present invention include defactinib, entinostat, eribulin, irinotecan and vinblastine.

Preferred therapeutic agents for administration with an antibody molecule as described herein are doxorubicin, mitoxantrone, cyclophosphamide, cisplatin, and oxaliplatin.

A radiotherapy for administration in combination with an antibody molecule as described herein may be external beam radiotherapy or brachytherapy.

An immunotherapeutic agent for administration in combination with an antibody molecule as described herein may be a therapeutic antibody molecule, nucleic acid, cytokine, or cytokine-based therapy. For example, the therapeutic antibody molecule may bind to an immune regulatory molecule, e.g. an inhibitory checkpoint molecule or an immune costimulatory molecule, a receptor of the innate immune system, or a tumour antigen, e.g. a cell surface tumour antigen or a soluble tumour antigen. Examples of immune regulatory molecules to which the therapeutic antibody molecule may bind include CTLA-4, LAG-3, TIGIT, TIM-3, VISTA, PD-L1, PD-1, CD47, CD73, CSF-1R, KIR, OX40, CD40, HVEM, IL-10 and CSF-1. Examples of receptors of the innate immune system to which the therapeutic antibody molecule may bind include TLR1, TLR2, TLR4, TLR5, TLR7, TLR9, RIG-I-like receptors (e.g. RIG-I and MDA-5), and STING. Examples of tumour antigens to which the therapeutic antibody molecule may bind include HER2, EGFR, CD20 and TGF-beta.

The nucleic acid for administration in combination with an antibody molecule as described herein may be an siRNA.

The cytokines or cytokine-based therapy may be selected from the group consisting of: IL-2, prodrug of conjugated IL-2, GM-CSF, IL-7, IL-12, IL-9, IL-15, IL-18, IL-21, and type I interferon.

Anti-tumour vaccines for the treatment of cancer have both been implemented in the clinic and discussed in detail within scientific literature (such as Rosenberg, 2000). This mainly involves strategies to prompt the immune system to respond to various cellular markers expressed by autologous or allogenic cancer cells by using those cells as a vaccination method, both with or without granulocyte-macrophage colony-stimulating factor (GM-CSF). GM-CSF provokes a strong response in antigen presentation and works particularly well when employed with said strategies.

The chemotherapeutic agent, radiotherapy, immunotherapeutic agent, anti-tumour vaccine, oncolytic virus, ACT therapy, or agent for hormone therapy is preferably a chemotherapeutic agent, radiotherapy, immunotherapeutic agent, anti-tumour vaccine, oncolytic virus, ACT therapy, or agent for hormone therapy for the cancer in question, i.e. a chemotherapeutic agent, radiotherapy, immunotherapeutic agent, anti-tumour vaccine, oncolytic virus, ACT therapy, or agent for hormone therapy which has been shown to be effective in the treatment of the cancer in question. The selection of a suitable chemotherapeutic agent, radiotherapy, immunotherapeutic agent, anti-tumour vaccine, oncolytic virus, ACT therapy, or agent for hormone therapy which has been shown to be effective for the cancer in question is well within the capabilities of the skilled practitioner.

In light of the immune response enhancing activity of CD137, CD137 agonist molecules are expected to find application in the treatment of infectious diseases. Thus, in another preferred embodiment, the antibody molecule as described herein may be for use in a method of treating an infectious disease, such as an acute or a persistent infectious disease.

Without wishing to be bound by theory, it is thought that CD137 agonist molecules may be able to enhance the immune response against an acute infectious disease caused by a pathogen by inducing rapid infiltration and activation of innate immune cells, such as neutrophils and monocytes, thereby facilitating the clearance of the pathogen responsible for the acute infectious disease. Therefore, in a further embodiment, the antibody molecule as described herein may be for use in a method of treating an acute infectious disease, such as an acute bacterial disease. In a preferred embodiment, the acute infectious disease is an acute bacterial disease caused by an infection by a gram-positive bacterium, such as a bacterium of the genus *Listeria, Streptococcus pneumoniae* or *Staphylococcus aureus*.

Infectious diseases are normally cleared by the immune system but some infections persist for long periods of time, such as months or years, and are ineffectively combatted by the immune system. Such infections are also referred to as persistent or chronic infections.

Preferably, the antibody molecule as described herein is used to treat a persistent infectious disease, such as a persistent viral, bacterial, fungal or parasitic infection, preferably a persistent viral or bacterial infection.

In a preferred embodiment, the persistent viral infection to be treated using an antibody molecule as described herein is a persistent infection by: human immunodeficiency virus (HIV), Epstein-Barr virus, Cytomegalovirus, Hepatitis B virus, Hepatitis C virus, or Varicella Zoster virus.

In a preferred embodiment, the persistent bacterial infection to be treated using an antibody molecule as described herein is a persistent infection of: *Staphylococcus aureus, Hemophilus influenza, Mycobacterium tuberculosis, Mycobacterium leprae, Salmonella typhi, Helicobacter pylori, Treponema pallidum, Enterococcus faecalis*, or *Streptococcus pneumoniae*.

CD137 agonism has been described to be beneficial in the context of treatment of infections by gram positive bacteria. Thus, in a preferred embodiment, the persistent bacterial infection to be treated using an antibody molecule as described herein is a persistent infection by a gram-positive bacterium. In a more preferred embodiment, the persistent bacterial infection is a persistent infection by a gram-positive bacterium selected from the group consisting of: *Staphylococcus aureus, Mycobacterium leprae, Enterococcus faecalis*, and *Streptococcus pneumoniae*.

In a preferred embodiment, the persistent fungal infection to be treated using an antibody molecule as described herein is a persistent infection of: *Candida* (e.g. *Candida albicans*), *Cryptococcus* (e.g. *Cryptococcus gattii* or *Cryptococcus neoformans*), *Talaromyces* (*Penicillium*) (e.g. *Talaromyces marneffe*), *Microsporum* (e.g. *Microsporum audouinii*), or *Trichophyton tonsurans*.

In a preferred embodiment, the persistent parasitic infection to be treated using an antibody molecule as described herein is a persistent infection of: *Plasmodium*, such as *Plasmodium falciparum*, or *Leishmania*, such as *Leishmania donovani*.

In the context of treatment of a persistent infectious disease, the antibody molecule may be administered to an individual in combination with a second therapy or therapeutic agent which has been shown to be suitable, or is expected to be suitable, for treatment of the pathogen in question. For example, the antibody molecule may be administered to the individual in combination with an immunotherapeutic agent. An immunotherapeutic agent for administration in combination with an antibody molecule as described herein may be a therapeutic antibody molecule. For example, the therapeutic antibody molecule may bind to a receptor of the innate immune system. Examples of receptors of the innate immune system to which the therapeutic antibody molecule may bind include TLR1, TLR2, TLR4, TLR5, TLR7, TLR9, RIG-I-like receptors (e.g. RIG-I and MDA-5), and STING.

Where the antibody molecule is used to prevent an infectious disease, the antibody molecule may be administered in combination with a vaccine for the pathogen in question. Without wishing to be bound by theory, it is thought that the antibody molecule described herein may act as an adjuvant in vaccination. Specifically, it is thought that administration of the antibody molecule to an in individual in combination with vaccine, will trigger a greater immune response against the pathogen than is achieved with the vaccine alone.

In the context of the treatment of a persistent infectious disease, treatment may include eliminating the infection, reducing the pathogenic load of the individual, preventing recurrence of the infection. For example, the treatment may comprise preventing, ameliorating, delaying, abating or arresting one or more symptoms and/or signs of the persistent infection. Alternatively, the treatment may include preventing an infectious disease.

The antibody molecules of the invention may be useful in the detection CD137, in particular in the detection of cells comprising CD137 at their cell surface, i.e. cells expressing cell-surface bound CD137. The cells may be immune cells, such as $CD8^+$ T cells, $CD4^+$ T cells, Treg cells, B cells, NK cells, NKT cells, dendritic cells, or TILs, but preferably are $CD8^+$ T cells or TILs.

Thus, the present invention relates to the use of an antibody molecule for detecting the presence of CD137, preferably the presence of cells comprising CD137 at their cell surface, in a sample. The antibody molecule may be conjugated to a detectable label as described elsewhere herein.

Also provided is an in vitro method of detecting CD137, wherein the method comprises incubating the antibody molecule with a sample of interest, and detecting binding of the antibody molecule to the sample, wherein binding of the antibody to the sample indicates the presence of CD137. Binding of the antibody molecule to a sample may be detected using an ELISA, for example.

In a preferred embodiment, the present invention relates to an in vitro method of detecting cells comprising CD137 at their cell surface, wherein the method comprises incubating the antibody molecule with a cell sample of interest, and determining binding of the antibody molecule to cells present in the sample, wherein binding of the antibody to cells present in sample indicates the presence of cells comprising CD137 at their cell surface. Methods for detecting binding of an antibody molecule to cells are known in the art and include ELISAs, and flow-cytometry.

The cell sample of interest may be a tumour sample obtained from an individual, for example. The detection of cells, such as TILs, comprising CD137 at their cell surface in a tumour sample may indicate that the tumour comprises activated TILs.

The antibody molecules of the invention may thus be useful in the detection or diagnosis of disease or disorder, in particular the detection or diagnosis of cancer. The cancer may be a cancer which can be treated with an antibody molecule of the invention as described herein. Related aspects of the invention thus provide;

(i) an antibody molecule described herein for use as a diagnostic,
(ii) an antibody molecule described herein for use in a method of detecting or diagnosing a disease or disorder, such as cancer,
(iii) the use of an antibody molecule described herein in the manufacture of a diagnostic product for use in the detection or diagnosis of a disease or disorder; (iv) a method of detecting or diagnosing a disease or disorder in an individual; and
(v) a kit for use in a method of detecting or diagnosing a disease or disorder in an individual, the kit comprising an antibody molecule as described herein.

Further aspects and embodiments of the invention will be apparent to those skilled in the art given the present disclosure including the following experimental exemplification.

All documents mentioned in this specification are incorporated herein by reference in their entirety.

Unless context dictates otherwise, the descriptions and definitions of the features set out above are not limited to any particular aspect or embodiment of the invention and apply equally to all aspects and embodiments which are described.

Other aspects and embodiments of the invention provide the aspects and embodiments described above with the term "comprising" replaced by the term "consisting of" or "consisting essentially of", unless the context dictates otherwise.

Certain aspects and embodiments of the invention will now be illustrated by way of example and with reference to the figures described above.

EXAMPLES

Example 1—Production, Characterisation and Selection of Human and Cynomolgus CD137 Antigens Activated T cells express the CD137 receptor on their cell surface. Clustering of the CD137 receptor is known to be essential to induce receptor signalling and further T cell activation (Chester et al., 2018). It would be desirable to isolate monoclonal antibodies that upon crosslinking induce CD137 receptor clustering and consequently T cell activation, whilst showing no or weak T cell activation in the absence of crosslinking. To achieve this aim, the inventors hypothesised that the anti-CD137 mAbs should bind to monomeric CD137, as expressed on the cell surface, but might require preferential binding to high levels of CD137, mimicked by dimeric CD137 antigen and cells overexpressing CD137. Therefore, recombinant monomeric and dimeric CD137, as well as cell surface-expressed CD137, were produced for use in the selections.

1.1 Recombinant Antigens

Tumour necrosis factor receptor superfamily (TNFRSF) members are known for their tendency to form multimers which cluster together when bound to their cognate ligands (Croft, 2003). This propensity to aggregate for their functionality makes it challenging to produce soluble recombinant proteins that do not aggregate in solution for use in in vitro selections such as phage display and for characterisation of selected proteins.

As several commercially available recombinant antigens were deemed to be unsuitable for use in selections due to the levels of aggregates present, the following recombinant monomeric and dimeric CD137 antigens (see Table 1) were produced in-house for use in selections, screening and further characterisation of anti-CD137 mAbs.

TABLE 1

Recombinant human, cynomolgus and mouse CD137 antigens

| Type | Designation | Species | Presentation | Biotinylated version prepared? | Antigen format | SEQ ID NO |
|---|---|---|---|---|---|---|
| Recombinant | hCD137-His-Avi | Human | Soluble | Yes | Monomer | 112 |
| Recombinant | hCD137-mFc-Avi | Human | Soluble | Yes | Dimer | 112 |
| Recombinant | cCD137-mFc-Avi | Cynomolgus | Soluble | Yes | Dimer | 113 |
| Recombinant | mCD137-mFc-Avi | Mouse | Soluble | Yes | Dimer | 114 |

"and/or" where used herein is to be taken as specific disclosure of each of the two specified features or components with or without the other. For example, "A and/or B" is to be taken as specific disclosure of each of (i) A, (ii) B and (iii) A and B, just as if each is set out individually herein.

Monomeric human CD137 antigen comprising the extracellular domain of human CD137 (SEQ ID NO: 112) was produced by cloning DNA encoding the extracellular domain of the human CD137 along with an Avi sequence and six C-terminal histidine residues into modified pFUSE vectors (Invivogen, cat no. pfuse-mg2afc2) using EcoRI-HF and BamHI-HF restriction enzymes. The vectors were transfected into HEK293-6E cells (National Research Council of Canada), and expressed CD137 was purified using a His-Trap™ excel nickel column (GE Healthcare, 29048586) and size-exclusion chromatography (SEC) to ensure that the antigen was a single species and did not contain aggregates.

To produce the dimeric antigens, DNA constructs encoding the extracellular domain of the human CD137 (SEQ ID NO: 112), cynomolgus (cyno) CD137 (SEQ ID NO: 113) or mouse CD137 (SEQ ID NO: 114) fused with the mIgG2a Fc domain along with an Avi sequence were cloned into modified pFUSE vectors and transfected into HEK293-6E cells. Recombinant CD137 was purified using MabSelect SuRe™ Protein A columns (GE Healthcare, 11003494) and SEC to ensure antigen was a single species and did not contain aggregates.

Biotinylated versions of each of the dimeric and monomeric antigens were prepared using a BirA biotin-biotin protein ligase reaction kit (Avidity LLC, BirA500) to produce monomeric CD137 antigen labelled with a single biotin molecule and dimeric CD137 antigens labelled with two biotin molecules, one per each of the two monomers. 3 mg of antigen was mixed with 7.8 µl BirA enzyme mix to a molar ratio of enzyme to substrate of 1:50. Additives were then added in accordance with the manufacturer's recommendations (142 µl Biomix A, 142 µl Biomix B, 142 µl Biotin) and the reaction mix was incubated for two hours at room temperature. To maintain the integrity of the biotinylated protein, the reaction mix was immediately buffer exchanged to DPBS (Life Technologies, 14190-169) using Amicon 30 µm filters (Merck Millipore, UFC503096).

Proteins were further purified by SEC to ensure removal of the BirA enzyme and production of a final high-quality monodispersed protein preparation with no high molecular weight aggregates. In more detail, materials from the same production lot were mixed together and analysed for stability and purity by size-exclusion high-performance liquid chromatography (SE-HPLC), SDS polyacrylamide gel electrophoresis (SDS-PAGE), and size-exclusion chromatography with multi-angle light scattering (SEC-MALS). Complete biotinylation of the proteins was confirmed in a streptavidin-shifting SDS-PAGE gel. The recombinant human and mouse antigens were confirmed to bind anti-CD137 positive-control antibodies (20H4.9 (U.S. Pat. No. 7,288,638) and Lob12.3 (University of Southampton), respectively), in vitro by surface-plasmon resonance (SPR) and to DO11.10 cells expressing human or mouse CD137 ligand by flow cytometry. Cells were incubated with the CD137 antigens for 1 hour, and then a fluorescently-labelled anti mouse Fc fragment antibody was used to detect cell binding. The recombinant cyno CD137 antigen was confirmed to bind to DO11.10 cells (National Jewish Health) expressing cyno CD137 ligand by flow cytometry as described above. To ensure as high a purity as possible for the materials used in selection protocols, thorough protein characterisation of the antigens was performed to ensure the percentage of protein aggregates did not exceed 2%.

1.2 Cell Surface-Expressed Antigens

DO11.10 cells (National Jewish Health) expressing full-length human CD137 (SEQ ID NO: 119) or cyno CD137 (SEQ ID NO: 120), designated 'DO11.10-hCD137' and 'DO11.10-cCD137' respectively (see Table 2), were produced in order to present the antigen in a membrane-bound conformation, most similar to its natural form, for selections and further characterisation of selected anti-CD137 mAbs.

Lentiviral transduction was used to generate DO11.10 cells over-expressing human or cyno CD137 receptors using the Lenti-X HTX Packaging System (Clontech, 631249). Lenti-X expression vector (pLVX) (Clontech, 631253) containing DNA encoding the full-length human CD137 or cyno CD137 was co-transfected with a Lenti-X HTX Packaging Mix into the Lenti-X 293T Cell Line (Clontech, 632180) to generate virus. The DO11.10 cell line was then transduced with these lentiviral vectors.

Expression of human CD137 or cyno CD137 on these cells was confirmed by binding of 20H4.9 and MOR7480.1 (Patent Publication No. US 2012/0237498) positive control antibodies, respectively, to the cells using flow cytometry. Cells were incubated with the human or cyno positive-control antibodies for 1 hour and then a fluorescently-labelled anti-human Fc detection antibody (Stratech Scientific Ltd, 109-546-098-JIR) was used to detect cell binding.

TABLE 2

Cell surface-expressed human and cynomolgus CD137 antigens

| Type | Designation | Species | Presentation | SEQ ID NO |
|---|---|---|---|---|
| Cell | DO11.10-hCD137 | Human | Cell-expressed | 119 |
| Cell | DO11.10-cCD137 | Cyno | Cell-expressed | 120 |

Example 2—Phagemid Library Selection and Screening to Identify Anti-CD137 Antibodies 2.1 Selection, Screening and Expression of Anti-CD137 Clones Synthetic naive phagemid libraries displaying the Fab domain of human germlines with randomisation in the CDR1, CDR2 and CDR3 (MSM Technologies) were used for selections with the recombinant and cell surface-expressed CD137 antigens described in Example 1.

Fab libraries were selected in three rounds using Streptavidin Dynabeads (Thermo Fisher Scientific, 11205D) and Neutravidin-binding protein coupled to Dynabeads (Thermo Fisher Scientific, 31000) to isolate the phage bound to biotinylated human CD137-mFc-Avi or human CD137-His-Avi. To ensure Fab binding to cell surface-expressed CD137, in a parallel selection strategy, first round outputs from the selections using recombinant CD137 antigen were subjected to two further rounds of selections using DO11.10-hCD137 cells and a fourth round with DO11.10-cCD137 cells.

Briefly, $1 \times 10^7$ DO11.10 control cells or $5 \times 10^6$ DO11.10-CD137 cells were washed 2× with 1×PBS+20% fetal bovine serum (FBS), and subsequently blocked in 4 ml 1×PMF (1×PBS, 4% Marvel dried milk, 20% FBS) for 1 hour at 4° C. Phage from round 1 output were blocked in blocking solution (2 ml 1×PMF) for 1 hour at 4° C. To avoid binders against non-relevant cell-surface proteins, deselection was performed by removing the blocking solution of the DO11.10 cells and adding the blocked phage for 1 hour at 4° C. Phage were removed from the DO11.10 deselection cells following centrifugation and added to the blocked DO11.10-CD137 selection cells for 1 hour at 4° C. Cells were then pelleted and washed three times with 5 ml PBS containing 1% BSA, changing tubes between the first wash. Phage were eluted from the cells by incubating with 300 µl of 1 mg/ml trypsin for 15 min at room temperature.

About 2200 clones from the round 3 and 4 outputs were screened by phage ELISA for binding to human and cyno CD137-mFc-Avi. Biotinylated mFc was included as a negative control. The variable regions of the positive clones (clones with a CD137 binding signal at least 4-fold higher than the binding signal to mFc) were sequenced which led to the identification of 36 unique VH/VL sequence combinations. Sequences identified originated from both selection strategies, i.e. using either recombinant CD137 antigen in all selection rounds or recombinant CD137 antigen in round 1 followed by cell surface-expressed CD137 antigen in subsequent rounds, with several clones isolated via both selection strategies. Based on the phage ELISA, 22 out of the 36 clones were cynomolgus (cyno) crossreactive, but as the sensitivity of the phage ELISA might not have been sufficient to detect weak cyno crossreactive binders, all 36 clones were taken forward for reformatting into IgG1 molecules.

For each clone the VH and VL domains were individually cloned into pTT5 expression vector (National Research Council of Canada) containing either CH1, CH2 (with a LALA mutation in the CH2 domain (Bruhns et al., 2009; Hezareh et al., 2001) and CH3 domains, or CL domains, respectively. The resulting pTT5-FS30 VH with LALA mutation (AA) and pTT5-FS30 VL vectors were transiently cotransfected into HEK293-6E cells. Twenty-eight clones expressed as soluble IgG1 molecules. These were purified by MabSelect SuRe Protein A columns (GE Healthcare) and subjected to further testing as described below.

2.2 Binding of mAbs to Human and Cyno CD137

The binding of the anti-CD137 mAbs was analysed in an ELISA using human and cyno CD137-mFc-Avi.

Briefly, Streptavidin (Thermo Scientific, 15500) plates were coated overnight at 4° C. with 10 nM recombinant biotinylated hCD137-mFc-Avi, cCD137-mFc-Avi or human OX40-mFc (produced in-house and comprising the extracellular domain of human OX40, the amino acid sequence of which is set forth in SEQ ID NO 116), mFc-Avi (produced in-house; SEQ ID NO 115) or 1×PBS as negative controls. Next day, plates were washed three times in PBS and subsequently blocked with 300 µl PBS containing 2% Tween for 2 hours at room temperature. Blocking solution was discarded and a dilution series of anti-CD137 mAb concentrations (0.1 to 300 nM, 3-fold dilutions) was added and incubated for 1 hour at room temperature whilst shaking at 450 rpm. Plates were washed 3× with 300 µl PBS/Tween 0.05%. Goat anti-human IgG (Fc fragment) antibody conjugated to Horseradish Peroxidase (Sigma, A0170) was diluted 1:10000 in PBS and 90 µl was added to the wells. After incubation for 1 hour at 4° C. whilst shaking at 450 rpm, plates were washed 3× with 300 µl PBS/Tween 0.05%, 100 µl TMB substrate (eBioscience, 00-4201-56) was added to each well. The reaction was stopped between 2-10 minutes after addition of TMB by the addition of 50 µl 1M sulphuric acid solution. Optical density (OD) was read at 450-630 nm in a 96-well plate reader within 30 minutes of sulphuric acid addition and analysed using GraphPad Prism software (GraphPad Software, Inc.).

Of the 28 clones tested, 10 showed dose-dependent binding to human CD137-mFc-Avi, and no binding to human OX40-mFc-Avi, mFc or streptavidin. Within this group, four clones, FS30-5, FS30-10, FS30-15 and FS30-16, were crossreactive to cyno CD137-mFc-Avi. Cyno crossreactivity is required to allow dosing and safety testing in cynomolgus monkeys during preclinical development of antibodies. Due to the low number of cyno crossreactive clones obtained, additional clones were screened and expressed as described in Example 2.1. This resulted in the isolation of one additional human/cyno crossreactive binder FS30-35. Whereas FS30-5, FS30-10, FS30-15 and FS30-16 were first characterised in mAb format (see Examples 2.3 to 2.4), FS30-35 was characterised in mAb$^2$ format only (see Example 3 onwards).

2.3 Cell Binding

The anti-human CD137 mAbs FS30-5, FS30-10, FS30-15 and FS30-16 were tested for binding to cells expressing human or cynomolgus CD137 (DO11.10-hCD137 or DO11.10-cCD137) using flow cytometry. Non-specific binding was also assessed by testing binding to DO11.10 cells and HEK293 cells lacking CD137 expression. Binding affinities were compared with those of two positive control anti-CD137 mAbs, MOR7480.1 (see Example 1.2 and 20H4.9 (U.S. Pat. No. 7,288,638), the variable domains of which were cloned and expressed in human IgG1 format comprising the LALA mutation in the CH2 domain (G1AA format) to result in antibodies G1AA/MOR7480.1 and G1AA/20H4.9.

Briefly, DO11.10, HEK293, DO11.10-hCD137 or DO11.10-cCD137 suspensions were prepared in PBS containing 2% BSA (Sigma, A7906) and seeded at 4×10$^6$ cell/ml with 50 µl/well in V-bottomed 96-well plates (Costar, 3897). mAb dilutions (1·10$^{-6}$-100 nM, 10-fold dilutions) were prepared at 2× the final concentration in triplicate in 1×DPBS (Gibco, 14190-094). 50 µl of the FS30-5, FS30-10, FS30-15 or FS30-16 mAb or control mAbs (G1AA/MOR7480.1 or G1AA/20H4.9) were added to separate cells (final volume 100 µl) and incubated at 4° C. for 1 hour. The cells were washed once in PBS and 100 µl/well of secondary antibody (anti-human Fc-488 antibody, Jackson ImmunoResearch, 109-546-098) diluted 1:1000 in PBS containing 2% BSA was then added and incubated for 30 mins at 4° C. in the dark. The cells were washed once with PBS and resuspended in 100 µl of PBS containing DAPI (Biotium, 40043) at 1 µg/ml. The cells were analysed using a Canto II flow cytometer (BD Bioscience). Dead cells were excluded and the fluorescence in the FITC channel (488 nm/530/30) was measured. The geometric mean fluorescence intensity (GMFI) values were plotted vs the log concentration of antibody and the resulting curves were fitted using the log (agonist) vs response equation in GraphPad Prism.

The FS30-5, FS30-10, FS30-15 and FS30-16 clones were found to bind to cell surface-expressed human and cyno CD137 receptors with EC$_{50}$ values in the range of 0.15-0.57 nM (see Table 3), comparable to the positive control mAbs. No binding to parental DO11.10 or HEK293 cells was observed, thus showing the specificity of the binding. No binding of the 20H4.9 positive control anti-CD137 antibody to cyno CD137 was observed in these cells. Published data (U.S. Pat. No. 7,288,638) show that the 20H4.9 antibody in IgG1 format does bind to cyno CD137 on phorbol myristate acetate (PMA)-induced cyno PMBCs. In the hands of the present inventors, the 20H4.9 antibody in G1AA format bound to recombinant cyno CD137 but the affinity was much lower than for human CD137 (data not shown), which may explain the lack of binding observed with this antibody to DO11.10-cCD137 cells.

TABLE 3

| mAb | DO11.10 cells | | | |
|---|---|---|---|---|
| | DO11.10-hCD137 EC$_{50}$ (nM) | DO11.10-cCD137 EC$_{50}$ (nM) | DO11.10 cells not expressing CD137 | HEK293 cells not expressing CD137 |
| G1AA/FS30-5 | 0.24 | 0.45 | no binding | no binding |
| G1AA/FS30-10 | 0.32 | 0.57 | no binding | no binding |

TABLE 3-continued

| | DO11.10 cells | | | |
|---|---|---|---|---|
| mAb | DO11.10-hCD137 $EC_{50}$ (nM) | DO11.10-cCD137 $EC_{50}$ (nM) | DO11.10 cells not expressing CD137 | HEK293 cells HEK293 cells not expressing CD137 |
| G1AA/FS30-15 | 0.15 | 0.31 | no binding | no binding |
| G1AA/FS30-16 | 0.21 | 0.36 | no binding | no binding |
| G1AA/20H4.9 | 0.14 | no binding | no binding | no binding |
| G1AA/MOR7480.1 | 0.10 | 0.14 | no binding | no binding |

2.3 Biophysical Characteristics of FS30 mAbs

Assessment of the biophysical characteristics of the selected mAbs is not only important for drug development but also for the interpretation of binding and functional data. Specifically, when analysing agonistic T cell activation, the presence of aggregates may mimic antibody clustering and induce T cell activation. The percentage of the monomeric fraction of the FS30 mAbs was therefore determined by SEC.

Briefly, FS30 mAbs were injected on a HPLC machine (Agilent 1100 series) with a TSKgel SuperSW3000 column (Tosoh Bioscience, 18675). The flow rate for these experiments was 0.35 mg/ml and the mobile phase was 20 mM Sodium phosphate, 200 mM NaCl, pH 6.8. Sample concentrations were 0.5-1 mg/ml in 1×PBS buffer.

All four FS30 mAbs showed a single-peak profile and were greater than 97% monomeric (Table 4). This high level of monomeric protein allowed functional activity testing to proceed.

TABLE 4

Percentage of mAb in monomeric form

| mAb | Monomer (%) |
|---|---|
| G1AA/FS30-5 | 98.3 |
| G1AA/FS30-10 | 98.3 |
| G1AA/FS30-15 | 99.8 |
| G1AA/FS30-16 | 97.0 |

2.4 T Cell Activation Assay

The functional activity of the anti-CD137 mAbs was then analysed in a primary T cell activation assay. In vivo, anti-CD137 mAbs induce agonism by recruitment of Fcγ receptors, thereby causing crosslinking of the mAbs and consequent clustering of the CD137 receptor. To mimic the maximum ability of the mAbs to cluster surface CD137 receptor molecules, the FS30 mAbs were crosslinked using an anti-human CH2 antibody (clone MK1A6 [Jefferis et al., 1985; Jefferis et al., 1992], produced in-house) prior to the assay. T cell activation was compared to non-crosslinked mAbs. FS30-5, FS30-10, FS30-15 and FS30-16 were tested alongside FS30-6, a human CD137 binder that was found not to be crossreactive to cyno CD137 in the binding ELISA (Example 2.2) and therefore is likely to bind to a different epitope, as well as the positive control anti-CD137 mAbs G1AA/MOR7480.1 and G1AA/20H4.9. The anti-hen egg-white lysozyme (HEL) antibody D1.3 (Braden et al., 1996) in a human IgG1 backbone with the LALA mutation (designated G1AA/HeID1.3) was used as a negative control.

2.4.1 Isolating and Activating Primary Human CD8⁺ T Cells

To isolate human $CD8^+$ T cells, peripheral blood mononuclear cells (PBMCs) were firstly isolated from leucocyte depletion cones, a by-product of platelet donations. Briefly, leucocyte cones contents were flushed with PBS and overlaid on a Ficoll (Sigma-Aldrich, 1440-02) gradient. PBMCs were isolated by centrifugation and recovery of cells that did not cross the Ficoll gradient. PBMCs were further washed with PBS and remaining red blood cells were lysed by adding 10 ml 1× red blood cell lysis buffer (eBioscience, 00-4300-54) according to the manufacturer's instructions. $CD8^+$ T cells were isolated from the PBMCs present in the eluant using a $CD8^+$ T Cell Isolation Kit (human) (Miltenyi Biotec, 130-096-495) according to the manufacturer's instructions.

96-well flat bottom tissue culture plates were coated with 8 µg/ml anti-CD3 antibody (Clone UCHT1, R&D Systems, MAB100-SP) in PBS overnight at 4° C. The plates were then washed 3 times with 200 µl PBS. The required amount of T cells at a concentration of $5.0 \times 10^5$ cells/ml in T cell medium (RPMI medium (Life Technologies, 61870-044) with 10% FBS (Life Technologies), 1× Penicillin Streptomycin (Life Technologies, 15140122), 1 mM Sodium Pyruvate (Gibco, 11360-070), 10 mM Hepes (Sigma-Aldrich, H0887), 2 mM L-Glutamine (Sigma-Aldrich, G7513) and 50 µM 2-mercaptoethanol (Gibco, M6250) were plated such that there were $5.0 \times 10^4$ cells/well in 100 µl culture medium.

2.4.2 T cell Activation Assay Protocol

The FS30 antibodies were diluted in T cell medium at a 2× final concentration starting at 200 nM and crosslinking agent (anti-human CH2 antibody MK1A6) was added to the antibody samples to be crosslinked at a 1:1 molar ratio before a 1:3 titration was carried out. Non-crosslinked antibody samples were tested at 100 nM and 25 nM only. 100 µl of diluted antibody or antibody/crosslinking agent mixture was added to the T cells on the plate for a total of 200 µl assay volume and 1× concentration of antibody. The assay was incubated at 37° C., 5% $CO_2$ for 72 hours. Supernatants were collected and assayed with human IL-2 ELISA Ready-SET-Go! kit (eBioscience, 88-7025-88) following the manufacturer's instructions. Plates were read at 450 nm using the plate reader with Gen5 Software, BioTek. Absorbance values of 630 nm were subtracted from those of 450 nm (Correction). The standard curve for calculation of cytokine concentration was based on a four parameter logistic curve fit (Gen5 Software, BioTek). The concentration of human IL-2 (hIL-2) was plotted vs the log concentration of antibody and the resulting curves were fitted using the log (agonist) vs response equation in GraphPad Prism. The results of the assay are shown in Table 5 and FIG. 1.

When crosslinked, the FS30-5, FS30-10, FS30-15 and FS30-16 mAbs showed potent activity in the T cell activation assay, with $EC_{50}$ values of less than 10 nM and a maximum level of IL-2 ($E_{max}$) similar to the positive control anti-CD137 mAbs (Table 5, FIG. 1A). The $E_{max}$ of the FS30-6 mAb was significantly lower than that of the positive controls and the other FS30 mAbs, indicating a lower overall level of T cell activation. Unlike the positive control G1AA/20H4.9 mAb, which showed activity in the absence of crosslinking (hIL-2 production of 3174 pg/ml), the FS30 mAbs showed no activity when not crosslinked as indicated by the background response levels of IL-2 measured (Table 5 and representative FIG. 1B).

TABLE 5

Activity of mAbs in the T cell activation assay

| mAb/mAb² | Activity of crosslinked mAbs | | Activity of non-crosslinked mAbs at 100 nM (hIL-2 pg/ml) |
|---|---|---|---|
| | $EC_{50}$ (nM) | $E_{max}$ (hIL-2 pg/ml) | |
| G1AA/FS30-5 | 3.2 | 10884 | 509 |
| G1AA/FS30-6 | 1.0 | 1512 | 532 |
| G1AA/FS30-10 | 5.4 | 8564 | 497 |
| G1AA/FS30-15 | 8.5 | 11143 | 449 |
| G1AA/FS30-16 | 1.4 | 4836 | 402 |
| G1AA/20H4.9 | 0.27 | 10232 | 3174 |
| G1AA/MOR7480.1 | 1.0 | 5637 | NM |
| G1AA/HeID1.3 | N/A | N/A | NM |

N/A: not applicable as low signal did not allow a meaningful $EC_{50}$/Emax determination
NM: not measured 2.5 Summary of Naïve Selection Procedure From the 36 mAbs identified by the initial screen of the naïve phage libraries, five anti-human CD137 mAb clones (FS30-5, FS30-10, FS30-15, FS30-16 and FS30-35) were found to bind to both recombinant human and cyno CD137. The FS30-5, FS30-10, FS30-15 and FS30-16 mAb clones were shown to bind cell-surface CD137 receptors induce T cell activation upon crosslinking. These clones, together with the FS30-35 mAb clone, were selected for expression in mAb² format and sequence optimisation as described in Example 3.

Example 3—Expression and Characterisation of mAbs in mAb² Format

The CDR-based antigen-binding sites of a mAb can be combined with additional binding sites generated in the constant domain, known as Fc antigen-binding or "Fcab" domains, to provide bispecific antibodies referred to as mAb². To allow the characterisation of the anti-CD137 binding moiety in mAb² format, mAb² molecules were prepared which consisted of an IgG1 molecule, comprising the CDRs of either the FS30-5, FS30-10, FS30-15, FS30-16 or FS30-35 clone and including the LALA mutation in the CH2 domain, and a human OX40 receptor-binding site in the CH3 domain. These mAb² molecules were generated by replacing the VH domain of an anti-human OX40/anti-HEL mAb², designated FS20-22-49AA/HeID1.3, with the corresponding VH domains of the FS30 clones and cotransfecting the generated VH with the corresponding light chain of the FS30 mAbs. The LALA mutation in the CH2 domain of the IgG1 molecule was retained in the resulting mAb² molecules. The heavy and light chain sequences of the resulting mAb² molecules are shown in SEQ ID NOS 83 and 13, 103 and 46, 89 and 88, 92 and 91, 93 and 68. These mAb² molecules were designated FS20-22-49AA/FS30-5, FS20-22-49AA/FS30-10, FS20-22-49AA/FS30-15, FS20-22-49AA/FS30-16 and FS20-22-49AA/FS30-35. The mAb² were produced by transient expression in HEK293-6E cells and purified using MabSelect SuRe Protein A columns (GE Healthcare).

3.1 Binding Specificity of Anti-CD137 mAb²

CD137 belongs to the tumour necrosis factor receptor superfamily (TNFRSF) of cytokine receptors (Moran et al., 2013). To analyse the specificity of the anti-CD137 Fab binding site of the five mAb² molecules, binding of the mAb² to human CD137 and five closely-related human TNFRSF members (TNFRSF1A, TNFRSF1B, GITR, NGFR and CD40) was tested using SPR. The aim was to demonstrate 1000-fold specificity by showing no binding of the mAb² to closely-related antigens at a concentration of 1 μM, but showing binding to CD137 receptors at a concentration of 1 nM.

Flow cells on CM5 chips were immobilised with approximately 1000 RU of either hCD137-mFc-Avi (Table 1), TNFRSF1A-Fc (R&D Systems, 372-RI-050/CF), TNFRSF1B-Fc (R&D Systems, 726-R2-050), GITR-hFc-Avi (in-house produced and comprising the extracellular domain of human GITR as set forth in SEQ ID NO: 117), NGFR-Fc (R&D Systems, 367—NR-050/CF) or CD40-mFc (in-house produced and comprising the extracellular domain of human CD40 as set forth in SEQ ID NO: 118). Flow cell 1 was run as a blank immobilisation. The five FS20-22-49AA/FS30 mAb² were diluted to 1 μM and 1 nM in 1×HBS-EP buffer (GE Healthcare, product code BR100188), allowed to flow over the chip for 3 min and then allowed to dissociate for 4 minutes. A 30-second injection of 10 mM glycine pH 1.5 was used for regeneration. Positive control mAbs were injected at 50-100 nM to confirm the coating of each antigen. Binding levels were determined at the end of the association phase and compared.

Whereas the FS20-22-49AA/FS30-5, FS20-22-49AA/FS30-10, FS20-22-49AA/FS30-16 and FS20-22-49AA/FS30-35 mAb² showed a high level of specificity (close to 1000-fold), the FS20-22-49AA/FS30-15 mAb² showed non-specific binding to all five closely-related TNFRSF members tested. The non-specific binding exhibited by this clone was about 5-10 fold lower on average than the binding to CD137 receptors at the same concentration, and was concluded to be due to the Fab binding site of the mAb² molecule, as the FS30-15 mAb showed the same binding profile when tested for binding to the same five TNFRSF members closely related to CD137. Based on this data, the FS30-15 clone was omitted from further selection campaigns.

Example 4—Sequence Optimisation

Whilst the FS30-5, FS30-10, FS30-16 and FS30-35 anti-CD137 mAbs showed high affinity and specificity for CD137, and activity in a T cell activation assay, they contained one or more potential post-translational modification (PTM) sites within the CDR loops. It was decided to further engineer these clones in an attempt to identify amino acid residues which could be substituted at these sites while retaining or improving binding and activity. The potential PTM sites identified included methionine residues in the VH CDR3 (Kabat position M100D and M100H in FS30-5, M97 in FS30-10, M100A in FS30-16, and M100F in FS30-35), a potential aspartate isomerisation motif in the VH CDR2 (Kabat position D54G55 in FS30-16) and a potential deamidation site in the VL CDR3 (Kabat position Q90G91 in FS30-16)

Site-directed mutagenesis was carried out using the five FS20-22-49AA/FS30 mAb² clones as templates and primers that contained the degenerate codon NNK at the sites encoding methionine, aspartate or glycine residues to allow for all possible amino acid substitutions. Cysteine residues and amino acids capable of producing novel potential PTM motifs were excluded. Clones were expressed and screened for binding to DO11.10-hCD137 cells. Clones with similar (within two-fold) or improved binding at 10 nM compared to the parental mAb² clones were selected for expression at 30-50 ml scale, purified on Protein A columns and screened in a T cell activation assay using DO11.10-hCD137 cells and the anti-human CH2 antibody MK1A6 as crosslinking agent.

DO11.10-hCD137 cells were washed once in PBS and resuspended in DO11.10 cell medium (RPMI medium (Life Technologies) with 10% FBS (Life Technologies) and 5 g/ml puromycin (Life Technologies, A11113803)) at a concentration of $1.0 \times 10^6$ cells/ml. 96-well flat-bottomed plates were coated with anti-mouse CD3 antibody (Thermo Fisher Scientific, clone 17A2) by incubation with 0.1 µg/ml anti-mouse CD3 antibody diluted in PBS for 2 hours at 37° C., 5% $CO_2$ and then washed twice with PBS. DO11.10-hCD137 cells were added to the plates at $1 \times 10^5$ cell/well. A 2 µM dilution of each test antibody was prepared in DPBS (Gibco) and further diluted 1:10 in DO11.10 cell medium (30 µl+270 µl) to obtain a 200 nM dilution. The MK1A6 crosslinking agent was added to the wells in a 1:1 molar ratio with the test antibody samples to be crosslinked. In a 96-well plate, serial dilutions of each antibody or antibody/crosslinking agent mixture were prepared. 100 µl of diluted antibody or antibody/crosslinking agent mixture was added to the DO11.10-hCD137 cells on the plate. Cells were incubated at 37° C., 5% $CO_2$ for 72 hours. Supernatants were collected and assayed with a mouse IL-2 ELISA kit (eBioscience or R&D Systems) following the manufacturer's instructions. Plates were read at 450 nm using the plate reader with Gen5 Software, BioTek. Absorbance values of 630 nm were subtracted from those of 450 nm (Correction). The standard curve for calculation of cytokine concentration was based on a four parameter logistic curve fit (Gen5 Software, BioTek). The concentration of mouse IL-2 (mIL-2) was plotted vs the log concentration of antibody and the resulting curves were fitted using the log (agonist) vs response equation in GraphPad Prism.

For each of the clones, a limited number of amino acids which retained or improved binding to cell-surface CD137 were identified for substitution of the methionine residue in the heavy chain CDR3 (see Table 6). The FS20-22-49AA/FS30-16 mAb[2] clone contained three potential PTM sites and mutation of each of them led to a small reduction in binding affinity. When these mutations were combined in one molecule the reduced binding was additive (data not shown) and, consequently, this clone was not pursued further. Few mutations were found that improved binding to CD137 and functional activity compared with the relevant parent clone. Three mutant mAb[2] clones, all derived from the FS20-22-49AA/FS30-10 mAb[2] clone, were found to have improved binding affinity and functional activity. These mAb[2] contained either an asparagine, a threonine or a leucine residue substituted for the methionine residue at position 97 in the parent FS20-22-49AA/FS30-10 mAb[2] and were designated FS20-22-49AA/FS30-10-3, FS20-22-49AA/FS30-10-12 and FS20-22-49AA/FS30-10-16, respectively. Although the $EC_{50}$ values for mutant clones derived from the FS20-22-49AA/FS30-35 parent mAb[2] clone showed no improvement in functional activity compared to the parent clone, one mutant clone, designated FS20-22-49AA/FS30-35-14, which contained an alanine residue substituted for the methionine residue at position 100F in the parent clone, did however show improved binding. In the case of the FS20-22-49AA/FS30-5 parent mAb[2] clone, both the methionine residue at position 100D and the methionine residue at position 100H were changed, respectively, for an isoleucine residue and a leucine residue in the same molecule to result in a mutant mAb[2] clone, designated FS20-22-49AA/FS30-5-37. The FS20-22-49AA/FS30-10-3, FS20-22-49AA/FS30-10-12, FS20-22-49AA/FS30-10-16, FS20-22-49AA/FS30-35-14 and FS20-22-49AA/FS30-5-37 clones were selected for further characterisation.

TABLE 6

Sequence optimisation of mAb[2]

| | FS20-22-49AA/FS30-5 | | FS20-22-49AA/ FS30-10 | FS20-22-49AA/FS30-16 | | | FS20-22-49AA/ FS30-35 |
|---|---|---|---|---|---|---|---|
| Residue mutated (Kabat position) | Methionine (100D) | Methionine (100H) | Methionine (97) | Methionine (100A) | Aspartic Acid (54) | Glycine (91) | Methionine (100F) |
| Mutations tested | A, R, E, Q, G, H, I, L, K, F, P, S, T, W, Y, V | A, R, E, Q, G, H, I, L, K, P, S, T, W, V | S, T, W, A, R, N, E, Q, G, H, I, L, K, F, P | A, R, N, D, Q, G, H, I, L, K, f, P, S, T, W, Y, V | G, H, I, L, K, F, S, P, A, R, N, E, T W, Y, V | A, R, N, E, G, H, I, L, K, F, S, P, T W, Y, V | A, R, N, D, E, Q, G, H, L, K, P, S, T, W, Y, V |
| Cell binding at 10 nM to DO11.10-hCD137 cells | I, L, W, Y (binding retained) | L (binding <1.3 fold) | N, T, L (binding improved) | F, P, Y (binding <1.6-fold) | ND | A, S, T (binding <1.6 fold) | A, E, Q, H, T, V (binding improved) |
| DO11.10-hCD137 T cell activation assay $EC_{50}$ (nM) | I: 4.4 L: ND W: 5.3 Y: 7.2 Parental: 4.8 | L: 5.9 | N: 4.8 T: 4.5 L: 3.7 Parental: 10.2 | ND | ND | ND | A: 6.3 E: 12.1 Q: 6.6 H: 9.5 T: ND V: 9.2 Parental: 5.5 |
| Selected mutation Selected mAb[2] | I FS20-22-49AA/ FS30-5-37 | L | N, T, L FS20-22-49AA/ FS30-10-3 FS20-22-49AA/ FS30-10-12 FS20-22-49AA/ FS30-10-16 | none | none None | none | A FS20-22-49AA/ FS30-35-14 |

ND: not determined

Example 5—Binding Affinity and Specificity of Anti-CD137 mAb²

5.1 Binding of Selected mAb² Clones to Recombinant CD137

Binding of the FS20-22-49AA/FS30-5-37, FS20-22-49AA/FS30-10-3, FS20-22-49AA/FS30-10-12, FS20-22-49AA/FS30-10-16 and FS20-22-49AA/FS30-35-14 mAb² clones to recombinant human, cyno and mouse CD137-mFC-Avi antigens (see Table 1) and rat CD137-mFc antigen (R&D Systems, 7968-4B-050) was measured by SPR using a Biacore 3000 instrument (GE Healthcare). The anti-CD137 MOR7480.1 mAb in IgG1 format (G1/MOR7480.1; SEQ ID NO: 99 and 101) and G1AA/20H4.9 were used as positive controls.

Briefly, 25 µg/ml anti-human IgG (Fc) antibody (GE Healthcare, Human Antibody Capture Kit, BR100839) was coated on flow cells 1, 2, 3 and 4 of a Biacore sensor chip CM5 (GE Healthcare, BR100012) for 3 minutes at 5 µl/min, achieving a final response of approximately 4300 RU. The mAb² clones, diluted in HBS-EP buffer (GE Healthcare, BR100188) at 0.5 µg/ml, were injected individually on flows cell 2, 3 and 4 at 30 µl/min to achieve a response of approximately 80 RU. The recombinant human, cyno, mouse and rat CD137-mFc antigens, diluted in HBS-EP buffer, were injected on flow cell 1, 2, 3 or 4 as appropriate at a concentration range of 22 nM to 0.01 nM with 3-fold dilutions for 2 minutes at 70 µl/min and then allowed to dissociate in buffer for 8 minutes. Regeneration was achieved by injecting 3 M magnesium chloride (GE Healthcare, Human Antibody Capture Kit, BR100839) for 30 seconds at a rate of 30 µl/min. The G1AA/20H4.9 control was tested under similar conditions except that high levels of mAbs were captured (270 RU) and a flow rate of 30 µl/min was used. These slightly less stringent conditions were used to assess whether this molecule could bind to cyno CD137-mFc. Subtracted data (flow cell 2-flow cell 1, flow cell 3-flow cell 1, or flow cell 4-flow cell 1) were analysed using BIAevaluation 3.2 Software (GE Healthcare) to identify binding using the model 1:1 binding with mass transfer, with refractive index (RI) constant 0.

The binding data demonstrated that the FS20-22-49AA/FS30-5-37, FS20-22-49AA/FS30-10-3, FS20-22-49AA/FS30-10-12, FS20-22-49AA/FS30-10-16 and FS20-22-49AA/FS30-35-14 clones bound to human CD137-mFc with low nanomolar affinities and were fully cyno crossreactive (Table 7). No binding to recombinant mouse or rat CD137-mFc antigen was observed. In comparison to the positive control G1/MOR7480.1 mAb, the binding affinities of the FS20-22-49AA/FS30-10-3 and FS20-22-49AA/FS30-10-16 mAb² for human CD137 were about three-fold higher. Similar to the G1AA/20H4.9 control, high affinity binding of the mAb² clones to human CD137-mFc was observed. However, binding of this control mAb to cyno CD137-mFc was weak in comparison to the mAb² clones, with less than 10% of the maximum binding level (Rmax) detected. This indicates that the G1AA/20H4.9 control mAb might bind to a different binding region on dimeric CD137 than the other mAbs/mAb² tested in this assay.

TABLE 7

Binding affinity of mAb² for cyno and human CD137

| mAb/mAb² | Human CD137-mFc $K_D$ (nM) ± SD | Cyno CD137-mFc $K_D$ (nM) ± SD |
|---|---|---|
| FS20-22-49AA/FS30-5-37 | 3.45 nM ± 0.26 | 3.00 nM ± 0.50 |
| FS20-22-49AA/FS30-10-3 | 0.19 nM ± 0.02 | 0.22 nM ± 0.02 |
| FS20-22-49AA/FS30-10-12 | 6.31 nM ± 1.03 | 4.63 nM ± 0.25 |
| FS20-22-49AA/FS30-10-16 | 0.17 nM ± 0.01 | 0.15 nM ± 0.03 |
| FS20-22-49AA/FS30-35-14 | 0.60 nM | 0.67 nM |
| G1/MOR7480.1 | 0.56 nM ± 0.09 | 0.34 nM |
| *G1AA/20H4.9 | 0.6 nM/Rmax 200 | 17 nM/Rmax 6 RU |

*Affinities measured using slightly different method

5.2 Binding Specificity of the Anti-CD137 mAb²

To test whether the amino acid mutations introduced in the mutagenesis campaign described in Example 4 had affected binding specificity, the selected mAb² clones were tested for binding to other TNFRSF members closely-related to the CD137 receptor.

Specificity was tested against the same five human TNFRSF members closely-related to CD137 (TNFRSF1A, TNFRSF1B, GITR, NGFR and CD40) plus an additional closely-related TNFRSF member, human DR6 (DR6-Fc; R&D Systems, 144-DR-100), using SPR as described in Example 3.1. The anti-CD137 G1/MOR7480.1 mAb was used as a positive control. Like the positive-control mAb, all of the selected mAb² showed no binding to the six closely-related TNFRSF members and therefore a high level of specificity for human CD137, indicating that the amino acid substitutions introduced by the mutagenesis campaign described in Example 4 had not altered the binding specificity of the resulting mAb².

Example 6—Human CD137 Ligand Blocking Assays

The CD137-CD137L interaction is required for activation of the CD137 receptor. Agonistic anti-CD137 antibodies may drive activation of CD137 by mimicking the ligand interaction, thereby potentially blocking ligand binding, or driving clustering and activation of the receptors without interfering with ligand binding. Where the antibody potentially mimics the CD137L, it may block the interaction of the receptor and the ligand. It is known in the art that MOR7480.1 blocks the ligand/receptor interaction (US 2012/0237498), whereas the 20H4.9 antibody has previously been reported to not block the interaction between CD137 and its ligand (U.S. Pat. No. 7,288,638).

6.1 ELISA-Based Human CD137 Ligand Blocking Assay

The anti-human CD137 mAb clones FS30-5-37, FS30-10-3, FS30-10-12, FS30-10-16 and FS30-35-14 in mAb² format (with anti-OX40 Fcab clone FS20-22-49AA) were tested for their ability to block the CD137-CD137L interaction using an ELISA-based method. Anti-OX40 mAb 11D4 (European Patent No. 2242771) in IgG1 format (G1/11D4; SEQ ID NO:110 and 111) was used as an isotype/negative control; the mAb² FS20-22-49AA/4420 (SEQ ID NO: 98 and 97) comprising the anti-OX40 Fcab clone FS20-22-49AA and Fab region of the anti-FITC antibody 4420 (Bedzyk et al., 1989; Bedzyk et al., 1990) was used as a negative control mAb² for OX40 binding; and anti-CD137 mAbs G1/MOR7480.1 (SEQ ID NO: 99 and 101) and G1/20H4.9 (SEQ ID NO: 104 and 106) as positive controls for CD137 binding and ligand blocking activity.

Specifically, recombinant human CD137-mFc-Avi antigen was coated overnight at 4° C. on Maxisorp 96-well plates at a concentration of 1 µg/ml in PBS. The following day, plates were washed with PBST (PBS+0.05% Tween20™) and blocked with PBS+1% BSA (Sigma, A3059-500G) for 1 hour at room temperature with agitation. After blocking, the plates were washed again with PBST. A 100 nM dilution of each test antibody was prepared in PBS+1% BSA and added to the CD137-coated plates and incubated for 1 hour at room temperature with agitation. After this incubation, the plates were washed with PBST and then incubated with 20 ng/ml CD137L-His (R&D Systems, 2295-4L-025/CF) in PBS for 1 hour at room temperature with agitation. The plates were then washed with PBST and then incubated with anti-his secondary antibody (R&D Systems, MAB050H) at a 1 in 1000 dilution in PBS for 1 hour at room temperature with agitation. The plates were then washed with PBST and incubated with TMB detection reagent (Thermo Fisher Scientific, 002023) until the positive control wells turned blue and then the reaction was stopped with the addition of 2N $H_2SO_4$. Plates were read at 450 nm using the plate reader with Gen5 Software, BioTek. Absorbance values of 630 nm were subtracted from those of 450 nm (Correction). The subtracted absorbance values were plotted vs the log concentration of antibody and the resulting curves were fitted using the log (inhibitor) vs response equation in GraphPad Prism. Values were normalised by setting the G1/11D4 and G1/MOR7480.1 control mAbs as 0 and 100% blocking values, respectively. The data was analysed using a one-way ANOVA test and Holm-Sidak's multiple comparisons test using GraphPad Prism.

Figure 2:
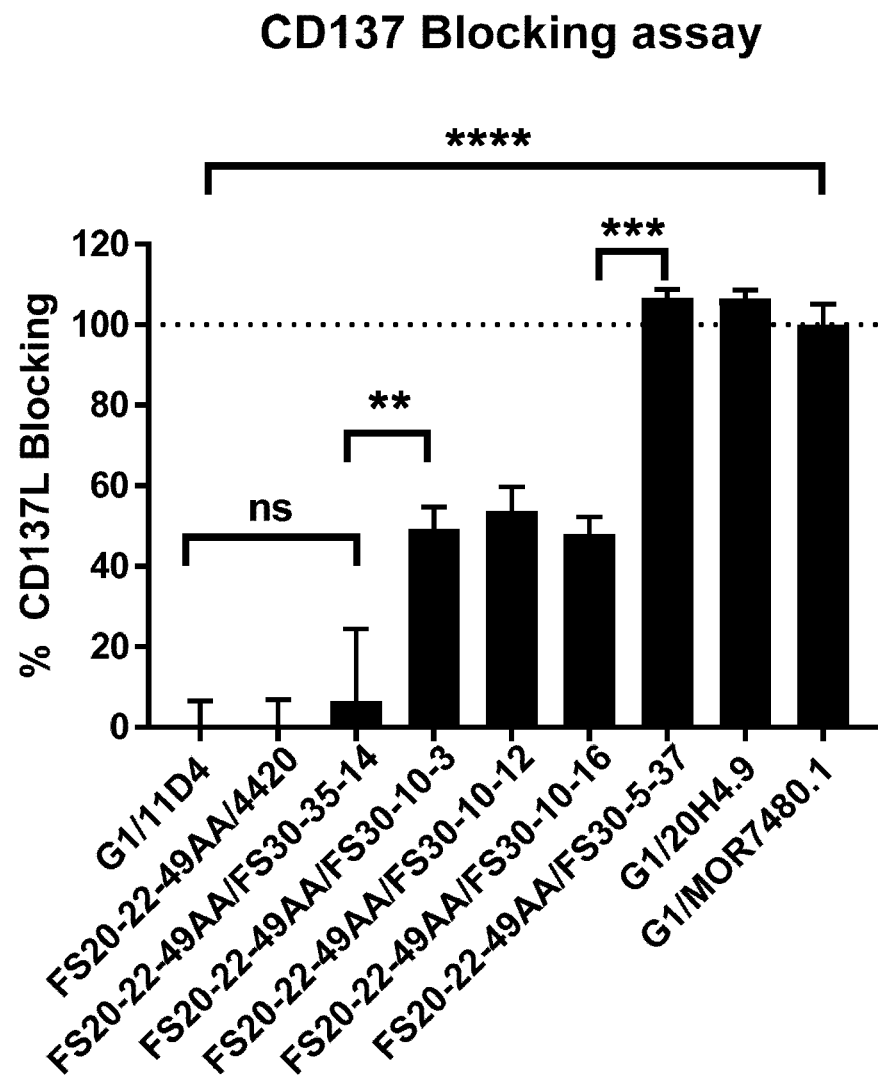
FIG. 2 shows representative plots of human CD137L binding to human CD137 receptor in the presence of anti-CD137 mAbs in mAb$^2$ format comprising an anti-human OX40 Fcab (FS20-22-49AA/FS30-5-37, FS20-22-49AA/FS30-10-3, FS20-22-49AA/FS30-10-12, FS20-22-49AA/FS30-10-16 and, in FIG. 2A only, FS20-22-49AA/FS30-35-
Figure 2:
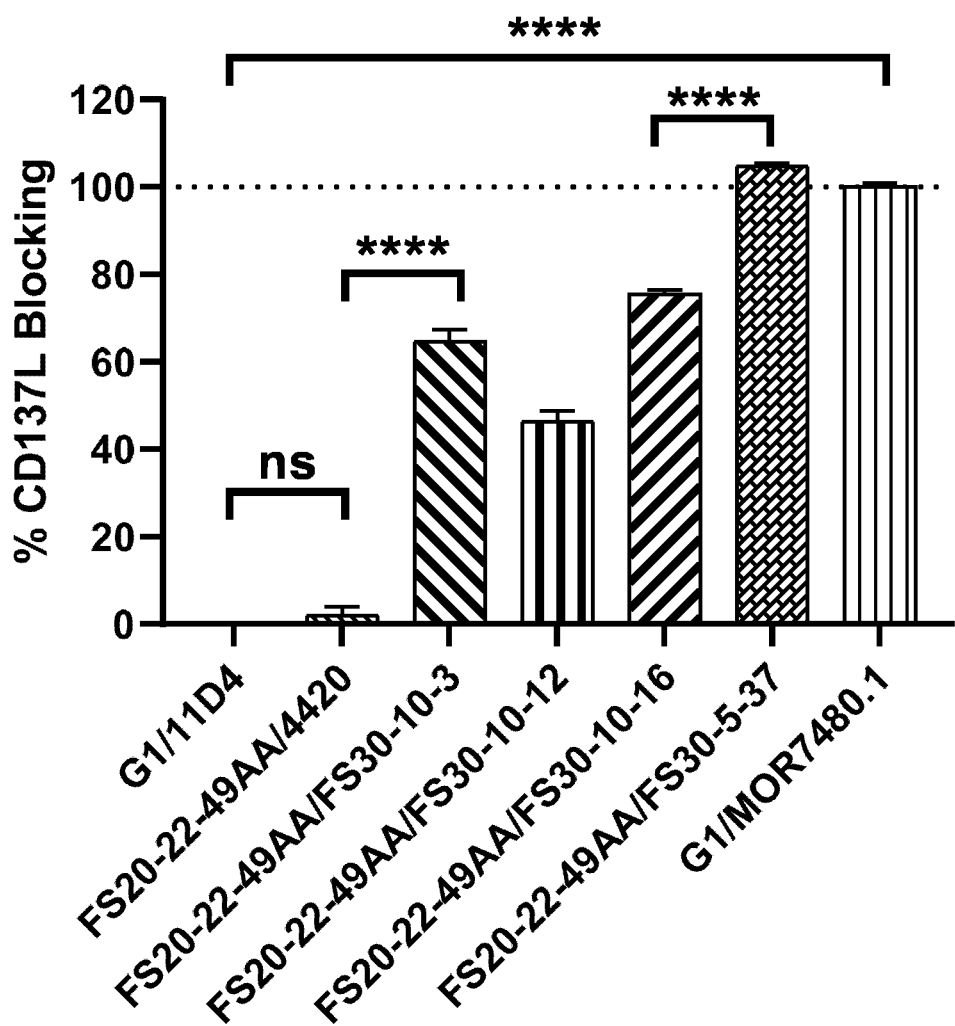

The ligand blocking activities (mean of n=2) of the molecules tested are shown in FIG. 2A and Table 8 as percentages of the ligand blocking activity of the G1/MOR7480.1 positive control. Both positive control mAbs, G1/MOR7480.1 and G1/20H4.9, completely blocked the interaction between CD137 and its ligand. This observation for the MOR7480.1 control is in agreement with previous reports. However, it was surprising that the 20H4.9 antibody blocked ligand binding in this assay as it has previously been reported to not block the interaction between CD137 and its ligand in a different assay (U.S. Pat. No. 7,288,638).

A range of blocking activities was observed for the five anti-human CD137 mAb$^2$ clones tested (FIG. 2A and Table 8). FS20-22-49AA/FS30-5-37 showed, like the positive control antibodies, complete inhibition of the receptor-ligand interaction. All mAb$^2$ clones containing the Fab regions of the anti-CD137 mAbs of the FS30-10 lineage (i.e., FS20-22-49AA/FS30-10-3, FS20-22-49AA/FS30-10-12 and FS20-22-49AA/FS30-10-16) inhibited the interaction between CD137 and CD137L by 48 to 54% and were therefore considered partial blockers. By only partially blocking the interaction between CD137 and CD137L, it is possible that these mAbs may not completely inhibit the natural interaction of CD137L with its receptor such that some CD137 signalling may still occur via this mechanism, even if one of these antibodies is bound. The FS20-22-49AA/FS30-35-14 clone, like the negative control FS20-22-49AA/4420 mAb$^2$ molecule, lacked the ability to significantly inhibit the receptor-ligand interaction and was therefore considered to be a non-blocker.

In summary, the results of this assay showed that the panel of anti-CD137 mAbs tested showed a range of ligand blocking abilities, including complete, partial and no blocking activity. Clones FS20-22-49AA/FS30-10-3, FS20-22-49AA/FS30-10-12, FS20-22-49AA/FS30-10-16 and FS20-22-49AA/FS30-35-14 each showed a blocking activity that was different from that of the positive-control anti-CD137 mAbs. Since a range of ligand blocking activities was identified, the functional activity of each of the antibodies was tested (see Example 7).

TABLE 8

Ligand blocking activity of mAbs/mAb$^2$ tested in ELISA-based blocking assay

| mAbs/mAb$^2$ | % CD137 ligand blocking activity in ELISA-based blocking assay |
|---|---|
| G1/11D4 | 0 |
| FS20-22-49AA/4420 | −0.3 |
| FS20-22-49AA/FS30-5-37 | 106.8 |
| FS20-22-49AA/FS30-10-3 | 49.4 |
| FS20-22-49AA/FS30-10-12 | 53.8 |
| FS20-22-49AA/FS30-10-16 | 48.1 |
| FS20-22-49AA/FS30-35-14 | 6.6 |
| G1/20H4.9 | 106.6 |
| G1/MOR7480.1 | 100 |

6.2 Cell-Based Human CD137 Ligand Blocking Assay

The anti-human CD137 mAb clones FS30-5-37, FS30-10-3, FS30-10-12 and FS30-10-16 in mAb$^2$ format (with anti-OX40 Fcab clone FS20-22-49AA) were tested for their ability to block the CD137-CD137L interaction using a cell-based method. Anti-OX40 mAb 11D4 (European Patent No. 2242771) in IgG1 format (G1/11D4; SEQ ID NOs 110 and 111) was used as an isotype/negative control; the mAb$^2$ FS20-22-49AA/4420 (SEQ ID NOs 98 and 97) comprising the anti-OX40 Fcab clone FS20-22-49AA and Fab region of the anti-FITC antibody 4420 (Bedzyk et al., 1989; Bedzyk et al., 1990) was used as a negative control mAb$^2$ for OX40 binding; and anti-CD137 mAb G1/MOR7480.1 (SEQ ID NOs 99 and 101) as a positive control for CD137 binding and ligand blocking activity.

Specifically, 100 nM recombinant human CD137-mFc-Avi protein was incubated for 30 minutes at 37° C. with a 200 nM dilution of each test antibody prepared in PBS. Following incubation, the antibody plus antigen mixtures were added to 105 DO11.10 cells expressing human CD137L and incubated for 30 minutes at 37° C. The cells were washed once in PBS and 100 μl/well of secondary antibody (anti-mouse Fc-488 antibody, Jackson Immuno Research, 115-546-008) diluted 1:1000 in PBS containing 2% BSA was then added and incubated for 30 mins at 4° C. in the dark. The cells were washed once with PBS and resuspended in 100 μl of PBS containing DAPI (Biotium, 40043) at 1 μg/ml. The cells were analysed using a Canto II flow cytometer (BD Bioscience). Dead cells were excluded and the fluorescence in the FITC channel (488 nm/530/30) was measured. The geometric mean fluorescence intensity (GMFI) values were normalised by setting the G1/11D4 and G1/MOR7480.1 control mAbs as 0 and 100% blocking values, respectively. The data was analysed using a one-way ANOVA test and Tukey's multiple comparisons test using GraphPad Prism.

The ligand blocking activities (mean of n=2) of the molecules tested are shown in FIG. 2B and Table 9 as percentages of the ligand blocking activity of the G1/MOR7480.1 positive control antibody, which completely blocked the interaction between CD137 and its ligand. This observation for the G1/MOR7480.1 control is in agreement with previous reports.

A range of blocking activities was observed for the four anti-human CD137 mAb$^2$ clones tested. FS20-22-49AA/FS30-5-37 showed, like the positive control antibody, complete inhibition of the receptor-ligand interaction. All mAb$^2$ clones containing the Fab regions of the anti-CD137 mAbs of the FS30-10 lineage (i.e., FS20-22-49AA/FS30-10-3, FS20-22-49AA/FS30-10-12 and FS20-22-49AA/FS30-10-16) inhibited the interaction between CD137 and CD137L by 46-76% and were therefore considered partial blockers.

In summary, the results of this assay are similar to those of the ELISA-based blocking assay and showed that the panel of anti-CD137 mAbs tested showed a range of ligand blocking abilities from complete to partial blocking activity. Clones FS20-22-49AA/FS30-10-3, FS20-22-49AA/FS30-10-12 and FS20-22-49AA/FS30-10-16 each showed a blocking activity that was different from that of the positive-control anti-CD137 mAb.

TABLE 9

Ligand blocking activity of mAbs/mAb$^2$ tested in cell-based blocking assay

| mAbs/mAb$^2$ | % CD137 ligand blocking activity in cell-based assay |
|---|---|
| G1/11D4 | 0 |
| FS20-22-49AA/4420 | 2 |
| FS20-22-49AA/FS30-10-3 | 65 |
| FS20-22-49AA/FS30-10-12 | 46 |
| FS20-22-49AA/FS30-10-16 | 76 |
| FS20-22-49AA/FS30-5-37 | 105 |
| G1/MOR7480.1 | 100 |

Example 7—Functional Activity of Anti-CD137 mAb$^2$ Clones in Human and Cyno CD137 T Cell Activation Assays The functional activity of the selected FS20-22-49AA/FS30-5-37, FS20-22-49AA/FS30-10-3, FS20-22-49AA/FS30-10-12, FS20-22-49AA/FS30-10-16 and FS20-22-49AA/FS30-35-14 mAb$^2$ clones was tested in a T cell activation assay using DO11.10-hCD137 cells, as described in Example 4. Anti-FITC antibody 4420 in IgG1 format (G1/4420; SEQ ID NO: 96 and 97) was used as an isotype negative control; anti-OX40 mAb G1/11D4 (SEQ ID NO: 110 and 111) and mAb$^2$ clone FS20-22-49AA/4420 (SEQ ID NO: 98 and 97) were used as negative controls; and anti-CD137 antibody MOR7480.1 in both IgG1 (G1/MOR7480.1; SEQ ID NO: 99 and 101) and IgG2 (G2/MOR7480.1; SEQ ID NO: 102 and 101) formats, the IgG2 format being the format in which the antibody has been tested in clinical trials (Gopal et al., 2017; Tolcher et al., 2016), was used as a positive control. Prior to the assay, the mAb and mAb$^2$ molecules were crosslinked with the anti-human CH2 antibody, MK1A6 (see Example 2.4), and in one experiment the activity of non-crosslinked mAb and mAb$^2$ molecules was investigated. Mouse IL-2 production was used as a measure of T cell activation.

When crosslinked, all five selected mAb$^2$ clones showed potent activity in the T cell activation assay, with average EC$_{50}$ values of less than 15 nM and average E$_{max}$ values in the range of about 16000-20000 pg/ml IL-2 (Table 10 and representative graph in FIG. 3A). No activity of the tested mAb$^2$ clones was observed in the absence of crosslinking (representative graph in FIG. 3B). The MOR7480.1 positive control antibody was observed to be active only when crosslinked (EC$_{50}$ of 3.3 nM and E$_{max}$ of 12575 pg/ml for G1/MOR7480.1, and EC$_{50}$ of 2.4 nM and E$_{max}$ of 8547 pg/ml for G2/MOR7480.1). The combination of a lack of activity of the cross-linked anti-OX40 mAb (11D4) and the low background signals observed for non-crosslinked anti-OX40 Fcab-containing mAb$^2$ molecules shows that the results of this assay are a read-out of CD137 activity only, most likely due to the high levels of CD137 receptor expression and non-detectable levels of OX40 receptor expression by the DO11.10 cells (data not shown).

TABLE 10

Activity of mAb$^2$ in the human CD137 T cell activation assay DO11.10-hCD137 T cell Assay

| | Activity of non-crosslinked mAbs/mAb$^2$ (n = 1) | | Activity of crosslinked mAbs/mAb$^2$ (Mean of n = 2) | |
|---|---|---|---|---|
| mAb/mAb$^2$ | EC$_{50}$ (nM) | E$_{max}$ (mIL-2 pg/ml) | EC$_{50}$ (nM) | E$_{max}$ (mIL-2 pg/ml) |
| G1/4420 | N/A | N/A | N/A | N/A |
| G1/11D4 | N/A | N/A | N/A | N/A |
| G1/MOR7480.1 | NM | NM | 3.3 | 12575 |
| G2/MOR7480.1 | N/A | N/A | 2.4 | 8547 |
| FS20-22-49AA/4420 | N/A | N/A | N/A | N/A |
| FS20-22-49AA/FS30-5-37 | N/A | N/A | 13.4 | 18129 |
| FS20-22-49AA/FS30-10-3 | N/A | N/A | 6.1 | 17049 |
| FS20-22-49AA/FS30-10-12 | N/A | N/A | 9.5 | 17183 |
| FS20-22-49AA/FS30-10-16 | N/A | N/A | 4.7 | 16310 |
| FS20-22-49AA/FS30-35-14 | N/A | N/A | 5.1 | 19837 |

N/A: not applicable as low signal did not allow a meaningful EC$_{50}$/E$_{max}$ determination
NM: not measured To determine whether the cyno crossreactivity observed in the binding experiment described in Example 5.1 would translate to functional activity, the mAb$^2$ were also analysed for their ability to activate cyno CD137 in a protocol essentially the same as the human CD137 T cell activation assay but using DO11.10 cells expressing cyno CD137 (DO11.10-cCD137). Prior to the assay, the mAb and mAb$^2$ molecules were crosslinked with the anti-human CH2 antibody, MK1A6. Mouse IL-2 production was used as a measure of T cell activation.

The background and E$_{max}$ activation values were higher in this assay than in the human CD137 DO11.10 activation assay, most likely due to the higher levels of cyno CD137 receptor expressed on the DO11.10 cells. Similar to the MOR7480.1 positive-control antibody, all five selected anti-human CD137 mAb$^2$ clones showed potent activity in the cyno T cell activation assay with average EC$_{50}$ values of 7.5 nM or below and average E$_{max}$ values in the range of about 45000-70000 pg/ml IL-2 (Table 11).

TABLE 11

Activity of mAb$^2$ in the cyno CD137 T cell activation assay DO11.10-cCD137 T cell Assay

| | Activity of crosslinked mAbs/mAb$^2$ (Mean of n = 2) | |
|---|---|---|
| mAb/mAb$^2$ | EC$_{50}$ (nM) | E$_{max}$ (mIL-2 pg/ml) |
| G1/4420 | N/A | N/A |
| G1/11D4 | N/A | N/A |
| G1/MOR7480.1 | 3.0 | 49497 |
| G2/MOR7480.1 | 2.1 | 36981 |
| FS20-22-49AA/4420 | N/A | N/A |
| FS20-22-49AA/FS30-5-37 | 7.5 | 45730 |
| FS20-22-49AA/FS30-10-3 | 5.0 | 49389 |
| FS20-22-49AA/FS30-10-12 | 5.8 | 46895 |
| FS20-22-49AA/FS30-10-16 | 3.7 | 50065 |
| FS20-22-49AA/FS30-35-14 | 6.6 | 69688 |

N/A: not applicable as low signal did not allow a meaningful EC$_{50}$/E$_{max}$ determination
NM: not measured The mAb$^2$ clones which showed the highest average agonistic activity in both the human and cyno CD137 DO11.10 T cell assays (n=2, Tables 10 and 11) were FS20-22-49AA/FS30-10-3, FS20-22-49AA/FS30-10-12, FS20-22-49AA/FS30-10-16 and FS20-22-49AA/FS30-35-14. These all had an $EC_{50}$ value of less than 10 nM and an $E_{max}$ value of greater than 16000 pg/ml IL-2 in the human CD137 T cell activation assay and an $EC_{50}$ of less than 7 nM and an $E_{max}$ value of greater than 46000 pg/ml IL-2 in the cyno CD137 T cell activation assay. These clones were the partial-blocking or non-blocking clones identified in the CD137 ligand blocking assays (Example 6).

SEQUENCE LISTING

In amino acid sequence of the complete heavy chain, variable domain are shown in italics, CDRs according to the IMGT scheme are shown in bold italics, CDRs according to the Kabat scheme to be shown in italics and underlined (therefore any overlapping IMGT and Kabat CDR sequences is shown in bold, italics and underlined), and, where applicable, location of LALA mutation is shown in bold and underlined.

In amino acid sequence of the complete light chain, variable domain to be shown in italics, CDRs according to the IMGT scheme shown in bold italics, and CDRs according to the Kabat scheme are shown in italics and underlined (therefore any overlapping IMGT and Kabat CDR sequences are shown in bold, italics and underlined).

In amino acid sequence of variable domains, CDRs according to the IMGT scheme are shown in bold italics, and CDRs according to the Kabat scheme are shown in italics and underlined (therefore any overlapping IMGT and Kabat CDR sequences will be shown in bold, italics and underlined).

```
Amino acid and cDNA sequences of heavy chain of FS30-5-37 mAb and its
variable domain and amino acid sequence of CDRs
Heavy chain AA (without LALA)
                                                                 SEQ ID NO: 1
EVQLLESGGGLVQPGGSLRLNCAASGFTFSSYAMSWVRQAPGKGLEWVSAISGSGGSTYYADSVKGRFTISRDNSK

NTLYLQMNSLRAEDTAVYYCARSYDKYWGSSIYSGLDYWGQGTLVTVSSASTKGPSVFPLAPSSKSTSGGTAALGCLV

KDYFPEPVTVSWNSGALTSGVHTFPAVLQSSGLYSLSSVVTVPSSSLGTQTYICNVNHKPSNTKVDKKVEPKSCDKTH

TCPPCPAPELLGGPSVFLFPPKPKDTLMISRTPEVTCVVVDVSHEDPEVKFNWYVDGVEVHNAKTKPREEQYNSTYR

VVSVLTVLHQDWLNGKEYKCKVSNKALPAPIEKTISKAKGQPREPQVYTLPPSRDELTKNQVSLTCLVKGFYPSDIAVE

WESNGQPENNYKTTPPVLDSDGSFFLYSKLTVDKSRWQQGNVFSCSVMHEALHNHYTQKSLSLSPG

Heavy chain DNA (without LALA)
                                                                 SEQ ID NO: 2
GAAGTGCAACTGCTGGAGTCCGGTGGTGGTCTGGTACAGCCGGGTGGTTCTCTGCGTCTGAATTGCGCGGCCA

GTGGCTTTACCTTCAGTAGCTATGCCATGAGCTGGGTGCGTCAGGCGCCGGGCAAAGGTCTGGAATGGGTTAG

CGCGATTAGCGGTAGTGGCGGTAGCACGTACTATGCGGATAGCGTGAAAGGCCGTTTTACCATTTCTCGCGAC

AACAGCAAGAACACGCTGTACCTGCAGATGAACTCACTGCGTGCCGAAGATACGGCCGTGTATTACTGTGCGA

GATCTTACGACAAATACTGGGGTTCTTCTATTTACTCTGGCTTGGACTACTGGGGCCAGGGAACCCTGGTCACC

GTCTCGAGTGCTAGCACTAAGGGCCCGTCGGTGTTCCCGCTGGCCCCATCGTCCAAGAGCACATCAGGGGGTA

CCGCCGCCCTGGGCTGCCTTGTGAAGGATTACTTTCCCGAGCCCGTCACAGTGTCCTGGAACAGCGGAGCCCT

GACCTCCGGAGTGCATACTTTCCCGGCTGTGCTTCAGTCCTCTGGCCTGTACTCATTGTCCTCCGTGGTCACCGT

CCCTTCGTCCTCCCTGGGCACCCAGACCTATATCTGTAATGTCAACCATAAGCCCTCGAACACCAAGGTCGACA

AGAAGGTCGAGCCGAAGTCGTGCGACAAGACTCACACTTGCCCGCCTTGCCCAGCCCCGGAACTGCTGGGTG

GTCCTTCGGTGTTCCTCTTCCCGCCCAAGCCGAAGGATACCCTGATGATCTCACGGACCCCCGAAGTGACCTGT

GTGGTGGTGGACGTGTCCCACGAGGACCCGGAAGTGAAATTCAATTGGTACGTGGATGGAGTGGAAGTGCAC

AACGCCAAGACCAAGCCACGGGAAGAACAGTACAACTCTACCTACCGCGTGGTGTCCGTGCTCACTGTGCTGC

ACCAAGACTGGCTGAACGGGAAGGAGTACAAGTGCAAAGTGTCCAACAAGGCGCTGCCTGCCCCAATTGAGA

AAACTATCTCGAAAGCCAAGGGACAGCCTCGAGAGCCTCAAGTGTACACCCTGCCTCCCTCTCGGGACGAGCT

GACCAAGAACCAAGTCTCCCTGACCTGTCTGGTCAAGGGATTCTACCCATCGGATATCGCCGTGGAATGGGAA

AGCAACGGACAGCCCGAGAACAACTACAAGACGACTCCGCCCGTGCTGGATTCCGACGGGAGCTTCTTCTTGT

ACTCCAAGCTGACCGTCGACAAGAGCAGATGGCAGCAGGGAAACGTGTTCTCCTGCTCCGTGATGCATGAGGC

GCTGCACAACCACTACACTCAGAAGAGCTTGTCCCTGTCGCCCGGA
```

-continued

Heavy chain AA (with LALA)
SEQ ID NO: 3

EVQLLESGGGLVQPGGSLRLNCAASGFTFSSYAMSWVRQAPGKGLEWVSAISGSGGSTYYADSVKGRFTISRDNSK

NTLYLQMNSLRAEDTAVYYCARSYDKYWGSSIYSGLDYWGQGTLVTVSSASTKGPSVFPLAPSSKSTSGGTAALGCLV

KDYFPEPVTVSWNSGALTSGVHTFPAVLQSSGLYSLSSVVTVPSSSLGTQTYICNVNHKPSNTKVDKKVEPKSCDKTH

TCPPCPAPEAAGGPSVFLFPPKPKDTLMISRTPEVTCVVVDVSHEDPEVKFNWYVDGVEVHNAKTKPREEQYNSTYR

VVSVLTVLHQDWLNGKEYKCKVSNKALPAPIEKTISKAKGQPREPQVYTLPPSRDELTKNQVSLTCLVKGFYPSDIAVE

WESNGQPENNYKTTPPVLDSDGSFFLYSKLTVDKSRWQQGNVFSCSVMHEALHNHYTQKSLSLSPG

Heavy chain DNA (with LALA)
SEQ ID NO: 4

GAAGTGCAACTGCTGGAGTCCGGTGGTGGTCTGGTACAGCCGGGTGGTTCTCTGCGTCTGAATTGCGCGGCCA

GTGGCTTTACCTTCAGTAGCTATGCCATGAGCTGGGTGCGTCAGGCGCCGGGCAAAGGTCTGGAATGGGTTAG

CGCGATTAGCGGTAGTGGCGGTAGCACGTACTATGCGGATAGCGTGAAAGGCCGTTTTACCATTTCTCGCGAC

AACAGCAAGAACACGCTGTACCTGCAGATGAACTCACTGCGTGCCGAAGATACGGCCGTGTATTACTGTGCGA

GATCTTACGACAAATACTGGGGTTCTTCTATTTACTCTGGCTTGGACTACTGGGGCCAGGGAACCCTGGTCACC

GTCTCGAGTGCTAGCACTAAGGGCCCGTCGGTGTTCCCGCTGGCCCCATCGTCCAAGAGCACATCAGGGGGTA

CCGCCGCCCTGGGCTGCCTTGTGAAGGATTACTTTCCCGAGCCCGTCACAGTGTCCTGGAACAGCGGAGCCCT

GACCTCCGGAGTGCATACTTTCCCGGCTGTGCTTCAGTCCTCTGGCCTGTACTCATTGTCCTCCGTGGTCACCGT

CCCTTCGTCCTCCCTGGGCACCCAGACCTATATCTGTAATGTCAACCATAAGCCCTCGAACACCAAGGTCGACA

AGAAGGTCGAGCCGAAGTCGTGCGACAAGACTCACACTTGCCCGCCTTGCCCAGCCCCGGAAGCTGCCGGTG

GTCCTTCGGTGTTCCTCTTCCCGCCCAAGCCGAAGGATACCCTGATGATCTCACGGACCCCCGAAGTGACCTGT

GTGGTGGTGGACGTGTCCCACGAGGACCCGGAAGTGAAATTCAATTGGTACGTGGATGGAGTGGAAGTGCAC

AACGCCAAGACCAAGCCACGGGAAGAACAGTACAACTCTACCTACCGCGTGGTGTCCGTGCTCACTGTGCTGC

ACCAAGACTGGCTGAACGGGAAGGAGTACAAGTGCAAAGTGTCCAACAAGGCGCTGCCTGCCCCAATTGAGA

AAACTATCTCGAAAGCCAAGGGACAGCCTCGAGAGCCTCAAGTGTACACCCTGCCTCCCTCTCGGGACGAGCT

GACCAAGAACCAAGTCTCCCTGACCTGTCTGGTCAAGGGATTCTACCCATCGGATATCGCCGTGGAATGGGAA

AGCAACGGACAGCCCGAGAACAACTACAAGACGACTCCGCCCGTGCTGGATTCCGACGGGAGCTTCTTCTTGT

ACTCCAAGCTGACCGTCGACAAGAGCAGATGGCAGCAGGGAAACGTGTTCTCCTGCTCCGTGATGCATGAGGC

GCTGCACAACCACTACACTCAGAAGAGCTTGTCCCTGTCGCCCGGA

Variable domain AA
SEQ ID NO: 5

EVQLLESGGGLVQPGGSLRLNCAASGFTFSSYAMSWVRQAPGKGLEWVSAISGSGGSTYYADSVKGRFTISRDNSK

NTLYLQMNSLRAEDTAVYYCARSYDKYWGSSIYSGLDYWGQGTLVTVSS

Variable domain DNA
SEQ ID NO: 6

GAAGTGCAACTGCTGGAGTCCGGTGGTGGTCTGGTACAGCCGGGTGGTTCTCTGCGTCTGAATTGCGCGGCCA

GTGGCTTTACCTTCAGTAGCTATGCCATGAGCTGGGTGCGTCAGGCGCCGGGCAAAGGTCTGGAATGGGTTAG

CGCGATTAGCGGTAGTGGCGGTAGCACGTACTATGCGGATAGCGTGAAAGGCCGTTTTACCATTTCTCGCGAC

AACAGCAAGAACACGCTGTACCTGCAGATGAACTCACTGCGTGCCGAAGATACGGCCGTGTATTACTGTGCGA

GATCTTACGACAAATACTGGGGTTCTTCTATTTACTCTGGCTTGGACTACTGGGGCCAGGGAACCCTGGTCACC

GTCTCGAGT

SEQ ID NO: 7        CDR1 (AA) (IMGT)         GFTFSSYA

SEQ ID NO: 8        CDR1 (AA) (Kabat)        SYAMS

SEQ ID NO: 9        CDR2 (AA) (IMGT)         ISGSGGST

-continued

```
SEQ ID NO: 10      CDR2 (AA) Kabat)       AISGSGGSTYYADSVKG

SEQ ID NO: 11      CDR3 (AA) (IMGT)       ARSYDKYWGSSIYSGLDY

SEQ ID NO: 12      CDR3 (AA) (Kabat)      SYDKYWGSSIYSGLDY
```

Amino acid and cDNA sequences of light chain of FS30-5-37 mAb and its variable domain and amino acid sequence of CDRs
Light chain AA

SEQ ID NO: 13

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQYYSYYPVTFGQGTKVEIK*RTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTKSFNRGEC

Light chain DNA

SEQ ID NO: 14

```
GAAATTGTGCTGACCCAGTCTCCGGGCACGTTATCTCTGAGCCCTGGTGAGCGCGCCACTCTGTCATGCCGGG

CTTCTCAAAGTGTTAGCAGTAGCTACCTGGCGTGGTATCAGCAAAAACCGGGCCAGGCCCCGCGTCTGCTGATT

TACGGTGCATCCAGCCGTGCCACCGGCATTCCAGATCGTTTTTCCGGTAGTGGTTCTGGGACGGACTTCACTCT

GACAATCTCACGCCTGGAACCGGAGGATTTTGCGGTGTATTACTGCCAGCAATATTATTCTTATTATCCTGTCAC

GTTCGGCCAAGGGACCAAGGTGGAAATCAAACGTACTGTGGCCGCTCCTAGCGTGTTCATTTTTCCGCCATCCG

ACGAGCAGCTCAAGTCCGGCACCGCCTCCGTGGTCTGCCTGCTCAACAACTTCTACCCTCGCGAAGCTAAGGTC

CAGTGGAAGGTCGACAATGCCCTGCAGTCCGGAAACTCGCAGGAAAGCGTGACTGAACAGGACTCCAAGGAC

TCCACCTATTCACTGTCCTCGACTCTGACCCTGAGCAAGGCGGATTACGAAAAGCACAAAGTGTACGCATGCGA

AGTGACCCACCAGGGTCTTTCGTCCCCCGTGACCAAGAGCTTCAACAGAGGAGAGTGT
```

Variable domain AA

SEQ ID NO: 15

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQYYSYYPVTFGQGTKVEIK*

Variable domain DNA

SEQ ID NO: 16

```
GAAATTGTGCTGACCCAGTCTCCGGGCACGTTATCTCTGAGCCCTGGTGAGCGCGCCACTCTGTCATGCCGGG

CTTCTCAAAGTGTTAGCAGTAGCTACCTGGCGTGGTATCAGCAAAAACCGGGCCAGGCCCCGCGTCTGCTGATT

TACGGTGCATCCAGCCGTGCCACCGGCATTCCAGATCGTTTTTCCGGTAGTGGTTCTGGGACGGACTTCACTCT

GACAATCTCACGCCTGGAACCGGAGGATTTTGCGGTGTATTACTGCCAGCAATATTATTCTTATTATCCTGTCAC

GTTCGGCCAAGGGACCAAGGTGGAAATCAAA
```

```
SEQ ID NO: 17      CDR1 (AA) (IMGT)       QSVSSSY

SEQ ID NO: 18      CDR1 (AA) (Kabat)      RASQSVSSSYLA

SEQ ID NO: 19      CDR2 (AA) (IMGT)       GAS

SEQ ID NO: 20      CDR2 (AA) (Kabat)      GASSRAT

SEQ ID NO: 21      CDR3 (AA) (IMGT)       QQYYSYYPVT

SEQ ID NO: 21      CDR3 (AA) (Kabat)      QQYYSYYPVT
```

Amino acid and cDNA sequences of heavy chain of FS30-10-3 mAb and its variable domain and amino acid sequence of CDRs
Heavy chain AA (without LALA)

SEQ ID NO: 24

*EVQLLESGGGLVQPGGSLRLSCAASGFTFSSYDMSWVRQAPGKGLEWVSDIDPTGSKTDYADSVKGRFTISRDNSK*

*NTLYLQMNSLRAEDTAVYYCARDLNVYGFDYWGQGTLVTVSS*ASTKGPSVFPLAPSSKSTSGGTAALGCLVKDYFPE

PVTVSWNSGALTSGVHTFPAVLQSSGLYSLSSVVTVPSSSLGTQTYICNVNHKPSNTKVDKKVEPKSCDKTHTCPPCP

APELLGGPSVFLFPPKPKDTLMISRTPEVTCVVVDVSHEDPEVKFNWYVDGVEVHNAKTKPREEQYNSTYRVVSVLT

VLHQDWLNGKEYKCKVSNKALPAPIEKTISKAKGQPREPQVYTLPPSRDELTKNQVSLTCLVKGFYPSDIAVEWESNG

QPENNYKTTPPVLDSDGSFFLYSKLTVDKSRWQQGNVFSCSVMHEALHNHYTQKSLSLSPG

-continued

Heavy chain DNA (without LALA)
SEQ ID NO: 25
GAAGTGCAACTGCTGGAGTCCGGTGGTGGTCTGGTACAGCCGGGTGGTTCTCTGCGTCTGAGTTGCGCGGCC

AGTGGCTTTACCTTCAGTAGTTACGATATGAGCTGGGTGCGTCAGGCTCCGGGCAAAGGTCTGGAATGGGTTA

GCGATATTGATCCGACTGGTAGCAAGACCGACTATGCGGATAGCGTGAAAGGCCGTTTTACCATTTCTCGCGAC

AACAGCAAGAACACGCTGTACCTGCAGATGAACTCACTGCGTGCCGAAGATACGGCCGTGTATTACTGTGCGA

GAGACCTCAATGTGTACGGGTTCGACTACTGGGGCCAGGGAACCCTGGTCACCGTCTCGAGTGCTAGCACTAA

GGGCCCGTCGGTGTTCCCGCTGGCCCCATCGTCCAAGAGCACATCAGGGGGTACCGCCGCCCTGGGCTGCCTT

GTGAAGGATTACTTTCCCGAGCCCGTCACAGTGTCCTGGAACAGCGGAGCCCTGACCTCCGGAGTGCATACTTT

CCCGGCTGTGCTTCAGTCCTCTGGCCTGTACTCATTGTCCTCCGTGGTCACCGTCCCTTCGTCCTCCCTGGGCAC

CCAGACCTATATCTGTAATGTCAACCATAAGCCCTCGAACACCAAGGTCGACAAGAAGGTCGAGCCGAAGTCG

TGCGACAAGACTCACACTTGCCCGCCTTGCCCAGCCCCGGAACTGCTGGGTGGTCCTTCGGTGTTCCTCTTCCC

GCCCAAGCCGAAGGATACCCTGATGATCTCACGGACCCCCGAAGTGACCTGTGTGGTGGTGGACGTGTCCCAC

GAGGACCCGGAAGTGAAATTCAATTGGTACGTGGATGGAGTGGAAGTGCACAACGCCAAGACCAAGCCACGG

GAAGAACAGTACAACTCTACCTACCGCGTGGTGTCCGTGCTCACTGTGCTGCACCAAGACTGGCTGAACGGGA

AGGAGTACAAGTGCAAAGTGTCCAACAAGGCGCTGCCTGCCCCAATTGAGAAAACTATCTCGAAAGCCAAGGG

ACAGCCTCGAGAGCCTCAAGTGTACACCCTGCCTCCCTCTCGGGACGAGCTGACCAAGAACCAAGTCTCCCTGA

CCTGTCTGGTCAAGGGATTCTACCCATCGGATATCGCCGTGGAATGGGAAAGCAACGGACAGCCCGAGAACAA

CTACAAGACGACTCCGCCCGTGCTGGATTCCGACGGGAGCTTCTTCTTGTACTCCAAGCTGACCGTCGACAAGA

GCAGATGGCAGCAGGGAAACGTGTTCTCCTGCTCCGTGATGCATGAGGCGCTGCACAACCACTACACTCAGAA

GAGCTTGTCCCTGTCGCCCGGA

Heavy chain AA (with LALA)
SEQ ID NO: 26
*EVQLLESGGGLVQPGGSLRLSCAASGFTFSSYDMSWVRQAPGKGLEWVSDIDPTGSKTDYADSVKGRFTISRDNSK*
*NTLYLQMNSLRAEDTAVYYCARDLNVYGFDYWGQGTLVTVSS*ASTKGPSVFPLAPSSKSTSGGTAALGCLVKDYFPE
PVTVSWNSGALTSGVHTFPAVLQSSGLYSLSSVVTVPSSSLGTQTYICNVNHKPSNTKVDKKVEPKSCDKTHTCPPCP
APEAAGGPSVFLFPPKPKDTLMISRTPEVTCVVVDVSHEDPEVKFNWYVDGVEVHNAKTKPREEQYNSTYRVVSVLT
VLHQDWLNGKEYKCKVSNKALPAPIEKTISKAKGQPREPQVYTLPPSRDELTKNQVSLTCLVKGFYPSDIAVEWESNG
QPENNYKTTPPVLDSDGSFFLYSKLTVDKSRWQQGNVFSCSVMHEALHNHYTQKSLSLSPG Heavy chain DNA (with LALA)
SEQ ID NO: 27
GAAGTGCAACTGCTGGAGTCCGGTGGTGGTCTGGTACAGCCGGGTGGTTCTCTGCGTCTGAGTTGCGCGGCC

AGTGGCTTTACCTTCAGTAGTTACGATATGAGCTGGGTGCGTCAGGCTCCGGGCAAAGGTCTGGAATGGGTTA

GCGATATTGATCCGACTGGTAGCAAGACCGACTATGCGGATAGCGTGAAAGGCCGTTTTACCATTTCTCGCGAC

AACAGCAAGAACACGCTGTACCTGCAGATGAACTCACTGCGTGCCGAAGATACGGCCGTGTATTACTGTGCGA

GAGACCTCAATGTGTACGGGTTCGACTACTGGGGCCAGGGAACCCTGGTCACCGTCTCGAGTGCTAGCACTAA

GGGCCCGTCGGTGTTCCCGCTGGCCCCATCGTCCAAGAGCACATCAGGGGGTACCGCCGCCCTGGGCTGCCTT

GTGAAGGATTACTTTCCCGAGCCCGTCACAGTGTCCTGGAACAGCGGAGCCCTGACCTCCGGAGTGCATACTTT

CCCGGCTGTGCTTCAGTCCTCTGGCCTGTACTCATTGTCCTCCGTGGTCACCGTCCCTTCGTCCTCCCTGGGCAC

CCAGACCTATATCTGTAATGTCAACCATAAGCCCTCGAACACCAAGGTCGACAAGAAGGTCGAGCCGAAGTCG

TGCGACAAGACTCACACTTGCCCGCCTTGCCCAGCCCCGGAAGCTGCCGGTGGTCCTTCGGTGTTCCTCTTCCC

GCCCAAGCCGAAGGATACCCTGATGATCTCACGGACCCCCGAAGTGACCTGTGTGGTGGTGGACGTGTCCCAC

GAGGACCCGGAAGTGAAATTCAATTGGTACGTGGATGGAGTGGAAGTGCACAACGCCAAGACCAAGCCACGG

-continued

```
GAAGAACAGTACAACTCTACCTACCGCGTGGTGTCCGTGCTCACTGTGCTGCACCAAGACTGGCTGAACGGGA
AGGAGTACAAGTGCAAAGTGTCCAACAAGGCGCTGCCTGCCCCAATTGAGAAAACTATCTCGAAAGCCAAGGG
ACAGCCTCGAGAGCCTCAAGTGTACACCCTGCCTCCCTCTCGGGACGAGCTGACCAAGAACCAAGTCTCCCTGA
CCTGTCTGGTCAAGGGATTCTACCCATCGGATATCGCCGTGGAATGGGAAAGCAACGGACAGCCCGAGAACAA
CTACAAGACGACTCCGCCCGTGCTGGATTCCGACGGGAGCTTCTTCTTGTACTCCAAGCTGACCGTCGACAAGA
GCAGATGGCAGCAGGGAAACGTGTTCTCCTGCTCCGTGATGCATGAGGCGCTGCACAACCACTACACTCAGAA
GAGCTTGTCCCTGTCGCCCGGA
```

Variable domain AA

SEQ ID NO: 28

*EVQLLESGGGLVQPGGSLRLSCAASGFTFSSYDMSWVRQAPGKGLEWVSDIDPTGSKTDYADSVKGRFTISRDNSK*

*NTLYLQMNSLRAEDTAVYYCARDLNVYGFDYWGQGTLVTVSS*

Variable domain DNA

SEQ ID NO: 29

```
GAAGTGCAACTGCTGGAGTCCGGTGGTGGTCTGGTACAGCCGGGTGGTTCTCTGCGTCTGAGTTGCGCGGCC
AGTGGCTTTACCTTCAGTAGTTACGATATGAGCTGGGTGCGTCAGGCTCCGGGCAAAGGTCTGGAATGGGTTA
GCGATATTGATCCGACTGGTAGCAAGACCGACTATGCGGATAGCGTGAAAGGCCGTTTTACCATTTCTCGCGAC
AACAGCAAGAACACGCTGTACCTGCAGATGAACTCACTGCGTGCCGAAGATACGGCCGTGTATTACTGTGCGA
GAGACCTCAATGTATACGGGTTCGACTACTGGGGCCAGGGAACCCTGGTCACCGTCTCGAGT
```

| SEQ ID NO: 30 | CDR1 | (AA) | (IMGT)  | *GFTFSSYD* |
| --- | --- | --- | --- | --- |
| SEQ ID NO: 31 | CDR1 | (AA) | (Kabat) | *SYDMS* |
| SEQ ID NO: 32 | CDR2 | (AA) | (IMGT)  | *IDPTGSKT* |
| SEQ ID NO: 33 | CDR2 | (AA) | (Kabat) | *DIDPTGSKTDYADSVKG* |
| SEQ ID NO: 34 | CDR3 | (AA) | (IMGT)  | *ARDLNVYGFDY* |
| SEQ ID NO: 35 | CDR3 | (AA) | (Kabat) | *DLNVYGFDY* |

Amino acid and cDNA sequences of light chain of FS30-10-3 mAb and its variable
domain and amino acid sequence of CDRs
Light chain AA

SEQ ID NO: 46

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQSYSYPVTFGQGTKVEIKRTVAAPSVFIFPPSDEQLKSGTASVVCLLNNFYPREAKVQWKVDNALQSG*

NSQESVTEQDSKDSTYSLSSTLTLSKADYEKHKVYACEVTHQGLSSPVTKSFNRGEC

Light chain DNA

SEQ ID NO: 47

```
GAAATTGTGCTGACCCAGTCTCCGGGCACGTTATCTCTGAGCCCTGGTGAGCGCGCCACTCTGTCATGCCGGG
CTTCTCAAAGTGTTAGCAGTAGCTACCTGGCGTGGTATCAGCAAAAACCGGGCCAGGCCCCGCGTCTGCTGATT
TACGGTGCATCCAGCCGTGCCACCGGCATTCCAGATCGTTTTTCCGGTAGTGGTTCTGGGACGGACTTCACTCT
GACAATCTCACGCCTGGAACCGGAGGATTTTGCGGTGTATTACTGCCAGCAATCTTATTCTTATCCTGTCACGTT
CGGCCAAGGGACCAAGGTGGAAATCAAACGTACTGTGGCCGCTCCTAGCGTGTTCATTTTTCCGCCATCCGAC
GAGCAGCTCAAGTCCGGCACCGCCTCCGTGGTCTGCCTGCTCAACAACTTCTACCCTCGCGAAGCTAAGGTCCA
GTGGAAGGTCGACAATGCCCTGCAGTCCGGAAACTCGCAGGAAAGCGTGACTGAACAGGACTCCAAGGACTC
CACCTATTCACTGTCCTCGACTCTGACCCTGAGCAAGGCGGATTACGAAAAGCACAAAGTGTACGCATGCGAA
GTGACCCACCAGGGTCTTTCGTCCCCCGTGACCAAGAGCTTCAACAGAGGAGAGTGT
```

Variable domain AA

SEQ ID NO: 48

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQSYSYPVTFGQGTKVEIK*

-continued

Variable domain DNA

SEQ ID NO: 49

GAAATTGTGCTGACCCAGTCTCCGGGCACGTTATCTCTGAGCCCTGGTGAGCGCGCCACTCTGTCATGCCGGG

CTTCTCAAAGTGTTAGCAGTAGCTACCTGGCGTGGTATCAGCAAAAACCGGGCCAGGCCCCGCGTCTGCTGATT

TACGGTGCATCCAGCCGTGCCACCGGCATTCCAGATCGTTTTTCCGGTAGTGGTTCTGGGACGGACTTCACTCT

GACAATCTCACGCCTGGAACCGGAGGATTTTGCGGTGTATTACTGCCAGCAATCTTATTCTTATCCTGTCACGTT

CGGCCAAGGGACCAAGGTGGAAATCAAA

| | | | |
|---|---|---|---|
| SEQ ID NO: 17 | CDR1 (AA) | (IMGT) | QSVSSSY |
| SEQ ID NO: 18 | CDR1 (AA) | (Kabat) | RASQSVSSSYLA |
| SEQ ID NO: 19 | CDR2 (AA) | (IMGT) | GAS |
| SEQ ID NO: 20 | CDR2 (AA) | (Kabat) | GASSRAT |
| SEQ ID NO: 22 | CDR3 (AA) | (IMGT) | QQSYSYPVT |
| SEQ ID NO: 22 | CDR3 (AA) | (Kabat) | QQSYSYPVT |

Amino acid and cDNA sequences of heavy chain of FS30-10-12 mAb and its variable domain and amino acid sequence of CDRs (project files)
Heavy chain AA (without LALA)

SEQ ID NO: 40

*EVQLLESGGGLVQPGGSLRLSCAASGFTFSSYDMSWVRQAPGKGLEWVSDIDPTGSKTDYADSVKGRFTISRDNSK*
*NTLYLQMNSLRAEDTAVYYCARDLTVYGFDYWGQGTLVTVSS*ASTKGPSVFPLAPSSKSTSGGTAALGCLVKDYFPE
PVTVSWNSGALTSGVHTFPAVLQSSGLYSLSSVVTVPSSSLGTQTYICNVNHKPSNTKVDKKVEPKSCDKTHTCPPCP
APELLGGPSVFLFPPKPKDTLMISRTPEVTCVVVDVSHEDPEVKFNWYVDGVEVHNAKTKPREEQYNSTYRVVSVLT
VLHQDWLNGKEYKCKVSNKALPAPIEKTISKAKGQPREPQVYTLPPSRDELTKNQVSLTCLVKGFYPSDIAVEWESNG
QPENNYKTTPPVLDSDGSFFLYSKLTVDKSRWQQGNVFSCSVMHEALHNHYTQKSLSLSPG

Heavy chain DNA (without LALA)

SEQ ID NO: 41

GAAGTGCAACTGCTGGAGTCCGGTGGTGGTCTGGTACAGCCGGGTGGTTCTCTGCGTCTGAGTTGCGCGGCC

AGTGGCTTTACCTTCAGTAGTTACGATATGAGCTGGGTGCGTCAGGCTCCGGGCAAAGGTCTGGAATGGGTTA

GCGATATTGATCCGACTGGTAGCAAGACCGACTATGCGGATAGCGTGAAAGGCCGTTTTACCATTTCTCGCGAC

AACAGCAAGAACACGCTGTACCTGCAGATGAACTCACTGCGTGCCGAAGATACGGCCGTGTATTACTGTGCGA

GAGACCTCACGGTGTACGGGTTCGACTACTGGGGCCAGGGAACCCTGGTCACCGTCTCGAGTGCTAGCACTAA

GGGCCCGTCGGTGTTCCCGCTGGCCCCATCGTCCAAGAGCACATCAGGGGGTACCGCCGCCCTGGGCTGCCTT

GTGAAGGATTACTTTCCCGAGCCCGTCACAGTGTCCTGGAACAGCGGAGCCCTGACCTCCGGAGTGCATACTTT

CCCGGCTGTGCTTCAGTCCTCTGGCCTGTACTCATTGTCCTCCGTGGTCACCGTCCCTTCGTCCTCCCTGGGCAC

CCAGACCTATATCTGTAATGTCAACCATAAGCCCTCGAACACCAAGGTCGACAAGAAGGTCGAGCCGAAGTCG

TGCGACAAGACTCACACTTGCCCGCCTTGCCCAGCCCCGGAACTGCTGGGTGGTCCTTCGGTGTTCCTCTTCCC

GCCCAAGCCGAAGGATACCCTGATGATCTCACGGACCCCCGAAGTGACCTGTGTGGTGGTGGACGTGTCCCAC

GAGGACCCGGAAGTGAAATTCAATTGGTACGTGGATGGAGTGGAAGTGCACAACGCCAAGACCAAGCCACGG

GAAGAACAGTACAACTCTACCTACCGCGTGGTGTCCGTGCTCACTGTGCTGCACCAAGACTGGCTGAACGGGA

AGGAGTACAAGTGCAAAGTGTCCAACAAGGCGCTGCCTGCCCCAATTGAGAAAACTATCTCGAAAGCCAAGGG

ACAGCCTCGAGAGCCTCAAGTGTACACCCTGCCTCCCTCGGGACGAGCTGACCAAGAACCAAGTCTCCCTGA

CCTGTCTGGTCAAGGGATTCTACCCATCGGATATCGCCGTGGAATGGGAAAGCAACGGACAGCCCGAGAACAA

CTACAAGACGACTCCGCCCGTGCTGGATTCCGACGGGAGCTTCTTCTTGTACTCCAAGCTGACCGTCGACAAGA

GCAGATGGCAGCAGGGAAACGTGTTCTCCTGCTCCGTGATGCATGAGGCGCTGCACAACCACTACACTCAGAA

GAGCTTGTCCCTGTCGCCCGGA

-continued

Heavy chain AA (with LALA)  
SEQ ID NO: 42

EVQLLESGGGLVQPGGSLRLSCAASGFTFSSYDMSWVRQAPGKGLEWVSDIDPTGSKTDYADSVKGRFTISRDNSK
NTLYLQMNSLRAEDTAVYYCARDLTVYGFDYWGQGTLVTVSSASTKGPSVFPLAPSSKSTSGGTAALGCLVKDYFPE
PVTVSWNSGALTSGVHTFPAVLQSSGLYSLSSVVTVPSSSLGTQTYICNVNHKPSNTKVDKKVEPKSCDKTHTCPPCP
APEAAGGPSVFLFPPKPKDTLMISRTPEVTCVVVDVSHEDPEVKFNWYVDGVEVHNAKTKPREEQYNSTYRVVSVLT
VLHQDWLNGKEYKCKVSNKALPAPIEKTISKAKGQPREPQVYTLPPSRDELTKNQVSLTCLVKGFYPSDIAVEWESNG
QPENNYKTTPPVLDSDGSFFLYSKLTVDKSRWQQGNVFSCSVMHEALHNHYTQKSLSLSPG

Heavy chain DNA (with LALA)  
SEQ ID NO: 43

GAAGTGCAACTGCTGGAGTCCGGTGGTGGTCTGGTACAGCCGGGTGGTTCTCTGCGTCTGAGTTGCGCGGCC
AGTGGCTTTACCTTCAGTAGTTACGATATGAGCTGGGTGCGTCAGGCTCCGGGCAAAGGTCTGGAATGGGTTA
GCGATATTGATCCGACTGGTAGCAAGACCGACTATGCGGATAGCGTGAAAGGCCGTTTTACCATTTCTCGCGAC
AACAGCAAGAACACGCTGTACCTGCAGATGAACTCACTGCGTGCCGAAGATACGGCCGTGTATTACTGTGCGA
GAGACCTCACGGTGTACGGGTTCGACTACTGGGGCCAGGGAACCCTGGTCACCGTCTCGAGTGCTAGCACTAA
GGGCCCGTCGGTGTTCCCGCTGGCCCCATCGTCCAAGAGCACATCAGGGGGTACCGCCGCCCTGGGCTGCCTT
GTGAAGGATTACTTTCCCGAGCCCGTCACAGTGTCCTGGAACAGCGGAGCCCTGACCTCCGGAGTGCATACTTT
CCCGGCTGTGCTTCAGTCCTCTGGCCTGTACTCATTGTCCTCCGTGGTCACCGTCCCTTCGTCCTCCCTGGGCAC
CCAGACCTATATCTGTAATGTCAACCATAAGCCCTCGAACACCAAGGTCGACAAGAAGGTCGAGCCGAAGTCG
TGCGACAAGACTCACACTTGCCCGCCTTGCCCAGCCCCGGAAGCTGCCGGTGGTCCTTCGGTGTTCCTCTTCCC
GCCCAAGCCGAAGGATACCCTGATGATCTCACGGACCCCCGAAGTGACCTGTGTGGTGGTGGACGTGTCCCAC
GAGGACCCCGAAGTGAAATTCAATTGGTACGTGGATGGAGTGGAAGTGCACAACGCCAAGACCAAGCCACGG
GAAGAACAGTACAACTCTACCTACCGCGTGGTGTCCGTGCTCACTGTGCTGCACCAAGACTGGCTGAACGGGA
AGGAGTACAAGTGCAAAGTGTCCAACAAGGCGCTGCCTGCCCCAATTGAGAAAACTATCTCGAAAGCCAAGGG
ACAGCCTCGAGAGCCTCAAGTGTACACCCTGCCTCCCTCTCGGGACGAGCTGACCAAGAACCAAGTCTCCCTGA
CCTGTCTGGTCAAGGGATTCTACCCATCGGATATCGCCGTGGAATGGGAAAGCAACGGACAGCCCGAGAACAA
CTACAAGACGACTCCGCCCGTGCTGGATTCCGACGGGAGCTTCTTCTTGTACTCCAAGCTGACCGTCGACAAGA
GCAGATGGCAGCAGGGAAACGTGTTCTCCTGCTCCGTGATGCATGAGGCGCTGCACAACCACTACACTCAGAA
GAGCTTGTCCCTGTCGCCCGGA

Variable domain AA  
SEQ ID NO: 44

EVQLLESGGGLVQPGGSLRLSCAASGFTFSSYDMSWVRQAPGKGLEWVSDIDPTGSKTDYADSVKGRFTISRDNSK
NTLYLQMNSLRAEDTAVYYCARDLTVYGFDYWGQGTLVTVSS

Variable domain DNA  
SEQ ID NO: 45

GAAGTGCAACTGCTGGAGTCCGGTGGTGGTCTGGTACAGCCGGGTGGTTCTCTGCGTCTGAGTTGCGCGGCC
AGTGGCTTTACCTTCAGTAGTTACGATATGAGCTGGGTGCGTCAGGCTCCGGGCAAAGGTCTGGAATGGGTTA
GCGATATTGATCCGACTGGTAGCAAGACCGACTATGCGGATAGCGTGAAAGGCCGTTTTACCATTTCTCGCGAC
AACAGCAAGAACACGCTGTACCTGCAGATGAACTCACTGCGTGCCGAAGATACGGCCGTGTATTACTGTGCGA
GAGACCTCACGGTGTACGGGTTCGACTACTGGGGCCAGGGAACCCTGGTCACCGTCTCGAGT

| SEQ ID NO: 30 | CDR1 (AA) (IMGT) | GFTFSSYD |
|---|---|---|
| SEQ ID NO: 31 | CDR1 (AA) (Kabat) | SYDMS |
| SEQ ID NO: 32 | CDR2 (AA) (IMGT) | IDPTGSKT |
| SEQ ID NO: 33 | CDR2 (AA) Kabat) | DIDPTGSKTDYADSVKG |

| | | | |
|---|---|---|---|
| SEQ ID NO: 36 | CDR3 (AA) | (IMGT) | ARDLTVYGFDY |
| SEQ ID NO: 37 | CDR3 (AA) | (Kabat) | DLTVYGFDY |

Amino acid and cDNA sequences of light chain of FS30-10-16 mAb and its variable domain and amino acid sequence of CDRs
Light chain AA

SEQ ID NO: 46

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQSYSYPVTFGQGTKVEIKRTVAAPSVFIFPPSDEQLKSGTASVVCLLNNFYPREAKVQWKVDNALQSG*

*NSQESVTEQDSKDSTYSLSSTLTLSKADYEKHKVYACEVTHQGLSSPVTKSFNRGEC*

Light chain DNA

SEQ ID NO: 47

GAAATTGTGCTGACCCAGTCTCCGGGCACGTTATCTCTGAGCCCTGGTGAGCGCGCCACTCTGTCATGCCGGG

CTTCTCAAAGTGTTAGCAGTAGCTACCTGGCGTGGTATCAGCAAAAACCGGGCCAGGCCCCGCGTCTGCTGATT

TACGGTGCATCCAGCCGTGCCACCGGCATTCCAGATCGTTTTTCCGGTAGTGGTTCTGGGACGGACTTCACTCT

GACAATCTCACGCCTGGAACCGGAGGATTTTGCGGTGTATTACTGCCAGCAATCTTATTCTTATCCTGTCACGTT

CGGCCAAGGGACCAAGGTGGAAATCAAACGTACTGTGGCCGCTCCTAGCGTGTTCATTTTTCCGCCATCCGAC

GAGCAGCTCAAGTCCGGCACCGCCTCCGTGGTCTGCCTGCTCAACAACTTCTACCCTCGCGAAGCTAAGGTCCA

GTGGAAGGTCGACAATGCCCTGCAGTCCGGAAACTCGCAGGAAAGCGTGACTGAACAGGACTCCAAGGACTC

CACCTATTCACTGTCCTCGACTCTGACCCTGAGCAAGGCGGATTACGAAAAGCACAAAGTGTACGCATGCGAA

GTGACCCACCAGGGTCTTTCGTCCCCCGTGACCAAGAGCTTCAACAGAGGAGAGTGT

Variable domain AA

SEQ ID NO: 48

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQSYSYPVTFGQGTKVEIK*

Variable domain DNA

SEQ ID NO: 49

GAAATTGTGCTGACCCAGTCTCCGGGCACGTTATCTCTGAGCCCTGGTGAGCGCGCCACTCTGTCATGCCGGG

CTTCTCAAAGTGTTAGCAGTAGCTACCTGGCGTGGTATCAGCAAAAACCGGGCCAGGCCCCGCGTCTGCTGATT

TACGGTGCATCCAGCCGTGCCACCGGCATTCCAGATCGTTTTTCCGGTAGTGGTTCTGGGACGGACTTCACTCT

GACAATCTCACGCCTGGAACCGGAGGATTTTGCGGTGTATTACTGCCAGCAATCTTATTCTTATCCTGTCACGTT

CGGCCAAGGGACCAAGGTGGAAATCAAA

| | | | |
|---|---|---|---|
| SEQ ID NO: 17 | CDR1 (AA) | (IMGT) | QSVSSSY |
| SEQ ID NO: 18 | CDR1 (AA) | (Kabat) | RASQSVSSSYLA |
| SEQ ID NO: 19 | CDR2 (AA) | (IMGT) | GAS |
| SEQ ID NO: 20 | CDR2 (AA) | (Kabat) | GASSRAT |
| SEQ ID NO: 22 | CDR3 (AA) | (IMGT) | QQSYSYPVT |
| SEQ ID NO: 22 | CDR3 (AA) | (Kabat) | QQSYSYPVT |

Amino acid and cDNA sequences of heavy chain of FS30-10-16 mAb and its variable domain and amino acid sequence of CDRs
Heavy chain AA (without LALA)

SEQ ID NO: 50

*EVQLLESGGGLVQPGGSLRLSCAASGFTFSSYDMSWVRQAPGKGLEWVSDIDPTGSKTDYADSVKGRFTISRDNSK*

*NTLYLQMNSLRAEDTAVYYCARDLLVYGFDYWGQGTLVTVSSASTKGPSVFPLAPSSKSTSGGTAALGCLVKDYFPEP*

VTVSWNSGALTSGVHTFPAVLQSSGLYSLSSVVTVPSSSLGTQTYICNVNHKPSNTKVDKKVEPKSCDKTHTCPPCPA

PELLGGPSVFLFPPKPKDTLMISRTPEVTCVVVDVSHEDPEVKFNWYVDGVEVHNAKTKPREEQYNSTYRVVSVLTVL

HQDWLNGKEYKCKVSNKALPAPIEKTISKAKGQPREPQVYTLPPSRDELTKNQVSLTCLVKGFYPSDIAVEWESNGQ

PENNYKTTPPVLDSDGSFFLYSKLTVDKSRWQQGNVFSCSVMHEALHNHYTQKSLSLSPG

Heavy chain DNA (without LALA)

SEQ ID NO: 51

GAAGTGCAACTGCTGGAGTCCGGTGGTGGTCTGGTACAGCCGGGTGGTTCTCTGCGTCTGAGTTGCGCGGCC

AGTGGCTTTACCTTCAGTAGTTACGATATGAGCTGGGTGCGTCAGGCTCCGGGCAAAGGTCTGGAATGGGTTA

GCGATATTGATCCGACTGGTAGCAAGACCGACTATGCGGATAGCGTGAAAGGCCGTTTTACCATTTCTCGCGAC

AACAGCAAGAACACGCTGTACCTGCAGATGAACTCACTGCGTGCCGAAGATACGGCCGTGTATTACTGTGCGA

GAGACCTCTTGGTGTACGGGTTCGACTACTGGGGCCAGGGAACCCTGGTCACCGTCTCGAGTGCTAGCACTAA

GGGCCCGTCGGTGTTCCCGCTGGCCCCATCGTCCAAGAGCACATCAGGGGGTACCGCCGCCCTGGGCTGCCTT

GTGAAGGATTACTTTCCCGAGCCCGTCACAGTGTCCTGGAACAGCGGAGCCCTGACCTCCGGAGTGCATACTTT

CCCGGCTGTGCTTCAGTCCTCTGGCCTGTACTCATTGTCCTCCGTGGTCACCGTCCCTTCGTCCTCCCTGGGCAC

CCAGACCTATATCTGTAATGTCAACCATAAGCCCTCGAACACCAAGGTCGACAAGAAGGTCGAGCCGAAGTCG

TGCGACAAGACTCACACTTGCCCGCCTTGCCCAGCCCCGGAACTGCTGGGTGGTCCTTCGGTGTTCCTCTTCCC

GCCCAAGCCGAAGGATACCCTGATGATCTCACGGACCCCCGAAGTGACCTGTGTGGTGGTGGACGTGTCCCAC

GAGGACCCGGAAGTGAAATTCAATTGGTACGTGGATGGAGTGGAAGTGCACAACGCCAAGACCAAGCCACGG

GAAGAACAGTACAACTCTACCTACCGCGTGGTGTCCGTGCTCACTGTGCTGCACCAAGACTGGCTGAACGGGA

AGGAGTACAAGTGCAAAGTGTCCAACAAGGCGCTGCCTGCCCCAATTGAGAAAACTATCTCGAAAGCCAAGGG

ACAGCCTCGAGAGCCTCAAGTGTACACCCTGCCTCCCTCTCGGGACGAGCTGACCAAGAACCAAGTCTCCCTGA

CCTGTCTGGTCAAGGGATTCTACCCATCGGATATCGCCGTGGAATGGGAAAGCAACGGACAGCCCGAGAACAA

CTACAAGACGACTCCGCCCGTGCTGGATTCCGACGGGAGCTTCTTCTTGTACTCCAAGCTGACCGTCGACAAGA

GCAGATGGCAGCAGGGAAACGTGTTCTCCTGCTCCGTGATGCATGAGGCGCTGCACAACCACTACACTCAGAA

GAGCTTGTCCCTGTCGCCCGGA

Heavy chain AA (with LALA)

SEQ ID NO: 52

*EVQLLESGGGLVQPGGSLRLSCAASGFTFSSYDMSWVRQAPGKGLEWVSDIDPTGSKTDYADSVKGRFTISRDNSK*
*NTLYLQMNSLRAEDTAVYYCARDLLVYGFDYWGQGTLVTVSS*ASTKGPSVFPLAPSSKSTSGGTAALGCLVKDYFPEP

VTVSWNSGALTSGVHTFPAVLQSSGLYSLSSVVTVPSSSLGTQTYICNVNHKPSNTKVDKKVEPKSCDKTHTCPPCPA

PEAAGGPSVFLFPPKPKDTLMISRTPEVTCVVVDVSHEDPEVKFNWYVDGVEVHNAKTKPREEQYNSTYRVVSVLTV

LHQDWLNGKEYKCKVSNKALPAPIEKTISKAKGQPREPQVYTLPPSRDELTKNQVSLTCLVKGFYPSDIAVEWESNGQ

PENNYKTTPPVLDSDGSFFLYSKLTVDKSRWQQGNVFSCSVMHEALHNHYTQKSLSLSPG

Heavy chain DNA (with LALA)

SEQ ID NO: 53

GAAGTGCAACTGCTGGAGTCCGGTGGTGGTCTGGTACAGCCGGGTGGTTCTCTGCGTCTGAGTTGCGCGGCC

AGTGGCTTTACCTTCAGTAGTTACGATATGAGCTGGGTGCGTCAGGCTCCGGGCAAAGGTCTGGAATGGGTTA

GCGATATTGATCCGACTGGTAGCAAGACCGACTATGCGGATAGCGTGAAAGGCCGTTTTACCATTTCTCGCGAC

AACAGCAAGAACACGCTGTACCTGCAGATGAACTCACTGCGTGCCGAAGATACGGCCGTGTATTACTGTGCGA

GAGACCTCTTGGTGTACGGGTTCGACTACTGGGGCCAGGGAACCCTGGTCACCGTCTCGAGTGCTAGCACTAA

GGGCCCGTCGGTGTTCCCGCTGGCCCCATCGTCCAAGAGCACATCAGGGGGTACCGCCGCCCTGGGCTGCCTT

GTGAAGGATTACTTTCCCGAGCCCGTCACAGTGTCCTGGAACAGCGGAGCCCTGACCTCCGGAGTGCATACTTT

CCCGGCTGTGCTTCAGTCCTCTGGCCTGTACTCATTGTCCTCCGTGGTCACCGTCCCTTCGTCCTCCCTGGGCAC

CCAGACCTATATCTGTAATGTCAACCATAAGCCCTCGAACACCAAGGTCGACAAGAAGGTCGAGCCGAAGTCG

TGCGACAAGACTCACACTTGCCCGCCTTGCCCAGCCCCGGAAGCTGCCGGTGGTCCTTCGGTGTTCCTCTTCCC

GCCCAAGCCGAAGGATACCCTGATGATCTCACGGACCCCCGAAGTGACCTGTGTGGTGGTGGACGTGTCCCAC

GAGGACCCGGAAGTGAAATTCAATTGGTACGTGGATGGAGTGGAAGTGCACAACGCCAAGACCAAGCCACGG

```
GAAGAACAGTACAACTCTACCTACCGCGTGGTGTCCGTGCTCACTGTGCTGCACCAAGACTGGCTGAACGGGA

AGGAGTACAAGTGCAAAGTGTCCAACAAGGCGCTGCCTGCCCCAATTGAGAAAACTATCTCGAAAGCCAAGGG

ACAGCCTCGAGAGCCTCAAGTGTACACCCTGCCTCCCTCTCGGGACGAGCTGACCAAGAACCAAGTCTCCCTGA

CCTGTCTGGTCAAGGGATTCTACCCATCGGATATCGCCGTGGAATGGGAAAGCAACGGACAGCCCGAGAACAA

CTACAAGACGACTCCGCCCGTGCTGGATTCCGACGGGAGCTTCTTCTTGTACTCCAAGCTGACCGTCGACAAGA

GCAGATGGCAGCAGGGAAACGTGTTCTCCTGCTCCGTGATGCATGAGGCGCTGCACAACCACTACACTCAGAA

GAGCTTGTCCCTGTCGCCCGGA
```

Variable domain AA

SEQ ID NO: 54

*EVQLLESGGGLVQPGGSLRLSCAASGFTFSSYDMSWVRQAPGKGLEWVSDIDPTGSKTDYADSVKGRFTISRDNSK*

*NTLYLQMNSLRAEDTAVYYCARDLLVYGFDYWGQGTLVTVSS*

Variable domain DNA

SEQ ID NO: 55

```
GAAGTGCAACTGCTGGAGTCCGGTGGTGGTCTGGTACAGCCGGGTGGTTCTCTGCGTCTGAGTTGCGCGGCC

AGTGGCTTTACCTTCAGTAGTTACGATATGAGCTGGGTGCGTCAGGCTCCGGGCAAAGGTCTGGAATGGGTTA

GCGATATTGATCCGACTGGTAGCAAGACCGACTATGCGGATAGCGTGAAAGGCCGTTTTACCATTTCTCGCGAC

AACAGCAAGAACACGCTGTACCTGCAGATGAACTCACTGCGTGCCGAAGATACGGCCGTGTATTACTGTGCGA

GAGACCTCTTGGTGTACGGGTTCGACTACTGGGGCCAGGGAACCCTGGTCACCGTCTCGAGT
```

| SEQ ID NO: 30 | CDR1 (AA) (IMGT) | *GFTFSSYD* |
| --- | --- | --- |
| SEQ ID NO: 31 | CDR1 (AA) (Kabat) | *SYDMS* |
| SEQ ID NO: 32 | CDR2 (AA) (IMGT) | *IDPTGSKT* |
| SEQ ID NO: 33 | CDR2 (AA) Kabat | *DIDPTGSKTDYADSVKG* |
| SEQ ID NO: 38 | CDR3 (AA) (IMGT) | *ARDLLVYGFDY* |
| SEQ ID NO: 39 | CDR3 (AA) (Kabat) | *DLLVYGFDY* |

Amino acid and cDNA sequences of light chain of FS30-10-16 mAb and its variable domain and amino acid sequence of CDRs Light chain AA

SEQ ID NO: 46

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQSYSYPVTFGQGTKVEIKRTVAAPSVFIFPPSDEQLKSGTASVVCLLNNFYPREAKVQWKVDNALQSG*

*NSQESVTEQDSKDSTYSLSSTLTLSKADYEKHKVYACEVTHQGLSSPVTKSFNRGEC*

Light chain DNA

SEQ ID NO: 47

```
GAAATTGTGCTGACCCAGTCTCCGGGCACGTTATCTCTGAGCCCTGGTGAGCGCGCCACTCTGTCATGCCGGG

CTTCTCAAAGTGTTAGCAGTAGCTACCTGGCGTGGTATCAGCAAAAACCGGGCCAGGCCCCGCGTCTGCTGATT

TACGGTGCATCCAGCCGTGCCACCGGCATTCCAGATCGTTTTTCCGGTAGTGGTTCTGGGACGGACTTCACTCT

GACAATCTCACGCCTGGAACCGGAGGATTTTGCGGTGTATTACTGCCAGCAATCTTATTCTTATCCTGTCACGTT

CGGCCAAGGGACCAAGGTGGAAATCAAACGTACTGTGGCCGCTCCTAGCGTGTTCATTTTTCCGCCATCCGAC

GAGCAGCTCAAGTCCGGCACCGCCTCCGTGGTCTGCCTGCTCAACAACTTCTACCCTCGCGAAGCTAAGGTCCA

GTGGAAGGTCGACAATGCCCTGCAGTCCGGAAACTCGCAGGAAAGCGTGACTGAACAGGACTCCAAGGACTC

CACCTATTCACTGTCCTCGACTCTGACCCTGAGCAAGGCGGATTACGAAAAGCACAAAGTGTACGCATGCGAA

GTGACCCACCAGGGTCTTTCGTCCCCCGTGACCAAGAGCTTCAACAGAGGAGAGTGT
```

Variable domain AA

SEQ ID NO: 48

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQSYSYPVTFGQGTKVEIK*

Variable domain DNA

SEQ ID NO: 49

GAAATTGTGCTGACCCAGTCTCCGGGCACGTTATCTCTGAGCCCTGGTGAGCGCGCCACTCTGTCATGCCGGG

CTTCTCAAAGTGTTAGCAGTAGCTACCTGGCGTGGTATCAGCAAAAACCGGGCCAGGCCCCGCGTCTGCTGATT

TACGGTGCATCCAGCCGTGCCACCGGCATTCCAGATCGTTTTTCCGGTAGTGGTTCTGGGACGGACTTCACTCT

GACAATCTCACGCCTGGAACCGGAGGATTTTGCGGTGTATTACTGCCAGCAATCTTATTCTTATCCTGTCACGTT

CGGCCAAGGGACCAAGGTGGAAATCAAA

| | | | |
|---|---|---|---|
| SEQ ID NO: 17 | CDR1 (AA) | (IMGT) | QSVSSSY |
| SEQ ID NO: 18 | CDR1 (AA) | (Kabat) | RASQSVSSSYLA |
| SEQ ID NO: 19 | CDR2 (AA) | (IMGT) | GAS |
| SEQ ID NO: 20 | CDR2 (AA) | (Kabat) | GASSRAT |
| SEQ ID NO: 22 | CDR3 (AA) | (IMGT) | QQSYSYPVT |
| SEQ ID NO: 22 | CDR3 (AA) | (Kabat) | QQSYSYPVT |

Amino acid and cDNA sequences of heavy chain of FS30-35-14 mAb and its variable domain and amino acid sequence of CDRs Heavy chain AA (without LALA)

SEQ ID NO: 56

EVQLLESGGGLVQPGGSLRLSCAASGFTFSAYNIHWVRQAPGKGLEWVSDISPYGGATNYADSVKGRFTISRDNSKN

TLYLQMNSLRAEDTAVYYCARNLYELSAYSYGADYWGQGTLVTVSSASTKGPSVFPLAPSSKSTSGGTAALGCLVKDY

FPEPVTVSWNSGALTSGVHTFPAVLQSSGLYSLSSVVTVPSSSLGTQTYICNVNHKPSNTKVDKKVEPKSCDKTHTCP

PCPAPELLGGPSVFLFPPKPKDTLMISRTPEVTCVVVDVSHEDPEVKFNWYVDGVEVHNAKTKPREEQYNSTYRVVS

VLTVLHQDWLNGKEYKCKVSNKALPAPIEKTISKAKGQPREPQVYTLPPSRDELTKNQVSLTCLVKGFYPSDIAVEWE

SNGQPENNYKTTPPVLDSDGSFFLYSKLTVDKSRWQQGNVFSCSVMHEALHNHYTQKSLSLSPG

Heavy chain DNA (without LALA)

SEQ ID NO: 57

GAAGTGCAACTGCTGGAGTCCGGTGGTGGTCTGGTACAGCCGGGTGGTTCTCTGCGTCTGAGTTGCGCGGCC

AGTGGCTTTACCTTCAGTGCCTATAATATCCATTGGGTGCGTCAGGCTCCGGGCAAAGGTCTGGAATGGGTTA

GCGATATTTCTCCGTATGGTGGCGCGACCAACTATGCGGATAGCGTGAAAGGCCGTTTTACCATTTCTCGCGAC

AACAGCAAGAACACGCTGTACCTGCAGATGAACTCACTGCGTGCCGAAGATACGGCCGTGTATTACTGTGCGA

GAAACCTCTACGAGTTGAGCGCTTACTCTTACGGGGCGGACTACTGGGGCCAGGGAACCCTGGTCACCGTCTC

GTCGGCTAGCACTAAGGGCCCGTCGGTGTTCCCGCTGGCCCCATCGTCCAAGAGCACATCAGGGGGTACCGCC

GCCCTGGGCTGCCTTGTGAAGGATTACTTTCCCGAGCCCGTCACAGTGTCCTGGAACAGCGGAGCCCTGACCT

CCGGAGTGCATACTTTCCCGGCTGTGCTTCAGTCCTCTGGCCTGTACTCATTGTCCTCCGTGGTCACCGTCCCTT

CGTCCTCCCTGGGCACCCAGACCTATATCTGTAATGTCAACCATAAGCCCTCGAACACCAAGGTCGACAAGAAG

GTCGAGCCGAAGTCGTGCGACAAGACTCACACTTGCCCGCCTTGCCCAGCCCCGGAACTGCTGGGTGGTCCTT

CGGTGTTCCTCTTCCCGCCCAAGCCGAAGGATACCCTGATGATCTCACGGACCCCCGAAGTGACCTGTGTGGTG

GTGGACGTGTCCCACGAGGACCCGGAAGTGAAATTCAATTGGTACGTGGATGGAGTGGAAGTGCACAACGCC

AAGACCAAGCCACGGGAAGAACAGTACAACTCTACCTACCGCGTGGTGTCCGTGCTCACTGTGCTGCACCAAG

ACTGGCTGAACGGGAAGGAGTACAAGTGCAAAGTGTCCAACAAGGCGCTGCCTGCCCCAATTGAGAAAACTAT

CTCGAAAGCCAAGGGACAGCCTCGAGAGCCTCAAGTGTACACCCTGCCTCCCTCTCGGGACGAGCTGACCAAG

AACCAAGTCTCCCTGACCTGTCTGGTCAAGGGATTCTACCCATCGGATATCGCCGTGGAATGGGAAAGCAACG

GACAGCCCGAGAACAACTACAAGACGACTCCGCCCGTGCTGGATTCCGACGGGAGCTTCTTCTTGTACTCCAA

GCTGACCGTCGACAAGAGCAGATGGCAGCAGGGAAACGTGTTCTCCTGCTCCGTGATGCATGAGGCGCTGCA

CAACCACTACACTCAGAAGAGCTTGTCCCTGTCGCCCGGA

-continued

Heavy chain AA (with LALA)
SEQ ID NO: 58
EVQLLESGGGLVQPGGSLRLSCAASGFTFSAYNIHWVRQAPGKGLEWVSDISPYGGATNYADSVKGRFTISRDNSKN
TLYLQMNSLRAEDTAVYYCARNLYELSAYSYGADYWGQGTLVTVSSASTKGPSVFPLAPSSKSTSGGTAALGCLVKDY
FPEPVTVSWNSGALTSGVHTFPAVLQSSGLYSLSSVVTVPSSSLGTQTYICNVNHKPSNTKVDKKVEPKSCDKTHTCP
PCPAPEAAGGPSVFLFPPKPKDTLMISRTPEVTCVVVDVSHEDPEVKFNWYVDGVEVHNAKTKPREEQYNSTYRVVS
VLTVLHQDWLNGKEYKCKVSNKALPAPIEKTISKAKGQPREPQVYTLPPSRDELTKNQVSLTCLVKGFYPSDIAVEWE
SNGQPENNYKTTPPVLDSDGSFFLYSKLTVDKSRWQQGNVFSCSVMHEALHNHYTQKSLSLSPG Heavy chain DNA (with LALA)
SEQ ID NO: 59
GAAGTGCAACTGCTGGAGTCCGGTGGTGGTCTGGTACAGCCGGGTGGTTCTCTGCGTCTGAGTTGCGCGGCC
AGTGGCTTTACCTTCAGTGCCTATAATATCCATTGGGTGCGTCAGGCTCCGGGCAAAGGTCTGGAATGGGTTA
GCGATATTTCTCCGTATGGTGGCGCGACCAACTATGCGGATAGCGTGAAAGGCCGTTTTACCATTTCTCGCGAC
AACAGCAAGAACACGCTGTACCTGCAGATGAACTCACTGCGTGCCGAAGATACGGCCGTGTATTACTGTGCGA
GAAACCTCTACGAGTTGAGCGCTTACTCTTACGGGGCGGACTACTGGGGCCAGGGAACCCTGGTCACCGTCTC
GTCGGCTAGCACTAAGGGCCCGTCGGTGTTCCCGCTGGCCCCATCGTCCAAGAGCACATCAGGGGGTACCGCC
GCCCTGGGCTGCCTTGTGAAGGATTACTTTCCCGAGCCCGTCACAGTGTCCTGGAACAGCGGAGCCCTGACCT
CCGGAGTGCATACTTTCCCGGCTGTGCTTCAGTCCTCTGGCCTGTACTCATTGTCCTCCGTGGTCACCGTCCCTT
CGTCCTCCCTGGGCACCCAGACCTATATCTGTAATGTCAACCATAAGCCCTCGAACACCAAGGTCGACAAGAAG
GTCGAGCCGAAGTCGTGCGACAAGACTCACACTTGCCCGCCTTGCCCAGCCCCGGAAGCTGCCGGTGGTCCTT
CGGTGTTCCTCTTCCCGCCCAAGCCGAAGGATACCCTGATGATCTCACGGACCCCCGAAGTGACCTGTGTGGTG
GTGGACGTGTCCCACGAGGACCCGGAAGTGAAATTCAATTGGTACGTGGATGGAGTGGAAGTGCACAACGCC
AAGACCAAGCCACGGGAAGAACAGTACAACTCTACCTACCGCGTGGTGTCCGTGCTCACTGTGCTGCACCAAG
ACTGGCTGAACGGGAAGGAGTACAAGTGCAAAGTGTCCAACAAGGCGCTGCCTGCCCCAATTGAGAAAACTAT
CTCGAAAGCCAAGGGACAGCCTCGAGAGCCTCAAGTGTACACCCTGCCTCCCTCTCGGGACGAGCTGACCAAG
AACCAAGTCTCCCTGACCTGTCTGGTCAAGGGATTCTACCCATCGGATATCGCCGTGGAATGGGAAAGCAACG
GACAGCCCGAGAACAACTACAAGACGACTCCGCCCGTGCTGGATTCCGACGGGAGCTTCTTCTTGTACTCCAA
GCTGACCGTCGACAAGAGCAGATGGCAGCAGGGAAACGTGTTCTCCTGCTCCGTGATGCATGAGGCGCTGCA
CAACCACTACACTCAGAAGAGCTTGTCCCTGTCGCCCGGA Variable domain AA
SEQ ID NO: 60
EVQLLESGGGLVQPGGSLRLSCAASGFTFSAYNIHWVRQAPGKGLEWVSDISPYGGATNYADSVKGRFTISRDNSKN
TLYLQMNSLRAEDTAVYYCARNLYELSAYSYGADYWGQGTLVTVSS Variable domain DNA
SEQ ID NO: 61
GAAGTGCAACTGCTGGAGTCCGGTGGTGGTCTGGTACAGCCGGGTGGTTCTCTGCGTCTGAGTTGCGCGGCC
AGTGGCTTTACCTTCAGTGCCTATAATATCCATTGGGTGCGTCAGGCTCCGGGCAAAGGTCTGGAATGGGTTA
GCGATATTTCTCCGTATGGTGGCGCGACCAACTATGCGGATAGCGTGAAAGGCCGTTTTACCATTTCTCGCGAC
AACAGCAAGAACACGCTGTACCTGCAGATGAACTCACTGCGTGCCGAAGATACGGCCGTGTATTACTGTGCGA
GAAACCTCTACGAGTTGAGCGCTTACTCTTACGGGGCGGACTACTGGGGCCAGGGAACCCTGGTCACCGTCTC
GTCG

| SEQ ID NO: 62 | CDR1 (AA) (IMGT) | GFTFSAYN |
| --- | --- | --- |
| SEQ ID NO: 63 | CDR1 (AA) (Kabat) | AYNIH |
| SEQ ID NO: 64 | CDR2 (AA) (IMGT) | ISPYGGAT |
| SEQ ID NO: 65 | CDR2 (AA) (Kabat) | DISPYGGATNYADSVKG |

| SEQ ID NO: 66 | CDR3 (AA) (IMGT) | ARNLYELSAYSYGADY |
| --- | --- | --- |
| SEQ ID NO: 67 | CDR3 (AA) (Kabat) | NLYELSAYSYGADY |

Amino acid and cDNA sequences of light chain of FS30-35-14 mAb and its variable domain and amino acid sequence of CDRs Light chain AA

SEQ ID NO: 68

EIVLTQSPGTLSLSPGERATLSCRASQSVSSSYLAWYQQKPGQAPRLLIYGASSRATGIPDRFSGSGSGTDFTLTISRLEP

EDFAVYYCQQYYYSSPITFGQGTKVEIKRTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTKSFNRGEC

Light chain DNA

SEQ ID NO: 69

GAAATTGTGCTGACCCAGTCTCCGGGCACGTTATCTCTGAGCCCTGGTGAGCGCGCCACTCTGTCATGCCGGG

CTTCTCAAAGTGTTAGCAGTAGCTACCTGGCGTGGTATCAGCAAAAACCGGGCCAGGCCCCGCGTCTGCTGATT

TACGGTGCATCCAGCCGTGCCACCGGCATTCCAGATCGTTTTTCCGGTAGTGGTTCTGGGACGGACTTCACTCT

GACAATCTCACGCCTGGAACCGGAGGATTTTGCGGTGTATTACTGCCAGCAATATTATTATTCTTCTCCTATCAC

GTTCGGCCAAGGGACCAAGGTGGAAATCAAACGTACTGTGGCCGCTCCTAGCGTGTTCATTTTTCCGCCATCCG

ACGAGCAGCTCAAGTCCGGCACCGCCTCCGTGGTCTGCCTGCTCAACAACTTCTACCCTCGCGAAGCTAAGGTC

CAGTGGAAGGTCGACAATGCCCTGCAGTCCGGAAACTCGCAGGAAAGCGTGACTGAACAGGACTCCAAGGAC

TCCACCTATTCACTGTCCTCGACTCTGACCCTGAGCAAGGCGGATTACGAAAAGCACAAAGTGTACGCATGCGA

AGTGACCCACCAGGGTCTTTCGTCCCCCGTGACCAAGAGCTTCAACAGAGGAGAGTGT

Variable domain AA

SEQ ID NO: 70

EIVLTQSPGTLSLSPGERATLSCRASQSVSSSYLAWYQQKPGQAPRLLIYGASSRATGIPDRFSGSGSGTDFTLTISRLEP

EDFAVYYCQQYYYSSPITFGQGTKVEIK

Variable domain DNA

SEQ ID NO: 71

GAAATTGTGCTGACCCAGTCTCCGGGCACGTTATCTCTGAGCCCTGGTGAGCGCGCCACTCTGTCATGCCGGG

CTTCTCAAAGTGTTAGCAGTAGCTACCTGGCGTGGTATCAGCAAAAACCGGGCCAGGCCCCGCGTCTGCTGATT

TACGGTGCATCCAGCCGTGCCACCGGCATTCCAGATCGTTTTTCCGGTAGTGGTTCTGGGACGGACTTCACTCT

GACAATCTCACGCCTGGAACCGGAGGATTTTGCGGTGTATTACTGCCAGCAATATTATTATTCTTCTCCTATCAC

GTTCGGCCAAGGGACCAAGGTGGAAATCAAA

| SEQ ID NO: 17 | CDR1 (AA) (IMGT) | QSVSSSY |
| --- | --- | --- |
| SEQ ID NO: 18 | CDR1 (AA) (Kabat) | RASQSVSSSYLA |
| SEQ ID NO: 19 | CDR2 (AA) (IMGT) | GAS |
| SEQ ID NO: 20 | CDR2 (AA) (Kabat) | GASSRAT |
| SEQ ID NO: 23 | CDR3 (AA) (IMGT) | QQYYYSSPIT |
| SEQ ID NO: 23 | CDR3 (AA) (Kabat) | QQYYYSSPIT |

In the following sequences, the heavy chain sequence variable domains are shown in italics and, where applicable, the location of LALA mutation is shown in bold and underlined.

In the light chain sequences, the variable domain is shown in italics.

```
Amino acid sequence of heavy chain of FS20-22-49AA/FS30-5-37 mAb2
Heavy chain AA (without LALA)
                                                                          SEQ ID NO: 72
EVQLLESGGGLVQPGGSLRLNCAASGFTFSSYAMSWVRQAPGKGLEWVSAISGSGGSTYYADSVKGRFTISRDNSK

NTLYLQMNSLRAEDTAVYYCARSYDKYWGSSIYSGLDYWGQGTLVTVSSASTKGPSVFPLAPSSKSTSGGTAALGCLV

KDYFPEPVTVSWNSGALTSGVHTFPAVLQSSGLYSLSSVVTVPSSSLGTQTYICNVNHKPSNTKVDKKVEPKSCDKTH

TCPPCPAPELLGGPSVFLFPPKPKDTLMISRTPEVTCVVVDVSHEDPEVKFNWYVDGVEVHNAKTKPREEQYNSTYR

VVSVLTVLHQDWLNGKEYKCKVSNKALPAPIEKTISKAKGQPREPQVYTLPPSRDEYWDQEVSLTCLVKGFYPSDIAV

EWESNGDEQFAYKTTPPVLDSDGSFFLYSKLTVDQYRWNPADYFSCSVMHEALHNHYTQKSLSLSPG

Heavy chain AA (with LALA)
                                                                          SEQ ID NO: 73
EVQLLESGGGLVQPGGSLRLNCAASGFTFSSYAMSWVRQAPGKGLEWVSAISGSGGSTYYADSVKGRFTISRDNSK

NTLYLQMNSLRAEDTAVYYCARSYDKYWGSSIYSGLDYWGQGTLVTVSSASTKGPSVFPLAPSSKSTSGGTAALGCLV

KDYFPEPVTVSWNSGALTSGVHTFPAVLQSSGLYSLSSVVTVPSSSLGTQTYICNVNHKPSNTKVDKKVEPKSCDKTH

TCPPCPAPEAAGGPSVFLFPPKPKDTLMISRTPEVTCVVVDVSHEDPEVKFNWYVDGVEVHNAKTKPREEQYNSTYR

VVSVLTVLHQDWLNGKEYKCKVSNKALPAPIEKTISKAKGQPREPQVYTLPPSRDEYWDQEVSLTCLVKGFYPSDIAV

EWESNGDEQFAYKTTPPVLDSDGSFFLYSKLTVDQYRWNPADYFSCSVMHEALHNHYTQKSLSLSPG

Amino acid sequence of light chain of FS20-22-49AA/FS30-5-37 mAb2
Light chain AA
                                                                          SEQ ID NO: 13
EIVLTQSPGTLSLSPGERATLSCRASQSVSSSYLAWYQQKPGQAPRLLIYGASSRATGIPDRFSGSGSGTDFTLTISRLEP

EDFAVYYCQQYYSYYPVTFGQGTKVEIKRTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTKSFNRGEC

Amino acid sequence of heavy chain of FS20-22-49AA/FS30-10-3 mAb2
Heavy chain (without LALA)
                                                                          SEQ ID NO: 74
EVQLLESGGGLVQPGGSLRLSCAASGFTFSSYDMSWVRQAPGKGLEWVSDIDPTGSKTDYADSVKGRFTISRDNSK

NTLYLQMNSLRAEDTAVYYCARDLNVYGFDYWGQGTLVTVSSASTKGPSVFPLAPSSKSTSGGTAALGCLVKDYFPE

PVTVSWNSGALTSGVHTFPAVLQSSGLYSLSSVVTVPSSSLGTQTYICNVNHKPSNTKVDKKVEPKSCDKTHTCPPCP

APELLGGPSVFLFPPKPKDTLMISRTPEVTCVVVDVSHEDPEVKFNWYVDGVEVHNAKTKPREEQYNSTYRVVSVLT

VLHQDWLNGKEYKCKVSNKALPAPIEKTISKAKGQPREPQVYTLPPSRDEYWDQEVSLTCLVKGFYPSDIAVEWESN

GDEQFAYKTTPPVLDSDGSFFLYSKLTVDQYRWNPADYFSCSVMHEALHNHYTQKSLSLSPG

Heavy chain (with LALA)
                                                                          SEQ ID NO: 75
EVQLLESGGGLVQPGGSLRLSCAASGFTFSSYDMSWVRQAPGKGLEWVSDIDPTGSKTDYADSVKGRFTISRDNSK

NTLYLQMNSLRAEDTAVYYCARDLNVYGFDYWGQGTLVTVSSASTKGPSVFPLAPSSKSTSGGTAALGCLVKDYFPE

PVTVSWNSGALTSGVHTFPAVLQSSGLYSLSSVVTVPSSSLGTQTYICNVNHKPSNTKVDKKVEPKSCDKTHTCPPCP

APEAAGGPSVFLFPPKPKDTLMISRTPEVTCVVVDVSHEDPEVKFNWYVDGVEVHNAKTKPREEQYNSTYRVVSVLT

VLHQDWLNGKEYKCKVSNKALPAPIEKTISKAKGQPREPQVYTLPPSRDEYWDQEVSLTCLVKGFYPSDIAVEWESN

GDEQFAYKTTPPVLDSDGSFFLYSKLTVDQYRWNPADYFSCSVMHEALHNHYTQKSLSLSPG
```

Amino acid sequence of light chain of FS20-22-49AA/FS30-10-3 mAb2)
Light chain

SEQ ID NO: 46

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQSYSYPVTFGQGTKVEIKRTVAAPSVFIFPPSDEQLKSGTASVVCLLNNFYPREAKVQWKVDNALQSG*

NSQESVTEQDSKDSTYSLSSTLTLSKADYEKHKVYACEVTHQGLSSPVTKSFNRGEC

Amino acid sequence of heavy chain of FS20-22-49AA/FS30-10-12 mAb2
Heavy chain (without LALA)

SEQ ID NO: 76

*EVQLLESGGGLVQPGGSLRLSCAASGFTFSSYDMSWVRQAPGKGLEWVSDIDPTGSKTDYADSVKGRFTISRDNSK*

*NTLYLQMNSLRAEDTAVYYCARDLTVYGFDYWGQGTLVTVSS*ASTKGPSVFPLAPSSKSTSGGTAALGCLVKDYFPEP

VTVSWNSGALTSGVHTFPAVLQSSGLYSLSSVVTVPSSSLGTQTYICNVNHKPSNTKVDKKVEPKSCDKTHTCPPCPA

PELLGGPSVFLFPPKPKDTLMISRTPEVTCVVVDVSHEDPEVKFNWYVDGVEVHNAKTKPREEQYNSTYRVVSVLTVL

HQDWLNGKEYKCKVSNKALPAPIEKTISKAKGQPREPQVYTLPPSRDEYWDQEVSLTCLVKGFYPSDIAVEWESNGD

EQFAYKTTPPVLDSDGSFFLYSKLTVDQYRWNPADYFSCSVMHEALHNHYTQKSLSLSPG

Heavy chain (with LALA)

SEQ ID NO: 77

*EVQLLESGGGLVQPGGSLRLSCAASGFTFSSYDMSWVRQAPGKGLEWVSDIDPTGSKTDYADSVKGRFTISRDNSK*

*NTLYLQMNSLRAEDTAVYYCARDLTVYGFDYWGQGTLVTVSS*ASTKGPSVFPLAPSSKSTSGGTAALGCLVKDYFPEP

VTVSWNSGALTSGVHTFPAVLQSSGLYSLSSVVTVPSSSLGTQTYICNVNHKPSNTKVDKKVEPKSCDKTHTCPPCPA

PEAAGGPSVFLFPPKPKDTLMISRTPEVTCVVVDVSHEDPEVKFNWYVDGVEVHNAKTKPREEQYNSTYRVVSVLTV

LHQDWLNGKEYKCKVSNKALPAPIEKTISKAKGQPREPQVYTLPPSRDEYWDQEVSLTCLVKGFYPSDIAVEWESNG

DEQFAYKTTPPVLDSDGSFFLYSKLTVDQYRWNPADYFSCSVMHEALHNHYTQKSLSLSPG

Amino acid sequence of light chain of FS20-22-49AA/FS30-10-12 mAb2
Light chain

SEQ ID NO: 46

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQSYSYPVTFGQGTKVEIKRTVAAPSVFIFPPSDEQLKSGTASVVCLLNNFYPREAKVQWKVDNALQSG*

NSQESVTEQDSKDSTYSLSSTLTLSKADYEKHKVYACEVTHQGLSSPVTKSFNRGEC

Amino acid sequence of heavy chain of FS20-22-49AA/FS30-10-16 mAb2
Heavy chain (without LALA)

SEQ ID NO: 78

*EVQLLESGGGLVQPGGSLRLSCAASGFTFSSYDMSWVRQAPGKGLEWVSDIDPTGSKTDYADSVKGRFTISRDNSK*

*NTLYLQMNSLRAEDTAVYYCARDLLVYGFDYWGQGTLVTVSS*ASTKGPSVFPLAPSSKSTSGGTAALGCLVKDYFPEP

VTVSWNSGALTSGVHTFPAVLQSSGLYSLSSVVTVPSSSLGTQTYICNVNHKPSNTKVDKKVEPKSCDKTHTCPPCPA

PELLGGPSVFLFPPKPKDTLMISRTPEVTCVVVDVSHEDPEVKFNWYVDGVEVHNAKTKPREEQYNSTYRVVSVLTVL

HQDWLNGKEYKCKVSNKALPAPIEKTISKAKGQPREPQVYTLPPSRDEYWDQEVSLTCLVKGFYPSDIAVEWESNGD

EQFAYKTTPPVLDSDGSFFLYSKLTVDQYRWNPADYFSCSVMHEALHNHYTQKSLSLSPG

Heavy chain (with LALA)

SEQ ID NO: 79

*EVQLLESGGGLVQPGGSLRLSCAASGFTFSSYDMSWVRQAPGKGLEWVSDIDPTGSKTDYADSVKGRFTISRDNSK*

*NTLYLQMNSLRAEDTAVYYCARDLLVYGFDYWGQGTLVTVSS*ASTKGPSVFPLAPSSKSTSGGTAALGCLVKDYFPEP

VTVSWNSGALTSGVHTFPAVLQSSGLYSLSSVVTVPSSSLGTQTYICNVNHKPSNTKVDKKVEPKSCDKTHTCPPCPA

PEAAGGPSVFLFPPKPKDTLMISRTPEVTCVVVDVSHEDPEVKFNWYVDGVEVHNAKTKPREEQYNSTYRVVSVLTV

LHQDWLNGKEYKCKVSNKALPAPIEKTISKAKGQPREPQVYTLPPSRDEYWDQEVSLTCLVKGFYPSDIAVEWESNG

DEQFAYKTTPPVLDSDGSFFLYSKLTVDQYRWNPADYFSCSVMHEALHNHYTQKSLSLSPG

-continued

Amino acid sequence of light chain of FS20-22-49AA/FS30-10-16 mAb2
Light chain
SEQ ID NO: 46
*EIVLTQSPGTLSLSPGERATLSCRASQSVSSSYLAWYQQKPGQAPRLLIYGASSRATGIPDRFSGSGSGTDFTLTISRLEP*

*EDFAVYYCQQSYSYPVTFGQGTKVEIK*RTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTKSFNRGEC

Amino acid sequence of heavy chain of FS20-22-49AA/FS30-35-14 mAb2
Heavy chain (without LALA)
SEQ ID NO: 80
*EVQLLESGGGLVQPGGSLRLSCAASGFTFSAYNIHWVRQAPGKGLEWVSDISPYGGATNYADSVKGRFTISRDNSKN*

*TLYLQMNSLRAEDTAVYYCARNLYELSAYSYGADYWGQGTLVTVSS*ASTKGPSVFPLAPSSKSTSGGTAALGCLVKDY

FPEPVTVSWNSGALTSGVHTFPAVLQSSGLYSLSSVVTVPSSSLGTQTYICNVNHKPSNTKVDKKVEPKSCDKTHTCP

PCPAPELLGGPSVFLFPPKPKDTLMISRTPEVTCVVVDVSHEDPEVKFNWYVDGVEVHNAKTKPREEQYNSTYRVVS

VLTVLHQDWLNGKEYKCKVSNKALPAPIEKTISKAKGQPREPQVYTLPPSRDEYWDQEVSLTCLVKGFYPSDIAVEWE

SNGDEQFAYKTTPPVLDSDGSFFLYSKLTVDQYRWNPADYFSCSVMHEALHNHYTQKSLSLSPG

Heavy chain (with LALA)
SEQ ID NO: 81
*EVQLLESGGGLVQPGGSLRLSCAASGFTFSAYNIHWVRQAPGKGLEWVSDISPYGGATNYADSVKGRFTISRDNSKN*

*TLYLQMNSLRAEDTAVYYCARNLYELSAYSYGADYWGQGTLVTVSS*ASTKGPSVFPLAPSSKSTSGGTAALGCLVKDY

FPEPVTVSWNSGALTSGVHTFPAVLQSSGLYSLSSVVTVPSSSLGTQTYICNVNHKPSNTKVDKKVEPKSCDKTHTCP

PCPAPEAAGGPSVFLFPPKPKDTLMISRTPEVTCVVVDVSHEDPEVKFNWYVDGVEVHNAKTKPREEQYNSTYRVVS

VLTVLHQDWLNGKEYKCKVSNKALPAPIEKTISKAKGQPREPQVYTLPPSRDEYWDQEVSLTCLVKGFYPSDIAVEWE

SNGDEQFAYKTTPPVLDSDGSFFLYSKLTVDQYRWNPADYFSCSVMHEALHNHYTQKSLSLSPG

Amino acid sequence of light chain of FS20-22-49AA/FS30-35-14 mAb2
Light chain
SEQ ID NO: 68
*EIVLTQSPGTLSLSPGERATLSCRASQSVSSSYLAWYQQKPGQAPRLLIYGASSRATGIPDRFSGSGSGTDFTLTISRLEP*

*EDFAVYYCQQYYYSSPITFGQGTKVEIK*RTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTKSFNRGEC

Amino acid sequence of heavy chain of G1AA/FS30-5 mAb
Heavy chain AA (with LALA)
SEQ ID NO: 82
*EVQLLESGGGLVQPGGSLRLNCAASGFTFSSYAMSWVRQAPGKGLEWVSAISGSGGSTYYADSVKGRFTISRDNSK*

*NTLYLQMNSLRAEDTAVYYCARSYDKYWGSSMYSGMDYWGQGTLVTVSS*ASTKGPSVFPLAPSSKSTSGGTAALGC

LVKDYFPEPVTVSWNSGALTSGVHTFPAVLQSSGLYSLSSVVTVPSSSLGTQTYICNVNHKPSNTKVDKKVEPKSCDKT

HTCPPCPAPEAAGGPSVFLFPPKPKDTLMISRTPEVTCVVVDVSHEDPEVKFNWYVDGVEVHNAKTKPREEQYNST

YRVVSVLTVLHQDWLNGKEYKCKVSNKALPAPIEKTISKAKGQPREPQVYTLPPSRDELTKNQVSLTCLVKGFYPSDIA

VEWESNGQPENNYKTTPPVLDSDGSFFLYSKLTVDKSRWQQGNVFSCSVMHEALHNHYTQKSLSLSPG

Amino acid sequence of light chain of G1AA/FS30-5 mAb
Light chain AA
SEQ ID NO: 13
*EIVLTQSPGTLSLSPGERATLSCRASQSVSSSYLAWYQQKPGQAPRLLIYGASSRATGIPDRFSGSGSGTDFTLTISRLEP*

*EDFAVYYCQQYYSYYPVTFGQGTKVEIK*RTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTKSFNRGEC

Amino acid sequence of heavy chain of FS20-22-49AA/FS30-5 mAb2
Heavy chain AA (with LALA)
SEQ ID NO: 83
*EVQLLESGGGLVQPGGSLRLNCAASGFTFSSYAMSWVRQAPGKGLEWVSAISGSGGSTYYADSVKGRFTISRDNSK*

*NTLYLQMNSLRAEDTAVYYCARSYDKYWGSSMYSGMDYWGQGTLVTVSS*ASTKGPSVFPLAPSSKSTSGGTAALGC

LVKDYFPEPVTVSWNSGALTSGVHTFPAVLQSSGLYSLSSVVTVPSSSLGTQTYICNVNHKPSNTKVDKKVEPKSCDKT

HTCPPCPAPEAAGGPSVFLFPPKPKDTLMISRTPEVTCVVVDVSHEDPEVKFNWYVDGVEVHNAKTKPREEQYNST

YRVVSVLTVLHQDWLNGKEYKCKVSNKALPAPIEKTISKAKGQPREPQVYTLPPSRDEYWDQEVSLTCLVKGFYPSDI

AVEWESNGDEQFAYKTTPPVLDSDGSFFLYSKLTVDQYRWNPADYFSCSVMHEALHNHYTQKSLSLSPG

Amino acid sequence of light chain of FS20-22-49AA/FS30-5 mAb2)
Light chain AA

SEQ ID NO: 13

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQYYSYYPVTFGQGTKVEIK*RTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTKSFNRGEC

Amino acid sequence of heavy chain of G1AA/FS30-6 mAb
Heavy chain AA (with LALA)

SEQ ID NO: 84

*EVQLLESGGGLVQPGGSLRLSCAASGFTVSYYSISWVRQAPGKGLEWVSDIYSYYGYTDYADSVKGRFTISRDNSKNT*

*LYLQMNSLRAEDTAVYYCARVSYGGQAFDYWGQGTLVTVSS*ASTKGPSVFPLAPSSKSTSGGTAALGCLVKDYFPEP

VTVSWNSGALTSGVHTFPAVLQSSGLYSLSSVVTVPSSSLGTQTYICNVNHKPSNTKVDKKVEPKSCDKTHTCPPCPA

PEAAGGPSVFLFPPKPKDTLMISRTPEVTCVVVDVSHEDPEVKFNWYVDGVEVHNAKTKPREEQYNSTYRVVSVLTV

LHQDWLNGKEYKCKVSNKALPAPIEKTISKAKGQPREPQVYTLPPSRDELTKNQVSLTCLVKGFYPSDIAVEWESNGQ

PENNYKTTPPVLDSDGSFFLYSKLTVDKSRWQQGNVFSCSVMHEALHNHYTQKSLSLSPG

Amino acid sequence of light chain of G1AA/FS30-6 mAb
Light chain AA

SEQ ID NO: 85

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQYDDYPVTFGQGTKVEIK*RTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTKSFNRGEC

Amino acid sequence of heavy chain of G1AA/FS30-10 mAb
Heavy chain AA (with LALA)

SEQ ID NO: 86

*EVQLLESGGGLVQPGGSLRLSCAASGFTFSSYDMSWVRQAPGKGLEWVSDIDPTGSKTDYADSVKGRFTISRDNSK*

*NTLYLQMNSLRAEDTAVYYCARDLMVYGFDYWGQGTLVTVSS*ASTKGPSVFPLAPSSKSTSGGTAALGCLVKDYFPE

PVTVSWNSGALTSGVHTFPAVLQSSGLYSLSSVVTVPSSSLGTQTYICNVNHKPSNTKVDKKVEPKSCDKTHTCPPCP

APEAAGGPSVFLFPPKPKDTLMISRTPEVTCVVVDVSHEDPEVKFNWYVDGVEVHNAKTKPREEQYNSTYRVVSVLT

VLHQDWLNGKEYKCKVSNKALPAPIEKTISKAKGQPREPQVYTLPPSRDELTKNQVSLTCLVKGFYPSDIAVEWESNG

QPENNYKTTPPVLDSDGSFFLYSKLTVDKSRWQQGNVFSCSVMHEALHNHYTQKSLSLSPG

Amino acid sequence of light chain of G1AA/FS30-10 mAb
Light chain AA

SEQ ID NO: 46

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQSYSYPVTFGQGTKVEIK*RTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTKSFNRGEC

Amino acid sequence of heavy chain of FS20-22-49AA/FS30-10 mAb[2]
Heavy chain AA (with LALA)

SEQ ID NO: 103

*EVQLLESGGGLVQPGGSLRLSCAASGFTFSSYDMSWVRQAPGKGLEWVSDIDPTGSKTDYADSVKGRFTISRDNSK*

*NTLYLQMNSLRAEDTAVYYCARDLMVYGFDYWGQGTLVTVSS*ASTKGPSVFPLAPSSKSTSGGTAALGCLVKDYFPE

PVTVSWNSGALTSGVHTFPAVLQSSGLYSLSSVVTVPSSSLGTQTYICNVNHKPSNTKVDKKVEPKSCDKTHTCPPCP

APEAAGGPSVFLFPPKPKDTLMISRTPEVTCVVVDVSHEDPEVKFNWYVDGVEVHNAKTKPREEQYNSTYRVVSVLT

VLHQDWLNGKEYKCKVSNKALPAPIEKTISKAKGQPREPQVYTLPPSRDEYWDQEVSLTCLVKGFYPSDIAVEWESN

GDEQFAYKTTPPVLDSDGSFFLYSKLTVDQYRWNPADYFSCSVMHEALHNHYTQKSLSLSPG

Amino acid sequence of light chain of FS20-22-49AA/FS30-10 mAb²
Light chain AA
SEQ ID NO: 46

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQSYSYPVTFGQGTKVEIK*RTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTKSFNRGEC

Amino acid sequence of heavy chain of G1AA/FS30-15 mAb
Heavy chain AA (with LALA)
SEQ ID NO: 87

*EVQLLESGGGLVQPGGSLRLSCAASGFTFSGSGMSWVRQAPGKGLEWVSIIYSTNGDTDYADSVKGRFTISRDNSKN*

*TLYLQMNSLRAEDTAVYYCARDFYDIANYYAFDYWGQGTLVTVSS*ASTKGPSVFPLAPSSKSTSGGTAALGCLVKDYF

PEPVTVSWNSGALTSGVHTFPAVLQSSGLYSLSSVVTVPSSSLGTQTYICNVNHKPSNTKVDKKVEPKSCDKTHTCPP

CPAPEAAGGPSVFLFPPKPKDTLMISRTPEVTCVVVDVSHEDPEVKFNWYVDGVEVHNAKTKPREEQYNSTYRVVS

VLTVLHQDWLNGKEYKCKVSNKALPAPIEKTISKAKGQPREPQVYTLPPSRDELTKNQVSLTCLVKGFYPSDIAVEWE

SNGQPENNYKTTPPVLDSDGSFFLYSKLTVDKSRWQQGNVFSCSVMHEALHNHYTQKSLSLSPG

Amino acid sequence of light chain of G1AA/FS30-15 mAb
Light chain AA
SEQ ID NO: 88

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQAYYDPITFGQGTKVEIK*RTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTKSFNRGEC

Amino acid sequence of heavy chain of FS20-22-49AA/FS30-15 mAb²
Heavy chain AA (with LALA)
SEQ ID NO: 89

*EVQLLESGGGLVQPGGSLRLSCAASGFTFSGSGMSWVRQAPGKGLEWVSIIYSTNGDTDYADSVKGRFTISRDNSKN*

*TLYLQMNSLRAEDTAVYYCARDFYDIANYYAFDYWGQGTLVTVSS*ASTKGPSVFPLAPSSKSTSGGTAALGCLVKDYF

PEPVTVSWNSGALTSGVHTFPAVLQSSGLYSLSSVVTVPSSSLGTQTYICNVNHKPSNTKVDKKVEPKSCDKTHTCPP

CPAPEAAGGPSVFLFPPKPKDTLMISRTPEVTCVVVDVSHEDPEVKFNWYVDGVEVHNAKTKPREEQYNSTYRVVS

VLTVLHQDWLNGKEYKCKVSNKALPAPIEKTISKAKGQPREPQVYTLPPSRDEYWDQEVSLTCLVKGFYPSDIAVEWE

SNGDEQFAYKTTPPVLDSDGSFFLYSKLTVDQYRWNPADYFSCSVMHEALHNHYTQKSLSLSPG

Amino acid sequence of light chain of FS20-22-49AA/FS30-15 mAb²
Light chain AA
SEQ ID NO: 88

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQAYYDPITFGQGTKVEIK*RTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTKSFNRGEC

Amino acid sequence of heavy chain of G1AA/FS30-16 mAb
Heavy chain AA (with LALA)
SEQ ID NO: 90

*EVQLLESGGGLVQPGGSLRLSCAASGFTFSNYAMHWVRQAPGKGLEWVSTIDPTDGATNYADSVKGRFTISRDNSK*

*NTLYLQMNSLRAEDTAVYYCARSKYYTYMQYVALDYWGQGTLVTVSS*ASTKGPSVFPLAPSSKSTSGGTAALGCLVK

DYFPEPVTVSWNSGALTSGVHTFPAVLQSSGLYSLSSVVTVPSSSLGTQTYICNVNHKPSNTKVDKKVEPKSCDKTHT

CPPCPAPEAAGGPSVFLFPPKPKDTLMISRTPEVTCVVVDVSHEDPEVKFNWYVDGVEVHNAKTKPREEQYNSTYR

VVSVLTVLHQDWLNGKEYKCKVSNKALPAPIEKTISKAKGQPREPQVYTLPPSRDELTKNQVSLTCLVKGFYPSDIAVE

WESNGQPENNYKTTPPVLDSDGSFFLYSKLTVDKSRWQQGNVFSCSVMHEALHNHYTQKSLSLSPG

Amino acid sequence of light chain of G1AA/FS30-16 mAb
Light chain AA
SEQ ID NO: 91

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQGSRFFPITFGQGTKVEIK*RTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTKSFNRGEC

Amino acid sequence of heavy chain of FS20-22-49AA/FS30-16 mAb²
Heavy chain AA (with LALA)

SEQ ID NO: 92

*EVQLLESGGGLVQPGGSLRLSCAASGFTFSNYAMHWVRQAPGKGLEWVSTIDPTDGATNYADSVKGRFTISRDNSK*

*NTLYLQMNSLRAEDTAVYYCARSKYYTYMQYVALDYWGQGTLVTVSSASTKGPSVFPLAPSSKSTSGGTAALGCLVK*

DYFPEPVTVSWNSGALTSGVHTFPAVLQSSGLYSLSSVVTVPSSSLGTQTYICNVNHKPSNTKVDKKVEPKSCDKTHT

CPPCPAPEAAGGPSVFLFPPKPKDTLMISRTPEVTCVVVDVSHEDPEVKFNWYVDGVEVHNAKTKPREEQYNSTYR

VVSVLTVLHQDWLNGKEYKCKVSNKALPAPIEKTISKAKGQPREPQVYTLPPSRDEYWDQEVSLTCLVKGFYPSDIAV

EWESNGDEQFAYKTTPPVLDSDGSFFLYSKLTVDQYRWNPADYFSCSVMHEALHNHYTQKSLSLSPG

Amino acid sequence of light chain of FS20-22-49AA/FS30-16 mAb²
Light chain AA

SEQ ID NO: 91

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQGSRFFPITFGQGTKVEIK*RTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTKSFNRGEC

Amino acid sequence of heavy chain of FS20-22-49AA/FS30-35 mAb²
Heavy chain AA (with LALA)

SEQ ID NO: 93

*EVQLLESGGGLVQPGGSLRLSCAASGFTFSAYNIHWVRQAPGKGLEWVSDISPYGGATNYADSVKGRFTISRDNSKN*

*TLYLQMNSLRAEDTAVYYCARNLYELSAYSYGMDYWGQGTLVTVSS*ASTKGPSVFPLAPSSKSTSGGTAALGCLVKD

YFPEPVTVSWNSGALTSGVHTFPAVLQSSGLYSLSSVVTVPSSSLGTQTYICNVNHKPSNTKVDKKVEPKSCDKTHTC

PPCPAPEAAGGPSVFLFPPKPKDTLMISRTPEVTCVVVDVSHEDPEVKFNWYVDGVEVHNAKTKPREEQYNSTYRV

VSVLTVLHQDWLNGKEYKCKVSNKALPAPIEKTISKAKGQPREPQVYTLPPSRDEYWDQEVSLTCLVKGFYPSDIAVE

WESNGDEQFAYKTTPPVLDSDGSFFLYSKLTVDQYRWNPADYFSCSVMHEALHNHYTQKSLSLSPG

Amino acid sequence of light chain of FS20-22-49AA/FS30-35 mAb²
Light chain AA

SEQ ID NO: 68

*EIVLTQSPGTLSLSPGERATLSCRASQSVSSSYLAWYQQKPGQAPRLLIYGASSRATGIPDRFSGSGSGTDFTLTISRLEP*

*EDFAVYYCQQYYYSSPITFGQGTKVEIK*RTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTKSFNRGEC

Amino acid sequence of heavy chain of G1AA/HeID1.3 mAb
Heavy chain AA (with LALA)

SEQ ID NO: 94

*QVQLQESGPGLVRPSQTLSLTCTVSGSTFSGYGVNWVRQPPGRGLEWIGMIWGDGNTDYNSALKSRVTMLVDTSK*

*NQFSLRLSSVTAADTAVYYCARERDYRLDYWGQGSLVTVSS*ASTKGPSVFPLAPSSKSTSGGTAALGCLVKDYFPEPV

TVSWNSGALTSGVHTFPAVLQSSGLYSLSSVVTVPSSSLGTQTYICNVNHKPSNTKVDKKVEPKSCDKTHTCPPCPAP

EAAGGPSVFLFPPKPKDTLMISRTPEVTCVVVDVSHEDPEVKFNWYVDGVEVHNAKTKPREEQYNSTYRVVSVLTVL

HQDWLNGKEYKCKVSNKALPAPIEKTISKAKGQPREPQVYTLPPSRDELTKNQVSLTCLVKGFYPSDIAVEWESNGQ

PENNYKTTPPVLDSDGSFFLYSKLTVDKSRWQQGNVFSCSVMHEALHNHYTQKSLSLSPG

Amino acid sequence of light chain of G1AA/HelD1.3 mAb
Light chain AA

SEQ ID NO: 95

*DIQMTQSPASLSASVGETVTITCRASGNIHNYLAWYQQKQGKSPQLLVYNAKTLADGVPSRFSGSGSGTQYSLKINSL*

*QPEDFGSYYCQHFWSTPRTFGGGTKLEIK*RTVAAPSVFIFPPSDEQLKSGTASVVCLLNNFYPREAKVQWKVDNALQ

SGNSQESVTEQDSKDSTYSLSSTLTLSKADYEKHKVYACEVTHQGLSSPVTKSFNRGEC

Amino acid sequence of heavy chain of G1/4420 mAb
Heavy chain AA (without LALA)

SEQ ID NO: 96

*EVKLDETGGGLVQPGRPMKLSCVASGFTFSDYWMNWVRQSPEKGLEWVAQIRNKPYNYETYYSDSVKGRFTISRD*

*DSKSSVYLQMNNLRVEDMGIYYCTGSYYGMDYWGQGTSVTVSS*ASTKGPSVFPLAPSSKSTSGGTAALGCLVKDYF

PEPVTVSWNSGALTSGVHTFPAVLQSSGLYSLSSVVTVPSSSLGTQTYICNVNHKPSNTKVDKKVEPKSCDKTHTCPP

CPAPELLGGPSVFLFPPKPKDTLMISRTPEVTCVVVDVSHEDPEVKFNWYVDGVEVHNAKTKPREEQYNSTYRVVSV

LTVLHQDWLNGKEYKCKVSNKALPAPIEKTISKAKGQPREPQVYTLPPSRDELTKNQVSLTCLVKGFYPSDIAVEWES

NGQPENNYKTTPPVLDSDGSFFLYSKLTVDKSRWQQGNVFSCSVMHEALHNHYTQKSLSLSPG

Amino acid sequence of light chain of G1/4420 mAb
Light chain AA
SEQ ID NO: 97

*DVVMTQTPLSLPVSLGDQASISCRSSQSLVHSNGNTYLRWYLQKPGQSPKVLIYKVSNRFSGVPDRFSGSGSGTDFTL*

*KISRVEAEDLGVYFCSQSTHVPWTFGGGTKLEIK*RTVAAPSVFIFPPSDEQLKSGTASVVCLLNNFYPREAKVQWKVD

NALQSGNSQESVTEQDSKDSTYSLSSTLTLSKADYEKHKVYACEVTHQGLSSPVTKSFNRGEC

Amino acid sequence of heavy chain of FS20-22-49AA/4420 mAb²
Heavy chain AA (with LALA)
SEQ ID NO: 98

*EVKLDETGGGLVQPGRPMKLSCVASGFTFSDYWMNWVRQSPEKGLEWVAQIRNKPYNYETYYSDSVKGRFTISRD*

*DSKSSVYLQMNNLRVEDMGIYYCTGSYYGMDYWGQGTSVTVSS*ASTKGPSVFPLAPSSKSTSGGTAALGCLVKDYF

PEPVTVSWNSGALTSGVHTFPAVLQSSGLYSLSSVVTVPSSLGTQTYICNVNHKPSNTKVDKKVEPKSCDKTHTCPP

CPAPEAAGGPSVFLFPPKPKDTLMISRTPEVTCVVVDVSHEDPEVKFNWYVDGVEVHNAKTKPREEQYNSTYRVVS

VLTVLHQDWLNGKEYKCKVSNKALPAPIEKTISKAKGQPREPQVYTLPPSRDEYWDQEVSLTCLVKGFYPSDIAVEWE

SNGDEQFAYKTTPPVLDSDGSFFLYSKLTVDQYRWNPADYFSCSVMHEALHNHYTQKSLSLSPG

Amino acid sequence of light chain of FS20-22-49AA/4420 mAb²
Light chain AA
SEQ ID NO: 97

*DVVMTQTPLSLPVSLGDQASISCRSSQSLVHSNGNTYLRWYLQKPGQSPKVLIYKVSNRFSGVPDRFSGSGSGTDFTL*

*KISRVEAEDLGVYFCSQSTHVPWTFGGGTKLEIK*RTVAAPSVFIFPPSDEQLKSGTASVVCLLNNFYPREAKVQWKVD

NALQSGNSQESVTEQDSKDSTYSLSSTLTLSKADYEKHKVYACEVTHQGLSSPVTKSFNRGEC

G1/MOR7480.1 and G1AA/MOR7480.1 mAb
Heavy chain (without LALA)
SEQ ID NO: 99

*EVQLVQSGAEVKKPGESLRISCKGSGYSFSTYWISWVRQMPGKGLEWMGKIYPGDSYTNYSPSFQGQVTISADKSIS*

*TAYLQWSSLKASDTAMYYCARGYGIFDYWGQGTLVTVSS*ASTKGPSVFPLAPSSKSTSGGTAALGCLVKDYFPEPVTV

SWNSGALTSGVHTFPAVLQSSGLYSLSSVVTVPSSLGTQTYICNVNHKPSNTKVDKKVEPKSCDKTHTCPPCPAPELL

GGPSVFLFPPKPKDTLMISRTPEVTCVVVDVSHEDPEVKFNWYVDGVEVHNAKTKPREEQYNSTYRVVSVLTVLHQ

DWLNGKEYKCKVSNKALPAPIEKTISKAKGQPREPQVYTLPPSRDELTKNQVSLTCLVKGFYPSDIAVEWESNGQPEN

NYKTTPPVLDSDGSFFLYSKLTVDKSRWQQGNVFSCSVMHEALHNHYTQKSLSLSPG

Heavy chain (with LALA)
SEQ ID NO: 100

*EVQLVQSGAEVKKPGESLRISCKGSGYSFSTYWISWVRQMPGKGLEWMGKIYPGDSYTNYSPSFQGQVTISADKSIS*

*TAYLQWSSLKASDTAMYYCARGYGIFDYWGQGTLVTVSS*ASTKGPSVFPLAPSSKSTSGGTAALGCLVKDYFPEPVTV

SWNSGALTSGVHTFPAVLQSSGLYSLSSVVTVPSSLGTQTYICNVNHKPSNTKVDKKVEPKSCDKTHTCPPCPAPEA

AGGPSVFLEPPKPKDTLMISRTPEVTCVVVDVSHEDPEVKFNWYVDGVEVHNAKTKPREEQYNSTYRVVSVLTVLH

QDWLNGKEYKCKVSNKALPAPIEKTISKAKGQPREPQVYTLPPSRDELTKNQVSLTCLVKGFYPSDIAVEWESNGQPE

NNYKTTPPVLDSDGSFFLYSKLTVDKSRWQQGNVFSCSVMHEALHNHYTQKSLSLSPG

Light chain
SEQ ID NO: 101

*SYELTQPPSVSVSPGQTASITCSGDNIGDQYAHWYQQKPGQSPVLVIYQDKNRPSGIPERFSGSNSGNTATLTISGTQ*

*AMDEADYYCATYTGFGSLAVFGGGTKLTVLG*QPKAAPSVTLFPPSSEELQANKATLVCLISDFYPGAVTVAWKADSS

PVKAGVETTTPSKQSNNKYAASSYLSLTPEQWKSHRSYSCQVTHEGSTVEKTVAPTECS

G2/MOR7480.1 mAb
Heavy chain

SEQ ID NO: 102

*EVQLVQSGAEVKKPGESLRISCKGSYSFSTYWISWVRQMPGKGLEWMGKIYPGDSYTNYSPSFQGQVTISADKSIS*

*TAYLQWSSLKASDTAMYYCARGYGIFDYWGQGTLVTVSS*ASTKGPSVFPLAPCSRSTSESTAALGCLVKDYFPEPVTV

SWNSGALTSGVHTFPAVLQSSGLYSLSSVVTVPSSNFGTQTYTCNVDHKPSNTKVDKTVERKCCVECPPCPAPPVAG

PSVFLFPPKPKDTLMISRTPEVTCVVVDVSHEDPEVQFNWYVDGVEVHNAKTKPREEQFNSTFRVVSVLTVVHQDW

LNGKEYKCKVSNKGLPAPIEKTISKTKGQPREPQVYTLPPSREEMTKNQVSLTCLVKGFYPSDIAVEWESNGQPENNY

KTTPPMLDSDGSFFLYSKLTVDKSRWQQGNVFSCSVMHEALHNHYTQKSLSLSPG

Light chain

SEQ ID NO: 101

*SYELTQPPSVSVSPGQTASITCSGDNIGDQYAHWYQQKPGQSPVLVIYQDKNRPSGIPERFSGSNSGNTATLTISGTQ*

*AMDEADYYCATYTGFGSLAVFGGGTKLTVL*GQPKAAPSVTLFPPSSEELQANKATLVCLISDFYPGAVTVAWKADSS

PVKAGVETTTPSKQSNNKYAASSYLSLTPEQWKSHRSYSCQVTHEGSTVEKTVAPTECS

G1/20H4.9 and G1AA/20H4.9 mAb
Heavy chain (without LALA)

SEQ ID NO: 104

*QVQLQQWGAGLLKPSETLSLTCAVYGGSFSGYYWSWIRQSPEKGLEWIGEINHGGYVTYNPSLESRVTISVDTSKNQ*

*FSLKLSSVTAADTAVYYCARDYGPGNYDWYFDLWGRGTLVTVSS*ASTKGPSVFPLAPSSKSTSGGTAALGCLVKDYFP

EPVTVSWNSGALTSGVHTFPAVLQSSGLYSLSSVVTVPSSSLGTQTYICNVNHKPSNTKVDKKVEPKSCDKTHTCPPC

PAPELLGGPSVFLFPPKPKDTLMISRTPEVTCVVVDVSHEDPEVKFNWYVDGVEVHNAKTKPREEQYNSTYRVVSVL

TVLHQDWLNGKEYKCKVSNKALPAPIEKTISKAKGQPREPQVYTLPPSRDELTKNQVSLTCLVKGFYPSDIAVEWESN

GQPENNYKTTPPVLDSDGSFFLYSKLTVDKSRWQQGNVFSCSVMHEALHNHYTQKSLSLSPG

Heavy chain (with LALA)

SEQ ID NO: 105

*QVQLQQWGAGLLKPSETLSLTCAVYGGSFSGYYWSWIRQSPEKGLEWIGEINHGGYVTYNPSLESRVTISVDTSKNQ*

*FSLKLSSVTAADTAVYYCARDYGPGNYDWYFDLWGRGTLVTVSS*ASTKGPSVFPLAPSSKSTSGGTAALGCLVKDYFP

EPVTVSWNSGALTSGVHTFPAVLQSSGLYSLSSVVTVPSSSLGTQTYICNVNHKPSNTKVDKKVEPKSCDKTHTCPPC

PAPEAAGGPSVFLFPPKPKDTLMISRTPEVTCVVVDVSHEDPEVKFNWYVDGVEVHNAKTKPREEQYNSTYRVVSVL

TVLHQDWLNGKEYKCKVSNKALPAPIEKTISKAKGQPREPQVYTLPPSRDELTKNQVSLTCLVKGFYPSDIAVEWESN

GQPENNYKTTPPVLDSDGSFFLYSKLTVDKSRWQQGNVFSCSVMHEALHNHYTQKSLSLSPG

Light chain

SEQ ID NO: 106

EIVLTQSPATLSLSPGERATLSCRASQSVSSYLAWYQQKPGQAPRLLIYDASNRATGIPARFSGSGSGTDFTLTISSLEPE

DFAVYYCQQRSNWPPALTFGGGTKVEIKRTVAAPSVFIFPPSDEQLKSGTASVVCLLNNFYPREAKVQWKVDNALQS

GNSQESVTEQDSKDSTYSLSSTLTLSKADYEKHKVYACEVTHQGLSSPVTKSFNRGEC

CH2 domain
with LALA

SEQ ID NO: 107

*APEAAGGPSVFLFPPKPKDTLMISRTPEVTCVVVDVSHEDPEVKFNWYVDGVEVHNAKTKPREEQYNSTYRVVSVLT*

*VLHQDWLNGKEYKCKVSNKALPAPIEKTISKA* with LALA PA

SEQ ID NO: 108

*APEAAGGPSVFLFPPKPKDTLMISRTPEVTCVVVDVSHEDPEVKFNWYVDGVEVHNAKTKPREEQYNSTYRVVSVLT*

*VLHQDWLNGKEYKCKVSNKALAAPIEKTISKAK*

CH3 domain

SEQ ID NO: 109

*GQPREPQVYTLPPSRDELTKNQVSLTCLVKGFYPSDIAVEWESNGQPENNYKTTPPVLDSDGSFFLYSKLTVDKSRW*

*QQGNVFSCSVMHEALHNHYTQKSLSLSPG*

-continued

G1/11D4 mAb
Heavy chain (without LALA)

SEQ ID NO: 110

*EVQLVESGGGLVQPGGSLRLSCAASGFTFSSYSMNWVRQAPGKGLEWVSYISSSSSTIDYADSVKGRFTISRDNAKNS*

*LYLQMNSLRDEDTAVYYCARESGWYLFDYWGQGTLVTVSS*ASTKGPSVFPLAPSSKSTSGGTAALGCLVKDYFPEPV

TVSWNSGALTSGVHTFPAVLQSSGLYSLSSVVTVPSSSLGTQTYICNVNHKPSNTKVDKKVEPKSCDKTHTCPPCPAP

ELLGGPSVFLFPPKPKDTLMISRTPEVTCVVVDVSHEDPEVKFNWYVDGVEVHNAKTKPREEQYNSTYRVVSVLTVL

HQDWLNGKEYKCKVSNKALPAPIEKTISKAKGQPREPQVYTLPPSRDELRFYQVSLTCLVKGFYPSDIAVEWESNGQP

DIFPNGLNYKTTPPVLDSDGSFFLYSKLTVPYPSWLMGTRFSCSVMHEALHNHYTQKSLSLSPG

Light chain

SEQ ID NO: 111

*DIQMTQSPSSLSASVGDRVTITCRASQGISSWLAWYQQKPEKAPKSLIYAASSLQSGVPSRFSGSGSGTDFTLTISSLQP*

*EDFATYYCQQYNSYPPTFGGGTKVEIK*RTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTKSFNRGEC

CD137-mFc-Avi and CD137-Avi-His
Human

SEQ ID NO: 112

SLQDPCSNCPAGTFCDNNRNQICSPCPPNSFSSAGGQRTCDICRQCKGVFRTRKECSSTSNAECDCTPGFHCLGAG

CSMCEQDCKQGQELTKKGCKDCCFGTFNDQKRGICRPWTNCSLDGKSVLVNGTKERDVVCGPSPADLSPGASSV

TPPAPAREPGHSPQ

Cyno

SEQ ID NO: 113

SLQDLCSNCPAGTFCDNNRSQICSPCPPNSFSSAGGQRTCDICRQCKGVFKTRKECSSTSNAECDCISGYHCLGAEC

SMCEQDCKQGQELTKKGCKDCCFGTFNDQKRGICRPWTNCSLDGKSVLVNGTKERDVVCGPSPADLSPGASSAT

PPAPAREPGHSPQ

Mouse

SEQ ID NO: 114

AVQNSCDNCQPGTFCRKYNPVCKSCPPSTFSSIGGQPNCNICRVCAGYFRFKKFCSSTHNAECECIEGFHCLGPQCT

RCEKDCRPGQELTKQGCKTCSLGTFNDQNGTGVCRPWTNCSLDGRSVLKTGTTEKDVVCGPPVVSFSPSTTISVTP

EGGPGGHSLQVL mFc-Avi

SEQ ID NO: 115

Mouse Fc domain (italics)
Avi tag (bold)

*PRGPTIKPCPPCKCPAPNLEGGPSVFIFPPKIKDVLMISLSPIVTCVVVDVSEDDPDVQISWFVNNVEVHTAQTQTH*

*REDYNSTLRVVSALPIQHQDWMSGKAFACAVNNKDLPAPIERTISKPKGSVRAPQVYVLPPPEEEMTKKQVTLTC*

*MVTDFMPEDIYVEWTNNGKTELNYKNTEPVLDSDGSYFMYSKLRVEKKNWVERNSYSCSVVHEGLHNHHTTKSF*

*SRTPGK*GGGLNDIFEAQKIEWHE

OX40-mFc

SEQ ID NO: 116

LHCVGDTYPSNDRCCHECRPGNGMVSRCSRSQNTVCRPCGPGFYNDVVSSKPCKPCTWCNLRSGSERKQLCTATQ

DTVCRCRAGTQPLDSYKPGVDCAPCPPGHFSPGDNQACKPWTNCTLAGKHTLQPASNSSDAICEDRDPPATQPQE

TQGPPARPITVQPTEAWPRTSQGPSTRPVEVPGGRAVA

GITR-hFc-Avi

SEQ ID NO: 117

QRPTGGPGCGPGRLLLGTGTDARCCRVHTTRCCRDYPGEECCSEWDCMCVQPEFHCGDPCCTTCRHHCPPGQ

GVQSQGKFSFGFQCIDCASGTFSGGHEGHCKPWTDCTQFGFLTVFPGNKTHNAVCVPGSPPAE

-continued

CD40-mFc

SEQ ID NO: 118

EPPTACREKQYLINSQCCSLCQPGQKLVSDCTEFTETECLPCGESEFLDTWNRETHCHQHKYCDPNLGLRVQQKGTS

ETDTICTCEEGWHCTSEACESCVLHRSCSPGFGVKQIATGVSDTICEPCPVGFFSNVSSAFEKCHPWTSCETKDLVVQ

QAGTNKTDVVCGPQDRLR

CD137 Cell-expressed antigens
Extracellular domain (italics)
Transmembrane and intracellular domains (bold)
Human

SEQ ID NO: 119

*LQDPCSNCPAGTFCDNNRNQICSPCPPNSFSSAGGQRTCDICRQCKGVFRTRKECSSTSNAECDCTPGFHCLGAGCS*

*MCEQDCKQGQELTKKGCKDCCFGTFNDQKRGICRPWTNCSLDGKSVLVNGTKERDVVCGPSPADLSPGASSVTPP*

*APAREPGHSPQI*ISFFLALTSTALLFLLFFLTLRFSVVKRGRKKLLYIFKQPFMRPVQTTQEEDGCSCRFPEEEEGGCEL

Cyno

SEQ ID NO: 120

*LQDLCSNCPAGTFCDNNRSQICSPCPPNSFSSAGGQRTCDICRQCKGVFKTRKECSSTSNAECDCISGYHCLGAECSM*

*CEQDCKQGQELTKKGCKDCCFGTFNDQKRGICRPWTNCSLDGKSVLVNGTKERDVVCGPSPADLSPGASSATPPAP*

*AREPGHSPQI*IFFLALTSTVVLFLLFFLVLRFSVVKRSRKKLLYIFKQPFMRPVQTTQEEDGCSCRFPEEEEGGCEL

REFERENCES

All documents mentioned in this specification are incorporated herein by reference in their entirety.

Altschul S F, Gish W, Miller W, Myers E W, Lipman D J. Basic local alignment search tool. J. Mol. Biol. 215 (3), 403-10 (1990).

Altschul S F, Madden T L, Schaffer A A, Zhang J, Zhang Z, Miller W, Lipman D J. Gapped BLAST and PSI-BLAST: a new generation of protein database search programs. Nucleic Acids Res. 25 (17), 3389-402 (1997).

Andrade V C, Vettore A L, Felix R S, Almeida M S, Carvalho F, Oliveira J S, Chauffaille M L, Andriolo A, Caballero O L, Zago M A, Colleoni G W. Prognostic impact of cancer/testis antigen expression in advanced stage multiple myeloma patients. Cancer Immun. 8, 2 (2008).

Bagshawe K D, Sharma S K, Springer C J, Antoniw P, Rogers G T, Burke P J, Melton R. Antibody-enzyme conjugates can generate cytotoxic drugs from inactive precursors at tumor sites. Antibody, Immunoconjugates and Radiopharmaceuticals 4, 915-922 (1991).

Bartkowiak T, Curran M A. 4-1BB agonists: multi-potent potentiators of tumor immunity. Front. Oncol. 5, 117 (2015).

Bedzyk W D, Johnson L S, Riordan G S, Voss E W Jr. Comparison of variable region primary structures within an anti-fluorescein idiotype family. J. Biol. Chem. 264 (3), 1565-69 (1989).

Bedzyk W D, Weidner K M, Denzin L K, Johnson L S, Hardman K D, Pantoliano M W, Asel E D, Voss E W Jr. Immunological and structural characterization of a high affinity anti-fluorescein single-chain antibody. J Biol Chem. 265 (30), 18615-20 (1990).

Bhome R, Bullock M D, A l Saihati H A, Goh R W, Primrose J N, Sayan A E, Mirnezami A H. A top-down view of the tumor microenvironment: structure, cells and signaling. Front. Cel. Dev. Biol. 3, 33 (2015).

Braden B C, Fields B A, Ysern X, Goldbaum F A, Dall'Acqua W, Schwarz F P, Poljak R J, Mariuzza R A. Crystal structure of the complex of the variable domain of antibody D1.3 and turkey egg white lysozyme: a novel conformational change in antibody CD3-L3 selects for antigen. J. Mol. Biol. 257 (5), 889-94 (1996)

Brinkmann U, Kontermann R E. The making of bispecific antibodies. MAbs (9) 2, 182-212 (2017).

Bruhns P, Iannascoli B, England P, Mancardi D A, Fernandez N, Jorieux S, Daëron M. Specificity and affinity of human Fcγ receptors and their polymorphic variants for human IgG subclasses. Blood 113 (16), 3716-25 (2009).

Carter P, Smith L, Ryan M. Identification and validation of cell surface antigens for antibody targeting in oncology. Endocr. Relat. Cancer 11 (4), 659-87 (2004).

Cheever M A, Allison J P, Ferris A S, Finn O J, Hastings B M, Hecht T T, Mellman I, Prindiville S A, Viner J L, Weiner L M, Matrisian L M. Clin. Cancer Res. 15 (17), 5323-37 (2009).

Chen D S, Mellman I. Oncology meets immunology: the cancer-immunity cycle. Immunity 39 (1), 1-10 (2013).

Chester C, Marabelle A, Houot R, Kohrt H E. Dual antibody therapy to harness the innate anti-tumour immune response to enhance antibody targeting of tumors. Curr. Opin. Immunol. 33, 1-8 (2015).

Chester C, Ambulkar S, Kohrt H E. 4-1BB agonism: adding the accelerator to cancer immunotherapy. Cancer Immunol. Immunother. 65(10), 1243-8 (2016).

Chester C, Sanmamed M F, Wang J, Melero I. Immunotherapy targeting 4-1BB: mechanistic rationale, clinical results, and future strategies. Blood 131(1), 49-57 (2018).

Croft M. Co-stimulatory members of the TNFR family: keys to effective T-cell immunity? Nat. Rev. Immunol. 3 (8), 609-620 (2003).

Dubrot J, Milheiro F, Alfaro C, Palazón A, Martinez-Forero I, Perez-Gracia J L, Morales-Kastresana A, Romero-Trevejo J L, Ochoa M C, Hervas-Stubbs S, Prieto J, Jure-Kunkel M, Chen L, Melero I. Treatment with anti-CD137 mAbs causes intense accumulations of liver T cells without selective antitumor immunotherapeutic effects in this organ. Cancer Immunol. Immunother. 59(8), 1223-33 (2010).

Gopal A, Levy R, Houot R, Patel S, Hatake K, Popplewell L, Chen Y, Davis C, Huang, B, Cesari R, Thall A, Woolfson A, Bartlett N. A phase I study of utomilumab (PF-05082566), a 4-1BB/CD137 agonist, in combination with rituximab in patients with CD20+ non Hodgkin's lymphoma. Hematol. Oncol. 35, 260 (2017).

Gubin M M, Artyomov M N, Mardis E R, Schreiber R D. Tumor neoantigens: building a framework for personalized cancer immunotherapy. J. Clin. Invest. 125 (9), 3413-21 (2015).

Gure A O, Chua R, Williamson B, Gonen M, Ferrera C A, Gnjatic S, Ritter G, Simpson A J, Chen Y T, Old L J, Altorki N K. Cancer-testis genes are coordinately expressed and are markers of poor outcome in non-small cell lung cancer. Clin. Cancer Res. 11(22), 8055-62 (2005).

Hezareh M, Hessell A J, Jensen R C, van de Winkel J G, Parren P W. Effector function activities of a panel of mutants of a broadly neutralizing antibody against human immunodeficiency virus type 1. J. Virol. 75(24), 12161-8 (2001).

Holliger P, Hudson P J. Engineered antibody fragments and the rise of single domains. Nat. Biotechnol. 23 (9), 1126-36 (2005).

Hurtado J C, Kim Y J, Kwon B S. Signals through 4-1BB are costimulatory to previously activated splenic T cells and inhibit activation-induced cell death. J. Immunol. 158(6), 2600-9 (1997).

Idusogie E E, Presta L G, Gazzano-Santoro H, Totpal K, Wong P Y, Ultsch M, Meng Y G, Mulkerrin M G. Mapping of the C1q binding site on rituxan, a chimeric antibody with a human IgG1 Fc. J. Immunol. 164(8), 4178-84 (2000).

Jefferis R, Reimer C B, Skvaril F, de Lange G, Ling N R, Lowe J, Walker M R, Phillips D J, Aloisio C H, Wells T W. Evaluation of monoclonal antibodies having specificity for human IgG sub-classes: results of an IUIS/WHO collaborative study. Immunol. Lett. 1, 223-52 (1985).

Jefferis R, Reimer C B, Skvaril F, de Lange G G, Goodall D M, Bentley T L, Phillips D J, Vlug A, Harada S, Radl J. Evaluation of monoclonal antibodies having specificity for human IgG subclasses: results of the 2nd IUIS/WHO collaborative study. Immunol. Lett. 31(2), 143-68 (1992).

Kabat E A, Wu T T, Perry H M, Gottesman K S, Foeller C. Sequences of Proteins of Immunological Interest, 5th ed. NIH Publication No. 91-3242. Washington, D.C.: U.S. Department of Health and Human Services (1991).

Klein C, Schaefer W, Regula J T. The use of CrossMAb technology for the generation of bi- and multispecific antibodies. MAbs 8(6), 1010-20 (2016).

Kohrt H E, Houot R, Goldstein M J, Weiskopf K, Alizadeh A A, Brody J, Müller A, Pachynski R, Czerwinski D, Coutre S, Chao M P, Chen L, Tedder T F, Levy R. CD137 stimulation enhances the antilymphoma activity of anti-CD20 antibodies. Blood 117(8), 2423-32 (2011).

Kohrt H E, Houot R, Weiskopf K, Goldstein M J, Scheeren F, Czerwinski D, Colevas A D, Weng W K, Clarke M F, Carlson R W, Stockdale F E, Mollick J A, Chen L, Levy R. Stimulation of natural killer cells with a CD137-specific antibody enhances trastuzumab efficacy in xenotransplant models of breast cancer. J. Clin. Invest. 122 (3), 1066-75 (2012).

Kohrt H E, Colevas A D, Houot R, Weiskopf K, Goldstein M J, Lund P, Mueller A, Sagiv-Barfi I, Marabelle A, Lira R, Troutner E, Richards L, Rajapaska A, Hebb J, Chester C, Waller E, Ostashko A, Weng W K, Chen L, Czerwinski D, Fu Y X, Sunwoo J, Levy R. Targeting CD137 enhances the efficacy of cetuximab. J. Clin. Invest. 124(6), 2668-82 (2014).

Kontermann R E. Dual targeting strategies with bispecific antibodies. MAbs 4 (2), 182-97 (2012).

Ledermann J A, Begent R H, Massof C, Kelly A M, Adam T, Bagshawe K D. A phase-I study of repeated therapy with radiolabelled antibody to carcinoembryonic antigen using intermittent or continuous administration of cyclosporin A to suppress the immune response. Int. J. Cancer 47(5), 659-64 (1991).

Lefranc M P, Giudicelli V, Duroux P, Jabado-Michaloud J, Folch G, Aouinti S, Carillon E, Duvergey H, Houles A, Paysan-Lafosse T, Hadi-Saljoqi S, Sasorith S, Lefranc G, Kossida S. IMGT®, the international ImMunoGene Tics information System® 25 years on. Nucleic Acids Res. 43 (Database issue), D413-22 (2015).

Li Y, Tan S, Zhang C, Chai Y, He M, Zhang C W, Wang Q, Tong Z, Liu K, Lei Y, Liu W J, Liu Y, Tian Z, Cao X, Yan J, Qi J, Tien P, Gao S, Gao G F. Limited cross-linking of 4-1BB by 4-1BB ligand and the agonist monoclonal antibody utomilumab. Cell Rep. 25(4), 909-920 (2018).

Makkouk A, Chester C, Kohrt H E. Rationale for anti-CD137 cancer immunotherapy. Eur. J. Cancer, 54, 112-119 (2016).

Malarkannan S, Horng T, Shih P P, Schwab S, Shastri N. Presentation of out-of-frame peptide/MHC class I complexes by a novel translation initiation mechanism. Immunity 10(6), 681-90 (1999).

Moran A E, Kovacsovics-Bankowski M, Weinberg A D. The TNFRs OX40, 4-1BB, and CD40 as targets for cancer immunotherapy. Curr. Opin. Immunol. 25(2), 230-7 (2013).

Napoletano C, Bellati F, Tarquini E, Tomao F, Taurino F, Spagnoli G, Rughetti A, Muzii L, Nuti M, Benedetti Panici P. MAGE-A and NY-ESO-1 expression in cervical cancer: prognostic factors and effects of chemotherapy. Am. J. Obstet. Gynecol. 198(1), 99.e1-99.e7 (2008).

Pearson W R, Lipman D J. Improved tools for biological sequence comparison. Proc. Natl. Acad. Sci. U.S.A. 85(8), 2444-8 (1988).

Podojil J R, Miller S D. Potential targeting of B7-H4 for the treatment of cancer. Immunol. Rev. 276(1), 40-51 (2017).

Powers G A, Hudson P J, Wheatcroft M P. Design and production of multimeric antibody fragments, focused on diabodies with enhanced clinical efficacy. Methods Mol. Biol. 907, 699-712 (2012).

Rosenberg S. Development of Cancer Vaccines. ASCO Educational Book Spring: 60-62 (2000).

Scott A M, Renner C. Tumour Antigens Recognized by Antibodies. eLS (2001).

Shuford W W, Klussman K, Tritchler D D, Loo D T, Chalupny J, Siadak A W, Brown T J, Emswiler J, Raecho H, Larsen C P, Pearson T C, Ledbetter J A, Aruffo A, Mittler R S. 4-1BB costimulatory signals preferentially induce CD8+ T cell proliferation and lead to the amplification in vivo of cytotoxic T cell responses. J. Exp. Med. 186(1), 47-55 (1997).

Simpson A J, Cabellero O L, Jungbluth O L, Chen Y T, Old L J. Cancer/testis antigens, gametogenesis and cancer. Nat. Rev. Cancer 5(8), 615-25 (2005).

Smith T F, Waterman M S. Identification of common molecular subsequences. J. Mol. Biol. 147(1), 195-7 (1981).

Spiess C, Zhai Q, Carter P J. Alternative molecular formats and therapeutic applications for bispecific antibodies. Mol. Immunol. 67(2 Pt A), 95-106 (2015).

Tai Y T, Anderson K C. Targeting B-cell maturation antigen in multiple myeloma. Immunotherapy 7(11), 1187-99 (2015).

Tinguely M, Jenni B, Knights A, Lopes B, Korol D, Rousson V, Curioni Fontecedro A, Cogliatti Bittermann A G, Schmid U, Dommann-Scherrer C, Maurer R, Renner C, Probst-Hensch N M, Moch H, Knuth A, Zippelius A. MAGE-C1/CT-7 expression in plasma cell myeloma: sub-cellular localization impacts on clinical outcome. Cancer Sci. 99(4), 720-5 (2008).

Tolcher A W, Sznol M, Hu-Lieskovan S, Papadopoulos K P, Patnaik A, Rasco D W, Di Gravio D, Huang B, Gambhire D, Chen Y, Thall A D, Pathan N, Schmidt E V, Chow L Q M. A phase Ib study of PF-05082566 in combination with pembrolizumab in patients with advanced solid tumors. J. Clin. Oncology 34, 3002 (2016).

Velazquez E F, Jungbluth A A, Yancovitz M, Gnjatic S, Adams S, O'Neill D, Zavilevich K, Albukh T, Christos P, Mazumdar M, Pavlick A, Polsky D, Shapiro R, Berman R, Spira J, Busam K, Osman I, Bhardwaj N. Expression of the cancer/testis antigen NY-ESO-1 in primary and metastatic malignant melanoma (MM)-correlation with prognostic factors. Cancer Immun. 7, 11 (2007).

Vinay D S, Kwon, B S. 4-1BB signalling beyond T cells. Cell. Mol. Immunol. 8(4), 281-4 (2011).

Wang X, Mathieu M, Brezski R J. IgG Fc engineering to modulate antibody effector functions. Protein Cell 9(1), 63-73 (2018).

Wen T, Bukczynski J, Watts T H. 4-1BB ligand-mediated costimulation of human T cells induces CD4 and CD8 T cell expansion, cytokine production, and the development of cytolytic effector function. J. Immunol. 168(10), 4897-906 (2002).

Wesche-Soldato D E, Chung C S, Gregory S H, Salazar-Mather T P, Ayala C A, Ayala A. CD8+ T cells promote inflammation and apoptosis in the liver after sepsis: role of Fas-FasL. Am. J. Pathol. 171(1), 87-96 (2007).

Won E Y, Cha K, Byun J S, Kim D U, Shin S, Ahn B, Kim Y H, Rice A J, Walz T, Kwon B S, Cho H S. The structure of the trimer of human 4-1BB ligand is unique among members of the tumor necrosis factor superfamily. J. Biol. Chem. 285(12), 9202-10 (2010).

Wozniak-Knopp G, Bartl S, Bauer A, Mostageer M, Woisetschläger M, Antes B, Ettl K, Kainer M, Weberhofer G, Wiederkum S, Himmler G, Mudde G C, Rüker F. Introducing antigen-binding sites in structural loops of immunoglobulin constant domains: Fc fragments with engineered HER2/neu-binding sites and antibody properties. Protein Eng. Des. Sel. 23(4), 289-97 (2010).

The invention claimed is:

1. An antibody molecule that binds to CD137, wherein the antigen-binding site of the antibody molecule comprises the VH CDR1, VH CDR2, VH CDR3, VL CDR1, VL CDR2 and VL CDR3 set forth in:
   (i) SEQ ID NOs: 30, 32, 38, 17, 19 and 22, respectively;
   (ii) SEQ ID NOs: 30, 32, 34, 17, 19 and 22, respectively;
   (iii) SEQ ID NOs: 30, 32, 36, 17, 19 and 22, respectively;
   (iv) SEQ ID NOs: 62, 64, 66, 17, 19 and 23, respectively; or
   (v) SEQ ID NOs: 7, 9, 11, 17, 19 and 21, respectively;
      wherein the CDR sequences are defined according to the ImMunoGeneTics (IMGT) numbering scheme; or
      wherein the antigen-binding site of the antibody molecule comprises the VH CDR1, VH CDR2, VH CDR3, VL CDR1, VL CDR2 and VL CDR3 set forth in:
   (vi) SEQ ID NOs: 31, 33, 39, 18, 20 and 22, respectively;
   (vii) SEQ ID NOs: 31, 33, 35, 18, 20 and 22, respectively;
   (viii) SEQ ID NOs: 31, 33, 37, 18, 20 and 22, respectively;
   (ix) SEQ ID NOs: 63, 65, 67, 18, 20 and 23, respectively; or
   (x) SEQ ID NOs: 8, 10, 12, 18, 20 and 21, respectively;
      wherein the CDR sequences are defined according to the Kabat numbering scheme.

2. The antibody molecule according to claim 1, wherein the antibody molecule comprises the heavy chain variable (VH) domain and the light chain variable (VL) domain set forth in:
   (i) SEQ ID NOs: 54 and 48, respectively;
   (ii) SEQ ID NOs: 28 and 48, respectively;
   (iii) SEQ ID NOs: 44 and 48, respectively;
   (iv) SEQ ID NOs: 60 and 70, respectively; or
   (v) SEQ ID NOs: 5 and 15, respectively.

3. The antibody molecule according to claim 1, wherein the antigen-binding site of the antibody molecule comprises:
   (i) the VH CDR1, VH CDR2, VH CDR3, VL CDR1, VL CDR2 and VL CDR3 set forth in SEQ ID NOs: 30, 32, 38, 17, 19 and 22, respectively, wherein the CDR sequences are defined according to the IMGT numbering scheme; or
   (ii) the VH CDR1, VH CDR2, VH CDR3, VL CDR1, VL CDR2 and VL CDR3 set forth in SEQ ID NOs: 31, 33, 39, 18, 20 and 22, respectively, wherein the CDR sequences are defined according to the Kabat numbering scheme.

4. The antibody molecule according to claim 3, wherein the antibody molecule comprises the VH domain and the VL domain set forth in SEQ ID NOs: 54 and 48, respectively.

5. The antibody molecule according to claim 1, wherein the antibody molecule is a multispecific antibody molecule.

6. The antibody molecule according to claim 5, wherein the antibody molecule is a bispecific, trispecific, or tetraspecific antibody molecule.

7. The antibody molecule according to claim 6, wherein the antibody molecule is a bispecific antibody molecule.

8. The antibody molecule according to claim 5, wherein the antibody molecule comprises a second antigen-binding site that binds to OX40, wherein the second antigen-binding site:
   (i) is located in a modified CH3 domain of the antibody molecule, and
   (ii) is provided by amino acid substitutions in the AB, CD and EF structural loops of the modified CH3 domain;
   wherein the AB structural loop, the CD structural loop, and the EF structural loop are located between positions 10 and 19, 42 and 79, and 91 and 102 of the modified CH3 domain, respectively;
   wherein the amino acid substitutions in the AB, CD and EF structural loops of the modified CH3 domain results in the AB structural loop having the sequence RDEYWDQE (SEQ ID NO: 125), the CD structural loop having the sequence SNGDEQFAY (SEQ ID NO: 126), and the EF structural loop having the sequence DQYRWNPADY (SEQ ID NO: 127); and
   wherein the amino acid residue positions of the modified CH3 domain are numbered according to the IMGT numbering scheme.

9. The antibody molecule according to claim 8, wherein the sequence of the modified CH3 domain is: GQPREPQVYTLPPSRDEYWDQEVSLTCLVKGFYPS-DIAVEWESNGDEQFAYKTTPPVLDSD GSFFLYSK-LTVDQYRWNPADYFSCSVMHEALHNHYTQKSLSL-SPG (SEQ ID NO: 124).

10. The antibody molecule according to claim 9, wherein the antibody molecule comprises the heavy chain set forth in SEQ ID NO: 72, 73, 74, 75, 76, 77, 78, 79, 80 or 81.

11. The antibody molecule according to claim 10, wherein the antibody molecule comprises the heavy chain and the light chain set forth in SEQ ID Nos: 79 and 46, respectively.

12. The antibody molecule according to claim 1, wherein the antibody molecule comprises a CH2 domain which has been modified to reduce or abrogate binding of the CH2 domain to one or more Fc receptors.

13. The antibody molecule according to claim 1, wherein the antibody molecule does not bind to one or more Fcγ receptors.

14. A conjugate comprising the antibody molecule according to claim 1 and a bioactive molecule.

15. A nucleic acid molecule or molecules encoding the antibody molecule according to claim 1.

16. A method of producing the antibody molecule according to claim 1 comprising culturing a recombinant host cell comprising a nucleic acid molecule or molecules encoding the antibody molecule of claim 1 under conditions for production of the antibody molecule.

17. A pharmaceutical composition comprising the antibody molecule according to claim 1 and a pharmaceutically acceptable excipient.

18. The antibody molecule according to claim 11, wherein the CH3 domain of the heavy chain comprises an additional lysine residue (K) at the immediate C-terminus of the CH3 domain sequence.

19. A nucleic acid molecule or molecules encoding the antibody molecule according to claim 10.

20. A method of producing the antibody molecule according to claim 10, comprising culturing a recombinant host cell comprising a nucleic acid molecule or molecules encoding the antibody molecule of claim 10 under conditions for production of the antibody molecule.

21. A pharmaceutical composition comprising the antibody molecule according to claim 10 and a pharmaceutically acceptable excipient.

* * * * *

SEQUENCE LISTING

```
<160> NUMBER OF SEQ ID NOS: 127

<210> SEQ ID NO 1
<211> LENGTH: 454
<212> TYPE: PRT
<213> ORGANISM: Artificial Sequence
<220> FEATURE:
<223> OTHER INFORMATION: Synthetic

<400> SEQUENCE: 1

Glu Val Gln Leu Leu Glu Ser Gly Gly Gly Leu Val Gln Pro Gly Gly
1               5                   10                  15

Ser Leu Arg Leu Asn Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Ser Gly Ser Gly Gly Ser Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Ser Tyr Asp Lys Tyr Trp Gly Ser Ser Ile Tyr Ser Gly Leu
            100                 105                 110

Asp Tyr Trp Gly Gln Gly Thr Leu Val Thr Val Ser Ser Ala Ser Thr
        115                 120                 125

Lys Gly Pro Ser Val Phe Pro Leu Ala Pro Ser Ser Lys Ser Thr Ser
    130                 135                 140

Gly Gly Thr Ala Ala Leu Gly Cys Leu Val Lys Asp Tyr Phe Pro Glu
145                 150                 155                 160

Pro Val Thr Val Ser Trp Asn Ser Gly Ala Leu Thr Ser Gly Val His
                165                 170                 175

Thr Phe Pro Ala Val Leu Gln Ser Ser Gly Leu Tyr Ser Leu Ser Ser
            180                 185                 190

Val Val Thr Val Pro Ser Ser Ser Leu Gly Thr Gln Thr Tyr Ile Cys
        195                 200                 205
```

Asn Val Asn His Lys Pro Ser Asn Thr Lys Val Asp Lys Val Glu
        210                 215                 220

Pro Lys Ser Cys Asp Lys Thr His Thr Cys Pro Pro Cys Pro Ala Pro
225                 230                 235                 240

Glu Leu Leu Gly Gly Pro Ser Val Phe Leu Phe Pro Pro Lys Pro Lys
                245                 250                 255

Asp Thr Leu Met Ile Ser Arg Thr Pro Glu Val Thr Cys Val Val Val
            260                 265                 270

Asp Val Ser His Glu Asp Pro Glu Val Lys Phe Asn Trp Tyr Val Asp
        275                 280                 285

Gly Val Glu Val His Asn Ala Lys Thr Lys Pro Arg Glu Glu Gln Tyr
    290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Ala Leu
                325                 330                 335

Pro Ala Pro Ile Glu Lys Thr Ile Ser Lys Ala Lys Gly Gln Pro Arg
            340                 345                 350

Glu Pro Gln Val Tyr Thr Leu Pro Pro Ser Arg Asp Glu Leu Thr Lys
        355                 360                 365

Asn Gln Val Ser Leu Thr Cys Leu Val Lys Gly Phe Tyr Pro Ser Asp
370                 375                 380

Ile Ala Val Glu Trp Glu Ser Asn Gly Gln Pro Glu Asn Asn Tyr Lys
385                 390                 395                 400

Thr Thr Pro Pro Val Leu Asp Ser Asp Gly Ser Phe Phe Leu Tyr Ser
                405                 410                 415

Lys Leu Thr Val Asp Lys Ser Arg Trp Gln Gln Gly Asn Val Phe Ser
            420                 425                 430

Cys Ser Val Met His Glu Ala Leu His Asn His Tyr Thr Gln Lys Ser
        435                 440                 445

Leu Ser Leu Ser Pro Gly
    450

<210> SEQ ID NO 2
<211> LENGTH: 1362
<212> TYPE: DNA
<213> ORGANISM: Artificial Sequence
<220> FEATURE:
<223> OTHER INFORMATION: Synthetic

<400> SEQUENCE: 2

```
gaagtgcaac tgctggagtc cggtggtggt ctggtacagc cgggtggttc tctgcgtctg    60
aattgcgcgg ccagtggctt taccttcagt agctatgcca tgagctgggt gcgtcaggcg   120
ccgggcaaag gtctggaatg ggttagcgcg attagcggta gtggcggtag cacgtactat   180
gcggatagcg tgaaaggccg ttttaccatt tctcgcgaca acagcaagaa cacgctgtac   240
ctgcagatga actcactgcg tgccgaagat acggccgtgt attactgtgc gagatcttac   300
gacaaatact ggggttcttc tatttactct ggcttggact actggggcca gggaaccctg   360
gtcaccgtct cgagtgctag cactaagggc ccgtcggtgt tcccgctggc ccatcgtcc    420 aagagcacat caggggggtac cgccgccctg gctgccttg tgaaggatta ctttcccgag    480
cccgtcacag tgtcctggaa cagcggagcc ctgacctccg gagtgcatac ttttcccggct   540 gtgcttcagt cctctggcct gtactcattg tcctccgtgg tcaccgtccc ttcgtcctcc    600
```

```
ctgggcaccc agacctatat ctgtaatgtc aaccataagc cctcgaacac caaggtcgac    660
aagaaggtcg agccgaagtc gtgcgacaag actcacactt gcccgccttg cccagccccg    720
gaactgctgg gtggtccttc ggtgttcctc ttcccgccca gccgaagga taccctgatg    780 atctcacgga cccccgaagt gacctgtgtg gtggtggacg tgtccacga ggacccggaa     840 gtgaaattca attggtacgt ggatggagtg gaagtgcaca acgccaagac caagccacgg    900
gaagaacagt acaactctac ctaccgcgtg gtgtccgtgc tcactgtgct gcaccaagac    960
tggctgaacg ggaaggagta caagtgcaaa gtgtccaaca aggcgctgcc tgccccaatt   1020
gagaaaacta tctcgaaagc caagggacag cctcgagagc ctcaagtgta cccctgcct    1080 ccctctcggg acgagctgac caagaaccaa gtctccctga cctgtctggt caagggattc   1140
tacccatcgg atatcgccgt ggaatgggaa agcaacggac agcccgagaa caactacaag   1200
acgactccgc ccgtgctgga ttccgacggg agcttcttct tgtactccaa gctgaccgtc   1260
gacaagagca gatggcagca gggaaacgtg ttctcctgct ccgtgatgca tgaggcgctg   1320
cacaaccact acactcagaa gagcttgtcc ctgtcgcccg ga                      1362
```

<210> SEQ ID NO 3
<211> LENGTH: 454
<212> TYPE: PRT
<213> ORGANISM: Artificial Sequence
<220> FEATURE:
<223> OTHER INFORMATION: Synthetic

<400> SEQUENCE: 3

```
Glu Val Gln Leu Leu Glu Ser Gly Gly Gly Leu Val Gln Pro Gly Gly
1               5                   10                  15

Ser Leu Arg Leu Asn Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Ser Gly Ser Gly Gly Ser Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Ser Tyr Asp Lys Tyr Trp Gly Ser Ser Ile Tyr Ser Gly Leu
            100                 105                 110

Asp Tyr Trp Gly Gln Gly Thr Leu Val Thr Val Ser Ser Ala Ser Thr
        115                 120                 125

Lys Gly Pro Ser Val Phe Pro Leu Ala Pro Ser Ser Lys Ser Thr Ser
    130                 135                 140

Gly Gly Thr Ala Ala Leu Gly Cys Leu Val Lys Asp Tyr Phe Pro Glu
145                 150                 155                 160

Pro Val Thr Val Ser Trp Asn Ser Gly Ala Leu Thr Ser Gly Val His
                165                 170                 175

Thr Phe Pro Ala Val Leu Gln Ser Ser Gly Leu Tyr Ser Leu Ser Ser
            180                 185                 190

Val Val Thr Val Pro Ser Ser Ser Leu Gly Thr Gln Thr Tyr Ile Cys
        195                 200                 205

Asn Val Asn His Lys Pro Ser Asn Thr Lys Val Asp Lys Lys Val Glu
    210                 215                 220

Pro Lys Ser Cys Asp Lys Thr His Thr Cys Pro Pro Cys Pro Ala Pro
```

```
             225                 230                 235                 240
    Glu Ala Ala Gly Gly Pro Ser Val Phe Leu Phe Pro Pro Lys Pro Lys
                    245                 250                 255

Asp Thr Leu Met Ile Ser Arg Thr Pro Glu Val Thr Cys Val Val Val
                    260                 265                 270

Asp Val Ser His Glu Asp Pro Glu Val Lys Phe Asn Trp Tyr Val Asp
                    275                 280                 285

Gly Val Glu Val His Asn Ala Lys Thr Lys Pro Arg Glu Glu Gln Tyr
                    290                 295                 300

Asn Ser Thr Tyr Arg Val Val Ser Val Leu Thr Val Leu His Gln Asp
    305                 310                 315                 320

Trp Leu Asn Gly Lys Glu Tyr Lys Cys Lys Val Ser Asn Lys Ala Leu
                    325                 330                 335

Pro Ala Pro Ile Glu Lys Thr Ile Ser Lys Ala Lys Gly Gln Pro Arg
                    340                 345                 350

Glu Pro Gln Val Tyr Thr Leu Pro Pro Ser Arg Asp Glu Leu Thr Lys
                    355                 360                 365

Asn Gln Val Ser Leu Thr Cys Leu Val Lys Gly Phe Tyr Pro Ser Asp
    370                 375                 380

Ile Ala Val Glu Trp Glu Ser Asn Gly Gln Pro Glu Asn Asn Tyr Lys
    385                 390                 395                 400

Thr Thr Pro Pro Val Leu Asp Ser Asp Gly Ser Phe Phe Leu Tyr Ser
                    405                 410                 415

Lys Leu Thr Val Asp Lys Ser Arg Trp Gln Gln Gly Asn Val Phe Ser
                    420                 425                 430

Cys Ser Val Met His Glu Ala Leu His Asn His Tyr Thr Gln Lys Ser
                    435                 440                 445

Leu Ser Leu Ser Pro Gly
        450

<210> SEQ ID NO 4
<211> LENGTH: 1362
<212> TYPE: DNA
<213> ORGANISM: Artificial Sequence
<220> FEATURE:
<223> OTHER INFORMATION: Synthetic

<400> SEQUENCE: 4
gaagtgcaac tgctggagtc cggtggtggt ctggtacagc cgggtggttc tctgcgtctg      60
aattgcgcgg ccagtggctt taccttcagt agctatgcca tgagctgggt gcgtcaggcg     120
ccgggcaaag gtctggaatg ggttagcgcg attagcggta gtggcggtag cacgtactat     180
gcggatagcg tgaaaggccg ttttaccatt tctcgcgaca cagcaagaa cacgctgtac      240 ctgcagatga actcactgcg tgccgaagat acggccgtgt attactgtgc gagatcttac     300
gacaaatact ggggttcttc tatttactct ggcttggact actggggcca gggaaccctg     360
gtcaccgtct cgagtgctag cactaagggc ccgtcggtgt tcccgctggc cccatcgtcc     420
aagagcacat cagggggtac cgccgccctg gctgccttg tgaaggatta ctttccgag      480 cccgtcacag tgtcctggaa cagcggagcc ctgacctccg gagtgcatac tttccgct      540 gtgcttcagt cctctggcct gtactcattg tcctcgtgg tcaccgtccc ttcgtcctcc      600
ctgggcaccc agacctatat ctgtaatgtc aaccataagc cctcgaacac caaggtcgac     660
aagaaggtcg agccgaagtc gtgcgacaag actcacactt gccgccttg cccagccccg     720 gaagctgccg gtggtccttc ggtgttcctc ttcccgccca gccgaagga taccctgatg     780
```

```
atctcacgga ccccgaagt gacctgtgtg gtggtggacg tgtcccacga ggacccggaa      840
gtgaaattca attggtacgt ggatggagtg gaagtgcaca acgccaagac caagccacgg      900
gaagaacagt acaactctac ctaccgcgtg gtgtccgtgc tcactgtgct gcaccaagac      960
tggctgaacg gcaaggagta caagtgcaaa gtgtccaaca aggcgctgcc tgccccaatt     1020
gagaaaacta tctcgaaagc caagggacag cctcgagagc tcaagtgta caccctgcct      1080 ccctctcggg acgagctgac caagaaccaa gtctccctga cctgtctggt caagggattc     1140
tacccatcgg atatcgccgt ggaatgggaa agcaacggac agcccgagaa caactacaag     1200
acgactccgc ccgtgctgga ttccgacggg agcttcttct tgtactccaa gctgaccgtc     1260
gacaagagca gatggcagca gggaaacgtg ttctcctgct ccgtgatgca tgaggcgctg     1320
cacaaccact acactcagaa gagcttgtcc ctgtcgcccg ga                       1362
```

<210> SEQ ID NO 5
<211> LENGTH: 125
<212> TYPE: PRT
<213> ORGANISM: Artificial Sequence
<220> FEATURE:
<223> OTHER INFORMATION: Synthetic

<400> SEQUENCE: 5

```
Glu Val Gln Leu Leu Glu Ser Gly Gly Gly Leu Val Gln Pro Gly Gly
1               5                   10                  15

Ser Leu Arg Leu Asn Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Ser Gly Ser Gly Gly Ser Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Ser Tyr Asp Lys Tyr Trp Gly Ser Ser Ile Tyr Ser Gly Leu
            100                 105                 110

Asp Tyr Trp Gly Gln Gly Thr Leu Val Thr Val Ser Ser
        115                 120                 125
```

<210> SEQ ID NO 6
<211> LENGTH: 375
<212> TYPE: DNA
<213> ORGANISM: Artificial Sequence
<220> FEATURE:
<223> OTHER INFORMATION: Synthetic

<400> SEQUENCE: 6

```
gaagtgcaac tgctggagtc cggtggtggt ctggtacagc cgggtggttc tctgcgtctg       60
aattgcgcgg ccagtggctt taccttcagt agctatgcca tgagctgggt gcgtcaggcg      120
ccgggcaaag gtctggaatg ggttagcgcg attagcggta gtggcggtag cacgtactat      180
gcggatagcg tgaaaggccg ttttaccatt tctcgcgaca acagcaagaa cacgctgtac      240
ctgcagatga actcactgcg tgccgaagat acggccgtgt attactgtgc gagatcttac      300
gacaaatact ggggttcttc tatttactct ggcttggact actggggcca gggaaccctg      360
gtcaccgtct cgagt                                                        375
```

<210> SEQ ID NO 7
<211> LENGTH: 8
<212> TYPE: PRT
<213> ORGANISM: Artificial Sequence
<220> FEATURE:
<223> OTHER INFORMATION: Synthetic

<400> SEQUENCE: 7

Gly Phe Thr Phe Ser Ser Tyr Ala
1               5

<210> SEQ ID NO 8
<211> LENGTH: 5
<212> TYPE: PRT
<213> ORGANISM: Artificial Sequence
<220> FEATURE:
<223> OTHER INFORMATION: Synthetic

<400> SEQUENCE: 8

Ser Tyr Ala Met Ser
1               5

<210> SEQ ID NO 9
<211> LENGTH: 8
<212> TYPE: PRT
<213> ORGANISM: Artificial Sequence
<220> FEATURE:
<223> OTHER INFORMATION: Synthetic

<400> SEQUENCE: 9

Ile Ser Gly Ser Gly Gly Ser Thr
1               5

<210> SEQ ID NO 10
<211> LENGTH: 17
<212> TYPE: PRT
<213> ORGANISM: Artificial Sequence
<220> FEATURE:
<223> OTHER INFORMATION: Synthetic

<400> SEQUENCE: 10

Ala Ile Ser Gly Ser Gly Gly Ser Thr Tyr Tyr Ala Asp Ser Val Lys
1               5                   10                  15

Gly

<210> SEQ ID NO 11
<211> LENGTH: 18
<212> TYPE: PRT
<213> ORGANISM: Artificial Sequence
<220> FEATURE:
<223> OTHER INFORMATION: Synthetic

<400> SEQUENCE: 11

Ala Arg Ser Tyr Asp Lys Tyr Trp Gly Ser Ser Ile Tyr Ser Gly Leu
1               5                   10                  15

Asp Tyr

<210> SEQ ID NO 12
<211> LENGTH: 16
<212> TYPE: PRT
<213> ORGANISM: Artificial Sequence
<220> FEATURE:
<223> OTHER INFORMATION: Synthetic

<400> SEQUENCE: 12

Ser Tyr Asp Lys Tyr Trp Gly Ser Ser Ile Tyr Ser Gly Leu Asp Tyr
1               5                   10                  15

<210> SEQ ID NO 13
<211> LENGTH: 216
<212> TYPE: PRT
<213> ORGANISM: Artificial Sequence
<220> FEATURE:
<223> OTHER INFORMATION: Synthetic

<400> SEQUENCE: 13

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Ser
            20                  25                  30

Tyr Leu Ala Trp Tyr Gln Gln Lys Pro Gly Gln Ala Pro Arg Leu Leu
        35                  40                  45

Ile Tyr Gly Ala Ser Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Tyr Ser Tyr Tyr
                85                  90                  95

Pro Val Thr Phe Gly Gln Gly Thr Lys Val Glu Ile Lys Arg Thr Val
            100                 105                 110

Ala Ala Pro Ser Val Phe Ile Phe Pro Pro Ser Asp Glu Gln Leu Lys
        115                 120                 125

Ser Gly Thr Ala Ser Val Val Cys Leu Leu Asn Asn Phe Tyr Pro Arg
    130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175

Leu Ser Ser Thr Leu Thr Leu Ser Lys Ala Asp Tyr Glu Lys His Lys
            180                 185                 190

Val Tyr Ala Cys Glu Val Thr His Gln Gly Leu Ser Ser Pro Val Thr
        195                 200                 205

Lys Ser Phe Asn Arg Gly Glu Cys
    210                 215

<210> SEQ ID NO 14
<211> LENGTH: 648
<212> TYPE: DNA
<213> ORGANISM: Artificial Sequence
<220> FEATURE:
<223> OTHER INFORMATION: Synthetic

<400> SEQUENCE: 14
gaaattgtgc tgacccagtc tccgggcacg ttatctctga gccctggtga gcgcgccact      60
ctgtcatgcc gggcttctca aagtgttagc agtagctacc tggcgtggta tcagcaaaaa     120
ccgggccagg ccccgcgtct gctgatttac ggtgcatcca gccgtgccac cggcattcca     180
gatcgttttt ccggtagtgg ttctgggacg gacttcactc tgacaatctc acgcctggaa     240
ccggaggatt ttgcggtgta ttactgccag caatattatt cttattatcc tgtcacgttc     300
ggccaaggga ccaaggtgga aatcaaacgt actgtggccg ctcctagcgt gttcattttt     360
ccgccatccg acgagcagct caagtccggc accgcctccg tggtctgcct gctcaacaac     420

```
ttctaccctc gcgaagctaa ggtccagtgg aaggtcgaca atgccctgca gtccggaaac    480
tcgcaggaaa gcgtgactga acaggactcc aaggactcca cctattcact gtcctcgact    540
ctgaccctga gcaaggcgga ttacgaaaag cacaaagtgt acgcatgcga agtgacccac    600
cagggtcttt cgtcccccgt gaccaagagc ttcaacagag gagagtgt                 648
```

<210> SEQ ID NO 15
<211> LENGTH: 109
<212> TYPE: PRT
<213> ORGANISM: Artificial Sequence
<220> FEATURE:
<223> OTHER INFORMATION: Synthetic

<400> SEQUENCE: 15

```
Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Ser
            20                  25                  30

Tyr Leu Ala Trp Tyr Gln Gln Lys Pro Gly Gln Ala Pro Arg Leu Leu
        35                  40                  45

Ile Tyr Gly Ala Ser Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Tyr Ser Tyr Tyr
                85                  90                  95

Pro Val Thr Phe Gly Gln Gly Thr Lys Val Glu Ile Lys
            100                 105
```

<210> SEQ ID NO 16
<211> LENGTH: 327
<212> TYPE: DNA
<213> ORGANISM: Artificial Sequence
<220> FEATURE:
<223> OTHER INFORMATION: Synthetic

<400> SEQUENCE: 16

```
gaaattgtgc tgacccagtc tccgggcacg ttatctctga gccctggtga gcgcgccact    60
ctgtcatgcc gggcttctca aagtgttagc agtagctacc tggcgtggta tcagcaaaaa   120
ccgggccagg ccccgcgtct gctgatttac ggtgcatcca gccgtgccac cggcattcca   180
gatcgttttt ccggtagtgg ttctgggacg gacttcactc tgacaatctc acgcctggaa   240
ccggaggatt ttgcggtgta ttactgccag caatattatt cttattatcc tgtcacgttc   300
ggccaaggga ccaaggtgga aatcaaa                                       327
```

<210> SEQ ID NO 17
<211> LENGTH: 7
<212> TYPE: PRT
<213> ORGANISM: Artificial Sequence
<220> FEATURE:
<223> OTHER INFORMATION: Synthetic

<400> SEQUENCE: 17

```
Gln Ser Val Ser Ser Ser Tyr
1               5
```

<210> SEQ ID NO 18
<211> LENGTH: 12
<212> TYPE: PRT
<213> ORGANISM: Artificial Sequence

```
<220> FEATURE:
<223> OTHER INFORMATION: Synthetic

<400> SEQUENCE: 18

Arg Ala Ser Gln Ser Val Ser Ser Tyr Leu Ala
1               5                   10

<210> SEQ ID NO 19
<211> LENGTH: 3
<212> TYPE: PRT
<213> ORGANISM: Artificial Sequence
<220> FEATURE:
<223> OTHER INFORMATION: Synthetic

<400> SEQUENCE: 19

Gly Ala Ser
1

<210> SEQ ID NO 20
<211> LENGTH: 7
<212> TYPE: PRT
<213> ORGANISM: Artificial Sequence
<220> FEATURE:
<223> OTHER INFORMATION: Synthetic

<400> SEQUENCE: 20

Gly Ala Ser Ser Arg Ala Thr
1               5

<210> SEQ ID NO 21
<211> LENGTH: 10
<212> TYPE: PRT
<213> ORGANISM: Artificial Sequence
<220> FEATURE:
<223> OTHER INFORMATION: Synthetic

<400> SEQUENCE: 21

Gln Gln Tyr Tyr Ser Tyr Tyr Pro Val Thr
1               5                   10

<210> SEQ ID NO 22
<211> LENGTH: 9
<212> TYPE: PRT
<213> ORGANISM: Artificial Sequence
<220> FEATURE:
<223> OTHER INFORMATION: Synthetic

<400> SEQUENCE: 22

Gln Gln Ser Tyr Ser Tyr Pro Val Thr
1               5

<210> SEQ ID NO 23
<211> LENGTH: 10
<212> TYPE: PRT
<213> ORGANISM: Artificial Sequence
<220> FEATURE:
<223> OTHER INFORMATION: Synthetic

<400> SEQUENCE: 23

Gln Gln Tyr Tyr Tyr Ser Ser Pro Ile Thr
1               5                   10

<210> SEQ ID NO 24
<211> LENGTH: 447
<212> TYPE: PRT
<213> ORGANISM: Artificial Sequence
<220> FEATURE:
```

<223> OTHER INFORMATION: Synthetic

<400> SEQUENCE: 24

```
Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Asp Met Ser Trp Val Arg Gln Ala Pro Gly Lys Gly Leu Glu Trp Val
        35                  40                  45

Ser Asp Ile Asp Pro Thr Gly Ser Lys Thr Asp Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Leu Asn Val Tyr Gly Phe Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Lys Val Glu Pro Lys Ser Cys Asp Lys Thr
    210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
        275                 280                 285

Lys Thr Lys Pro Arg Glu Glu Gln Tyr Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Asp Glu Leu Thr Lys Asn Gln Val Ser Leu Thr Cys
        355                 360                 365

Leu Val Lys Gly Phe Tyr Pro Ser Asp Ile Ala Val Glu Trp Glu Ser
    370                 375                 380

Asn Gly Gln Pro Glu Asn Asn Tyr Lys Thr Thr Pro Pro Val Leu Asp
385                 390                 395                 400
```

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
        420                 425                 430

Leu His Asn His Tyr Thr Gln Lys Ser Leu Ser Leu Ser Pro Gly
        435                 440                 445

<210> SEQ ID NO 25
<211> LENGTH: 1341
<212> TYPE: DNA
<213> ORGANISM: Artificial Sequence
<220> FEATURE:
<223> OTHER INFORMATION: Synthetic

<400> SEQUENCE: 25

```
gaagtgcaac tgctggagtc cggtggtggt ctggtacagc cgggtggttc tctgcgtctg      60
agttgcgcgg ccagtggctt taccttcagt agttacgata tgagctgggt gcgtcaggct     120
ccgggcaaag gtctgaatg ggttagcgat attgatccga ctggtagcaa gaccgactat      180
gcggatagcg tgaaaggccg ttttaccatt ctcgcgaca cagcaagaa cacgctgtac       240
ctgcagatga actcactgcg tgccgaagat acggccgtgt attactgtgc gagagacctc     300
aatgtgtacg ggttcgacta ctggggccag ggaaccctgg tcaccgtctc gagtgctagc     360
actaagggcc cgtcggtgtt cccgctggcc ccatcgtcca agagcacatc aggggggtacc    420
gccgccctgg gctgccttgt gaaggattac tttcccgagc ccgtcacagt gtcctggaac     480
agcggagccc tgacctccgg agtgcatact ttcccggctg tgcttcagtc ctctggcctg     540
tactcattgt cctccgtggt caccgtccct tcgtcctccc tgggcaccca gacctatatc     600
tgtaatgtca accataagcc ctcgaacacc aaggtcgaca gaaggtcga gccgaagtcg      660
tgcgacaaga ctcacacttg cccgccttgc ccagccccgg aactgctggg tggtccttcg     720
gtgttcctct cccgcccaa gccgaaggat accctgatga tctcacggac ccccgaagtg     780
acctgtgtgg tggtggacgt gtcccacgag gacccggaag tgaaattcaa ttggtacgtg     840
gatggagtgg aagtgcacaa cgccaagacc aagccacggg aagaacagta caactctacc    900
taccgcgtgg tgtccgtgct cactgtgctg caccaagact ggctgaacgg gaaggagtac    960
aagtgcaaag tgtccaacaa ggcgctgcct gccccaattg agaaaactat ctcgaaagcc   1020
aagggacagc ctcgagagcc tcaagtgtac accctgcctc cctctcggga cgagctgacc   1080
aagaaccaag tctccctgac ctgtctggtc aagggattct acccatcgga tatcgccgtg   1140
gaatgggaaa gcaacggaca gcccgagaac aactacaaga cgactccgcc cgtgctggat   1200
tccgacggga gcttcttctt gtactccaag ctgaccgtcg acaagagcag atggcagcag   1260
ggaaacgtgt tctcctgctc cgtgatgcat gaggcgctgc acaaccacta cactcagaag   1320
agcttgtccc tgtcgcccgg a                                              1341
```

<210> SEQ ID NO 26
<211> LENGTH: 447
<212> TYPE: PRT
<213> ORGANISM: Artificial Sequence
<220> FEATURE:
<223> OTHER INFORMATION: Synthetic

<400> SEQUENCE: 26

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr

-continued

```
            20                  25                  30
Asp Met Ser Trp Val Arg Gln Ala Pro Gly Lys Gly Leu Glu Trp Val
        35                  40                  45
Ser Asp Ile Asp Pro Thr Gly Ser Lys Thr Asp Tyr Ala Asp Ser Val
50                  55                  60
Lys Gly Arg Phe Thr Ile Ser Arg Asp Asn Lys Asn Thr Leu Tyr
65                  70                  75                  80
Leu Gln Met Asn Ser Leu Arg Ala Glu Asp Thr Ala Val Tyr Tyr Cys
                85                  90                  95
Ala Arg Asp Leu Asn Val Tyr Gly Phe Asp Tyr Trp Gly Gln Gly Thr
            100                 105                 110
Leu Val Thr Val Ser Ser Ala Ser Thr Lys Gly Pro Ser Val Phe Pro
            115                 120                 125
Leu Ala Pro Ser Ser Lys Ser Thr Ser Gly Gly Thr Ala Ala Leu Gly
            130                 135                 140
Cys Leu Val Lys Asp Tyr Phe Pro Glu Pro Val Thr Val Ser Trp Asn
145                 150                 155                 160
Ser Gly Ala Leu Thr Ser Gly Val His Thr Phe Pro Ala Val Leu Gln
                165                 170                 175
Ser Ser Gly Leu Tyr Ser Leu Ser Ser Val Val Thr Val Pro Ser Ser
            180                 185                 190
Ser Leu Gly Thr Gln Thr Tyr Ile Cys Asn Val Asn His Lys Pro Ser
            195                 200                 205
Asn Thr Lys Val Asp Lys Lys Val Glu Pro Lys Ser Cys Asp Lys Thr
            210                 215                 220
His Thr Cys Pro Pro Cys Pro Ala Pro Glu Ala Ala Gly Gly Pro Ser
225                 230                 235                 240
Val Phe Leu Phe Pro Pro Lys Pro Lys Asp Thr Leu Met Ile Ser Arg
                245                 250                 255
Thr Pro Glu Val Thr Cys Val Val Val Asp Val Ser His Glu Asp Pro
            260                 265                 270
Glu Val Lys Phe Asn Trp Tyr Val Asp Gly Val Glu Val His Asn Ala
            275                 280                 285
Lys Thr Lys Pro Arg Glu Glu Gln Tyr Asn Ser Thr Tyr Arg Val Val
            290                 295                 300
Ser Val Leu Thr Val Leu His Gln Asp Trp Leu Asn Gly Lys Glu Tyr
305                 310                 315                 320
Lys Cys Lys Val Ser Asn Lys Ala Leu Pro Ala Pro Ile Glu Lys Thr
                325                 330                 335
Ile Ser Lys Ala Lys Gly Gln Pro Arg Glu Pro Gln Val Tyr Thr Leu
            340                 345                 350
Pro Pro Ser Arg Asp Glu Leu Thr Lys Asn Gln Val Ser Leu Thr Cys
            355                 360                 365
Leu Val Lys Gly Phe Tyr Pro Ser Asp Ile Ala Val Glu Trp Glu Ser
            370                 375                 380
Asn Gly Gln Pro Glu Asn Asn Tyr Lys Thr Thr Pro Pro Val Leu Asp
385                 390                 395                 400
Ser Asp Gly Ser Phe Phe Leu Tyr Ser Lys Leu Thr Val Asp Lys Ser
                405                 410                 415
Arg Trp Gln Gln Gly Asn Val Phe Ser Cys Ser Val Met His Glu Ala
            420                 425                 430
Leu His Asn His Tyr Thr Gln Lys Ser Leu Ser Leu Ser Pro Gly
            435                 440                 445
```

<210> SEQ ID NO 27
<211> LENGTH: 1341
<212> TYPE: DNA
<213> ORGANISM: Artificial Sequence
<220> FEATURE:
<223> OTHER INFORMATION: Synthetic

<400> SEQUENCE: 27

```
gaagtgcaac tgctggagtc cggtggtggt ctggtacagc cgggtggttc tctgcgtctg      60
agttgcgcgg ccagtggctt taccttcagt agttacgata tgagctgggt gcgtcaggct     120
ccgggcaaag gtctggaatg ggttagcgat attgatccga ctggtagcaa gaccgactat     180
gcggatagcg tgaaaggccg ttttaccatt tctcgcgaca acagcaagaa cacgctgtac     240
ctgcagatga actcactgcg tgccgaagat acggccgtgt attactgtgc gagagacctc     300
aatgtgtacg ggttcgacta ctggggccag ggaaccctgg tcaccgtctc gagtgctagc     360
actaagggcc cgtcggtgtt cccgctggcc ccatcgtcca agagcacatc agggggtacc     420
gccgccctgg gctgccttgt gaaggattac tttcccgagc ccgtcacagt gtcctggaac     480
agcggagccc tgacctccgg agtgcatact ttcccggctg tgcttcagtc ctctggcctg     540
tactcattgt cctccgtggt caccgtccct tcgtcctccc tgggcaccca gacctatatc     600
tgtaatgtca accataagcc ctcgaacacc aaggtcgaca gaaggtcga gccgaagtcg     660
tgcgacaaga ctcacacttg cccgccttgc ccagccccgg aagctgccgg tggtccttcg     720
gtgttcctct cccgcccaa gccgaaggat accctgatga tctcacggac ccccgaagtg     780
acctgtgtgg tggtggacgt gtcccacgag gacccggaag tgaaattcaa ttggtacgtg     840
gatggagtgg aagtgcacaa cgccaagacc aagccacggg aagaacagta caactctacc     900
taccgcgtgg tgtccgtgct cactgtgctg caccaagact ggctgaacgg gaaggagtac     960
aagtgcaaag tgtccaacaa ggcgctgcct gccccaattg agaaaactat ctcgaaagcc    1020
aagggacagc ctcgagagcc tcaagtgtac accctgcctc cctctcggga cgagctgacc    1080
aagaaccaag tctccctgac ctgtctggtc aagggattct acccatcgga tatcgccgtg    1140
gaatgggaaa gcaacggaca gcccgagaac aactacaaga cgactccgcc cgtgctggat    1200
tccgacggga gcttcttctt gtactccaag ctgaccgtcg acaagagcag atggcagcag    1260
ggaaacgtgt tctcctgctc cgtgatgcat gaggcgctgc acaaccacta cactcagaag    1320
agcttgtccc tgtcgcccgg a                                             1341
```

<210> SEQ ID NO 28
<211> LENGTH: 118
<212> TYPE: PRT
<213> ORGANISM: Artificial Sequence
<220> FEATURE:
<223> OTHER INFORMATION: Synthetic

<400> SEQUENCE: 28

```
Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Asp Met Ser Trp Val Arg Gln Ala Pro Gly Lys Gly Leu Glu Trp Val
        35                  40                  45

Ser Asp Ile Asp Pro Thr Gly Ser Lys Thr Asp Tyr Ala Asp Ser Val
    50                  55                  60
```

```
Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Arg Asp Leu Asn Val Tyr Gly Phe Asp Tyr Trp Gly Gln Gly Thr
            100                 105                 110

Leu Val Thr Val Ser Ser
        115
```

<210> SEQ ID NO 29
<211> LENGTH: 354
<212> TYPE: DNA
<213> ORGANISM: Artificial Sequence
<220> FEATURE:
<223> OTHER INFORMATION: Synthetic

<400> SEQUENCE: 29

```
gaagtgcaac tgctggagtc cggtggtggt ctggtacagc cgggtggttc tctgcgtctg    60
agttgcgcgg ccagtggctt taccttcagt agttacgata tgagctgggt gcgtcaggct   120
ccgggcaaag gtctggaatg ggttagcgat attgatccga ctggtagcaa gaccgactat   180
gcggatagcg tgaaaggccg ttttaccatt tctcgcgaca cagcaagaa cacgctgtac    240 ctgcagatga actcactgcg tgccgaagat acggccgtgt attactgtgc gagagacctc   300
aatgtgtacg gttcgacta ctggggccag ggaaccctgg tcaccgtctc gagt          354
```

<210> SEQ ID NO 30
<211> LENGTH: 8
<212> TYPE: PRT
<213> ORGANISM: Artificial Sequence
<220> FEATURE:
<223> OTHER INFORMATION: Synthetic

<400> SEQUENCE: 30

```
Gly Phe Thr Phe Ser Ser Tyr Asp
1               5
```

<210> SEQ ID NO 31
<211> LENGTH: 5
<212> TYPE: PRT
<213> ORGANISM: Artificial Sequence
<220> FEATURE:
<223> OTHER INFORMATION: Synthetic

<400> SEQUENCE: 31

```
Ser Tyr Asp Met Ser
1               5
```

<210> SEQ ID NO 32
<211> LENGTH: 8
<212> TYPE: PRT
<213> ORGANISM: Artificial Sequence
<220> FEATURE:
<223> OTHER INFORMATION: Synthetic

<400> SEQUENCE: 32

```
Ile Asp Pro Thr Gly Ser Lys Thr
1               5
```

<210> SEQ ID NO 33
<211> LENGTH: 17
<212> TYPE: PRT
<213> ORGANISM: Artificial Sequence
<220> FEATURE:

```
<223> OTHER INFORMATION: Synthetic

<400> SEQUENCE: 33

Asp Ile Asp Pro Thr Gly Ser Lys Thr Asp Tyr Ala Asp Ser Val Lys
1               5                   10                  15
Gly

<210> SEQ ID NO 34
<211> LENGTH: 11
<212> TYPE: PRT
<213> ORGANISM: Artificial Sequence
<220> FEATURE:
<223> OTHER INFORMATION: Synthetic

<400> SEQUENCE: 34

Ala Arg Asp Leu Asn Val Tyr Gly Phe Asp Tyr
1               5                   10

<210> SEQ ID NO 35
<211> LENGTH: 9
<212> TYPE: PRT
<213> ORGANISM: Artificial Sequence
<220> FEATURE:
<223> OTHER INFORMATION: Synthetic

<400> SEQUENCE: 35

Asp Leu Asn Val Tyr Gly Phe Asp Tyr
1               5

<210> SEQ ID NO 36
<211> LENGTH: 11
<212> TYPE: PRT
<213> ORGANISM: Artificial Sequence
<220> FEATURE:
<223> OTHER INFORMATION: Synthetic

<400> SEQUENCE: 36

Ala Arg Asp Leu Thr Val Tyr Gly Phe Asp Tyr
1               5                   10

<210> SEQ ID NO 37
<211> LENGTH: 9
<212> TYPE: PRT
<213> ORGANISM: Artificial Sequence
<220> FEATURE:
<223> OTHER INFORMATION: Synthetic

<400> SEQUENCE: 37

Asp Leu Thr Val Tyr Gly Phe Asp Tyr
1               5

<210> SEQ ID NO 38
<211> LENGTH: 11
<212> TYPE: PRT
<213> ORGANISM: Artificial Sequence
<220> FEATURE:
<223> OTHER INFORMATION: Synthetic

<400> SEQUENCE: 38

Ala Arg Asp Leu Leu Val Tyr Gly Phe Asp Tyr
1               5                   10

<210> SEQ ID NO 39
<211> LENGTH: 9
<212> TYPE: PRT
<213> ORGANISM: Artificial Sequence
```

<220> FEATURE:
<223> OTHER INFORMATION: Synthetic

<400> SEQUENCE: 39

Asp Leu Leu Val Tyr Gly Phe Asp Tyr
1               5

<210> SEQ ID NO 40
<211> LENGTH: 447
<212> TYPE: PRT
<213> ORGANISM: Artificial Sequence
<220> FEATURE:
<223> OTHER INFORMATION: Synthetic

<400> SEQUENCE: 40

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Asp Met Ser Trp Val Arg Gln Ala Pro Gly Lys Gly Leu Glu Trp Val
        35                  40                  45

Ser Asp Ile Asp Pro Thr Gly Ser Lys Thr Asp Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Leu Thr Val Tyr Gly Phe Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Lys Val Glu Pro Lys Ser Cys Asp Lys Thr
    210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
        275                 280                 285

Lys Thr Lys Pro Arg Glu Glu Gln Tyr Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr 325                 330                 335
Ile Ser Lys Ala Lys Gly Gln Pro Arg Glu Pro Gln Val Tyr Thr Leu
            340                 345                 350

Pro Pro Ser Arg Asp Glu Leu Thr Lys Asn Gln Val Ser Leu Thr Cys
            355                 360                 365

Leu Val Lys Gly Phe Tyr Pro Ser Asp Ile Ala Val Glu Trp Glu Ser
        370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
            420                 425                 430

Leu His Asn His Tyr Thr Gln Lys Ser Leu Ser Leu Ser Pro Gly
            435                 440                 445

<210> SEQ ID NO 41
<211> LENGTH: 1341
<212> TYPE: DNA
<213> ORGANISM: Artificial Sequence
<220> FEATURE:
<223> OTHER INFORMATION: Synthetic

<400> SEQUENCE: 41
gaagtgcaac tgctggagtc cggtggtggt ctggtacagc cgggtggttc tctgcgtctg        60
agttgcgcgg ccagtggctt taccttcagt agttacgata tgagctgggt gcgtcaggct       120
ccgggcaaag gtctggaatg ggttagcgat attgatccga ctggtagcaa gaccgactat       180
gcggatagcg tgaaaggccg ttttaccatt tctcgcgaca cagcaagaa cacgctgtac        240 ctgcagatga actcactgcg tgccgaagat acggccgtgt attactgtgc gagagacctc       300
acggtgtacg gttcgacta ctgggggccag ggaaccctgg tcaccgtctc gagtgctagc       360
actaagggcc cgtcggtgtt cccgctggcc ccatcgtcca agagcacatc aggggtacc         420 gccgccctgg gctgccttgt gaaggattac tttcccgagc ccgtcacagt gtcctggaac       480
agcggagccc tgacctccgg agtgcatact ttccggctg tgcttcagtc ctctggcctg        540
tactcattgt cctccgtggt caccgtccct tcgtcctccc tgggcaccca gacctatatc       600
tgtaatgtca accataagcc ctcgaacacc aaggtcgaca gaaggtcga gccgaagtcg        660 tgcgacaaga ctcacacttg cccgccttgc ccagccccgg aactgctggg tggtccttcg       720
gtgttcctct tccccgcccaa gccgaaggat accctgatga tctcacggac ccccgaagtg       780
acctgtgtgg tggtggacgt gtcccacgag gacccggaag tgaaattcaa ttggtacgtg       840
gatggagtgg aagtgcacaa cgccaagacc aagccacggg aagaacagta caactctacc       900
taccgcgtgg tgtccgtgct cactgtgctg caccaagact ggctgaacgg gaaggagtac       960
aagtgcaaag tgtccaacaa ggcgctgcct gccccaattg agaaaactat ctcgaaagcc      1020
aagggacagc ctcgagagcc tcaagtgtac accctgcctc cctctcggga cgagctgacc      1080
aagaaccaag tctccctgac ctgtctggtc aagggattct acccatcgga tatcgccgtg      1140
gaatgggaaa gcaacggaca gcccgagaac aactacaaga cgactccgcc cgtgctggat      1200
tccgacggga gcttcttctt gtactccaag ctgaccgtcg acaagagcag atggcagcag      1260
ggaaacgtgt tctcctgctc cgtgatgcat gaggcgctgc acaaccacta cactcagaag      1320
agcttgtccc tgtcgcccgg a                                                1341

```
<210> SEQ ID NO 42
<211> LENGTH: 447
<212> TYPE: PRT
<213> ORGANISM: Artificial Sequence
<220> FEATURE:
<223> OTHER INFORMATION: Synthetic

<400> SEQUENCE: 42

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Asp Met Ser Trp Val Arg Gln Ala Pro Gly Lys Gly Leu Glu Trp Val
        35                  40                  45

Ser Asp Ile Asp Pro Thr Gly Ser Lys Thr Asp Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Leu Thr Val Tyr Gly Phe Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Lys Val Glu Pro Lys Ser Cys Asp Lys Thr
    210                 215                 220

His Thr Cys Pro Pro Cys Pro Ala Pro Glu Ala Ala Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
        275                 280                 285

Lys Thr Lys Pro Arg Glu Glu Gln Tyr Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Asp Glu Leu Thr Lys Asn Gln Val Ser Leu Thr Cys
        355                 360                 365
```

| | | | | | | | | | | |
|---|---|---|---|---|---|---|---|---|---|---|
|Leu|Val|Lys|Gly|Phe|Tyr|Pro|Ser|Asp|Ile|Ala|Val|Glu|Trp|Glu|Ser|
| |370| | | |375| | | |380| |

Asn Gly Gln Pro Glu Asn Asn Tyr Lys Thr Thr Pro Pro Val Leu Asp
385                390                395                400

Ser Asp Gly Ser Phe Phe Leu Tyr Ser Lys Leu Thr Val Asp Lys Ser
                 405                410                 415

Arg Trp Gln Gln Gly Asn Val Phe Ser Cys Ser Val Met His Glu Ala
             420                 425             430

Leu His Asn His Tyr Thr Gln Lys Ser Leu Ser Leu Ser Pro Gly
         435                 440             445

```
<210> SEQ ID NO 43
<211> LENGTH: 1341
<212> TYPE: DNA
<213> ORGANISM: Artificial Sequence
<220> FEATURE:
<223> OTHER INFORMATION: Synthetic

<400> SEQUENCE: 43
```

| | | |
|---|---|---|
|gaagtgcaac tgctggagtc cggtggtggt ctggtacagc cgggtggttc tctgcgtctg|60|
|agttgcgcgg ccagtggctt taccttcagt agttacgata tgagctgggt gcgtcaggct|120|
|ccgggcaaag gtctggaatg ggttagcgat attgatccga ctggtagcaa gaccgactat|180|
|gcggatagcg tgaaaggccg ttttaccatt tctcgcgaca acagcaagaa cacgctgtac|240|
|ctgcagatga actcactgcg tgccgaagat acggccgtgt attactgtgc gagagacctc|300|
|acggtgtacg ggttcgacta ctggggccag ggaaccctgg tcaccgtctc gagtgctagc|360|
|actaagggcc cgtcggtgtt cccgctggcc ccatcgtcca agagcacatc aggggggtacc|420|
|gccgcctgg gctgccttgt gaaggattac tttcccgagc ccgtcacagt gtcctggaac|480|
|agcggagccc tgacctccgg agtgcatact tccccggctg tgcttcagtc ctctggcctg|540|
|tactcattgt cctccgtggt caccgtccct tcgtcctccc tgggcaccca gacctatatc|600|
|tgtaatgtca accataagcc ctcgaacacc aaggtcgaca gaaggtcga gccgaagtcg|660|
|tgcgacaaga ctcacacttg cccgccttgc ccagccccgg aagctgccgg tggtccttcg|720|
|gtgttcctct tcccgcccaa gccgaaggat accctgatga tctcacggac ccccgaagtg|780|
|acctgtgtgg tggtggacgt gtcccacgag gacccggaag tgaaattcaa ttggtacgtg|840|
|gatggagtgg aagtgcacaa cgccaagacc aagccacggg aagaacagta caactctacc|900|
|taccgcgtgg tgtccgtgct cactgtgctg caccaagact ggctgaacgg aaggagtac|960|
|aagtgcaaag tgtccaacaa ggcgctgcct gcccccaattg agaaaactat ctcgaaagcc|1020|
|aagggacagc ctcgagagcc tcaagtgtac accctgcctc cctctcggga cgagctgacc|1080|
|aagaaccaag tctccctgac ctgtctggtc aagggattct acccatcgga tatcgccgtg|1140|
|gaatgggaaa gcaacggaca gcccgagaac aactacaaga cgactccgcc cgtgctggat|1200|
|tccgacggga gcttcttctt gtactccaag ctgaccgtcg acaagagcag atggcagcag|1260|
|ggaaacgtgt tctcctgctc cgtgatgcat gaggcgctgc acaaccacta cactcagaag|1320|
|agcttgtccc tgtcgcccgg a|1341|

```
<210> SEQ ID NO 44
<211> LENGTH: 118
<212> TYPE: PRT
<213> ORGANISM: Artificial Sequence
<220> FEATURE:
<223> OTHER INFORMATION: Synthetic
```

<400> SEQUENCE: 44

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Asp Met Ser Trp Val Arg Gln Ala Pro Gly Lys Gly Leu Glu Trp Val
        35                  40                  45

Ser Asp Ile Asp Pro Thr Gly Ser Lys Thr Asp Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Leu Thr Val Tyr Gly Phe Asp Tyr Trp Gly Gln Gly Thr
            100                 105                 110

Leu Val Thr Val Ser Ser
        115

<210> SEQ ID NO 45
<211> LENGTH: 354
<212> TYPE: DNA
<213> ORGANISM: Artificial Sequence
<220> FEATURE:
<223> OTHER INFORMATION: Synthetic

<400> SEQUENCE: 45
gaagtgcaac tgctggagtc cggtggtggt ctggtacagc cgggtggttc tctgcgtctg      60
agttgcgcgg ccagtggctt taccttcagt agttacgata tgagctgggt gcgtcaggct     120
ccgggcaaag gtctgaatg ggttagcgat attgatccga ctggtagcaa gaccgactat      180
gcggatagcg tgaaaggccg ttttaccatt tctcgcgaca acagcaagaa cacgctgtac     240
ctgcagatga actcactgcg tgccgaagat acggccgtgt attactgtgc gagagacctc     300
acggtgtacg ggttcgacta ctggggccag ggaaccctgg tcaccgtctc gagt           354

<210> SEQ ID NO 46
<211> LENGTH: 215
<212> TYPE: PRT
<213> ORGANISM: Artificial Sequence
<220> FEATURE:
<223> OTHER INFORMATION: Synthetic

<400> SEQUENCE: 46

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Ser
            20                  25                  30

Tyr Leu Ala Trp Tyr Gln Gln Lys Pro Gly Gln Ala Pro Arg Leu Leu
        35                  40                  45

Ile Tyr Gly Ala Ser Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Ser Tyr Ser Tyr Pro
                85                  90                  95

Val Thr Phe Gly Gln Gly Thr Lys Val Glu Ile Lys Arg Thr Val Ala
            100                 105                 110

```
Ala Pro Ser Val Phe Ile Phe Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 47
<211> LENGTH: 645
<212> TYPE: DNA
<213> ORGANISM: Artificial Sequence
<220> FEATURE:
<223> OTHER INFORMATION: Synthetic

<400> SEQUENCE: 47
gaaattgtgc tgacccagtc tccgggcacg ttatctctga gccctggtga gcgcgccact      60
ctgtcatgcc gggcttctca agtgttagc agtagctacc tggcgtggta tcagcaaaaa     120
ccgggccagg ccccgcgtct gctgatttac ggtgcatcca gccgtgccac cggcattcca     180
gatcgttttt ccggtagtgg ttctgggacg gacttcactc tgacaatctc acgcctggaa     240
ccggaggatt ttgcggtgta ttactgccag caatcttatt cttatcctgt cacgttcggc     300
caagggacca aggtggaaat caaacgtact gtggccgctc ctagcgtgtt cattttccg     360 ccatccgacg agcagctcaa gtccggcacc gcctccgtgg tctgcctgct caacaacttc     420
taccctcgcg aagctaaggt ccagtggaag gtcgacaatg ccctgcagtc cggaaactcg     480
caggaaagcg tgactgaaca ggactccaag gactccacct attcactgtc ctcgactctg     540
accctgagca aggcggatta cgaaaagcac aaagtgtacg catgcgaagt gacccaccag     600
ggtctttcgt cccccgtgac caagagcttc aacagaggag agtgt                    645

<210> SEQ ID NO 48
<211> LENGTH: 108
<212> TYPE: PRT
<213> ORGANISM: Artificial Sequence
<220> FEATURE:
<223> OTHER INFORMATION: Synthetic

<400> SEQUENCE: 48

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Ser
            20                  25                  30

Tyr Leu Ala Trp Tyr Gln Gln Lys Pro Gly Gln Ala Pro Arg Leu Leu
        35                  40                  45

Ile Tyr Gly Ala Ser Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Ser Tyr Ser Tyr Pro
```

```
                    85                  90                  95
Val Thr Phe Gly Gln Gly Thr Lys Val Glu Ile Lys
                   100                 105

<210> SEQ ID NO 49
<211> LENGTH: 324
<212> TYPE: DNA
<213> ORGANISM: Artificial Sequence
<220> FEATURE:
<223> OTHER INFORMATION: Synthetic

<400> SEQUENCE: 49
gaaattgtgc tgacccagtc tccgggcacg ttatctctga gccctggtga gcgcgccact      60
ctgtcatgcc gggcttctca aagtgttagc agtagctacc tggcgtggta tcagcaaaaa     120
ccgggccagg ccccgcgtct gctgatttac ggtgcatcca gccgtgccac cggcattcca     180
gatcgttttt ccggtagtgg ttctgggacg gacttcactc tgacaatctc acgcctggaa     240
ccggaggatt ttgcggtgta ttactgccag caatcttatt cttatcctgt cacgttcggc     300
caagggacca aggtggaaat caaa                                             324

<210> SEQ ID NO 50
<211> LENGTH: 447
<212> TYPE: PRT
<213> ORGANISM: Artificial Sequence
<220> FEATURE:
<223> OTHER INFORMATION: Synthetic

<400> SEQUENCE: 50

Glu Val Gln Leu Leu Glu Ser Gly Gly Gly Leu Val Gln Pro Gly Gly
1               5                  10                  15

Ser Leu Arg Leu Ser Cys Ala Ala Ser Gly Phe Thr Phe Ser Ser Tyr
            20                  25                  30

Asp Met Ser Trp Val Arg Gln Ala Pro Gly Lys Gly Leu Glu Trp Val
        35                  40                  45

Ser Asp Ile Asp Pro Thr Gly Ser Lys Thr Asp Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Leu Leu Val Tyr Gly Phe Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Lys Val Glu Pro Lys Ser Cys Asp Lys Thr
    210                 215                 220
```

| His Thr Cys Pro Pro Cys Pro Ala Pro Glu Leu Leu Gly Gly Pro Ser |
| 225                 230                 235                 240 |

Val Phe Leu Phe Pro Pro Lys Pro Lys Asp Thr Leu Met Ile Ser Arg
            245                 250                 255

Thr Pro Glu Val Thr Cys Val Val Val Asp Val Ser His Glu Asp Pro
        260                 265                 270

Glu Val Lys Phe Asn Trp Tyr Val Asp Gly Val Glu Val His Asn Ala
            275                 280                 285

Lys Thr Lys Pro Arg Glu Glu Gln Tyr Asn Ser Thr Tyr Arg Val Val
        290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Asp Glu Leu Thr Lys Asn Gln Val Ser Leu Thr Cys
        355                 360                 365

Leu Val Lys Gly Phe Tyr Pro Ser Asp Ile Ala Val Glu Trp Glu Ser
370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
            420                 425                 430

Leu His Asn His Tyr Thr Gln Lys Ser Leu Ser Leu Ser Pro Gly
        435                 440                 445

<210> SEQ ID NO 51
<211> LENGTH: 1341
<212> TYPE: DNA
<213> ORGANISM: Artificial Sequence
<220> FEATURE:
<223> OTHER INFORMATION: Synthetic

<400> SEQUENCE: 51

| gaagtgcaac tgctggagtc cggtggtggt ctggtacagc cgggtggttc tctgcgtctg | 60 |
| agttgcgcgg ccagtggctt taccttcagt agttacgata tgagctgggt gcgtcaggct | 120 |
| ccgggcaaag gtctggaatg ggttagcgat attgatccga ctggtagcaa gaccgactat | 180 |
| gcggatagcg tgaaaggccg ttttaccatt tctcgcgaca acagcaagaa cacgctgtac | 240 |
| ctgcagatga actcactgcg tgccgaagat acggccgtgt attactgtgc gagagacctc | 300 |
| ttggtgtacg ggttcgacta ctggggccag ggaaccctgg tcaccgtctc gagtgctagc | 360 |
| actaagggcc cgtcggtgtt cccgctggcc ccatcgtcca agagcacatc agggggtacc | 420 |
| gccgccctgg gctgccttgt gaaggattac tttcccgagc ccgtcacagt gtcctggaac | 480 |
| agcggagccc tgacctccgg agtgcatact ttccggctg tgcttcagtc ctctggcctg | 540 |
| tactcattgt cctccgtggt caccgtccct tcgtcctccc tgggcaccca gacctatatc | 600 |
| tgtaatgtca accataagcc ctcgaacacc aaggtcgaca agaaggtcga gccgaagtcg | 660 |
| tgcgacaaga ctcacacttg cccgccttgc ccagccccgg aactgctggg tggtccttcg | 720 |
| gtgttcctct ccccgcccaa gccgaaggat accctgatga tctcacggac ccccgaagtg | 780 |
| acctgtgtgg tggtggacgt gtcccacgag gacccggaag tgaaattcaa ttggtacgtg | 840 |

```
gatggagtgg aagtgcacaa cgccaagacc aagccacggg aagaacagta caactctacc    900
taccgcgtgg tgtccgtgct cactgtgctg caccaagact ggctgaacgg gaaggagtac    960
aagtgcaaag tgtccaacaa ggcgctgcct gccccaattg agaaaactat ctcgaaagcc   1020
aagggacagc ctcgagagcc tcaagtgtac accctgcctc cctctcggga cgagctgacc   1080
aagaaccaag tctccctgac ctgtctggtc aagggattct acccatcgga tatcgccgtg   1140
gaatgggaaa gcaacggaca gcccgagaac aactacaaga cgactccgcc cgtgctggat   1200
tccgacggga gcttcttctt gtactccaag ctgaccgtcg acaagagcag atggcagcag   1260
ggaaacgtgt tctcctgctc cgtgatgcat gaggcgctgc acaaccacta cactcagaag   1320
agcttgtccc tgtcgcccgg a                                             1341
```

<210> SEQ ID NO 52
<211> LENGTH: 447
<212> TYPE: PRT
<213> ORGANISM: Artificial Sequence
<220> FEATURE:
<223> OTHER INFORMATION: Synthetic

<400> SEQUENCE: 52

```
Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Asp Met Ser Trp Val Arg Gln Ala Pro Gly Lys Gly Leu Glu Trp Val
        35                  40                  45

Ser Asp Ile Asp Pro Thr Gly Ser Lys Thr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Leu Leu Val Tyr Gly Phe Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Lys Val Glu Pro Lys Ser Cys Asp Lys Thr
    210                 215                 220

His Thr Cys Pro Pro Cys Pro Ala Pro Glu Ala Ala Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270
```

```
Glu Val Lys Phe Asn Trp Tyr Val Asp Gly Val Glu Val His Asn Ala
            275                 280                 285

Lys Thr Lys Pro Arg Glu Glu Gln Tyr Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Asp Glu Leu Thr Lys Asn Gln Val Ser Leu Thr Cys
            355                 360                 365

Leu Val Lys Gly Phe Tyr Pro Ser Asp Ile Ala Val Glu Trp Glu Ser
370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
            420                 425                 430

Leu His Asn His Tyr Thr Gln Lys Ser Leu Ser Leu Ser Pro Gly
            435                 440                 445

<210> SEQ ID NO 53
<211> LENGTH: 1341
<212> TYPE: DNA
<213> ORGANISM: Artificial Sequence
<220> FEATURE:
<223> OTHER INFORMATION: Synthetic

<400> SEQUENCE: 53
gaagtgcaac tgctggagtc cggtggtggt ctggtacagc cgggtggttc tctgcgtctg      60
agttgcgcgg ccagtggctt taccttcagt agttacgata tgagctgggt gcgtcaggct     120
ccgggcaaag gtctgaatg ggttagcgat attgatccga ctggtagcaa gaccgactat     180
gcggatagcg tgaaaggccg ttttaccatt tctcgcgaca cagcaagaa cacgctgtac     240 ctgcagatga actcactgcg tgccgaagat acggccgtgt attactgtgc gagagacctc     300
ttggtgtacg ggttcgacta ctggggccag ggaaccctgg tcaccgtctc gagtgctagc     360
actaagggcc cgtcggtgtt cccgctggcc catcgtcca agagcacatc aggggggtacc     420 gccgccctgg gctgccttgt gaaggattac tttcccgagc ccgtcacagt gtcctggaac     480
agcggagccc tgacctccgg agtgcatact ttccggctg tgcttcagtc ctctggcctg     540
tactcattgt cctccgtggt caccgtccct tcgtcctccc tgggcaccca gacctatatc     600
tgtaatgtca accataagcc ctcgaacacc aaggtcgaca gaaggtcga gccgaagtcg     660 tgcgacaaga ctcacacttg cccgccttgc ccagccccgg aagctgccgg tggtccttcg     720
gtgttcctct cccgcccaa gccgaaggat accctgatga tctcacggac ccccgaagtg     780
acctgtgtgg tggtggacgt gtcccacgag gacccgaag tgaaattcaa ttggtacgtg     840
gatggagtgg aagtgcacaa cgccaagacc aagccacggg aagaacagta caactctacc     900
taccgcgtgg tgtccgtgct cactgtgctg caccaagact ggctgaacgg gaaggagtac     960
aagtgcaaag tgtccaacaa ggcgctgcct gccccaattg agaaaactat ctcgaaagcc    1020
aagggacagc ctcgagagcc tcaagtgtac accctgcctc cctctcggga cgagctgacc    1080
```

```
aagaaccaag tctccctgac ctgtctggtc aagggattct acccatcgga tatcgccgtg  1140
gaatgggaaa gcaacggaca gcccgagaac aactacaaga cgactccgcc cgtgctggat  1200
tccgacggga gcttcttctt gtactccaag ctgaccgtcg acaagagcag atggcagcag  1260
ggaaacgtgt tctcctgctc cgtgatgcat gaggcgctgc acaaccacta cactcagaag  1320
agcttgtccc tgtcgcccgg a                                             1341
```

```
<210> SEQ ID NO 54
<211> LENGTH: 118
<212> TYPE: PRT
<213> ORGANISM: Artificial Sequence
<220> FEATURE:
<223> OTHER INFORMATION: Synthetic

<400> SEQUENCE: 54
```

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Asp Met Ser Trp Val Arg Gln Ala Pro Gly Lys Gly Leu Glu Trp Val
        35                  40                  45

Ser Asp Ile Asp Pro Thr Gly Ser Lys Thr Asp Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Leu Leu Val Tyr Gly Phe Asp Tyr Trp Gly Gln Gly Thr
            100                 105                 110

Leu Val Thr Val Ser Ser
        115

```
<210> SEQ ID NO 55
<211> LENGTH: 354
<212> TYPE: DNA
<213> ORGANISM: Artificial Sequence
<220> FEATURE:
<223> OTHER INFORMATION: Synthetic

<400> SEQUENCE: 55
gaagtgcaac tgctggagtc cggtggtggt ctggtacagc cgggtggttc tctgcgtctg   60
agttgcgcgg ccagtggctt taccttcagt agttacgata tgagctgggt gcgtcaggct  120
ccgggcaaag gtctggaatg ggttagcgat attgatccga ctggtagcaa gaccgactat  180
gcggatagcg tgaaaggccg ttttaccatt tctcgcgaca acagcaagaa cacgctgtac  240
ctgcagatga actcactgcg tgccgaagat acggccgtgt attactgtgc gagagacctc  300
ttggtgtacg gttcgactac tggggccag ggaaccctgg tcaccgtctc gagt          354
```

```
<210> SEQ ID NO 56
<211> LENGTH: 452
<212> TYPE: PRT
<213> ORGANISM: Artificial Sequence
<220> FEATURE:
<223> OTHER INFORMATION: Synthetic

<400> SEQUENCE: 56
```

Glu Val Gln Leu Leu Glu Ser Gly Gly Gly Leu Val Gln Pro Gly Gly
1               5                   10                  15

```
Ser Leu Arg Leu Ser Cys Ala Ala Ser Gly Phe Thr Phe Ser Ala Tyr
            20                  25                  30

Asn Ile His Trp Val Arg Gln Ala Pro Gly Lys Gly Leu Glu Trp Val
            35                  40                  45

Ser Asp Ile Ser Pro Tyr Gly Ala Thr Asn Tyr Ala Asp Ser Val
50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
            85                  90                  95

Ala Arg Asn Leu Tyr Glu Leu Ser Ala Tyr Ser Tyr Gly Ala Asp Tyr
            100                 105                 110

Trp Gly Gln Gly Thr Leu Val Thr Val Ser Ser Ala Ser Thr Lys Gly
            115                 120                 125

Pro Ser Val Phe Pro Leu Ala Pro Ser Ser Lys Ser Thr Ser Gly Gly
    130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
            180                 185                 190

Thr Val Pro Ser Ser Ser Leu Gly Thr Gln Thr Tyr Ile Cys Asn Val
            195                 200                 205

Asn His Lys Pro Ser Asn Thr Lys Val Asp Lys Lys Val Glu Pro Lys
    210                 215                 220

Ser Cys Asp Lys Thr His Thr Cys Pro Pro Cys Pro Ala Pro Glu Leu
225                 230                 235                 240

Leu Gly Gly Pro Ser Val Phe Leu Phe Pro Pro Lys Pro Lys Asp Thr
                245                 250                 255

Leu Met Ile Ser Arg Thr Pro Glu Val Thr Cys Val Val Val Asp Val
            260                 265                 270

Ser His Glu Asp Pro Glu Val Lys Phe Asn Trp Tyr Val Asp Gly Val
            275                 280                 285

Glu Val His Asn Ala Lys Thr Lys Pro Arg Glu Glu Gln Tyr Asn Ser
            290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Ala Leu Pro Ala
                325                 330                 335

Pro Ile Glu Lys Thr Ile Ser Lys Ala Lys Gly Gln Pro Arg Glu Pro
            340                 345                 350

Gln Val Tyr Thr Leu Pro Pro Ser Arg Asp Glu Leu Thr Lys Asn Gln
            355                 360                 365

Val Ser Leu Thr Cys Leu Val Lys Gly Phe Tyr Pro Ser Asp Ile Ala
370                 375                 380

Val Glu Trp Glu Ser Asn Gly Gln Pro Glu Asn Asn Tyr Lys Thr Thr
385                 390                 395                 400

Pro Pro Val Leu Asp Ser Asp Gly Ser Phe Phe Leu Tyr Ser Lys Leu
            405                 410                 415

Thr Val Asp Lys Ser Arg Trp Gln Gln Gly Asn Val Phe Ser Cys Ser
            420                 425                 430
```

Val Met His Glu Ala Leu His Asn His Tyr Thr Gln Lys Ser Leu Ser
        435                 440                 445

Leu Ser Pro Gly
    450

<210> SEQ ID NO 57
<211> LENGTH: 1356
<212> TYPE: DNA
<213> ORGANISM: Artificial Sequence
<220> FEATURE:
<223> OTHER INFORMATION: Synthetic

<400> SEQUENCE: 57

```
gaagtgcaac tgctggagtc cggtggtggt ctggtacagc cgggtggttc tctgcgtctg      60
agttgcgcgg ccagtggctt taccttcagt gcctataata tccattgggt gcgtcaggct     120
ccgggcaaag gtctggaatg ggttagcgat atttctccgt atggtggcgc gaccaactat     180
gcggatagcg tgaaaggccg ttttaccatt tctcgcgaca acagcaagaa cacgctgtac     240
ctgcagatga actcactgcg tgccgaagat acggccgtgt attactgtgc gagaaacctc     300
tacgagttga gcgcttactc ttacggggcg gactactggg gccagggaac cctggtcacc     360
gtctcgtcgg ctagcactaa gggcccgtcg gtgttcccgc tggccccatc gtccaagagc     420
acatcagggg gtaccgccgc cctgggctgc cttgtgaagg attactttcc cgagcccgtc     480
acagtgtcct ggaacagcgg agccctgacc tccggagtgc atacttttcc ggctgtgctt     540
cagtcctctg gcctgtactc attgtcctcc gtggtcaccg tcccttcgtc ctccctgggc     600
acccagacct atatctgtaa tgtcaaccat aagccctcga acaccaaggt cgacaagaag     660
gtcgagccga gtcgtgcgac aagactcac acttgcccgc cttgcccagc cccggaactg     720
ctgggtggtc cttcggtgtt cctcttcccg cccaagccga aggatacccct gatgatctca     780
cggaccccg aagtgacctg tgtggtggtg gacgtgtccc acgaggaccc ggaagtgaaa     840
ttcaattggt acgtggatgg agtggaagtg cacaacgcca agaccaagcc acgggaagaa     900
cagtacaact ctacctaccg cgtggtgtcc gtgctcactg tgctgcacca agactggctg     960
aacgggaagg agtacaagtg caaagtgtcc aacaaggcgc tgcctgcccc aattgagaaa    1020
actatctcga aagccaaggg acagcctcga gagcctcaag tgtacaccct gcctccctct    1080
cgggacgagc tgaccaagaa ccaagtctcc ctgacctgtc tggtcaaggg attctaccca    1140
tcggatatcg ccgtggaatg ggaaagcaac ggacagcccg agaacaacta caagacgact    1200
ccgcccgtgc tggattccga cgggagcttc ttcttgtact ccaagctgac cgtcgacaag    1260
agcagatggc agcagggaaa cgtgttctcc tgctccgtga tgcatgaggc gctgcacaac    1320
cactacactc agaagagctt gtccctgtcg cccgga                              1356
```

<210> SEQ ID NO 58
<211> LENGTH: 452
<212> TYPE: PRT
<213> ORGANISM: Artificial Sequence
<220> FEATURE:
<223> OTHER INFORMATION: Synthetic

<400> SEQUENCE: 58

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ala Tyr
            20                  25                  30

Asn Ile His Trp Val Arg Gln Ala Pro Gly Lys Gly Leu Glu Trp Val

```
                35                  40                  45
Ser Asp Ile Ser Pro Tyr Gly Gly Ala Thr Asn Tyr Ala Asp Ser Val
 50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Arg Asn Leu Tyr Glu Leu Ser Ala Tyr Ser Tyr Gly Ala Asp Tyr
            100                 105                 110

Trp Gly Gln Gly Thr Leu Val Thr Val Ser Ser Ala Ser Thr Lys Gly
        115                 120                 125

Pro Ser Val Phe Pro Leu Ala Pro Ser Ser Lys Ser Thr Ser Gly Gly
    130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
            180                 185                 190

Thr Val Pro Ser Ser Ser Leu Gly Thr Gln Thr Tyr Ile Cys Asn Val
        195                 200                 205

Asn His Lys Pro Ser Asn Thr Lys Val Asp Lys Lys Val Glu Pro Lys
    210                 215                 220

Ser Cys Asp Lys Thr His Thr Cys Pro Pro Cys Pro Ala Pro Glu Ala
225                 230                 235                 240

Ala Gly Gly Pro Ser Val Phe Leu Phe Pro Pro Lys Pro Lys Asp Thr
                245                 250                 255

Leu Met Ile Ser Arg Thr Pro Glu Val Thr Cys Val Val Val Asp Val
            260                 265                 270

Ser His Glu Asp Pro Glu Val Lys Phe Asn Trp Tyr Val Asp Gly Val
        275                 280                 285

Glu Val His Asn Ala Lys Thr Lys Pro Arg Glu Glu Gln Tyr Asn Ser
    290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Ala Leu Pro Ala
                325                 330                 335

Pro Ile Glu Lys Thr Ile Ser Lys Ala Lys Gly Gln Pro Arg Glu Pro
            340                 345                 350

Gln Val Tyr Thr Leu Pro Pro Ser Arg Asp Glu Leu Thr Lys Asn Gln
        355                 360                 365

Val Ser Leu Thr Cys Leu Val Lys Gly Phe Tyr Pro Ser Asp Ile Ala
    370                 375                 380

Val Glu Trp Glu Ser Asn Gly Gln Pro Glu Asn Asn Tyr Lys Thr Thr
385                 390                 395                 400

Pro Pro Val Leu Asp Ser Asp Gly Ser Phe Phe Leu Tyr Ser Lys Leu
                405                 410                 415

Thr Val Asp Lys Ser Arg Trp Gln Gln Gly Asn Val Phe Ser Cys Ser
            420                 425                 430

Val Met His Glu Ala Leu His Asn His Tyr Thr Gln Lys Ser Leu Ser
        435                 440                 445

Leu Ser Pro Gly
    450
```

<210> SEQ ID NO 59
<211> LENGTH: 1356
<212> TYPE: DNA
<213> ORGANISM: Artificial Sequence
<220> FEATURE:
<223> OTHER INFORMATION: Synthetic

<400> SEQUENCE: 59

```
gaagtgcaac tgctggagtc cggtggtggt ctggtacagc cgggtggttc tctgcgtctg      60
agttgcgcgg ccagtggctt taccttcagt gcctataata tccattgggt gcgtcaggct     120
ccgggcaaag gtctggaatg ggttagcgat atttctccgt atggtggcgc gaccaactat     180
gcggatagcg tgaaaggccg ttttaccatt tctcgcgaca acagcaagaa cacgctgtac     240
ctgcagatga actcactgcg tgccgaagat acggccgtgt attactgtgc gagaaacctc     300
tacgagttga gcgcttactc ttacggggcg gactactggg gccagggaac cctggtcacc     360
gtctcgtcgg ctagcactaa gggcccgtcg gtgttcccgc tggccccatc gtccaagagc     420
acatcagggg gtaccgccgc cctgggctgc cttgtgaagg attactttcc gagcccgtc     480
acagtgtcct ggaacagcgg agccctgacc tccggagtgc atactttccc ggctgtgctt     540
cagtcctctg gcctgtactc attgtcctcc gtggtcaccg tcccttcgtc ctccctgggc     600
acccagacct atatctgtaa tgtcaaccat aagccctcga acaccaaggt cgacaagaag     660
gtcgagccga agtcgtgcga caagactcac acttgcccgc cttgcccagc cccggaagct     720
gccggtggtc cttcggtgtt cctcttcccg cccaagccga aggatacc ct gatgatctca     780
cggaccccg aagtgacctg tgtggtggtg gacgtgtccc acgaggaccc ggaagtgaaa     840
ttcaattggt acgtggatgg agtggaagtg cacaacgcca agaccaagcc acgggaagaa     900
cagtacaact ctacctaccg cgtggtgtcc gtgctcactg tgctgcacca agactggctg     960
aacgggaagg agtacaagtg caaagtgtcc aacaaggcgc tgcctgcccc aattgagaaa    1020
actatctcga aagccaaggg acagcctcga gagcctcaag tgtacaccct gcctccctct    1080
cgggacgagc tgaccaagaa ccaagtctcc ctgacctgtc tggtcaaggg attctaccca    1140
tcggatatcg ccgtggaatg ggaaagcaac ggacagcccg agaacaacta caagacgact    1200
ccgcccgtgc tggattccga cgggagcttc ttcttgtact ccaagctgac cgtcgacaag    1260
agcagatggc agcagggaaa cgtgttctcc tgctccgtga tgcatgaggc gctgcacaac    1320
cactacactc agaagagctt gtccctgtcg cccgga                              1356
```

<210> SEQ ID NO 60
<211> LENGTH: 123
<212> TYPE: PRT
<213> ORGANISM: Artificial Sequence
<220> FEATURE:
<223> OTHER INFORMATION: Synthetic

<400> SEQUENCE: 60

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ala Tyr
            20                  25                  30

Asn Ile His Trp Val Arg Gln Ala Pro Gly Lys Gly Leu Glu Trp Val
        35                  40                  45

Ser Asp Ile Ser Pro Tyr Gly Gly Ala Thr Asn Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asn Leu Tyr Glu Leu Ser Ala Tyr Ser Tyr Gly Ala Asp Tyr
            100                 105                 110

Trp Gly Gln Gly Thr Leu Val Thr Val Ser Ser
            115                 120

<210> SEQ ID NO 61
<211> LENGTH: 369
<212> TYPE: DNA
<213> ORGANISM: Artificial Sequence
<220> FEATURE:
<223> OTHER INFORMATION: Synthetic

<400> SEQUENCE: 61
gaagtgcaac tgctggagtc cggtggtggt ctggtacagc cgggtggttc tctgcgtctg      60
agttgcgcgg ccagtggctt taccttcagt gcctataata tccattgggt gcgtcaggct     120
ccgggcaaag gtctggaatg ggttagcgat atttctccgt atggtggcgc gaccaactat     180
gcggatagcg tgaaaggccg ttttaccatt tctcgcgaca acagcaagaa cacgctgtac     240
ctgcagatga actcactgcg tgccgaagat acggccgtgt attactgtgc gagaaacctc     300
tacgagttga gcgcttactc ttacggggcg gactactggg gccagggaac cctggtcacc     360
gtctcgtcg                                                             369

<210> SEQ ID NO 62
<211> LENGTH: 8
<212> TYPE: PRT
<213> ORGANISM: Artificial Sequence
<220> FEATURE:
<223> OTHER INFORMATION: Synthetic

<400> SEQUENCE: 62

Gly Phe Thr Phe Ser Ala Tyr Asn
1               5

<210> SEQ ID NO 63
<211> LENGTH: 5
<212> TYPE: PRT
<213> ORGANISM: Artificial Sequence
<220> FEATURE:
<223> OTHER INFORMATION: Synthetic

<400> SEQUENCE: 63

Ala Tyr Asn Ile His
1               5

<210> SEQ ID NO 64
<211> LENGTH: 8
<212> TYPE: PRT
<213> ORGANISM: Artificial Sequence
<220> FEATURE:
<223> OTHER INFORMATION: Synthetic

<400> SEQUENCE: 64

Ile Ser Pro Tyr Gly Gly Ala Thr
1               5

<210> SEQ ID NO 65
<211> LENGTH: 17
<212> TYPE: PRT

```
<213> ORGANISM: Artificial Sequence
<220> FEATURE:
<223> OTHER INFORMATION: Synthetic

<400> SEQUENCE: 65

Asp Ile Ser Pro Tyr Gly Gly Ala Thr Asn Tyr Ala Asp Ser Val Lys
1               5                   10                  15

Gly

<210> SEQ ID NO 66
<211> LENGTH: 16
<212> TYPE: PRT
<213> ORGANISM: Artificial Sequence
<220> FEATURE:
<223> OTHER INFORMATION: Synthetic

<400> SEQUENCE: 66

Ala Arg Asn Leu Tyr Glu Leu Ser Ala Tyr Ser Tyr Gly Ala Asp Tyr
1               5                   10                  15

<210> SEQ ID NO 67
<211> LENGTH: 14
<212> TYPE: PRT
<213> ORGANISM: Artificial Sequence
<220> FEATURE:
<223> OTHER INFORMATION: Synthetic

<400> SEQUENCE: 67

Asn Leu Tyr Glu Leu Ser Ala Tyr Ser Tyr Gly Ala Asp Tyr
1               5                   10

<210> SEQ ID NO 68
<211> LENGTH: 216
<212> TYPE: PRT
<213> ORGANISM: Artificial Sequence
<220> FEATURE:
<223> OTHER INFORMATION: Synthetic

<400> SEQUENCE: 68

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Ser
                20                  25                  30

Tyr Leu Ala Trp Tyr Gln Gln Lys Pro Gly Gln Ala Pro Arg Leu Leu
            35                  40                  45

Ile Tyr Gly Ala Ser Ser Arg Ala Thr Gly Ile Pro Asp Arg Phe Ser
        50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Tyr Ser Ser
                85                  90                  95

Pro Ile Thr Phe Gly Gln Gly Thr Lys Val Glu Ile Lys Arg Thr Val
                100                 105                 110

Ala Ala Pro Ser Val Phe Ile Phe Pro Pro Ser Asp Glu Gln Leu Lys
            115                 120                 125

Ser Gly Thr Ala Ser Val Val Cys Leu Leu Asn Asn Phe Tyr Pro Arg
        130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175
```

```
Leu Ser Ser Thr Leu Thr Leu Ser Lys Ala Asp Tyr Glu Lys His Lys
            180                 185                 190

Val Tyr Ala Cys Glu Val Thr His Gln Gly Leu Ser Ser Pro Val Thr
        195                 200                 205

Lys Ser Phe Asn Arg Gly Glu Cys
    210                 215
```

<210> SEQ ID NO 69
<211> LENGTH: 648
<212> TYPE: DNA
<213> ORGANISM: Artificial Sequence
<220> FEATURE:
<223> OTHER INFORMATION: Synthetic

<400> SEQUENCE: 69

```
gaaattgtgc tgacccagtc tccgggcacg ttatctctga gccctggtga gcgcgccact      60
ctgtcatgcc gggcttctca aagtgttagc agtagctacc tggcgtggta tcagcaaaaa     120
ccgggccagg ccccgcgtct gctgatttac ggtgcatcca gccgtgccac cggcattcca     180
gatcgttttt ccggtagtgg ttctgggacg gacttcactc tgacaatctc acgcctggaa     240
ccggaggatt ttgcggtgta ttactgccag caatattatt attcttctcc tatcacgttc     300
ggccaaggga ccaaggtgga aatcaaacgt actgtggccg ctcctagcgt gttcattttt     360
ccgccatccg acgagcagct caagtccggc accgcctccg tggtctgcct gctcaacaac     420
ttctaccctc gcgaagctaa ggtccagtgg aaggtcgaca atgccctgca gtccggaaac     480
tcgcaggaaa gcgtgactga acaggactcc aaggactcca cctattcact gtcctcgact     540
ctgaccctga gcaaggcgga ttacgaaaag cacaaagtgt acgcatgcga agtgacccac     600
cagggtcttt cgtccccgt gaccaagagc ttcaacagag gagagtgt                   648
```

<210> SEQ ID NO 70
<211> LENGTH: 109
<212> TYPE: PRT
<213> ORGANISM: Artificial Sequence
<220> FEATURE:
<223> OTHER INFORMATION: Synthetic

<400> SEQUENCE: 70

```
Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Ser
            20                  25                  30

Tyr Leu Ala Trp Tyr Gln Gln Lys Pro Gly Gln Ala Pro Arg Leu Leu
        35                  40                  45

Ile Tyr Gly Ala Ser Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Tyr Tyr Ser Ser
                85                  90                  95

Pro Ile Thr Phe Gly Gln Gly Thr Lys Val Glu Ile Lys
            100                 105
```

<210> SEQ ID NO 71
<211> LENGTH: 327
<212> TYPE: DNA
<213> ORGANISM: Artificial Sequence
<220> FEATURE:

<223> OTHER INFORMATION: Synthetic

<400> SEQUENCE: 71

```
gaaattgtgc tgacccagtc tccgggcacg ttatctctga gccctggtga gcgcgccact    60
ctgtcatgcc gggcttctca aagtgttagc agtagctacc tggcgtggta tcagcaaaaa   120
ccgggccagg ccccgcgtct gctgatttac ggtgcatcca gccgtgccac cggcattcca   180
gatcgttttt ccggtagtgg ttctgggacg gacttcactc tgacaatctc acgcctggaa   240
ccggaggatt ttgcggtgta ttactgccag caatattatt attcttctcc tatcacgttc   300
ggccaaggga ccaaggtgga aatcaaa                                       327
```

<210> SEQ ID NO 72
<211> LENGTH: 454
<212> TYPE: PRT
<213> ORGANISM: Artificial Sequence
<220> FEATURE:
<223> OTHER INFORMATION: Synthetic

<400> SEQUENCE: 72

```
Glu Val Gln Leu Leu Glu Ser Gly Gly Gly Leu Val Gln Pro Gly Gly
1               5                   10                  15

Ser Leu Arg Leu Asn Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Ser Gly Ser Gly Gly Ser Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Ser Tyr Asp Lys Tyr Trp Gly Ser Ser Ile Tyr Ser Gly Leu
            100                 105                 110

Asp Tyr Trp Gly Gln Gly Thr Leu Val Thr Val Ser Ser Ala Ser Thr
        115                 120                 125

Lys Gly Pro Ser Val Phe Pro Leu Ala Pro Ser Ser Lys Ser Thr Ser
    130                 135                 140

Gly Gly Thr Ala Ala Leu Gly Cys Leu Val Lys Asp Tyr Phe Pro Glu
145                 150                 155                 160

Pro Val Thr Val Ser Trp Asn Ser Gly Ala Leu Thr Ser Gly Val His
                165                 170                 175

Thr Phe Pro Ala Val Leu Gln Ser Ser Gly Leu Tyr Ser Leu Ser Ser
            180                 185                 190

Val Val Thr Val Pro Ser Ser Ser Leu Gly Thr Gln Thr Tyr Ile Cys
        195                 200                 205

Asn Val Asn His Lys Pro Ser Asn Thr Lys Val Asp Lys Lys Val Glu
    210                 215                 220

Pro Lys Ser Cys Asp Lys Thr His Thr Cys Pro Pro Cys Pro Ala Pro
225                 230                 235                 240

Glu Leu Leu Gly Gly Pro Ser Val Phe Leu Phe Pro Pro Lys Pro Lys
                245                 250                 255

Asp Thr Leu Met Ile Ser Arg Thr Pro Glu Val Thr Cys Val Val Val
            260                 265                 270

Asp Val Ser His Glu Asp Pro Glu Val Lys Phe Asn Trp Tyr Val Asp
        275                 280                 285
```

Gly Val Glu Val His Asn Ala Lys Thr Lys Pro Arg Glu Glu Gln Tyr
            290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Ala Leu
                325                 330                 335

Pro Ala Pro Ile Glu Lys Thr Ile Ser Lys Ala Lys Gly Gln Pro Arg
            340                 345                 350

Glu Pro Gln Val Tyr Thr Leu Pro Pro Ser Arg Asp Glu Tyr Trp Asp
            355                 360                 365

Gln Glu Val Ser Leu Thr Cys Leu Val Lys Gly Phe Tyr Pro Ser Asp
370                 375                 380

Ile Ala Val Glu Trp Glu Ser Asn Gly Asp Glu Gln Phe Ala Tyr Lys
385                 390                 395                 400

Thr Thr Pro Pro Val Leu Asp Ser Asp Gly Ser Phe Phe Leu Tyr Ser
                405                 410                 415

Lys Leu Thr Val Asp Gln Tyr Arg Trp Asn Pro Ala Asp Tyr Phe Ser
            420                 425                 430

Cys Ser Val Met His Glu Ala Leu His Asn His Tyr Thr Gln Lys Ser
            435                 440                 445

Leu Ser Leu Ser Pro Gly
    450

<210> SEQ ID NO 73
<211> LENGTH: 454
<212> TYPE: PRT
<213> ORGANISM: Artificial Sequence
<220> FEATURE:
<223> OTHER INFORMATION: Synthetic

<400> SEQUENCE: 73

Glu Val Gln Leu Leu Glu Ser Gly Gly Gly Leu Val Gln Pro Gly Gly
1               5                   10                  15

Ser Leu Arg Leu Asn Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Ser Gly Ser Gly Gly Ser Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Ser Tyr Asp Lys Tyr Trp Gly Ser Ser Ile Tyr Ser Gly Leu
            100                 105                 110

Asp Tyr Trp Gly Gln Gly Thr Leu Val Thr Val Ser Ser Ala Ser Thr
        115                 120                 125

Lys Gly Pro Ser Val Phe Pro Leu Ala Pro Ser Ser Lys Ser Thr Ser
    130                 135                 140

Gly Gly Thr Ala Ala Leu Gly Cys Leu Val Lys Asp Tyr Phe Pro Glu
145                 150                 155                 160

Pro Val Thr Val Ser Trp Asn Ser Gly Ala Leu Thr Ser Gly Val His
                165                 170                 175

Thr Phe Pro Ala Val Leu Gln Ser Ser Gly Leu Tyr Ser Leu Ser Ser
            180                 185                 190

Val Val Thr Val Pro Ser Ser Leu Gly Thr Gln Thr Tyr Ile Cys
            195                 200                 205

Asn Val Asn His Lys Pro Ser Asn Thr Lys Val Asp Lys Lys Val Glu
    210                 215                 220

Pro Lys Ser Cys Asp Lys Thr His Thr Cys Pro Pro Cys Pro Ala Pro
225                 230                 235                 240

Glu Ala Ala Gly Gly Pro Ser Val Phe Leu Phe Pro Pro Lys Pro Lys
                245                 250                 255

Asp Thr Leu Met Ile Ser Arg Thr Pro Glu Val Thr Cys Val Val Val
                260                 265                 270

Asp Val Ser His Glu Asp Pro Glu Val Lys Phe Asn Trp Tyr Val Asp
            275                 280                 285

Gly Val Glu Val His Asn Ala Lys Thr Lys Pro Arg Glu Glu Gln Tyr
    290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Ala Leu
                325                 330                 335

Pro Ala Pro Ile Glu Lys Thr Ile Ser Lys Ala Lys Gly Gln Pro Arg
                340                 345                 350

Glu Pro Gln Val Tyr Thr Leu Pro Pro Ser Arg Asp Glu Tyr Trp Asp
            355                 360                 365

Gln Glu Val Ser Leu Thr Cys Leu Val Lys Gly Phe Tyr Pro Ser Asp
    370                 375                 380

Ile Ala Val Glu Trp Glu Ser Asn Gly Asp Glu Gln Phe Ala Tyr Lys
385                 390                 395                 400

Thr Thr Pro Pro Val Leu Asp Ser Asp Gly Ser Phe Phe Leu Tyr Ser
                405                 410                 415

Lys Leu Thr Val Asp Lys Ser Arg Trp Gln Gln Gly Asn Val Phe Ser
                420                 425                 430

Cys Ser Val Met His Glu Ala Leu His Asn His Tyr Thr Gln Lys Ser
            435                 440                 445

Leu Ser Leu Ser Pro Gly
    450

<210> SEQ ID NO 74
<211> LENGTH: 447
<212> TYPE: PRT
<213> ORGANISM: Artificial Sequence
<220> FEATURE:
<223> OTHER INFORMATION: Synthetic

<400> SEQUENCE: 74

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Asp Met Ser Trp Val Arg Gln Ala Pro Gly Lys Gly Leu Glu Trp Val
        35                  40                  45

Ser Asp Ile Asp Pro Thr Gly Ser Lys Thr Asp Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Leu Asn Val Tyr Gly Phe Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Lys Val Glu Pro Lys Ser Cys Asp Lys Thr
    210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
        275                 280                 285

Lys Thr Lys Pro Arg Glu Glu Gln Tyr Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Asp Glu Tyr Trp Asp Gln Glu Val Ser Leu Thr Cys
        355                 360                 365

Leu Val Lys Gly Phe Tyr Pro Ser Asp Ile Ala Val Glu Trp Glu Ser
    370                 375                 380

Asn Gly Asp Glu Gln Phe Ala Tyr Lys Thr Thr Pro Pro Val Leu Asp
385                 390                 395                 400

Ser Asp Gly Ser Phe Phe Leu Tyr Ser Lys Leu Thr Val Asp Gln Tyr
                405                 410                 415

Arg Trp Asn Pro Ala Asp Tyr Phe Ser Cys Ser Val Met His Glu Ala
            420                 425                 430

Leu His Asn His Tyr Thr Gln Lys Ser Leu Ser Leu Ser Pro Gly
        435                 440                 445

<210> SEQ ID NO 75
<211> LENGTH: 447
<212> TYPE: PRT
<213> ORGANISM: Artificial Sequence
<220> FEATURE:
<223> OTHER INFORMATION: Synthetic

<400> SEQUENCE: 75

Glu Val Gln Leu Leu Glu Ser Gly Gly Gly Leu Val Gln Pro Gly Gly
1               5                   10                  15

-continued

Ser Leu Arg Leu Ser Cys Ala Ala Ser Gly Phe Thr Phe Ser Ser Tyr
            20                  25                  30

Asp Met Ser Trp Val Arg Gln Ala Pro Gly Lys Gly Leu Glu Trp Val
            35                  40                  45

Ser Asp Ile Asp Pro Thr Gly Ser Lys Thr Asp Tyr Ala Asp Ser Val
 50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                85                  90                  95

Ala Arg Asp Leu Asn Val Tyr Gly Phe Asp Tyr Trp Gly Gln Gly Thr
                100                 105                 110

Leu Val Thr Val Ser Ser Ala Ser Thr Lys Gly Pro Ser Val Phe Pro
            115                 120                 125

Leu Ala Pro Ser Ser Lys Ser Thr Ser Gly Gly Thr Ala Ala Leu Gly
 130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
                180                 185                 190

Ser Leu Gly Thr Gln Thr Tyr Ile Cys Asn Val Asn His Lys Pro Ser
            195                 200                 205

Asn Thr Lys Val Asp Lys Lys Val Glu Pro Lys Ser Cys Asp Lys Thr
 210                 215                 220

His Thr Cys Pro Pro Cys Pro Ala Pro Glu Ala Ala Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
            275                 280                 285

Lys Thr Lys Pro Arg Glu Glu Gln Tyr Asn Ser Thr Tyr Arg Val Val
 290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Asp Glu Tyr Trp Asp Gln Glu Val Ser Leu Thr Cys
            355                 360                 365

Leu Val Lys Gly Phe Tyr Pro Ser Asp Ile Ala Val Glu Trp Glu Ser
            370                 375                 380

Asn Gly Asp Glu Gln Phe Ala Tyr Lys Thr Thr Pro Pro Val Leu Asp
385                 390                 395                 400

Ser Asp Gly Ser Phe Phe Leu Tyr Ser Lys Leu Thr Val Asp Gln Tyr
                405                 410                 415

Arg Trp Asn Pro Ala Asp Tyr Phe Ser Cys Ser Val Met His Glu Ala
            420                 425                 430

```
Leu His Asn His Tyr Thr Gln Lys Ser Leu Ser Leu Ser Pro Gly
            435                 440                 445
```

<210> SEQ ID NO 76
<211> LENGTH: 447
<212> TYPE: PRT
<213> ORGANISM: Artificial Sequence
<220> FEATURE:
<223> OTHER INFORMATION: Synthetic

<400> SEQUENCE: 76

```
Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Asp Met Ser Trp Val Arg Gln Ala Pro Gly Lys Gly Leu Glu Trp Val
        35                  40                  45

Ser Asp Ile Asp Pro Thr Gly Ser Lys Thr Asp Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Leu Thr Val Tyr Gly Phe Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Lys Val Glu Pro Lys Ser Cys Asp Lys Thr
    210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
        275                 280                 285

Lys Thr Lys Pro Arg Glu Glu Gln Tyr Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350
```

Pro Pro Ser Arg Asp Glu Tyr Trp Asp Gln Glu Val Ser Leu Thr Cys
            355                 360                 365

Leu Val Lys Gly Phe Tyr Pro Ser Asp Ile Ala Val Glu Trp Glu Ser
370                 375                 380

Asn Gly Asp Glu Gln Phe Ala Tyr Lys Thr Thr Pro Pro Val Leu Asp
385                 390                 395                 400

Ser Asp Gly Ser Phe Phe Leu Tyr Ser Lys Leu Thr Val Asp Gln Tyr
            405                 410                 415

Arg Trp Asn Pro Ala Asp Tyr Phe Ser Cys Ser Val Met His Glu Ala
            420                 425                 430

Leu His Asn His Tyr Thr Gln Lys Ser Leu Ser Leu Ser Pro Gly
            435                 440                 445

<210> SEQ ID NO 77
<211> LENGTH: 447
<212> TYPE: PRT
<213> ORGANISM: Artificial Sequence
<220> FEATURE:
<223> OTHER INFORMATION: Synthetic

<400> SEQUENCE: 77

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Asp Met Ser Trp Val Arg Gln Ala Pro Gly Lys Gly Leu Glu Trp Val
            35                  40                  45

Ser Asp Ile Asp Pro Thr Gly Ser Lys Thr Asp Tyr Ala Asp Ser Val
50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
            85                  90                  95

Ala Arg Asp Leu Thr Val Tyr Gly Phe Asp Tyr Trp Gly Gln Gly Thr
            100                 105                 110

Leu Val Thr Val Ser Ser Ala Ser Thr Lys Gly Pro Ser Val Phe Pro
            115                 120                 125

Leu Ala Pro Ser Ser Lys Ser Thr Ser Gly Gly Thr Ala Ala Leu Gly
            130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
            165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
            195                 200                 205

Asn Thr Lys Val Asp Lys Lys Val Glu Pro Lys Ser Cys Asp Lys Thr
            210                 215                 220

His Thr Cys Pro Pro Cys Pro Ala Pro Glu Ala Ala Gly Gly Pro Ser
225                 230                 235                 240

Val Phe Leu Phe Pro Pro Lys Pro Lys Asp Thr Leu Met Ile Ser Arg
            245                 250                 255

Thr Pro Glu Val Thr Cys Val Val Val Asp Val Ser His Glu Asp Pro
            260                 265                 270

```
Glu Val Lys Phe Asn Trp Tyr Val Asp Gly Val Glu Val His Asn Ala
            275                 280                 285

Lys Thr Lys Pro Arg Glu Glu Gln Tyr Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Asp Glu Tyr Trp Asp Gln Glu Val Ser Leu Thr Cys
            355                 360                 365

Leu Val Lys Gly Phe Tyr Pro Ser Asp Ile Ala Val Glu Trp Glu Ser
    370                 375                 380

Asn Gly Asp Glu Gln Phe Ala Tyr Lys Thr Thr Pro Pro Val Leu Asp
385                 390                 395                 400

Ser Asp Gly Ser Phe Phe Leu Tyr Ser Lys Leu Thr Val Asp Gln Tyr
                405                 410                 415

Arg Trp Asn Pro Ala Asp Tyr Phe Ser Cys Ser Val Met His Glu Ala
            420                 425                 430

Leu His Asn His Tyr Thr Gln Lys Ser Leu Ser Leu Ser Pro Gly
            435                 440                 445

<210> SEQ ID NO 78
<211> LENGTH: 447
<212> TYPE: PRT
<213> ORGANISM: Artificial Sequence
<220> FEATURE:
<223> OTHER INFORMATION: Synthetic

<400> SEQUENCE: 78

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Asp Met Ser Trp Val Arg Gln Ala Pro Gly Lys Gly Leu Glu Trp Val
        35                  40                  45

Ser Asp Ile Asp Pro Thr Gly Ser Lys Thr Asp Tyr Ala Asp Ser Val
50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Leu Leu Val Tyr Gly Phe Asp Tyr Trp Gly Gln Gly Thr
            100                 105                 110

Leu Val Thr Val Ser Ser Ala Ser Thr Lys Gly Pro Ser Val Phe Pro
    115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190
```

-continued

Ser Leu Gly Thr Gln Thr Tyr Ile Cys Asn Val Asn His Lys Pro Ser
            195                 200                 205

Asn Thr Lys Val Asp Lys Lys Val Glu Pro Lys Ser Cys Asp Lys Thr
210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
            245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
            275                 280                 285

Lys Thr Lys Pro Arg Glu Glu Gln Tyr Asn Ser Thr Tyr Arg Val Val
            290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
            325                 330                 335

Ile Ser Lys Ala Lys Gly Gln Pro Arg Glu Pro Gln Val Tyr Thr Leu
            340                 345                 350

Pro Pro Ser Arg Asp Glu Tyr Trp Asp Gln Glu Val Ser Leu Thr Cys
            355                 360                 365

Leu Val Lys Gly Phe Tyr Pro Ser Asp Ile Ala Val Glu Trp Glu Ser
            370                 375                 380

Asn Gly Asp Glu Gln Phe Ala Tyr Lys Thr Thr Pro Pro Val Leu Asp
385                 390                 395                 400

Ser Asp Gly Ser Phe Phe Leu Tyr Ser Lys Leu Thr Val Asp Gln Tyr
            405                 410                 415

Arg Trp Asn Pro Ala Asp Tyr Phe Ser Cys Ser Val Met His Glu Ala
            420                 425                 430

Leu His Asn His Tyr Thr Gln Lys Ser Leu Ser Leu Ser Pro Gly
            435                 440                 445

<210> SEQ ID NO 79
<211> LENGTH: 447
<212> TYPE: PRT
<213> ORGANISM: Artificial Sequence
<220> FEATURE:
<223> OTHER INFORMATION: Synthetic

<400> SEQUENCE: 79

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Asp Met Ser Trp Val Arg Gln Ala Pro Gly Lys Gly Leu Glu Trp Val
            35                  40                  45

Ser Asp Ile Asp Pro Thr Gly Ser Lys Thr Asp Tyr Ala Asp Ser Val
            50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
            85                  90                  95

Ala Arg Asp Leu Leu Val Tyr Gly Phe Asp Tyr Trp Gly Gln Gly Thr
            100                 105                 110

```
Leu Val Thr Val Ser Ser Ala Ser Thr Lys Gly Pro Ser Val Phe Pro
            115                 120                 125
Leu Ala Pro Ser Ser Lys Ser Thr Ser Gly Gly Thr Ala Ala Leu Gly
        130                 135                 140
Cys Leu Val Lys Asp Tyr Phe Pro Glu Pro Val Thr Val Ser Trp Asn
145                 150                 155                 160
Ser Gly Ala Leu Thr Ser Gly Val His Thr Phe Pro Ala Val Leu Gln
                165                 170                 175
Ser Ser Gly Leu Tyr Ser Leu Ser Val Val Thr Val Pro Ser Ser
            180                 185                 190
Ser Leu Gly Thr Gln Thr Tyr Ile Cys Asn Val Asn His Lys Pro Ser
        195                 200                 205
Asn Thr Lys Val Asp Lys Lys Val Glu Pro Lys Ser Cys Asp Lys Thr
210                 215                 220
His Thr Cys Pro Pro Cys Pro Ala Pro Glu Ala Ala Gly Gly Pro Ser
225                 230                 235                 240
Val Phe Leu Phe Pro Pro Lys Pro Lys Asp Thr Leu Met Ile Ser Arg
                245                 250                 255
Thr Pro Glu Val Thr Cys Val Val Val Asp Val Ser His Glu Asp Pro
                260                 265                 270
Glu Val Lys Phe Asn Trp Tyr Val Asp Gly Val Glu Val His Asn Ala
        275                 280                 285
Lys Thr Lys Pro Arg Glu Glu Gln Tyr Asn Ser Thr Tyr Arg Val Val
    290                 295                 300
Ser Val Leu Thr Val Leu His Gln Asp Trp Leu Asn Gly Lys Glu Tyr
305                 310                 315                 320
Lys Cys Lys Val Ser Asn Lys Ala Leu Pro Ala Pro Ile Glu Lys Thr
                325                 330                 335
Ile Ser Lys Ala Lys Gly Gln Pro Arg Glu Pro Gln Val Tyr Thr Leu
                340                 345                 350
Pro Pro Ser Arg Asp Glu Tyr Trp Asp Gln Glu Val Ser Leu Thr Cys
        355                 360                 365
Leu Val Lys Gly Phe Tyr Pro Ser Asp Ile Ala Val Glu Trp Glu Ser
370                 375                 380
Asn Gly Asp Glu Gln Phe Ala Tyr Lys Thr Thr Pro Pro Val Leu Asp
385                 390                 395                 400
Ser Asp Gly Ser Phe Phe Leu Tyr Ser Lys Leu Thr Val Asp Gln Tyr
                405                 410                 415
Arg Trp Asn Pro Ala Asp Tyr Phe Ser Cys Ser Val Met His Glu Ala
                420                 425                 430
Leu His Asn His Tyr Thr Gln Lys Ser Leu Ser Leu Ser Pro Gly
        435                 440                 445

<210> SEQ ID NO 80
<211> LENGTH: 452
<212> TYPE: PRT
<213> ORGANISM: Artificial Sequence
<220> FEATURE:
<223> OTHER INFORMATION: Synthetic

<400> SEQUENCE: 80

Glu Val Gln Leu Leu Glu Ser Gly Gly Gly Leu Val Gln Pro Gly Gly
1               5                   10                  15
Ser Leu Arg Leu Ser Cys Ala Ala Ser Gly Phe Thr Phe Ser Ala Tyr
            20                  25                  30
```

-continued

```
Asn Ile His Trp Val Arg Gln Ala Pro Gly Lys Gly Leu Glu Trp Val
         35                  40                  45
Ser Asp Ile Ser Pro Tyr Gly Gly Ala Thr Asn Tyr Ala Asp Ser Val
 50                  55                  60
Lys Gly Arg Phe Thr Ile Ser Arg Asp Asn Ser Lys Asn Thr Leu Tyr
 65                  70                  75                  80
Leu Gln Met Asn Ser Leu Arg Ala Glu Asp Thr Ala Val Tyr Tyr Cys
                 85                  90                  95
Ala Arg Asn Leu Tyr Glu Leu Ser Ala Tyr Ser Tyr Gly Ala Asp Tyr
             100                 105                 110
Trp Gly Gln Gly Thr Leu Val Thr Val Ser Ser Ala Ser Thr Lys Gly
         115                 120                 125
Pro Ser Val Phe Pro Leu Ala Pro Ser Ser Lys Ser Thr Ser Gly Gly
     130                 135                 140
Thr Ala Ala Leu Gly Cys Leu Val Lys Asp Tyr Phe Pro Glu Pro Val
145                 150                 155                 160
Thr Val Ser Trp Asn Ser Gly Ala Leu Thr Ser Gly Val His Thr Phe
                165                 170                 175
Pro Ala Val Leu Gln Ser Ser Gly Leu Tyr Ser Leu Ser Ser Val Val
            180                 185                 190
Thr Val Pro Ser Ser Ser Leu Gly Thr Gln Thr Tyr Ile Cys Asn Val
        195                 200                 205
Asn His Lys Pro Ser Asn Thr Lys Val Asp Lys Lys Val Glu Pro Lys
    210                 215                 220
Ser Cys Asp Lys Thr His Thr Cys Pro Pro Cys Pro Ala Pro Glu Leu
225                 230                 235                 240
Leu Gly Gly Pro Ser Val Phe Leu Phe Pro Pro Lys Pro Lys Asp Thr
                245                 250                 255
Leu Met Ile Ser Arg Thr Pro Glu Val Thr Cys Val Val Val Asp Val
            260                 265                 270
Ser His Glu Asp Pro Glu Val Lys Phe Asn Trp Tyr Val Asp Gly Val
        275                 280                 285
Glu Val His Asn Ala Lys Thr Lys Pro Arg Glu Glu Gln Tyr Asn Ser
    290                 295                 300
Thr Tyr Arg Val Val Ser Val Leu Thr Val Leu His Gln Asp Trp Leu
305                 310                 315                 320
Asn Gly Lys Glu Tyr Lys Cys Lys Val Ser Asn Lys Ala Leu Pro Ala
                325                 330                 335
Pro Ile Glu Lys Thr Ile Ser Lys Ala Lys Gly Gln Pro Arg Glu Pro
            340                 345                 350
Gln Val Tyr Thr Leu Pro Pro Ser Arg Asp Glu Tyr Trp Asp Gln Glu
        355                 360                 365
Val Ser Leu Thr Cys Leu Val Lys Gly Phe Tyr Pro Ser Asp Ile Ala
    370                 375                 380
Val Glu Trp Glu Ser Asn Gly Asp Glu Gln Phe Ala Tyr Lys Thr Thr
385                 390                 395                 400
Pro Pro Val Leu Asp Ser Asp Gly Ser Phe Phe Leu Tyr Ser Lys Leu
                405                 410                 415
Thr Val Asp Gln Tyr Arg Trp Asn Pro Ala Asp Tyr Phe Ser Cys Ser
            420                 425                 430
Val Met His Glu Ala Leu His Asn His Tyr Thr Gln Lys Ser Leu Ser
        435                 440                 445
Leu Ser Pro Gly
```

450

<210> SEQ ID NO 81
<211> LENGTH: 452
<212> TYPE: PRT
<213> ORGANISM: Artificial Sequence
<220> FEATURE:
<223> OTHER INFORMATION: Synthetic

<400> SEQUENCE: 81

```
Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ala Tyr
            20                  25                  30

Asn Ile His Trp Val Arg Gln Ala Pro Gly Lys Gly Leu Glu Trp Val
        35                  40                  45

Ser Asp Ile Ser Pro Tyr Gly Gly Ala Thr Asn Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asn Leu Tyr Glu Leu Ser Ala Tyr Ser Tyr Gly Ala Asp Tyr
            100                 105                 110

Trp Gly Gln Gly Thr Leu Val Thr Val Ser Ser Ala Ser Thr Lys Gly
        115                 120                 125

Pro Ser Val Phe Pro Leu Ala Pro Ser Ser Lys Ser Thr Ser Gly Gly
    130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
            180                 185                 190

Thr Val Pro Ser Ser Ser Leu Gly Thr Gln Thr Tyr Ile Cys Asn Val
        195                 200                 205

Asn His Lys Pro Ser Asn Thr Lys Val Asp Lys Lys Val Glu Pro Lys
    210                 215                 220

Ser Cys Asp Lys Thr His Thr Cys Pro Pro Cys Pro Ala Pro Glu Ala
225                 230                 235                 240

Ala Gly Gly Pro Ser Val Phe Leu Phe Pro Pro Lys Pro Lys Asp Thr
                245                 250                 255

Leu Met Ile Ser Arg Thr Pro Glu Val Thr Cys Val Val Val Asp Val
            260                 265                 270

Ser His Glu Asp Pro Glu Val Lys Phe Asn Trp Tyr Val Asp Gly Val
        275                 280                 285

Glu Val His Asn Ala Lys Thr Lys Pro Arg Glu Glu Gln Tyr Asn Ser
    290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Ala Leu Pro Ala
                325                 330                 335

Pro Ile Glu Lys Thr Ile Ser Lys Ala Lys Gly Gln Pro Arg Glu Pro
            340                 345                 350

Gln Val Tyr Thr Leu Pro Pro Ser Arg Asp Glu Tyr Trp Asp Gln Glu
```

```
                    355                 360                 365
Val Ser Leu Thr Cys Leu Val Lys Gly Phe Tyr Pro Ser Asp Ile Ala
        370                 375                 380

Val Glu Trp Glu Ser Asn Gly Asp Glu Gln Phe Ala Tyr Lys Thr Thr
385                 390                 395                 400

Pro Pro Val Leu Asp Ser Asp Gly Ser Phe Phe Leu Tyr Ser Lys Leu
                405                 410                 415

Thr Val Asp Gln Tyr Arg Trp Asn Pro Ala Asp Tyr Phe Ser Cys Ser
            420                 425                 430

Val Met His Glu Ala Leu His Asn His Tyr Thr Gln Lys Ser Leu Ser
        435                 440                 445

Leu Ser Pro Gly
    450

<210> SEQ ID NO 82
<211> LENGTH: 454
<212> TYPE: PRT
<213> ORGANISM: Artificial Sequence
<220> FEATURE:
<223> OTHER INFORMATION: Synthetic

<400> SEQUENCE: 82

Glu Val Gln Leu Leu Glu Ser Gly Gly Gly Leu Val Gln Pro Gly Gly
1               5                   10                  15

Ser Leu Arg Leu Asn Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Ser Gly Ser Gly Gly Ser Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Ser Tyr Asp Lys Tyr Trp Gly Ser Ser Met Tyr Ser Gly Met
            100                 105                 110

Asp Tyr Trp Gly Gln Gly Thr Leu Val Thr Val Ser Ser Ala Ser Thr
        115                 120                 125

Lys Gly Pro Ser Val Phe Pro Leu Ala Pro Ser Ser Lys Ser Thr Ser
    130                 135                 140

Gly Gly Thr Ala Ala Leu Gly Cys Leu Val Lys Asp Tyr Phe Pro Glu
145                 150                 155                 160

Pro Val Thr Val Ser Trp Asn Ser Gly Ala Leu Thr Ser Gly Val His
                165                 170                 175

Thr Phe Pro Ala Val Leu Gln Ser Ser Gly Leu Tyr Ser Leu Ser Ser
            180                 185                 190

Val Val Thr Val Pro Ser Ser Ser Leu Gly Thr Gln Thr Tyr Ile Cys
        195                 200                 205

Asn Val Asn His Lys Pro Ser Asn Thr Lys Val Asp Lys Lys Val Glu
    210                 215                 220

Pro Lys Ser Cys Asp Lys Thr His Thr Cys Pro Cys Pro Ala Pro
225                 230                 235                 240

Glu Ala Ala Gly Gly Pro Ser Val Phe Leu Phe Pro Pro Lys Pro Lys
                245                 250                 255

Asp Thr Leu Met Ile Ser Arg Thr Pro Glu Val Thr Cys Val Val Val
```

```
                260             265             270
Asp Val Ser His Glu Asp Pro Glu Val Lys Phe Asn Trp Tyr Val Asp
            275             280             285
Gly Val Glu Val His Asn Ala Lys Thr Lys Pro Arg Glu Glu Gln Tyr
        290             295             300
Asn Ser Thr Tyr Arg Val Val Ser Val Leu Thr Val Leu His Gln Asp
305             310             315             320
Trp Leu Asn Gly Lys Glu Tyr Lys Cys Lys Val Ser Asn Lys Ala Leu
            325             330             335
Pro Ala Pro Ile Glu Lys Thr Ile Ser Lys Ala Lys Gly Gln Pro Arg
        340             345             350
Glu Pro Gln Val Tyr Thr Leu Pro Pro Ser Arg Asp Glu Leu Thr Lys
        355             360             365
Asn Gln Val Ser Leu Thr Cys Leu Val Lys Gly Phe Tyr Pro Ser Asp
        370             375             380
Ile Ala Val Glu Trp Glu Ser Asn Gly Gln Pro Glu Asn Asn Tyr Lys
385             390             395             400
Thr Thr Pro Pro Val Leu Asp Ser Asp Gly Ser Phe Phe Leu Tyr Ser
            405             410             415
Lys Leu Thr Val Asp Lys Ser Arg Trp Gln Gln Gly Asn Val Phe Ser
            420             425             430
Cys Ser Val Met His Glu Ala Leu His Asn His Tyr Thr Gln Lys Ser
            435             440             445
Leu Ser Leu Ser Pro Gly
        450

<210> SEQ ID NO 83
<211> LENGTH: 454
<212> TYPE: PRT
<213> ORGANISM: Artificial Sequence
<220> FEATURE:
<223> OTHER INFORMATION: Synthetic

<400> SEQUENCE: 83

Glu Val Gln Leu Leu Glu Ser Gly Gly Gly Leu Val Gln Pro Gly Gly
1               5                   10                  15
Ser Leu Arg Leu Asn Cys Ala Ala Ser Gly Phe Thr Phe Ser Ser Tyr
            20                  25                  30
Ala Met Ser Trp Val Arg Gln Ala Pro Gly Lys Gly Leu Glu Trp Val
        35                  40                  45
Ser Ala Ile Ser Gly Ser Gly Gly Ser Thr Tyr Tyr Ala Asp Ser Val
    50                  55                  60
Lys Gly Arg Phe Thr Ile Ser Arg Asp Asn Ser Lys Asn Thr Leu Tyr
65                  70                  75                  80
Leu Gln Met Asn Ser Leu Arg Ala Glu Asp Thr Ala Val Tyr Tyr Cys
                85                  90                  95
Ala Arg Ser Tyr Asp Lys Tyr Trp Gly Ser Ser Met Tyr Ser Gly Met
            100                 105                 110
Asp Tyr Trp Gly Gln Gly Thr Leu Val Thr Val Ser Ser Ala Ser Thr
        115                 120                 125
Lys Gly Pro Ser Val Phe Pro Leu Ala Pro Ser Ser Lys Ser Thr Ser
    130                 135                 140
Gly Gly Thr Ala Ala Leu Gly Cys Leu Val Lys Asp Tyr Phe Pro Glu
145                 150                 155                 160
Pro Val Thr Val Ser Trp Asn Ser Gly Ala Leu Thr Ser Gly Val His
```

165                 170                 175
Thr Phe Pro Ala Val Leu Gln Ser Ser Gly Leu Tyr Ser Leu Ser Ser
                180                 185                 190

Val Val Thr Val Pro Ser Ser Ser Leu Gly Thr Gln Thr Tyr Ile Cys
            195                 200                 205

Asn Val Asn His Lys Pro Ser Asn Thr Lys Val Asp Lys Lys Val Glu
        210                 215                 220

Pro Lys Ser Cys Asp Lys Thr His Thr Cys Pro Pro Cys Pro Ala Pro
225                 230                 235                 240

Glu Ala Ala Gly Gly Pro Ser Val Phe Leu Phe Pro Pro Lys Pro Lys
                245                 250                 255

Asp Thr Leu Met Ile Ser Arg Thr Pro Glu Val Thr Cys Val Val Val
                260                 265                 270

Asp Val Ser His Glu Asp Pro Glu Val Lys Phe Asn Trp Tyr Val Asp
            275                 280                 285

Gly Val Glu Val His Asn Ala Lys Thr Lys Pro Arg Glu Glu Gln Tyr
        290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Ala Leu
                325                 330                 335

Pro Ala Pro Ile Glu Lys Thr Ile Ser Lys Ala Lys Gly Gln Pro Arg
                340                 345                 350

Glu Pro Gln Val Tyr Thr Leu Pro Pro Ser Arg Asp Glu Tyr Trp Asp
            355                 360                 365

Gln Glu Val Ser Leu Thr Cys Leu Val Lys Gly Phe Tyr Pro Ser Asp
        370                 375                 380

Ile Ala Val Glu Trp Glu Ser Asn Gly Asp Glu Gln Phe Ala Tyr Lys
385                 390                 395                 400

Thr Thr Pro Pro Val Leu Asp Ser Asp Gly Ser Phe Phe Leu Tyr Ser
                405                 410                 415

Lys Leu Thr Val Asp Gln Tyr Arg Trp Asn Pro Ala Asp Tyr Phe Ser
                420                 425                 430

Cys Ser Val Met His Glu Ala Leu His Asn His Tyr Thr Gln Lys Ser
            435                 440                 445

Leu Ser Leu Ser Pro Gly
        450

<210> SEQ ID NO 84
<211> LENGTH: 448
<212> TYPE: PRT
<213> ORGANISM: Artificial Sequence
<220> FEATURE:
<223> OTHER INFORMATION: Synthetic

<400> SEQUENCE: 84

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Val Ser Tyr Tyr
            20                  25                  30

Ser Ile Ser Trp Val Arg Gln Ala Pro Gly Lys Gly Leu Glu Trp Val
        35                  40                  45

Ser Asp Ile Tyr Ser Tyr Tyr Gly Tyr Thr Asp Tyr Ala Asp Ser Val
    50                  55                  60

Lys Gly Arg Phe Thr Ile Ser Arg Asp Asn Ser Lys Asn Thr Leu Tyr

-continued

```
            65                  70                  75                  80
Leu Gln Met Asn Ser Leu Arg Ala Glu Asp Thr Ala Val Tyr Tyr Cys
                85                  90                  95
Ala Arg Val Ser Tyr Gly Gly Gln Ala Phe Asp Tyr Trp Gly Gln Gly
            100                 105                 110
Thr Leu Val Thr Val Ser Ser Ala Ser Thr Lys Gly Pro Ser Val Phe
            115                 120                 125
Pro Leu Ala Pro Ser Ser Lys Ser Thr Ser Gly Gly Thr Ala Ala Leu
        130                 135                 140
Gly Cys Leu Val Lys Asp Tyr Phe Pro Glu Pro Val Thr Val Ser Trp
145                 150                 155                 160
Asn Ser Gly Ala Leu Thr Ser Gly Val His Thr Phe Pro Ala Val Leu
                165                 170                 175
Gln Ser Ser Gly Leu Tyr Ser Leu Ser Ser Val Val Thr Val Pro Ser
            180                 185                 190
Ser Ser Leu Gly Thr Gln Thr Tyr Ile Cys Asn Val Asn His Lys Pro
        195                 200                 205
Ser Asn Thr Lys Val Asp Lys Lys Val Glu Pro Lys Ser Cys Asp Lys
    210                 215                 220
Thr His Thr Cys Pro Pro Cys Pro Ala Pro Glu Ala Ala Gly Gly Pro
225                 230                 235                 240
Ser Val Phe Leu Phe Pro Pro Lys Pro Lys Asp Thr Leu Met Ile Ser
                245                 250                 255
Arg Thr Pro Glu Val Thr Cys Val Val Val Asp Val Ser His Glu Asp
            260                 265                 270
Pro Glu Val Lys Phe Asn Trp Tyr Val Asp Gly Val Glu Val His Asn
        275                 280                 285
Ala Lys Thr Lys Pro Arg Glu Glu Gln Tyr Asn Ser Thr Tyr Arg Val
    290                 295                 300
Val Ser Val Leu Thr Val Leu His Gln Asp Trp Leu Asn Gly Lys Glu
305                 310                 315                 320
Tyr Lys Cys Lys Val Ser Asn Lys Ala Leu Pro Ala Pro Ile Glu Lys
                325                 330                 335
Thr Ile Ser Lys Ala Lys Gly Gln Pro Arg Glu Pro Gln Val Tyr Thr
            340                 345                 350
Leu Pro Pro Ser Arg Asp Glu Leu Thr Lys Asn Gln Val Ser Leu Thr
        355                 360                 365
Cys Leu Val Lys Gly Phe Tyr Pro Ser Asp Ile Ala Val Glu Trp Glu
    370                 375                 380
Ser Asn Gly Gln Pro Glu Asn Asn Tyr Lys Thr Thr Pro Pro Val Leu
385                 390                 395                 400
Asp Ser Asp Gly Ser Phe Phe Leu Tyr Ser Lys Leu Thr Val Asp Lys
                405                 410                 415
Ser Arg Trp Gln Gln Gly Asn Val Phe Ser Cys Ser Val Met His Glu
            420                 425                 430
Ala Leu His Asn His Tyr Thr Gln Lys Ser Leu Ser Leu Ser Pro Gly
        435                 440                 445
```

<210> SEQ ID NO 85
<211> LENGTH: 215
<212> TYPE: PRT
<213> ORGANISM: Artificial Sequence
<220> FEATURE:
<223> OTHER INFORMATION: Synthetic

<400> SEQUENCE: 85

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Ser
            20                  25                  30

Tyr Leu Ala Trp Tyr Gln Lys Pro Gly Gln Ala Pro Arg Leu Leu
        35                  40                  45

Ile Tyr Gly Ala Ser Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Asp Asp Tyr Pro
                85                  90                  95

Val Thr Phe Gly Gln Gly Thr Lys Val Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 86
<211> LENGTH: 447
<212> TYPE: PRT
<213> ORGANISM: Artificial Sequence
<220> FEATURE:
<223> OTHER INFORMATION: Synthetic

<400> SEQUENCE: 86

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Asp Met Ser Trp Val Arg Gln Ala Pro Gly Lys Gly Leu Glu Trp Val
        35                  40                  45

Ser Asp Ile Asp Pro Thr Gly Ser Lys Thr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Leu Met Val Tyr Gly Phe Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly

```
            130                 135                 140
Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
                180                 185                 190

Ser Leu Gly Thr Gln Thr Tyr Ile Cys Asn Val Asn His Lys Pro Ser
                195                 200                 205

Asn Thr Lys Val Asp Lys Lys Val Glu Pro Lys Ser Cys Asp Lys Thr
                210                 215                 220

His Thr Cys Pro Pro Cys Pro Ala Pro Glu Ala Ala Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
                260                 265                 270

Glu Val Lys Phe Asn Trp Tyr Val Asp Gly Val Glu Val His Asn Ala
                275                 280                 285

Lys Thr Lys Pro Arg Glu Glu Gln Tyr Asn Ser Thr Tyr Arg Val Val
                290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
                340                 345                 350

Pro Pro Ser Arg Asp Glu Leu Thr Lys Asn Gln Val Ser Leu Thr Cys
                355                 360                 365

Leu Val Lys Gly Phe Tyr Pro Ser Asp Ile Ala Val Glu Trp Glu Ser
                370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
                420                 425                 430

Leu His Asn His Tyr Thr Gln Lys Ser Leu Ser Leu Ser Pro Gly
                435                 440                 445

<210> SEQ ID NO 87
<211> LENGTH: 451
<212> TYPE: PRT
<213> ORGANISM: Artificial Sequence
<220> FEATURE:
<223> OTHER INFORMATION: Synthetic

<400> SEQUENCE: 87

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Gly Ser
                20                  25                  30

Gly Met Ser Trp Val Arg Gln Ala Pro Gly Lys Gly Leu Glu Trp Val
                35                  40                  45

Ser Ile Ile Tyr Ser Thr Asn Gly Asp Thr Asp Tyr Ala Asp Ser Val
```

```
             50                  55                  60
Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Arg Asp Phe Tyr Asp Ile Ala Asn Tyr Tyr Ala Phe Asp Tyr Trp
            100                 105                 110

Gly Gln Gly Thr Leu Val Thr Val Ser Ser Ala Ser Thr Lys Gly Pro
            115                 120                 125

Ser Val Phe Pro Leu Ala Pro Ser Ser Lys Ser Thr Ser Gly Gly Thr
130                 135                 140

Ala Ala Leu Gly Cys Leu Val Lys Asp Tyr Phe Pro Glu Pro Val Thr
145                 150                 155                 160

Val Ser Trp Asn Ser Gly Ala Leu Thr Ser Gly Val His Thr Phe Pro
                165                 170                 175

Ala Val Leu Gln Ser Ser Gly Leu Tyr Ser Leu Ser Ser Val Val Thr
            180                 185                 190

Val Pro Ser Ser Ser Leu Gly Thr Gln Thr Tyr Ile Cys Asn Val Asn
            195                 200                 205

His Lys Pro Ser Asn Thr Lys Val Asp Lys Lys Val Glu Pro Lys Ser
            210                 215                 220

Cys Asp Lys Thr His Thr Cys Pro Pro Cys Pro Ala Pro Glu Ala Ala
225                 230                 235                 240

Gly Gly Pro Ser Val Phe Leu Phe Pro Pro Lys Pro Lys Asp Thr Leu
                245                 250                 255

Met Ile Ser Arg Thr Pro Glu Val Thr Cys Val Val Val Asp Val Ser
            260                 265                 270

His Glu Asp Pro Glu Val Lys Phe Asn Trp Tyr Val Asp Gly Val Glu
            275                 280                 285

Val His Asn Ala Lys Thr Lys Pro Arg Glu Glu Gln Tyr Asn Ser Thr
            290                 295                 300

Tyr Arg Val Val Ser Val Leu Thr Val Leu His Gln Asp Trp Leu Asn
305                 310                 315                 320

Gly Lys Glu Tyr Lys Cys Lys Val Ser Asn Lys Ala Leu Pro Ala Pro
                325                 330                 335

Ile Glu Lys Thr Ile Ser Lys Ala Lys Gly Gln Pro Arg Glu Pro Gln
            340                 345                 350

Val Tyr Thr Leu Pro Pro Ser Arg Asp Glu Leu Thr Lys Asn Gln Val
            355                 360                 365

Ser Leu Thr Cys Leu Val Lys Gly Phe Tyr Pro Ser Asp Ile Ala Val
370                 375                 380

Glu Trp Glu Ser Asn Gly Gln Pro Glu Asn Asn Tyr Lys Thr Thr Pro
385                 390                 395                 400

Pro Val Leu Asp Ser Asp Gly Ser Phe Phe Leu Tyr Ser Lys Leu Thr
                405                 410                 415

Val Asp Lys Ser Arg Trp Gln Gln Gly Asn Val Phe Ser Cys Ser Val
            420                 425                 430

Met His Glu Ala Leu His Asn His Tyr Thr Gln Lys Ser Leu Ser Leu
            435                 440                 445

Ser Pro Gly
450

<210> SEQ ID NO 88
```

<211> LENGTH: 215
<212> TYPE: PRT
<213> ORGANISM: Artificial Sequence
<220> FEATURE:
<223> OTHER INFORMATION: Synthetic

<400> SEQUENCE: 88

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Ser
            20                  25                  30

Tyr Leu Ala Trp Tyr Gln Gln Lys Pro Gly Gln Ala Pro Arg Leu Leu
        35                  40                  45

Ile Tyr Gly Ala Ser Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Ala Tyr Tyr Asp Pro
                85                  90                  95

Ile Thr Phe Gly Gln Gly Thr Lys Val Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 89
<211> LENGTH: 451
<212> TYPE: PRT
<213> ORGANISM: Artificial Sequence
<220> FEATURE:
<223> OTHER INFORMATION: Synthetic

<400> SEQUENCE: 89

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Gly Ser
            20                  25                  30

Gly Met Ser Trp Val Arg Gln Ala Pro Gly Lys Gly Leu Glu Trp Val
        35                  40                  45

Ser Ile Ile Tyr Ser Thr Asn Gly Asp Thr Asp Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Phe Tyr Asp Ile Ala Asn Tyr Tyr Ala Phe Asp Tyr Trp

```
                100             105              110
Gly Gln Gly Thr Leu Val Thr Val Ser Ser Ala Ser Thr Lys Gly Pro
            115                 120             125

Ser Val Phe Pro Leu Ala Pro Ser Ser Lys Ser Thr Ser Gly Gly Thr
        130                 135             140

Ala Ala Leu Gly Cys Leu Val Lys Asp Tyr Phe Pro Glu Pro Val Thr
145                 150                 155                 160

Val Ser Trp Asn Ser Gly Ala Leu Thr Ser Gly Val His Thr Phe Pro
                165                 170                 175

Ala Val Leu Gln Ser Ser Gly Leu Tyr Ser Leu Ser Ser Val Val Thr
            180                 185                 190

Val Pro Ser Ser Ser Leu Gly Thr Gln Thr Tyr Ile Cys Asn Val Asn
        195                 200                 205

His Lys Pro Ser Asn Thr Lys Val Asp Lys Lys Val Glu Pro Lys Ser
    210                 215                 220

Cys Asp Lys Thr His Thr Cys Pro Pro Cys Pro Ala Pro Glu Ala Ala
225                 230                 235                 240

Gly Gly Pro Ser Val Phe Leu Phe Pro Pro Lys Pro Lys Asp Thr Leu
                245                 250                 255

Met Ile Ser Arg Thr Pro Glu Val Thr Cys Val Val Val Asp Val Ser
            260                 265                 270

His Glu Asp Pro Glu Val Lys Phe Asn Trp Tyr Val Asp Gly Val Glu
        275                 280                 285

Val His Asn Ala Lys Thr Lys Pro Arg Glu Glu Gln Tyr Asn Ser Thr
    290                 295                 300

Tyr Arg Val Val Ser Val Leu Thr Val Leu His Gln Asp Trp Leu Asn
305                 310                 315                 320

Gly Lys Glu Tyr Lys Cys Lys Val Ser Asn Lys Ala Leu Pro Ala Pro
                325                 330                 335

Ile Glu Lys Thr Ile Ser Lys Ala Lys Gly Gln Pro Arg Glu Pro Gln
            340                 345                 350

Val Tyr Thr Leu Pro Pro Ser Arg Asp Glu Tyr Trp Asp Gln Glu Val
        355                 360                 365

Ser Leu Thr Cys Leu Val Lys Gly Phe Tyr Pro Ser Asp Ile Ala Val
    370                 375                 380

Glu Trp Glu Ser Asn Gly Asp Glu Gln Phe Ala Tyr Lys Thr Thr Pro
385                 390                 395                 400

Pro Val Leu Asp Ser Asp Gly Ser Phe Phe Leu Tyr Ser Lys Leu Thr
                405                 410                 415

Val Asp Gln Tyr Arg Trp Asn Pro Ala Asp Tyr Phe Ser Cys Ser Val
            420                 425                 430

Met His Glu Ala Leu His Asn His Tyr Thr Gln Lys Ser Leu Ser Leu
        435                 440                 445

Ser Pro Gly
    450

<210> SEQ ID NO 90
<211> LENGTH: 452
<212> TYPE: PRT
<213> ORGANISM: Artificial Sequence
<220> FEATURE:
<223> OTHER INFORMATION: Synthetic

<400> SEQUENCE: 90

Glu Val Gln Leu Leu Glu Ser Gly Gly Gly Leu Val Gln Pro Gly Gly
```

```
1               5                   10                  15
Ser Leu Arg Leu Ser Cys Ala Ala Ser Gly Phe Thr Phe Ser Asn Tyr
            20                  25                  30

Ala Met His Trp Val Arg Gln Ala Pro Gly Lys Gly Leu Glu Trp Val
            35                  40                  45

Ser Thr Ile Asp Pro Thr Asp Gly Ala Thr Asn Tyr Ala Asp Ser Val
            50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
            85                  90                  95

Ala Arg Ser Lys Tyr Tyr Thr Tyr Met Gln Tyr Val Ala Leu Asp Tyr
            100                 105                 110

Trp Gly Gln Gly Thr Leu Val Thr Val Ser Ser Ala Ser Thr Lys Gly
            115                 120                 125

Pro Ser Val Phe Pro Leu Ala Pro Ser Ser Lys Ser Thr Ser Gly Gly
            130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
            165                 170                 175

Pro Ala Val Leu Gln Ser Ser Gly Leu Tyr Ser Leu Ser Ser Val Val
            180                 185                 190

Thr Val Pro Ser Ser Ser Leu Gly Thr Gln Thr Tyr Ile Cys Asn Val
            195                 200                 205

Asn His Lys Pro Ser Asn Thr Lys Val Asp Lys Lys Val Glu Pro Lys
210                 215                 220

Ser Cys Asp Lys Thr His Thr Cys Pro Pro Cys Pro Ala Pro Glu Ala
225                 230                 235                 240

Ala Gly Gly Pro Ser Val Phe Leu Phe Pro Pro Lys Pro Lys Asp Thr
            245                 250                 255

Leu Met Ile Ser Arg Thr Pro Glu Val Thr Cys Val Val Val Asp Val
            260                 265                 270

Ser His Glu Asp Pro Glu Val Lys Phe Asn Trp Tyr Val Asp Gly Val
            275                 280                 285

Glu Val His Asn Ala Lys Thr Lys Pro Arg Glu Glu Gln Tyr Asn Ser
            290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Ala Leu Pro Ala
            325                 330                 335

Pro Ile Glu Lys Thr Ile Ser Lys Ala Lys Gly Gln Pro Arg Glu Pro
            340                 345                 350

Gln Val Tyr Thr Leu Pro Pro Ser Arg Asp Glu Leu Thr Lys Asn Gln
            355                 360                 365

Val Ser Leu Thr Cys Leu Val Lys Gly Phe Tyr Pro Ser Asp Ile Ala
            370                 375                 380

Val Glu Trp Glu Ser Asn Gly Gln Pro Glu Asn Asn Tyr Lys Thr Thr
385                 390                 395                 400

Pro Pro Val Leu Asp Ser Asp Gly Ser Phe Phe Leu Tyr Ser Lys Leu
            405                 410                 415

Thr Val Asp Lys Ser Arg Trp Gln Gln Gly Asn Val Phe Ser Cys Ser
            420                 425                 430
```

Val Met His Glu Ala Leu His Asn His Tyr Thr Gln Lys Ser Leu Ser
        435                 440                 445

Leu Ser Pro Gly
    450

<210> SEQ ID NO 91
<211> LENGTH: 216
<212> TYPE: PRT
<213> ORGANISM: Artificial Sequence
<220> FEATURE:
<223> OTHER INFORMATION: Synthetic

<400> SEQUENCE: 91

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Ser
            20                  25                  30

Tyr Leu Ala Trp Tyr Gln Gln Lys Pro Gly Gln Ala Pro Arg Leu Leu
        35                  40                  45

Ile Tyr Gly Ala Ser Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Gly Ser Arg Phe Phe
                85                  90                  95

Pro Ile Thr Phe Gly Gln Gly Thr Lys Val Glu Ile Lys Arg Thr Val
            100                 105                 110

Ala Ala Pro Ser Val Phe Ile Phe Pro Pro Ser Asp Glu Gln Leu Lys
        115                 120                 125

Ser Gly Thr Ala Ser Val Val Cys Leu Leu Asn Asn Phe Tyr Pro Arg
    130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175

Leu Ser Ser Thr Leu Thr Leu Ser Lys Ala Asp Tyr Glu Lys His Lys
            180                 185                 190

Val Tyr Ala Cys Glu Val Thr His Gln Gly Leu Ser Ser Pro Val Thr
        195                 200                 205

Lys Ser Phe Asn Arg Gly Glu Cys
    210                 215

<210> SEQ ID NO 92
<211> LENGTH: 452
<212> TYPE: PRT
<213> ORGANISM: Artificial Sequence
<220> FEATURE:
<223> OTHER INFORMATION: Synthetic

<400> SEQUENCE: 92

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Asn Tyr
            20                  25                  30

Ala Met His Trp Val Arg Gln Ala Pro Gly Lys Gly Leu Glu Trp Val
        35                  40                  45

Ser Thr Ile Asp Pro Thr Asp Gly Ala Thr Asn Tyr Ala Asp Ser Val

```
            50                  55                  60
Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                     85                  90                  95

Ala Arg Ser Lys Tyr Tyr Thr Tyr Met Gln Tyr Val Ala Leu Asp Tyr
                100                 105                 110

Trp Gly Gln Gly Thr Leu Val Thr Val Ser Ser Ala Ser Thr Lys Gly
                115                 120                 125

Pro Ser Val Phe Pro Leu Ala Pro Ser Ser Lys Ser Thr Ser Gly Gly
                130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
                180                 185                 190

Thr Val Pro Ser Ser Ser Leu Gly Thr Gln Thr Tyr Ile Cys Asn Val
                195                 200                 205

Asn His Lys Pro Ser Asn Thr Lys Val Asp Lys Lys Val Glu Pro Lys
210                 215                 220

Ser Cys Asp Lys Thr His Thr Cys Pro Pro Cys Pro Ala Pro Glu Ala
225                 230                 235                 240

Ala Gly Gly Pro Ser Val Phe Leu Phe Pro Pro Lys Pro Lys Asp Thr
                245                 250                 255

Leu Met Ile Ser Arg Thr Pro Glu Val Thr Cys Val Val Val Asp Val
                260                 265                 270

Ser His Glu Asp Pro Glu Val Lys Phe Asn Trp Tyr Val Asp Gly Val
                275                 280                 285

Glu Val His Asn Ala Lys Thr Lys Pro Arg Glu Glu Gln Tyr Asn Ser
                290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Ala Leu Pro Ala
                325                 330                 335

Pro Ile Glu Lys Thr Ile Ser Lys Ala Lys Gly Gln Pro Arg Glu Pro
                340                 345                 350

Gln Val Tyr Thr Leu Pro Pro Ser Arg Asp Glu Tyr Trp Asp Gln Glu
                355                 360                 365

Val Ser Leu Thr Cys Leu Val Lys Gly Phe Tyr Pro Ser Asp Ile Ala
370                 375                 380

Val Glu Trp Glu Ser Asn Gly Asp Glu Gln Phe Ala Tyr Lys Thr Thr
385                 390                 395                 400

Pro Pro Val Leu Asp Ser Asp Gly Ser Phe Phe Leu Tyr Ser Lys Leu
                405                 410                 415

Thr Val Asp Gln Tyr Arg Trp Asn Pro Ala Asp Tyr Phe Ser Cys Ser
                420                 425                 430

Val Met His Glu Ala Leu His Asn His Tyr Thr Gln Lys Ser Leu Ser
                435                 440                 445

Leu Ser Pro Gly
            450

<210> SEQ ID NO 93
```

```
<211> LENGTH: 452
<212> TYPE: PRT
<213> ORGANISM: Artificial Sequence
<220> FEATURE:
<223> OTHER INFORMATION: Synthetic

<400> SEQUENCE: 93
```

| | | | | | | | | | | | | | | |
|---|---|---|---|---|---|---|---|---|---|---|---|---|---|---|
| Glu | Val | Gln | Leu | Leu | Glu | Ser | Gly | Gly | Gly | Leu | Val | Gln | Pro | Gly | Gly |
| 1 | | | | 5 | | | | | 10 | | | | | 15 |
| Ser | Leu | Arg | Leu | Ser | Cys | Ala | Ala | Ser | Gly | Phe | Thr | Phe | Ser | Ala | Tyr |
| | | | 20 | | | | | 25 | | | | | 30 | | |
| Asn | Ile | His | Trp | Val | Arg | Gln | Ala | Pro | Gly | Lys | Gly | Leu | Glu | Trp | Val |
| | | 35 | | | | | 40 | | | | | 45 | | | |
| Ser | Asp | Ile | Ser | Pro | Tyr | Gly | Gly | Ala | Thr | Asn | Tyr | Ala | Asp | Ser | Val |
| 50 | | | | | 55 | | | | | 60 | | | | | |
| Lys | Gly | Arg | Phe | Thr | Ile | Ser | Arg | Asp | Asn | Ser | Lys | Asn | Thr | Leu | Tyr |
| 65 | | | | 70 | | | | | 75 | | | | | 80 | |
| Leu | Gln | Met | Asn | Ser | Leu | Arg | Ala | Glu | Asp | Thr | Ala | Val | Tyr | Tyr | Cys |
| | | | | 85 | | | | | 90 | | | | | 95 | |
| Ala | Arg | Asn | Leu | Tyr | Glu | Leu | Ser | Ala | Tyr | Ser | Tyr | Gly | Met | Asp | Tyr |
| | | | 100 | | | | | 105 | | | | | 110 | | |
| Trp | Gly | Gln | Gly | Thr | Leu | Val | Thr | Val | Ser | Ser | Ala | Ser | Thr | Lys | Gly |
| | | 115 | | | | | 120 | | | | | 125 | | | |
| Pro | Ser | Val | Phe | Pro | Leu | Ala | Pro | Ser | Ser | Lys | Ser | Thr | Ser | Gly | Gly |
| 130 | | | | | 135 | | | | | 140 | | | | | |
| Thr | Ala | Ala | Leu | Gly | Cys | Leu | Val | Lys | Asp | Tyr | Phe | Pro | Glu | Pro | Val |
| 145 | | | | | 150 | | | | | 155 | | | | | 160 |
| Thr | Val | Ser | Trp | Asn | Ser | Gly | Ala | Leu | Thr | Ser | Gly | Val | His | Thr | Phe |
| | | | | 165 | | | | | 170 | | | | | 175 | |
| Pro | Ala | Val | Leu | Gln | Ser | Ser | Gly | Leu | Tyr | Ser | Leu | Ser | Ser | Val | Val |
| | | | 180 | | | | | 185 | | | | | 190 | | |
| Thr | Val | Pro | Ser | Ser | Ser | Leu | Gly | Thr | Gln | Thr | Tyr | Ile | Cys | Asn | Val |
| | | | 195 | | | | | 200 | | | | | 205 | | |
| Asn | His | Lys | Pro | Ser | Asn | Thr | Lys | Val | Asp | Lys | Lys | Val | Glu | Pro | Lys |
| 210 | | | | | 215 | | | | | 220 | | | | | |
| Ser | Cys | Asp | Lys | Thr | His | Thr | Cys | Pro | Pro | Cys | Pro | Ala | Pro | Glu | Ala |
| 225 | | | | | 230 | | | | | 235 | | | | | 240 |
| Ala | Gly | Gly | Pro | Ser | Val | Phe | Leu | Phe | Pro | Pro | Lys | Pro | Lys | Asp | Thr |
| | | | | 245 | | | | | 250 | | | | | 255 | |
| Leu | Met | Ile | Ser | Arg | Thr | Pro | Glu | Val | Thr | Cys | Val | Val | Val | Asp | Val |
| | | | 260 | | | | | 265 | | | | | 270 | | |
| Ser | His | Glu | Asp | Pro | Glu | Val | Lys | Phe | Asn | Trp | Tyr | Val | Asp | Gly | Val |
| | | 275 | | | | | 280 | | | | | 285 | | | |
| Glu | Val | His | Asn | Ala | Lys | Thr | Lys | Pro | Arg | Glu | Glu | Gln | Tyr | Asn | Ser |
| | 290 | | | | | 295 | | | | | 300 | | | | |
| Thr | Tyr | Arg | Val | Val | Ser | Val | Leu | Thr | Val | Leu | His | Gln | Asp | Trp | Leu |
| 305 | | | | | 310 | | | | | 315 | | | | | 320 |
| Asn | Gly | Lys | Glu | Tyr | Lys | Cys | Lys | Val | Ser | Asn | Lys | Ala | Leu | Pro | Ala |
| | | | | 325 | | | | | 330 | | | | | 335 | |
| Pro | Ile | Glu | Lys | Thr | Ile | Ser | Lys | Ala | Lys | Gly | Gln | Pro | Arg | Glu | Pro |
| | | | 340 | | | | | 345 | | | | | 350 | | |
| Gln | Val | Tyr | Thr | Leu | Pro | Pro | Ser | Arg | Asp | Glu | Tyr | Trp | Asp | Gln | Glu |
| | | | 355 | | | | | 360 | | | | | 365 | | |
| Val | Ser | Leu | Thr | Cys | Leu | Val | Lys | Gly | Phe | Tyr | Pro | Ser | Asp | Ile | Ala |
| | | | 370 | | | | | 375 | | | | | 380 | | |

```
Val Glu Trp Glu Ser Asn Gly Asp Glu Gln Phe Ala Tyr Lys Thr Thr
385                 390                 395                 400

Pro Pro Val Leu Asp Ser Asp Gly Ser Phe Phe Leu Tyr Ser Lys Leu
                405                 410                 415

Thr Val Asp Gln Tyr Arg Trp Asn Pro Ala Asp Tyr Phe Ser Cys Ser
            420                 425                 430

Val Met His Glu Ala Leu His Asn His Tyr Thr Gln Lys Ser Leu Ser
        435                 440                 445

Leu Ser Pro Gly
    450

<210> SEQ ID NO 94
<211> LENGTH: 445
<212> TYPE: PRT
<213> ORGANISM: Artificial Sequence
<220> FEATURE:
<223> OTHER INFORMATION: Synthetic

<400> SEQUENCE: 94

Gln Val Gln Leu Gln Glu Ser Gly Pro Gly Leu Val Arg Pro Ser Gln
1               5                   10                  15

Thr Leu Ser Leu Thr Cys Thr Val Ser Gly Ser Thr Phe Ser Gly Tyr
            20                  25                  30

Gly Val Asn Trp Val Arg Gln Pro Pro Gly Arg Gly Leu Glu Trp Ile
        35                  40                  45

Gly Met Ile Trp Gly Asp Gly Asn Thr Asp Tyr Asn Ser Ala Leu Lys
    50                  55                  60

Ser Arg Val Thr Met Leu Val Asp Thr Ser Lys Asn Gln Phe Ser Leu
65                  70                  75                  80

Arg Leu Ser Ser Val Thr Ala Ala Asp Thr Ala Val Tyr Tyr Cys Ala
                85                  90                  95

Arg Glu Arg Asp Tyr Arg Leu Asp Tyr Trp Gly Gln Gly Ser Leu Val
            100                 105                 110

Thr Val Ser Ser Ala Ser Thr Lys Gly Pro Ser Val Phe Pro Leu Ala
        115                 120                 125

Pro Ser Ser Lys Ser Thr Ser Gly Gly Thr Ala Ala Leu Gly Cys Leu
    130                 135                 140

Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Ser Leu
            180                 185                 190

Gly Thr Gln Thr Tyr Ile Cys Asn Val Asn His Lys Pro Ser Asn Thr
        195                 200                 205

Lys Val Asp Lys Lys Val Glu Pro Lys Ser Cys Asp Lys Thr His Thr
    210                 215                 220

Cys Pro Pro Cys Pro Ala Pro Glu Ala Ala Gly Gly Pro Ser Val Phe
225                 230                 235                 240

Leu Phe Pro Pro Lys Pro Lys Asp Thr Leu Met Ile Ser Arg Thr Pro
                245                 250                 255

Glu Val Thr Cys Val Val Val Asp Val Ser His Glu Asp Pro Glu Val
            260                 265                 270

Lys Phe Asn Trp Tyr Val Asp Gly Val Glu Val His Asn Ala Lys Thr
        275                 280                 285
```

-continued

Lys Pro Arg Glu Glu Gln Tyr Asn Ser Thr Tyr Arg Val Val Ser Val
    290                 295                 300

Leu Thr Val Leu His Gln Asp Trp Leu Asn Gly Lys Glu Tyr Lys Cys
305                 310                 315                 320

Lys Val Ser Asn Lys Ala Leu Pro Ala Pro Ile Glu Lys Thr Ile Ser
                325                 330                 335

Lys Ala Lys Gly Gln Pro Arg Glu Pro Gln Val Tyr Thr Leu Pro Pro
                340                 345                 350

Ser Arg Asp Glu Leu Thr Lys Asn Gln Val Ser Leu Thr Cys Leu Val
        355                 360                 365

Lys Gly Phe Tyr Pro Ser Asp Ile Ala Val Glu Trp Glu Ser Asn Gly
    370                 375                 380

Gln Pro Glu Asn Asn Tyr Lys Thr Thr Pro Pro Val Leu Asp Ser Asp
385                 390                 395                 400

Gly Ser Phe Phe Leu Tyr Ser Lys Leu Thr Val Asp Lys Ser Arg Trp
                405                 410                 415

Gln Gln Gly Asn Val Phe Ser Cys Ser Val Met His Glu Ala Leu His
                420                 425                 430

Asn His Tyr Thr Gln Lys Ser Leu Ser Leu Ser Pro Gly
                435                 440                 445

<210> SEQ ID NO 95
<211> LENGTH: 214
<212> TYPE: PRT
<213> ORGANISM: Artificial Sequence
<220> FEATURE:
<223> OTHER INFORMATION: Synthetic

<400> SEQUENCE: 95

Asp Ile Gln Met Thr Gln Ser Pro Ala Ser Leu Ser Ala Ser Val Gly
1               5                   10                  15

Glu Thr Val Thr Ile Thr Cys Arg Ala Ser Gly Asn Ile His Asn Tyr
            20                  25                  30

Leu Ala Trp Tyr Gln Gln Lys Gln Gly Lys Ser Pro Gln Leu Leu Val
        35                  40                  45

Tyr Asn Ala Lys Thr Leu Ala Asp Gly Val Pro Ser Arg Phe Ser Gly
    50                  55                  60

Ser Gly Ser Gly Thr Gln Tyr Ser Leu Lys Ile Asn Ser Leu Gln Pro
65                  70                  75                  80

Glu Asp Phe Gly Ser Tyr Tyr Cys Gln His Phe Trp Ser Thr Pro Arg
                85                  90                  95

Thr Phe Gly Gly Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 96
<211> LENGTH: 447
<212> TYPE: PRT
<213> ORGANISM: Artificial Sequence
<220> FEATURE:
<223> OTHER INFORMATION: Synthetic

<400> SEQUENCE: 96

Glu Val Lys Leu Asp Glu Thr Gly Gly Leu Val Gln Pro Gly Arg
1               5                   10                  15

Pro Met Lys Leu Ser Cys Val Ala Ser Gly Phe Thr Phe Ser Asp Tyr
            20                  25                  30

Trp Met Asn Trp Val Arg Gln Ser Pro Glu Lys Gly Leu Glu Trp Val
            35                  40                  45

Ala Gln Ile Arg Asn Lys Pro Tyr Asn Tyr Glu Thr Tyr Tyr Ser Asp
        50                  55                  60

Ser Val Lys Gly Arg Phe Thr Ile Ser Arg Asp Asp Ser Lys Ser Ser
65                  70                  75                  80

Val Tyr Leu Gln Met Asn Asn Leu Arg Val Glu Asp Met Gly Ile Tyr
                85                  90                  95

Tyr Cys Thr Gly Ser Tyr Tyr Gly Met Asp Tyr Trp Gly Gln Gly Thr
            100                 105                 110

Ser Val Thr Val Ser Ser Ala Ser Thr Lys Gly Pro Ser Val Phe Pro
            115                 120                 125

Leu Ala Pro Ser Ser Lys Ser Thr Ser Gly Gly Thr Ala Ala Leu Gly
        130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
            195                 200                 205

Asn Thr Lys Val Asp Lys Lys Val Glu Pro Lys Ser Cys Asp Lys Thr
        210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
            275                 280                 285

Lys Thr Lys Pro Arg Glu Glu Gln Tyr Asn Ser Thr Tyr Arg Val Val
        290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

```
Pro Pro Ser Arg Asp Glu Leu Thr Lys Asn Gln Val Ser Leu Thr Cys
        355                 360                 365

Leu Val Lys Gly Phe Tyr Pro Ser Asp Ile Ala Val Glu Trp Glu Ser
    370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
                420                 425                 430

Leu His Asn His Tyr Thr Gln Lys Ser Leu Ser Leu Ser Pro Gly
                435                 440                 445

<210> SEQ ID NO 97
<211> LENGTH: 219
<212> TYPE: PRT
<213> ORGANISM: Artificial Sequence
<220> FEATURE:
<223> OTHER INFORMATION: Synthetic

<400> SEQUENCE: 97

Asp Val Val Met Thr Gln Thr Pro Leu Ser Leu Pro Val Ser Leu Gly
1               5                   10                  15

Asp Gln Ala Ser Ile Ser Cys Arg Ser Ser Gln Ser Leu Val His Ser
            20                  25                  30

Asn Gly Asn Thr Tyr Leu Arg Trp Tyr Leu Gln Lys Pro Gly Gln Ser
        35                  40                  45

Pro Lys Val Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Phe Cys Ser Gln Ser
                85                  90                  95

Thr His Val Pro Trp Thr Phe Gly Gly Gly Thr Lys Leu Glu Ile Lys
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
    130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys
    210                 215

<210> SEQ ID NO 98
<211> LENGTH: 447
<212> TYPE: PRT
<213> ORGANISM: Artificial Sequence
<220> FEATURE:
<223> OTHER INFORMATION: Synthetic
```

-continued

```
<400> SEQUENCE: 98

Glu Val Lys Leu Asp Glu Thr Gly Gly Gly Leu Val Gln Pro Gly Arg
1               5                   10                  15

Pro Met Lys Leu Ser Cys Val Ala Ser Gly Phe Thr Phe Ser Asp Tyr
            20                  25                  30

Trp Met Asn Trp Val Arg Gln Ser Pro Glu Lys Gly Leu Glu Trp Val
        35                  40                  45

Ala Gln Ile Arg Asn Lys Pro Tyr Asn Tyr Glu Thr Tyr Tyr Ser Asp
    50                  55                  60

Ser Val Lys Gly Arg Phe Thr Ile Ser Arg Asp Asp Ser Lys Ser Ser
65                  70                  75                  80

Val Tyr Leu Gln Met Asn Asn Leu Arg Val Glu Asp Met Gly Ile Tyr
                85                  90                  95

Tyr Cys Thr Gly Ser Tyr Tyr Gly Met Asp Tyr Trp Gly Gln Gly Thr
            100                 105                 110

Ser Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Lys Val Glu Pro Lys Ser Cys Asp Lys Thr
    210                 215                 220

His Thr Cys Pro Pro Cys Pro Ala Pro Glu Ala Ala Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
        275                 280                 285

Lys Thr Lys Pro Arg Glu Glu Gln Tyr Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Asp Glu Tyr Trp Asp Gln Glu Val Ser Leu Thr Cys
        355                 360                 365

Leu Val Lys Gly Phe Tyr Pro Ser Asp Ile Ala Val Glu Trp Glu Ser
    370                 375                 380

Asn Gly Asp Glu Gln Phe Ala Tyr Lys Thr Thr Pro Pro Val Leu Asp
385                 390                 395                 400

Ser Asp Gly Ser Phe Phe Leu Tyr Ser Lys Leu Thr Val Asp Gln Tyr
                405                 410                 415
```

```
Arg Trp Asn Pro Ala Asp Tyr Phe Ser Cys Ser Val Met His Glu Ala
            420                 425                 430

Leu His Asn His Tyr Thr Gln Lys Ser Leu Ser Leu Ser Pro Gly
            435                 440                 445

<210> SEQ ID NO 99
<211> LENGTH: 445
<212> TYPE: PRT
<213> ORGANISM: Artificial Sequence
<220> FEATURE:
<223> OTHER INFORMATION: Synthetic

<400> SEQUENCE: 99

Glu Val Gln Leu Val Gln Ser Gly Ala Glu Val Lys Lys Pro Gly Glu
1               5                   10                  15

Ser Leu Arg Ile Ser Cys Lys Gly Ser Gly Tyr Ser Phe Ser Thr Tyr
            20                  25                  30

Trp Ile Ser Trp Val Arg Gln Met Pro Gly Lys Gly Leu Glu Trp Met
        35                  40                  45

Gly Lys Ile Tyr Pro Gly Asp Ser Tyr Thr Asn Tyr Ser Pro Ser Phe
    50                  55                  60

Gln Gly Gln Val Thr Ile Ser Ala Asp Lys Ser Ile Ser Thr Ala Tyr
65                  70                  75                  80

Leu Gln Trp Ser Ser Leu Lys Ala Ser Asp Thr Ala Met Tyr Tyr Cys
                85                  90                  95

Ala Arg Gly Tyr Gly Ile Phe Asp Tyr Trp Gly Gln Gly Thr Leu Val
            100                 105                 110

Thr Val Ser Ser Ala Ser Thr Lys Gly Pro Ser Val Phe Pro Leu Ala
        115                 120                 125

Pro Ser Ser Lys Ser Thr Ser Gly Gly Thr Ala Ala Leu Gly Cys Leu
    130                 135                 140

Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Ser Leu
            180                 185                 190

Gly Thr Gln Thr Tyr Ile Cys Asn Val Asn His Lys Pro Ser Asn Thr
        195                 200                 205

Lys Val Asp Lys Lys Val Glu Pro Lys Ser Cys Asp Lys Thr His Thr
    210                 215                 220

Cys Pro Pro Cys Pro Ala Pro Glu Leu Leu Gly Gly Pro Ser Val Phe
225                 230                 235                 240

Leu Phe Pro Pro Lys Pro Lys Asp Thr Leu Met Ile Ser Arg Thr Pro
                245                 250                 255

Glu Val Thr Cys Val Val Val Asp Val Ser His Glu Asp Pro Glu Val
            260                 265                 270

Lys Phe Asn Trp Tyr Val Asp Gly Val Glu Val His Asn Ala Lys Thr
        275                 280                 285

Lys Pro Arg Glu Glu Gln Tyr Asn Ser Thr Tyr Arg Val Val Ser Val
    290                 295                 300

Leu Thr Val Leu His Gln Asp Trp Leu Asn Gly Lys Glu Tyr Lys Cys
305                 310                 315                 320

Lys Val Ser Asn Lys Ala Leu Pro Ala Pro Ile Glu Lys Thr Ile Ser
                325                 330                 335
```

```
Lys Ala Lys Gly Gln Pro Arg Glu Pro Gln Val Tyr Thr Leu Pro Pro
            340                 345                 350

Ser Arg Asp Glu Leu Thr Lys Asn Gln Val Ser Leu Thr Cys Leu Val
        355                 360                 365

Lys Gly Phe Tyr Pro Ser Asp Ile Ala Val Glu Trp Glu Ser Asn Gly
    370                 375                 380

Gln Pro Glu Asn Asn Tyr Lys Thr Thr Pro Val Leu Asp Ser Asp
385                 390                 395                 400

Gly Ser Phe Phe Leu Tyr Ser Lys Leu Thr Val Asp Lys Ser Arg Trp
                405                 410                 415

Gln Gln Gly Asn Val Phe Ser Cys Ser Val Met His Glu Ala Leu His
            420                 425                 430

Asn His Tyr Thr Gln Lys Ser Leu Ser Leu Ser Pro Gly
        435                 440                 445

<210> SEQ ID NO 100
<211> LENGTH: 445
<212> TYPE: PRT
<213> ORGANISM: Artificial Sequence
<220> FEATURE:
<223> OTHER INFORMATION: Synthetic

<400> SEQUENCE: 100

Glu Val Gln Leu Val Gln Ser Gly Ala Glu Val Lys Lys Pro Gly Glu
1               5                   10                  15

Ser Leu Arg Ile Ser Cys Lys Gly Ser Gly Tyr Ser Phe Ser Thr Tyr
            20                  25                  30

Trp Ile Ser Trp Val Arg Gln Met Pro Gly Lys Gly Leu Glu Trp Met
        35                  40                  45

Gly Lys Ile Tyr Pro Gly Asp Ser Tyr Thr Asn Tyr Ser Pro Ser Phe
    50                  55                  60

Gln Gly Gln Val Thr Ile Ser Ala Asp Lys Ser Ile Ser Thr Ala Tyr
65                  70                  75                  80

Leu Gln Trp Ser Ser Leu Lys Ala Ser Asp Thr Ala Met Tyr Tyr Cys
                85                  90                  95

Ala Arg Gly Tyr Gly Ile Phe Asp Tyr Trp Gly Gln Gly Thr Leu Val
            100                 105                 110

Thr Val Ser Ser Ala Ser Thr Lys Gly Pro Ser Val Phe Pro Leu Ala
        115                 120                 125

Pro Ser Ser Lys Ser Thr Ser Gly Gly Thr Ala Ala Leu Gly Cys Leu
    130                 135                 140

Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Ser Leu
            180                 185                 190

Gly Thr Gln Thr Tyr Ile Cys Asn Val Asn His Lys Pro Ser Asn Thr
        195                 200                 205

Lys Val Asp Lys Lys Val Glu Pro Lys Ser Cys Asp Lys Thr His Thr
    210                 215                 220

Cys Pro Pro Cys Pro Ala Pro Glu Ala Ala Gly Gly Pro Ser Val Phe
225                 230                 235                 240

Leu Phe Pro Pro Lys Pro Lys Asp Thr Leu Met Ile Ser Arg Thr Pro
                245                 250                 255
```

Glu Val Thr Cys Val Val Asp Val Ser His Glu Asp Pro Glu Val
                260                 265                 270

Lys Phe Asn Trp Tyr Val Asp Gly Val Glu Val His Asn Ala Lys Thr
            275                 280                 285

Lys Pro Arg Glu Glu Gln Tyr Asn Ser Thr Tyr Arg Val Val Ser Val
        290                 295                 300

Leu Thr Val Leu His Gln Asp Trp Leu Asn Gly Lys Glu Tyr Lys Cys
305                 310                 315                 320

Lys Val Ser Asn Lys Ala Leu Pro Ala Pro Ile Glu Lys Thr Ile Ser
                325                 330                 335

Lys Ala Lys Gly Gln Pro Arg Glu Pro Gln Val Tyr Thr Leu Pro Pro
            340                 345                 350

Ser Arg Asp Glu Leu Thr Lys Asn Gln Val Ser Leu Thr Cys Leu Val
        355                 360                 365

Lys Gly Phe Tyr Pro Ser Asp Ile Ala Val Glu Trp Glu Ser Asn Gly
    370                 375                 380

Gln Pro Glu Asn Asn Tyr Lys Thr Thr Pro Pro Val Leu Asp Ser Asp
385                 390                 395                 400

Gly Ser Phe Phe Leu Tyr Ser Lys Leu Thr Val Asp Lys Ser Arg Trp
                405                 410                 415

Gln Gln Gly Asn Val Phe Ser Cys Ser Val Met His Glu Ala Leu His
            420                 425                 430

Asn His Tyr Thr Gln Lys Ser Leu Ser Leu Ser Pro Gly
        435                 440                 445

<210> SEQ ID NO 101
<211> LENGTH: 214
<212> TYPE: PRT
<213> ORGANISM: Artificial Sequence
<220> FEATURE:
<223> OTHER INFORMATION: Synthetic

<400> SEQUENCE: 101

Ser Tyr Glu Leu Thr Gln Pro Pro Ser Val Ser Val Ser Pro Gly Gln
1               5                   10                  15

Thr Ala Ser Ile Thr Cys Ser Gly Asp Asn Ile Gly Asp Gln Tyr Ala
            20                  25                  30

His Trp Tyr Gln Gln Lys Pro Gly Gln Ser Pro Val Leu Val Ile Tyr
        35                  40                  45

Gln Asp Lys Asn Arg Pro Ser Gly Ile Pro Glu Arg Phe Ser Gly Ser
    50                  55                  60

Asn Ser Gly Asn Thr Ala Thr Leu Thr Ile Ser Gly Thr Gln Ala Met
65                  70                  75                  80

Asp Glu Ala Asp Tyr Tyr Cys Ala Thr Tyr Thr Gly Phe Gly Ser Leu
                85                  90                  95

Ala Val Phe Gly Gly Gly Thr Lys Leu Thr Val Leu Gly Gln Pro Lys
            100                 105                 110

Ala Ala Pro Ser Val Thr Leu Phe Pro Pro Ser Ser Glu Glu Leu Gln
        115                 120                 125

Ala Asn Lys Ala Thr Leu Val Cys Leu Ile Ser Asp Phe Tyr Pro Gly
    130                 135                 140

Ala Val Thr Val Ala Trp Lys Ala Asp Ser Ser Pro Val Lys Ala Gly
145                 150                 155                 160

Val Glu Thr Thr Thr Pro Ser Lys Gln Ser Asn Asn Lys Tyr Ala Ala
                165                 170                 175

Ser Ser Tyr Leu Ser Leu Thr Pro Glu Gln Trp Lys Ser His Arg Ser
            180                 185                 190

Tyr Ser Cys Gln Val Thr His Glu Gly Ser Thr Val Glu Lys Thr Val
        195                 200                 205

Ala Pro Thr Glu Cys Ser
    210

<210> SEQ ID NO 102
<211> LENGTH: 441
<212> TYPE: PRT
<213> ORGANISM: Artificial Sequence
<220> FEATURE:
<223> OTHER INFORMATION: Synthetic

<400> SEQUENCE: 102

Glu Val Gln Leu Val Gln Ser Gly Ala Glu Val Lys Lys Pro Gly Glu
1               5                   10                  15

Ser Leu Arg Ile Ser Cys Lys Gly Ser Gly Tyr Ser Phe Ser Thr Tyr
            20                  25                  30

Trp Ile Ser Trp Val Arg Gln Met Pro Gly Lys Gly Leu Glu Trp Met
        35                  40                  45

Gly Lys Ile Tyr Pro Gly Asp Ser Tyr Thr Asn Tyr Ser Pro Ser Phe
    50                  55                  60

Gln Gly Gln Val Thr Ile Ser Ala Asp Lys Ser Ile Ser Thr Ala Tyr
65                  70                  75                  80

Leu Gln Trp Ser Ser Leu Lys Ala Ser Asp Thr Ala Met Tyr Tyr Cys
                85                  90                  95

Ala Arg Gly Tyr Gly Ile Phe Asp Tyr Trp Gly Gln Gly Thr Leu Val
            100                 105                 110

Thr Val Ser Ser Ala Ser Thr Lys Gly Pro Ser Val Phe Pro Leu Ala
        115                 120                 125

Pro Cys Ser Arg Ser Thr Ser Glu Ser Thr Ala Ala Leu Gly Cys Leu
    130                 135                 140

Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Asn Phe
            180                 185                 190

Gly Thr Gln Thr Tyr Thr Cys Asn Val Asp His Lys Pro Ser Asn Thr
        195                 200                 205

Lys Val Asp Lys Thr Val Glu Arg Lys Cys Cys Val Glu Cys Pro Pro
    210                 215                 220

Cys Pro Ala Pro Pro Val Ala Gly Pro Ser Val Phe Leu Phe Pro Pro
225                 230                 235                 240

Lys Pro Lys Asp Thr Leu Met Ile Ser Arg Thr Pro Glu Val Thr Cys
                245                 250                 255

Val Val Val Asp Val Ser His Glu Asp Pro Glu Val Gln Phe Asn Trp
            260                 265                 270

Tyr Val Asp Gly Val Glu Val His Asn Ala Lys Thr Lys Pro Arg Glu
        275                 280                 285

Glu Gln Phe Asn Ser Thr Phe Arg Val Val Ser Val Leu Thr Val Val
    290                 295                 300

His Gln Asp Trp Leu Asn Gly Lys Glu Tyr Lys Cys Lys Val Ser Asn
305                 310                 315                 320

Lys Gly Leu Pro Ala Pro Ile Glu Lys Thr Ile Ser Lys Thr Lys Gly
                325                 330                 335

Gln Pro Arg Glu Pro Gln Val Tyr Thr Leu Pro Pro Ser Arg Glu Glu
            340                 345                 350

Met Thr Lys Asn Gln Val Ser Leu Thr Cys Leu Val Lys Gly Phe Tyr
        355                 360                 365

Pro Ser Asp Ile Ala Val Glu Trp Glu Ser Asn Gly Gln Pro Glu Asn
370                 375                 380

Asn Tyr Lys Thr Thr Pro Pro Met Leu Asp Ser Asp Gly Ser Phe Phe
385                 390                 395                 400

Leu Tyr Ser Lys Leu Thr Val Asp Lys Ser Arg Trp Gln Gln Gly Asn
                405                 410                 415

Val Phe Ser Cys Ser Val Met His Glu Ala Leu His Asn His Tyr Thr
            420                 425                 430

Gln Lys Ser Leu Ser Leu Ser Pro Gly
        435                 440

<210> SEQ ID NO 103
<211> LENGTH: 447
<212> TYPE: PRT
<213> ORGANISM: Artificial Sequence
<220> FEATURE:
<223> OTHER INFORMATION: Synthetic

<400> SEQUENCE: 103

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Asp Met Ser Trp Val Arg Gln Ala Pro Gly Lys Gly Leu Glu Trp Val
        35                  40                  45

Ser Asp Ile Asp Pro Thr Gly Ser Lys Thr Asp Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Leu Met Val Tyr Gly Phe Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Lys Val Glu Pro Lys Ser Cys Asp Lys Thr
    210                 215                 220

His Thr Cys Pro Pro Cys Pro Ala Pro Glu Ala Ala Gly Gly Pro Ser
225                 230                 235                 240

-continued

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
        275                 280                 285

Lys Thr Lys Pro Arg Glu Glu Gln Tyr Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Asp Glu Tyr Trp Asp Gln Glu Val Ser Leu Thr Cys
        355                 360                 365

Leu Val Lys Gly Phe Tyr Pro Ser Asp Ile Ala Val Glu Trp Glu Ser
    370                 375                 380

Asn Gly Asp Glu Gln Phe Ala Tyr Lys Thr Thr Pro Pro Val Leu Asp
385                 390                 395                 400

Ser Asp Gly Ser Phe Phe Leu Tyr Ser Lys Leu Thr Val Asp Gln Tyr  [correction: Ser]
                405                 410                 415

Arg Trp Asn Pro Ala Asp Tyr Phe Ser Cys Ser Val Met His Glu Ala
            420                 425                 430

Leu His Asn His Tyr Thr Gln Lys Ser Leu Ser Leu Ser Pro Gly
        435                 440                 445

<210> SEQ ID NO 104
<211> LENGTH: 450
<212> TYPE: PRT
<213> ORGANISM: Artificial Sequence
<220> FEATURE:
<223> OTHER INFORMATION: Synthetic

<400> SEQUENCE: 104

Gln Val Gln Leu Gln Gln Trp Gly Ala Gly Leu Leu Lys Pro Ser Glu
1               5                   10                  15

Thr Leu Ser Leu Thr Cys Ala Val Tyr Gly Gly Ser Phe Ser Gly Tyr
            20                  25                  30

Tyr Trp Ser Trp Ile Arg Gln Ser Pro Glu Lys Gly Leu Glu Trp Ile
        35                  40                  45

Gly Glu Ile Asn His Gly Gly Tyr Val Thr Tyr Asn Pro Ser Leu Glu
    50                  55                  60

Ser Arg Val Thr Ile Ser Val Asp Thr Ser Lys Asn Gln Phe Ser Leu
65                  70                  75                  80

Lys Leu Ser Ser Val Thr Ala Ala Asp Thr Ala Val Tyr Tyr Cys Ala
                85                  90                  95

Arg Asp Tyr Gly Pro Gly Asn Tyr Asp Trp Tyr Phe Asp Leu Trp Gly
            100                 105                 110

Arg Gly Thr Leu Val Thr Val Ser Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
            165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
            195                 200                 205

Lys Pro Ser Asn Thr Lys Val Asp Lys Lys Val Glu Pro Lys Ser Cys
210                 215                 220

Asp Lys Thr His Thr Cys Pro Pro Cys Pro Ala Pro Glu Leu Leu Gly
225                 230                 235                 240

Gly Pro Ser Val Phe Leu Phe Pro Pro Lys Pro Lys Asp Thr Leu Met
            245                 250                 255

Ile Ser Arg Thr Pro Glu Val Thr Cys Val Val Val Asp Val Ser His
            260                 265                 270

Glu Asp Pro Glu Val Lys Phe Asn Trp Tyr Val Asp Gly Val Glu Val
            275                 280                 285

His Asn Ala Lys Thr Lys Pro Arg Glu Glu Gln Tyr Asn Ser Thr Tyr
            290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Ala Leu Pro Ala Pro Ile
            325                 330                 335

Glu Lys Thr Ile Ser Lys Ala Lys Gly Gln Pro Arg Glu Pro Gln Val
            340                 345                 350

Tyr Thr Leu Pro Pro Ser Arg Asp Glu Leu Thr Lys Asn Gln Val Ser
            355                 360                 365

Leu Thr Cys Leu Val Lys Gly Phe Tyr Pro Ser Asp Ile Ala Val Glu
            370                 375                 380

Trp Glu Ser Asn Gly Gln Pro Glu Asn Asn Tyr Lys Thr Thr Pro Pro
385                 390                 395                 400

Val Leu Asp Ser Asp Gly Ser Phe Phe Leu Tyr Ser Lys Leu Thr Val
            405                 410                 415

Asp Lys Ser Arg Trp Gln Gln Gly Asn Val Phe Ser Cys Ser Val Met
            420                 425                 430

His Glu Ala Leu His Asn His Tyr Thr Gln Lys Ser Leu Ser Leu Ser
            435                 440                 445

Pro Gly
450

<210> SEQ ID NO 105
<211> LENGTH: 450
<212> TYPE: PRT
<213> ORGANISM: Artificial Sequence
<220> FEATURE:
<223> OTHER INFORMATION: Synthetic

<400> SEQUENCE: 105

Gln Val Gln Leu Gln Gln Trp Gly Ala Gly Leu Leu Lys Pro Ser Glu
1               5                   10                  15

Thr Leu Ser Leu Thr Cys Ala Val Tyr Gly Gly Ser Phe Ser Gly Tyr
            20                  25                  30

Tyr Trp Ser Trp Ile Arg Gln Ser Pro Glu Lys Gly Leu Glu Trp Ile
            35                  40                  45

Gly Glu Ile Asn His Gly Gly Tyr Val Thr Tyr Asn Pro Ser Leu Glu
        50                  55                  60

```
Ser Arg Val Thr Ile Ser Val Asp Thr Ser Lys Asn Gln Phe Ser Leu
 65                  70                  75                  80

Lys Leu Ser Ser Val Thr Ala Ala Asp Thr Ala Val Tyr Tyr Cys Ala
                 85                  90                  95

Arg Asp Tyr Gly Pro Gly Asn Tyr Asp Trp Tyr Phe Asp Leu Trp Gly
            100                 105                 110

Arg Gly Thr Leu Val Thr Val Ser Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
        195                 200                 205

Lys Pro Ser Asn Thr Lys Val Asp Lys Val Glu Pro Lys Ser Cys
210                 215                 220

Asp Lys Thr His Thr Cys Pro Pro Cys Pro Ala Pro Glu Ala Ala Gly
225                 230                 235                 240

Gly Pro Ser Val Phe Leu Phe Pro Pro Lys Pro Lys Asp Thr Leu Met
                245                 250                 255

Ile Ser Arg Thr Pro Glu Val Thr Cys Val Val Val Asp Val Ser His
            260                 265                 270

Glu Asp Pro Glu Val Lys Phe Asn Trp Tyr Val Asp Gly Val Glu Val
        275                 280                 285

His Asn Ala Lys Thr Lys Pro Arg Glu Glu Gln Tyr Asn Ser Thr Tyr
290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Ala Leu Pro Ala Pro Ile
                325                 330                 335

Glu Lys Thr Ile Ser Lys Ala Lys Gly Gln Pro Arg Glu Pro Gln Val
            340                 345                 350

Tyr Thr Leu Pro Pro Ser Arg Asp Glu Leu Thr Lys Asn Gln Val Ser
        355                 360                 365

Leu Thr Cys Leu Val Lys Gly Phe Tyr Pro Ser Asp Ile Ala Val Glu
        370                 375                 380

Trp Glu Ser Asn Gly Gln Pro Glu Asn Asn Tyr Lys Thr Thr Pro Pro
385                 390                 395                 400

Val Leu Asp Ser Asp Gly Ser Phe Phe Leu Tyr Ser Lys Leu Thr Val
                405                 410                 415

Asp Lys Ser Arg Trp Gln Gln Gly Asn Val Phe Ser Cys Ser Val Met
            420                 425                 430

His Glu Ala Leu His Asn His Tyr Thr Gln Lys Ser Leu Ser Leu Ser
        435                 440                 445

Pro Gly
450

<210> SEQ ID NO 106
<211> LENGTH: 216
```

```
<212> TYPE: PRT
<213> ORGANISM: Artificial Sequence
<220> FEATURE:
<223> OTHER INFORMATION: Synthetic

<400> SEQUENCE: 106

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
        35                  40                  45

Tyr Asp Ala Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Arg Ser Asn Trp Pro Pro
                85                  90                  95

Ala Leu Thr Phe Gly Gly Gly Thr Lys Val Glu Ile Lys Arg Thr Val
            100                 105                 110

Ala Ala Pro Ser Val Phe Ile Phe Pro Pro Ser Asp Glu Gln Leu Lys
        115                 120                 125

Ser Gly Thr Ala Ser Val Val Cys Leu Leu Asn Asn Phe Tyr Pro Arg
    130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175

Leu Ser Ser Thr Leu Thr Leu Ser Lys Ala Asp Tyr Glu Lys His Lys
            180                 185                 190

Val Tyr Ala Cys Glu Val Thr His Gln Gly Leu Ser Ser Pro Val Thr
        195                 200                 205

Lys Ser Phe Asn Arg Gly Glu Cys
    210                 215

<210> SEQ ID NO 107
<211> LENGTH: 109
<212> TYPE: PRT
<213> ORGANISM: Artificial Sequence
<220> FEATURE:
<223> OTHER INFORMATION: Synthetic

<400> SEQUENCE: 107

Ala Pro Glu Ala Ala Gly Gly Pro Ser Val Phe Leu Phe Pro Pro Lys
1               5                   10                  15

Pro Lys Asp Thr Leu Met Ile Ser Arg Thr Pro Glu Val Thr Cys Val
            20                  25                  30

Val Val Asp Val Ser His Glu Asp Pro Glu Val Lys Phe Asn Trp Tyr
        35                  40                  45

Val Asp Gly Val Glu Val His Asn Ala Lys Thr Lys Pro Arg Glu Glu
    50                  55                  60

Gln Tyr Asn Ser Thr Tyr Arg Val Val Ser Val Leu Thr Val Leu His
65                  70                  75                  80

Gln Asp Trp Leu Asn Gly Lys Glu Tyr Lys Cys Lys Val Ser Asn Lys
                85                  90                  95

Ala Leu Pro Ala Pro Ile Glu Lys Thr Ile Ser Lys Ala
            100                 105
```

<210> SEQ ID NO 108
<211> LENGTH: 110
<212> TYPE: PRT
<213> ORGANISM: Artificial Sequence
<220> FEATURE:
<223> OTHER INFORMATION: Synthetic

<400> SEQUENCE: 108

Ala Pro Glu Ala Ala Gly Gly Pro Ser Val Phe Leu Phe Pro Pro Lys
1               5                   10                  15

Pro Lys Asp Thr Leu Met Ile Ser Arg Thr Pro Glu Val Thr Cys Val
            20                  25                  30

Val Val Asp Val Ser His Glu Asp Pro Glu Val Lys Phe Asn Trp Tyr
        35                  40                  45

Val Asp Gly Val Glu Val His Asn Ala Lys Thr Lys Pro Arg Glu Glu
    50                  55                  60

Gln Tyr Asn Ser Thr Tyr Arg Val Val Ser Val Leu Thr Val Leu His
65                  70                  75                  80

Gln Asp Trp Leu Asn Gly Lys Glu Tyr Lys Cys Lys Val Ser Asn Lys
                85                  90                  95

Ala Leu Ala Ala Pro Ile Glu Lys Thr Ile Ser Lys Ala Lys
            100                 105                 110

<210> SEQ ID NO 109
<211> LENGTH: 106
<212> TYPE: PRT
<213> ORGANISM: Artificial Sequence
<220> FEATURE:
<223> OTHER INFORMATION: Synthetic

<400> SEQUENCE: 109

Gly Gln Pro Arg Glu Pro Gln Val Tyr Thr Leu Pro Pro Ser Arg Asp
1               5                   10                  15

Glu Leu Thr Lys Asn Gln Val Ser Leu Thr Cys Leu Val Lys Gly Phe
            20                  25                  30

Tyr Pro Ser Asp Ile Ala Val Glu Trp Glu Ser Asn Gly Gln Pro Glu
        35                  40                  45

Asn Asn Tyr Lys Thr Thr Pro Pro Val Leu Asp Ser Asp Gly Ser Phe
    50                  55                  60

Phe Leu Tyr Ser Lys Leu Thr Val Asp Lys Ser Arg Trp Gln Gln Gly
65                  70                  75                  80

Asn Val Phe Ser Cys Ser Val Met His Glu Ala Leu His Asn His Tyr
                85                  90                  95

Thr Gln Lys Ser Leu Ser Leu Ser Pro Gly
            100                 105

<210> SEQ ID NO 110
<211> LENGTH: 452
<212> TYPE: PRT
<213> ORGANISM: Artificial Sequence
<220> FEATURE:
<223> OTHER INFORMATION: Synthetic

<400> SEQUENCE: 110

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

```
Ser Met Asn Trp Val Arg Gln Ala Pro Gly Lys Gly Leu Glu Trp Val
     35                  40                  45
Ser Tyr Ile Ser Ser Ser Ser Thr Ile Asp Tyr Ala Asp Ser Val
 50                  55                  60
Lys Gly Arg Phe Thr Ile Ser Arg Asp Asn Ala Lys Asn Ser Leu Tyr
 65                  70                  75                  80
Leu Gln Met Asn Ser Leu Arg Asp Glu Asp Thr Ala Val Tyr Tyr Cys
                 85                  90                  95
Ala Arg Glu Ser Gly Trp Tyr Leu Phe Asp Tyr Trp Gly Gln Gly Thr
                100                 105                 110
Leu Val Thr Val Ser Ser Ala Ser Thr Lys Gly Pro Ser Val Phe Pro
            115                 120                 125
Leu Ala Pro Ser Ser Lys Ser Thr Ser Gly Gly Thr Ala Ala Leu Gly
        130                 135                 140
Cys Leu Val Lys Asp Tyr Phe Pro Glu Pro Val Thr Val Ser Trp Asn
145                 150                 155                 160
Ser Gly Ala Leu Thr Ser Gly Val His Thr Phe Pro Ala Val Leu Gln
                165                 170                 175
Ser Ser Gly Leu Tyr Ser Leu Ser Ser Val Val Thr Val Pro Ser Ser
            180                 185                 190
Ser Leu Gly Thr Gln Thr Tyr Ile Cys Asn Val Asn His Lys Pro Ser
        195                 200                 205
Asn Thr Lys Val Asp Lys Lys Val Glu Pro Lys Ser Cys Asp Lys Thr
    210                 215                 220
His Thr Cys Pro Pro Cys Pro Ala Pro Glu Leu Leu Gly Gly Pro Ser
225                 230                 235                 240
Val Phe Leu Phe Pro Pro Lys Pro Lys Asp Thr Leu Met Ile Ser Arg
                245                 250                 255
Thr Pro Glu Val Thr Cys Val Val Val Asp Val Ser His Glu Asp Pro
            260                 265                 270
Glu Val Lys Phe Asn Trp Tyr Val Asp Gly Val Glu Val His Asn Ala
        275                 280                 285
Lys Thr Lys Pro Arg Glu Glu Gln Tyr Asn Ser Thr Tyr Arg Val Val
    290                 295                 300
Ser Val Leu Thr Val Leu His Gln Asp Trp Leu Asn Gly Lys Glu Tyr
305                 310                 315                 320
Lys Cys Lys Val Ser Asn Lys Ala Leu Pro Ala Pro Ile Glu Lys Thr
                325                 330                 335
Ile Ser Lys Ala Lys Gly Gln Pro Arg Glu Pro Gln Val Tyr Thr Leu
            340                 345                 350
Pro Pro Ser Arg Asp Glu Leu Arg Phe Tyr Gln Val Ser Leu Thr Cys
        355                 360                 365
Leu Val Lys Gly Phe Tyr Pro Ser Asp Ile Ala Val Glu Trp Glu Ser
    370                 375                 380
Asn Gly Gln Pro Asp Ile Phe Pro Asn Gly Leu Asn Tyr Lys Thr Thr
385                 390                 395                 400
Pro Pro Val Leu Asp Ser Asp Gly Ser Phe Phe Leu Tyr Ser Lys Leu
                405                 410                 415
Thr Val Pro Tyr Pro Ser Trp Leu Met Gly Thr Arg Phe Ser Cys Ser
            420                 425                 430
Val Met His Glu Ala Leu His Asn His Tyr Thr Gln Lys Ser Leu Ser
        435                 440                 445
Leu Ser Pro Gly
```

-continued

450

<210> SEQ ID NO 111
<211> LENGTH: 214
<212> TYPE: PRT
<213> ORGANISM: Artificial Sequence
<220> FEATURE:
<223> OTHER INFORMATION: Synthetic

<400> SEQUENCE: 111

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Gly Ile Ser Ser Trp
            20                  25                  30

Leu Ala Trp Tyr Gln Gln Lys Pro Glu Lys Ala Pro Lys Ser Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Asn Ser Tyr Pro Pro
                85                  90                  95

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 112
<211> LENGTH: 164
<212> TYPE: PRT
<213> ORGANISM: Homo sapiens

<400> SEQUENCE: 112

Ser Leu Gln Asp Pro Cys Ser Asn Cys Pro Ala Gly Thr Phe Cys Asp
1               5                   10                  15

Asn Asn Arg Asn Gln Ile Cys Ser Pro Cys Pro Pro Asn Ser Phe Ser
            20                  25                  30

Ser Ala Gly Gly Gln Arg Thr Cys Asp Ile Cys Arg Gln Cys Lys Gly
        35                  40                  45

Val Phe Arg Thr Arg Lys Glu Cys Ser Ser Thr Ser Asn Ala Glu Cys
    50                  55                  60

Asp Cys Thr Pro Gly Phe His Cys Leu Gly Ala Gly Cys Ser Met Cys
65                  70                  75                  80

Glu Gln Asp Cys Lys Gln Gly Gln Glu Leu Thr Lys Lys Gly Cys Lys
                85                  90                  95

Asp Cys Cys Phe Gly Thr Phe Asn Asp Gln Lys Arg Gly Ile Cys Arg
                100                 105                 110

Pro Trp Thr Asn Cys Ser Leu Asp Gly Lys Ser Val Leu Val Asn Gly
            115                 120                 125

Thr Lys Glu Arg Asp Val Val Cys Gly Pro Ser Pro Ala Asp Leu Ser
        130                 135                 140

Pro Gly Ala Ser Ser Val Thr Pro Pro Ala Pro Ala Arg Glu Pro Gly
145                 150                 155                 160

His Ser Pro Gln

<210> SEQ ID NO 113
<211> LENGTH: 164
<212> TYPE: PRT
<213> ORGANISM: Macaca fascicularis

<400> SEQUENCE: 113

Ser Leu Gln Asp Leu Cys Ser Asn Cys Pro Ala Gly Thr Phe Cys Asp
1               5                   10                  15

Asn Asn Arg Ser Gln Ile Cys Ser Pro Cys Pro Asn Ser Phe Ser
            20                  25                  30

Ser Ala Gly Gly Gln Arg Thr Cys Asp Ile Cys Arg Gln Cys Lys Gly
        35                  40                  45

Val Phe Lys Thr Arg Lys Glu Cys Ser Ser Thr Ser Asn Ala Glu Cys
50                  55                  60

Asp Cys Ile Ser Gly Tyr His Cys Leu Gly Ala Glu Cys Ser Met Cys
65                  70                  75                  80

Glu Gln Asp Cys Lys Gln Gly Gln Glu Leu Thr Lys Lys Gly Cys Lys
                85                  90                  95

Asp Cys Cys Phe Gly Thr Phe Asn Asp Gln Lys Arg Gly Ile Cys Arg
                100                 105                 110

Pro Trp Thr Asn Cys Ser Leu Asp Gly Lys Ser Val Leu Val Asn Gly
            115                 120                 125

Thr Lys Glu Arg Asp Val Val Cys Gly Pro Ser Pro Ala Asp Leu Ser
        130                 135                 140

Pro Gly Ala Ser Ser Ala Thr Pro Pro Ala Pro Ala Arg Glu Pro Gly
145                 150                 155                 160

His Ser Pro Gln

<210> SEQ ID NO 114
<211> LENGTH: 165
<212> TYPE: PRT
<213> ORGANISM: Mus musculus

<400> SEQUENCE: 114

Ala Val Gln Asn Ser Cys Asp Asn Cys Gln Pro Gly Thr Phe Cys Arg
1               5                   10                  15

Lys Tyr Asn Pro Val Cys Lys Ser Cys Pro Pro Ser Thr Phe Ser Ser
            20                  25                  30

Ile Gly Gly Gln Pro Asn Cys Asn Ile Cys Arg Val Cys Ala Gly Tyr
        35                  40                  45

Phe Arg Phe Lys Lys Phe Cys Ser Ser Thr His Asn Ala Glu Cys Glu
50                  55                  60

Cys Ile Glu Gly Phe His Cys Leu Gly Pro Gln Cys Thr Arg Cys Glu
65                  70                  75                  80

Lys Asp Cys Arg Pro Gly Gln Glu Leu Thr Lys Gln Gly Cys Lys Thr

```
            85                  90                  95
Cys Ser Leu Gly Thr Phe Asn Asp Gln Asn Gly Thr Gly Val Cys Arg
            100                 105                 110

Pro Trp Thr Asn Cys Ser Leu Asp Gly Arg Ser Val Leu Lys Thr Gly
        115                 120                 125

Thr Thr Glu Lys Asp Val Val Cys Gly Pro Val Val Ser Phe Ser
    130                 135                 140

Pro Ser Thr Thr Ile Ser Val Thr Pro Glu Gly Gly Pro Gly His
145                 150                 155                 160

Ser Leu Gln Val Leu
                165

<210> SEQ ID NO 115
<211> LENGTH: 249
<212> TYPE: PRT
<213> ORGANISM: Mus musculus

<400> SEQUENCE: 115

Pro Arg Gly Pro Thr Ile Lys Pro Cys Pro Pro Cys Lys Cys Pro Ala
1               5                   10                  15

Pro Asn Leu Glu Gly Gly Pro Ser Val Phe Ile Phe Pro Pro Lys Ile
            20                  25                  30

Lys Asp Val Leu Met Ile Ser Leu Ser Pro Ile Val Thr Cys Val Val
        35                  40                  45

Val Asp Val Ser Glu Asp Asp Pro Asp Val Gln Ile Ser Trp Phe Val
    50                  55                  60

Asn Asn Val Glu Val His Thr Ala Gln Thr Gln Thr His Arg Glu Asp
65                  70                  75                  80

Tyr Asn Ser Thr Leu Arg Val Val Ser Ala Leu Pro Ile Gln His Gln
                85                  90                  95

Asp Trp Met Ser Gly Lys Ala Phe Ala Cys Ala Val Asn Asn Lys Asp
            100                 105                 110

Leu Pro Ala Pro Ile Glu Arg Thr Ile Ser Lys Pro Lys Gly Ser Val
        115                 120                 125

Arg Ala Pro Gln Val Tyr Val Leu Pro Pro Pro Glu Glu Glu Met Thr
    130                 135                 140

Lys Lys Gln Val Thr Leu Thr Cys Met Val Thr Asp Phe Met Pro Glu
145                 150                 155                 160

Asp Ile Tyr Val Glu Trp Thr Asn Asn Gly Lys Thr Glu Leu Asn Tyr
                165                 170                 175

Lys Asn Thr Glu Pro Val Leu Asp Ser Asp Gly Ser Tyr Phe Met Tyr
            180                 185                 190

Ser Lys Leu Arg Val Glu Lys Lys Asn Trp Val Glu Arg Asn Ser Tyr
        195                 200                 205

Ser Cys Ser Val Val His Glu Gly Leu His Asn His Thr Thr Lys
    210                 215                 220

Ser Phe Ser Arg Thr Pro Gly Lys Gly Gly Leu Asn Asp Ile Phe
225                 230                 235                 240

Glu Ala Gln Lys Ile Glu Trp His Glu
                245

<210> SEQ ID NO 116
<211> LENGTH: 188
<212> TYPE: PRT
<213> ORGANISM: Artificial Sequence
<220> FEATURE:
```

<223> OTHER INFORMATION: Synthetic

<400> SEQUENCE: 116

Leu His Cys Val Gly Asp Thr Tyr Pro Ser Asn Asp Arg Cys Cys His
1               5                   10                  15

Glu Cys Arg Pro Gly Asn Gly Met Val Ser Arg Cys Ser Arg Ser Gln
            20                  25                  30

Asn Thr Val Cys Arg Pro Cys Gly Pro Gly Phe Tyr Asn Asp Val Val
        35                  40                  45

Ser Ser Lys Pro Cys Lys Pro Cys Thr Trp Cys Asn Leu Arg Ser Gly
    50                  55                  60

Ser Glu Arg Lys Gln Leu Cys Thr Ala Thr Gln Asp Thr Val Cys Arg
65                  70                  75                  80

Cys Arg Ala Gly Thr Gln Pro Leu Asp Ser Tyr Lys Pro Gly Val Asp
                85                  90                  95

Cys Ala Pro Cys Pro Pro Gly His Phe Ser Pro Gly Asp Asn Gln Ala
            100                 105                 110

Cys Lys Pro Trp Thr Asn Cys Thr Leu Ala Gly Lys His Thr Leu Gln
        115                 120                 125

Pro Ala Ser Asn Ser Ser Asp Ala Ile Cys Glu Asp Arg Asp Pro Pro
    130                 135                 140

Ala Thr Gln Pro Gln Glu Thr Gln Gly Pro Pro Ala Arg Pro Ile Thr
145                 150                 155                 160

Val Gln Pro Thr Glu Ala Trp Pro Arg Thr Ser Gln Gly Pro Ser Thr
                165                 170                 175

Arg Pro Val Glu Val Pro Gly Gly Arg Ala Val Ala
            180                 185

<210> SEQ ID NO 117
<211> LENGTH: 136
<212> TYPE: PRT
<213> ORGANISM: Artificial Sequence
<220> FEATURE:
<223> OTHER INFORMATION: Synthetic

<400> SEQUENCE: 117

Gln Arg Pro Thr Gly Gly Pro Gly Cys Gly Pro Gly Arg Leu Leu Leu
1               5                   10                  15

Gly Thr Gly Thr Asp Ala Arg Cys Cys Arg Val His Thr Thr Arg Cys
            20                  25                  30

Cys Arg Asp Tyr Pro Gly Glu Glu Cys Ser Glu Trp Asp Cys Met
        35                  40                  45

Cys Val Gln Pro Glu Phe His Cys Gly Asp Pro Cys Cys Thr Thr Cys
    50                  55                  60

Arg His His Pro Cys Pro Gly Gln Gly Val Gln Ser Gln Gly Lys
65                  70                  75                  80

Phe Ser Phe Gly Phe Gln Cys Ile Asp Cys Ala Ser Gly Thr Phe Ser
                85                  90                  95

Gly Gly His Glu Gly His Cys Lys Pro Trp Thr Asp Cys Thr Gln Phe
            100                 105                 110

Gly Phe Leu Thr Val Phe Pro Gly Asn Lys Thr His Asn Ala Val Cys
        115                 120                 125

Val Pro Gly Ser Pro Pro Ala Glu
    130                 135

<210> SEQ ID NO 118

<211> LENGTH: 173
<212> TYPE: PRT
<213> ORGANISM: Artificial Sequence
<220> FEATURE:
<223> OTHER INFORMATION: Synthetic

<400> SEQUENCE: 118

Glu Pro Pro Thr Ala Cys Arg Glu Lys Gln Tyr Leu Ile Asn Ser Gln
1               5                   10                  15

Cys Cys Ser Leu Cys Gln Pro Gly Gln Lys Leu Val Ser Asp Cys Thr
            20                  25                  30

Glu Phe Thr Glu Thr Glu Cys Leu Pro Cys Gly Glu Ser Glu Phe Leu
        35                  40                  45

Asp Thr Trp Asn Arg Glu Thr His Cys His Gln His Lys Tyr Cys Asp
    50                  55                  60

Pro Asn Leu Gly Leu Arg Val Gln Gln Lys Gly Thr Ser Glu Thr Asp
65                  70                  75                  80

Thr Ile Cys Thr Cys Glu Glu Gly Trp His Cys Thr Ser Glu Ala Cys
                85                  90                  95

Glu Ser Cys Val Leu His Arg Ser Cys Ser Pro Gly Phe Gly Val Lys
            100                 105                 110

Gln Ile Ala Thr Gly Val Ser Asp Thr Ile Cys Glu Pro Cys Pro Val
        115                 120                 125

Gly Phe Phe Ser Asn Val Ser Ser Ala Phe Glu Lys Cys His Pro Trp
    130                 135                 140

Thr Ser Cys Glu Thr Lys Asp Leu Val Val Gln Gln Ala Gly Thr Asn
145                 150                 155                 160

Lys Thr Asp Val Val Cys Gly Pro Gln Asp Arg Leu Arg
                165                 170

<210> SEQ ID NO 119
<211> LENGTH: 232
<212> TYPE: PRT
<213> ORGANISM: Artificial Sequence
<220> FEATURE:
<223> OTHER INFORMATION: Synthetic

<400> SEQUENCE: 119

Leu Gln Asp Pro Cys Ser Asn Cys Pro Ala Gly Thr Phe Cys Asp Asn
1               5                   10                  15

Asn Arg Asn Gln Ile Cys Ser Pro Cys Pro Pro Asn Ser Phe Ser Ser
            20                  25                  30

Ala Gly Gly Gln Arg Thr Cys Asp Ile Cys Arg Gln Cys Lys Gly Val
        35                  40                  45

Phe Arg Thr Arg Lys Glu Cys Ser Ser Thr Ser Asn Ala Glu Cys Asp
    50                  55                  60

Cys Thr Pro Gly Phe His Cys Leu Gly Ala Gly Cys Ser Met Cys Glu
65                  70                  75                  80

Gln Asp Cys Lys Gln Gly Gln Glu Leu Thr Lys Lys Gly Cys Lys Asp
                85                  90                  95

Cys Cys Phe Gly Thr Phe Asn Asp Gln Lys Arg Gly Ile Cys Arg Pro
            100                 105                 110

Trp Thr Asn Cys Ser Leu Asp Gly Lys Ser Val Leu Val Asn Gly Thr
        115                 120                 125

Lys Glu Arg Asp Val Val Cys Gly Pro Ser Pro Ala Asp Leu Ser Pro
    130                 135                 140

Gly Ala Ser Ser Val Thr Pro Pro Ala Pro Ala Arg Glu Pro Gly His

```
                145                 150                 155                 160
Ser Pro Gln Ile Ile Ser Phe Leu Ala Leu Thr Ser Thr Ala Leu
                    165                 170                 175

Leu Phe Leu Leu Phe Phe Leu Thr Leu Arg Phe Ser Val Val Lys Arg
                    180                 185                 190

Gly Arg Lys Lys Leu Leu Tyr Ile Phe Lys Gln Pro Phe Met Arg Pro
                    195                 200                 205

Val Gln Thr Thr Gln Glu Glu Asp Gly Cys Ser Cys Arg Phe Pro Glu
                    210                 215                 220

Glu Glu Glu Gly Gly Cys Glu Leu
225                 230

<210> SEQ ID NO 120
<211> LENGTH: 231
<212> TYPE: PRT
<213> ORGANISM: Artificial Sequence
<220> FEATURE:
<223> OTHER INFORMATION: Synthetic

<400> SEQUENCE: 120

Leu Gln Asp Leu Cys Ser Asn Cys Pro Ala Gly Thr Phe Cys Asp Asn
1               5                   10                  15

Asn Arg Ser Gln Ile Cys Ser Pro Cys Pro Pro Asn Ser Phe Ser Ser
                20                  25                  30

Ala Gly Gly Gln Arg Thr Cys Asp Ile Cys Arg Gln Cys Lys Gly Val
                35                  40                  45

Phe Lys Thr Arg Lys Glu Cys Ser Ser Thr Ser Asn Ala Glu Cys Asp
50                  55                  60

Cys Ile Ser Gly Tyr His Cys Leu Gly Ala Glu Cys Ser Met Cys Glu
65                  70                  75                  80

Gln Asp Cys Lys Gln Gly Gln Glu Leu Thr Lys Lys Gly Cys Lys Asp
                85                  90                  95

Cys Cys Phe Gly Thr Phe Asn Asp Gln Lys Arg Gly Ile Cys Arg Pro
                100                 105                 110

Trp Thr Asn Cys Ser Leu Asp Gly Lys Ser Val Leu Val Asn Gly Thr
                115                 120                 125

Lys Glu Arg Asp Val Val Cys Gly Pro Ser Pro Ala Asp Leu Ser Pro
130                 135                 140

Gly Ala Ser Ser Ala Thr Pro Pro Ala Pro Ala Arg Glu Pro Gly His
145                 150                 155                 160

Ser Pro Gln Ile Ile Phe Phe Leu Ala Leu Thr Ser Thr Val Val Leu
                165                 170                 175

Phe Leu Leu Phe Phe Leu Val Leu Arg Phe Ser Val Val Lys Arg Ser
                180                 185                 190

Arg Lys Lys Leu Leu Tyr Ile Phe Lys Gln Pro Phe Met Arg Pro Val
                195                 200                 205

Gln Thr Thr Gln Glu Glu Asp Gly Cys Ser Cys Arg Phe Pro Glu Glu
                210                 215                 220

Glu Glu Gly Gly Cys Glu Leu
225                 230

<210> SEQ ID NO 121
<211> LENGTH: 5
<212> TYPE: PRT
<213> ORGANISM: Artificial Sequence
<220> FEATURE:
<223> OTHER INFORMATION: Synthetic
```

<400> SEQUENCE: 121

Tyr Trp Asp Gln Glu
1               5

<210> SEQ ID NO 122
<211> LENGTH: 5
<212> TYPE: PRT
<213> ORGANISM: Artificial Sequence
<220> FEATURE:
<223> OTHER INFORMATION: Synthetic

<400> SEQUENCE: 122

Asp Glu Gln Phe Ala
1               5

<210> SEQ ID NO 123
<211> LENGTH: 9
<212> TYPE: PRT
<213> ORGANISM: Artificial Sequence
<220> FEATURE:
<223> OTHER INFORMATION: Synthetic

<400> SEQUENCE: 123

Gln Tyr Arg Trp Asn Pro Ala Asp Tyr
1               5

<210> SEQ ID NO 124
<211> LENGTH: 106
<212> TYPE: PRT
<213> ORGANISM: Artificial Sequence
<220> FEATURE:
<223> OTHER INFORMATION: Synthetic

<400> SEQUENCE: 124

Gly Gln Pro Arg Glu Pro Gln Val Tyr Thr Leu Pro Pro Ser Arg Asp
1               5                   10                  15

Glu Tyr Trp Asp Gln Glu Val Ser Leu Thr Cys Leu Val Lys Gly Phe
            20                  25                  30

Tyr Pro Ser Asp Ile Ala Val Glu Trp Glu Ser Asn Gly Asp Glu Gln
        35                  40                  45

Phe Ala Tyr Lys Thr Thr Pro Pro Val Leu Asp Ser Asp Gly Ser Phe
    50                  55                  60

Phe Leu Tyr Ser Lys Leu Thr Val Asp Gln Tyr Arg Trp Asn Pro Ala
65                  70                  75                  80

Asp Tyr Phe Ser Cys Ser Val Met His Glu Ala Leu His Asn His Tyr
                85                  90                  95

Thr Gln Lys Ser Leu Ser Leu Ser Pro Gly
            100                 105

<210> SEQ ID NO 125
<211> LENGTH: 8
<212> TYPE: PRT
<213> ORGANISM: Artificial Sequence
<220> FEATURE:
<223> OTHER INFORMATION: Synthetic

<400> SEQUENCE: 125

Arg Asp Glu Tyr Trp Asp Gln Glu
1               5

<210> SEQ ID NO 126
<211> LENGTH: 9

```
<212> TYPE: PRT
<213> ORGANISM: Artificial Sequence
<220> FEATURE:
<223> OTHER INFORMATION: Synthetic

<400> SEQUENCE: 126

Ser Asn Gly Asp Glu Gln Phe Ala Tyr
1               5

<210> SEQ ID NO 127
<211> LENGTH: 10
<212> TYPE: PRT
<213> ORGANISM: Artificial Sequence
<220> FEATURE:
<223> OTHER INFORMATION: Synthetic

<400> SEQUENCE: 127

Asp Gln Tyr Arg Trp Asn Pro Ala Asp Tyr
1               5                   10
```